United States Patent [19]

Kimura et al.

[11] Patent Number: 5,737,579
[45] Date of Patent: Apr. 7, 1998

[54] SYSTEM AND METHOD FOR EMULATING COMPUTER ARCHITECTURES

[75] Inventors: Tsunenori Kimura; Chiharu Takeuchi; Masaru Kohno, all of Suwa, Japan

[73] Assignee: Seiko Epson Corporation, Tokyo, Japan

[21] Appl. No.: 361,528

[22] Filed: Dec. 22, 1994

[30] Foreign Application Priority Data

| Dec. 24, 1993 | [JP] | Japan | 5-328588 |
| Apr. 11, 1994 | [JP] | Japan | 6-097991 |
| Oct. 21, 1994 | [JP] | Japan | 6-282539 |

[51] Int. Cl.$^6$ ............................. G06F 13/00
[52] U.S. Cl. ............ 395/500; 395/375; 395/527; 395/376; 395/737
[58] Field of Search .......... 364/578; 395/500, 395/375, 800, 700, 600, 650, 821, 413, 775, 735, 734, 846, 868, 842, 412, 480, 200.03, 421.04, 737, 430, 550, 421.02, 527, 376, 200.08, 200.01; 371/64.1, 25.1, 26, 22.3, 67.1

[56] References Cited

U.S. PATENT DOCUMENTS

| 3,891,974 | 6/1975 | Coulter et al. | 395/500 |
| 4,727,480 | 2/1988 | Albright et al. | 395/500 |
| 4,862,347 | 8/1989 | Rudy | 395/500 |
| 4,951,195 | 8/1990 | Fogg, Jr. et al. | 395/500 |
| 4,956,770 | 9/1990 | Johnson et al. | 395/375 |
| 4,985,826 | 1/1991 | Jonsson et al. | 395/375 |
| 5,167,023 | 11/1992 | de Nicolas et al. | 395/375 |
| 5,408,622 | 4/1995 | Fitch | 395/500 |
| 5,426,769 | 6/1995 | Pawloski | 395/500 |
| 5,440,720 | 8/1995 | Baisuck et al. | 395/500 |
| 5,440,747 | 8/1995 | Kiuchi | 395/500 |
| 5,502,826 | 3/1996 | Vassiliadis et al. | 395/500 |
| 5,566,326 | 10/1996 | Hirsch et al. | 395/500 |

Primary Examiner—Jacques Louis-Jacques
Attorney, Agent, or Firm—Oliff & Berridge, P.L.C.

[57] ABSTRACT

When a CPU issues an instruction conforming to a second architecture, the instruction is accepted by an I/O acceptance device within a subcontroller. If an event is set in an SMI status display device in accordance with the contents of the instruction, an SMI generation device simultaneously outputs an SMI signal to the CPU. If that happens, an SMM handler executes given processing corresponding to the event, and a translated instruction is transferred to a first device control device. An instruction that can be translated by hardware circuitry is translated by an instruction translation device that comprises microcode memory. This ensures that a first device control device can be used as a structural component of hardware of a second architecture. It also allows the implementation of compatibility with a number of different computer architectures.

85 Claims, 105 Drawing Sheets

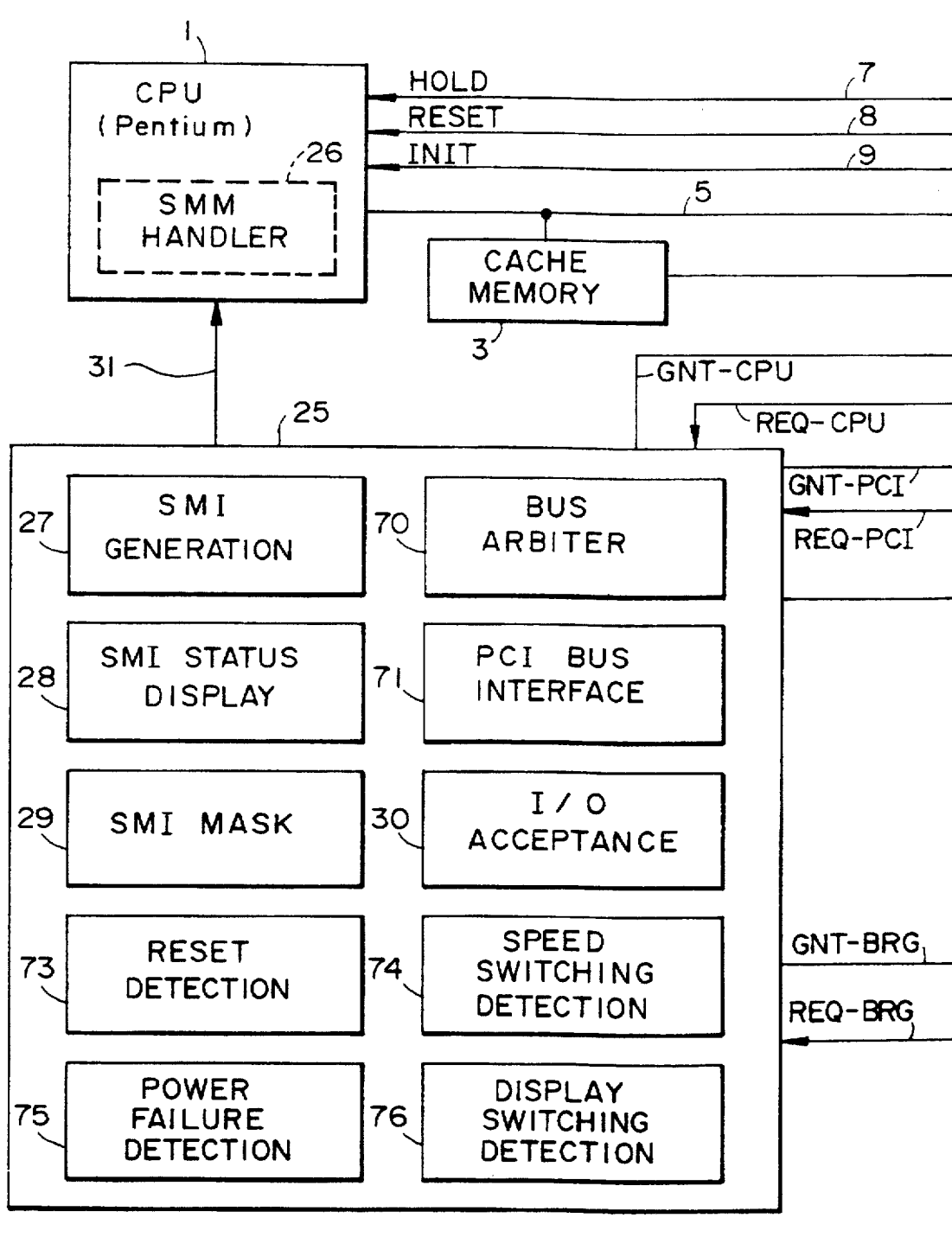

FIG. 8A
FIRST GROUP OF EVENT REGISTERS
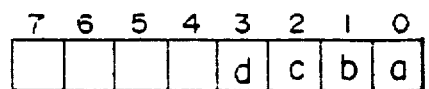
      
THIRD GROUP OF EVENT REGISTERS           SECOND GROUP OF EVENT REGISTERS
FIG. 8B
FIRST MASK REGISTER
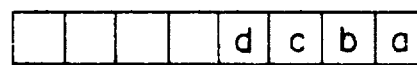
      
THIRD MASK REGISTER                       SECOND MASK REGISTER

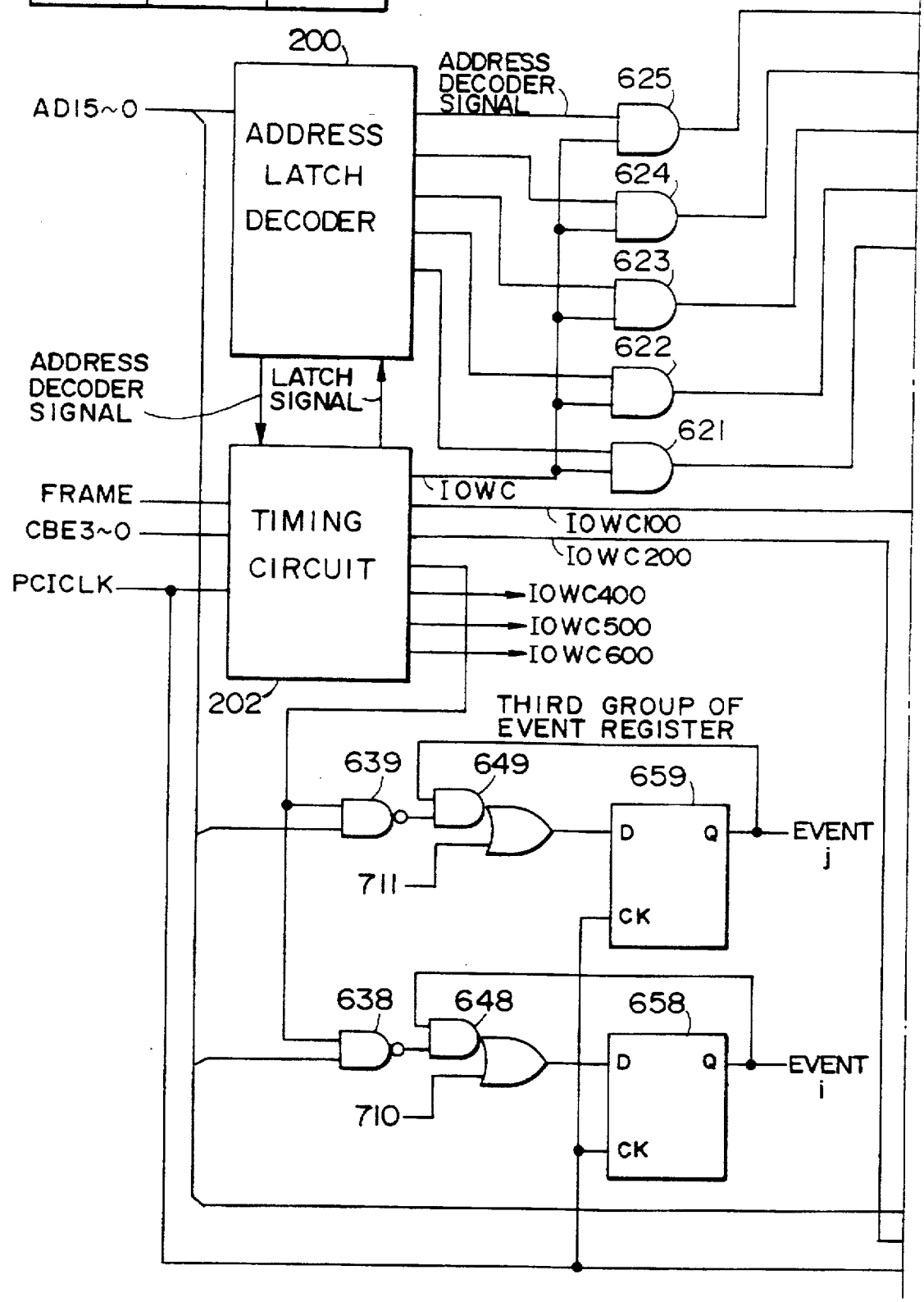

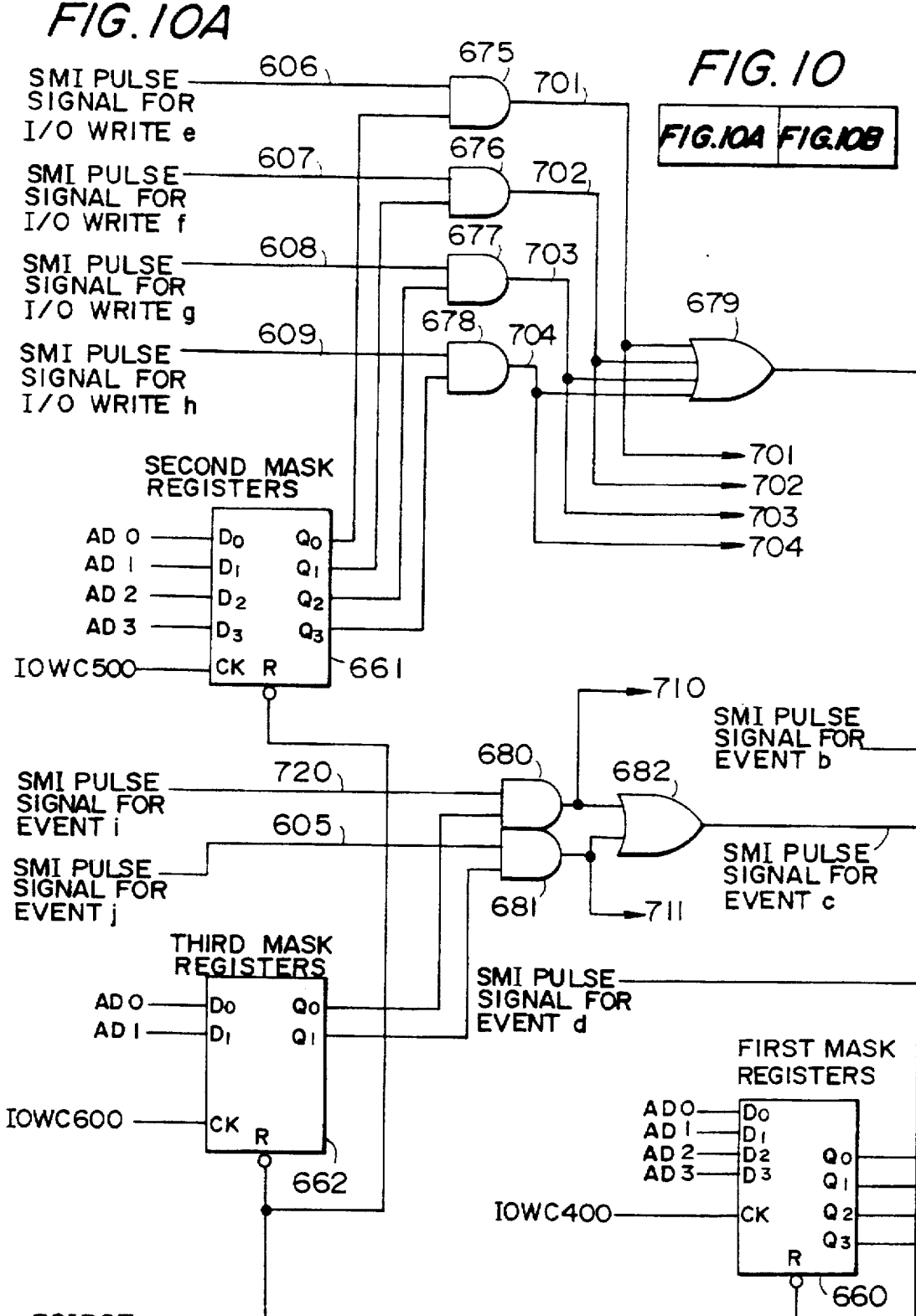

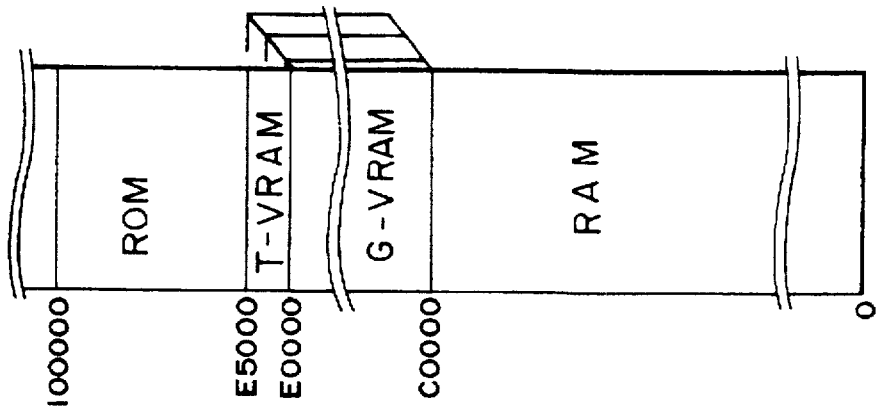
FIG.17A PCMC MEMORY SETTING REGISTER
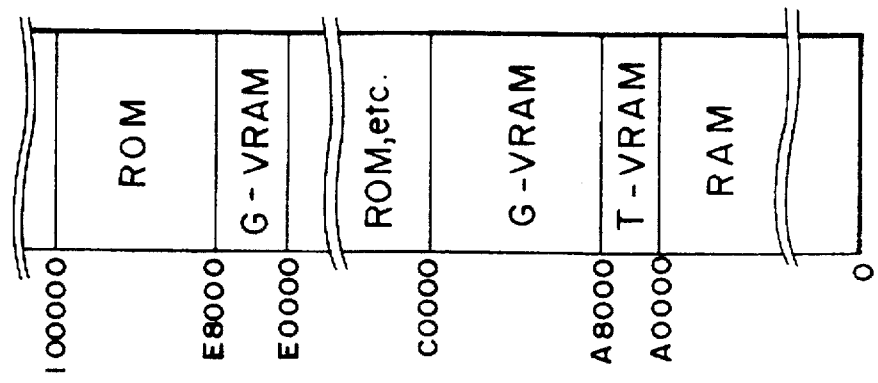
FIG.17B DISPLAY MODE 1
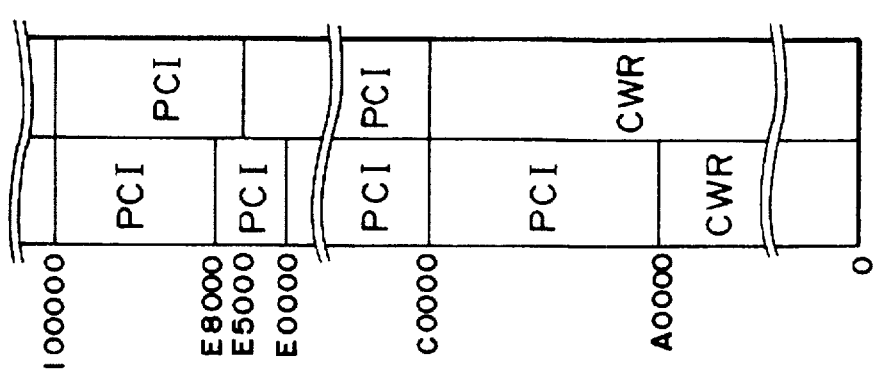
FIG.17C DISPLAY MODE 2

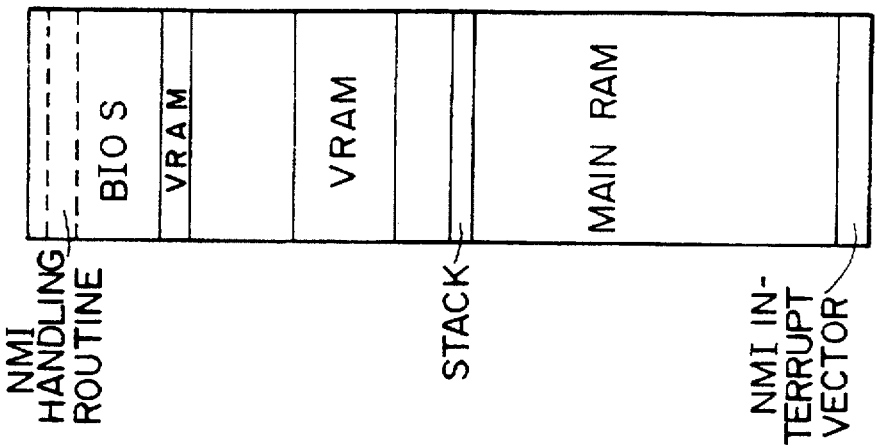
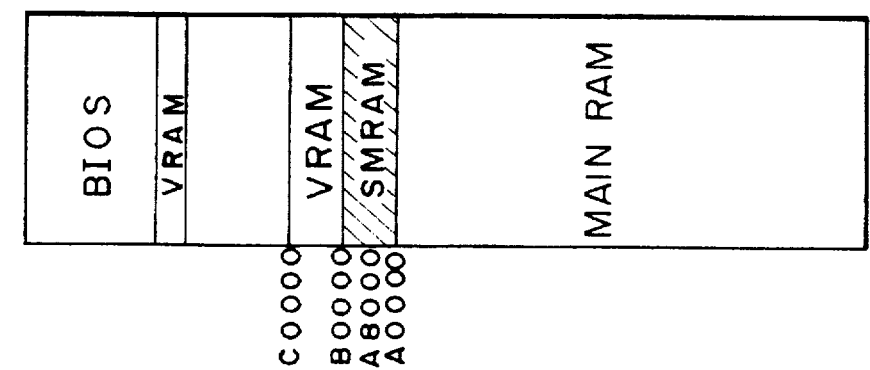
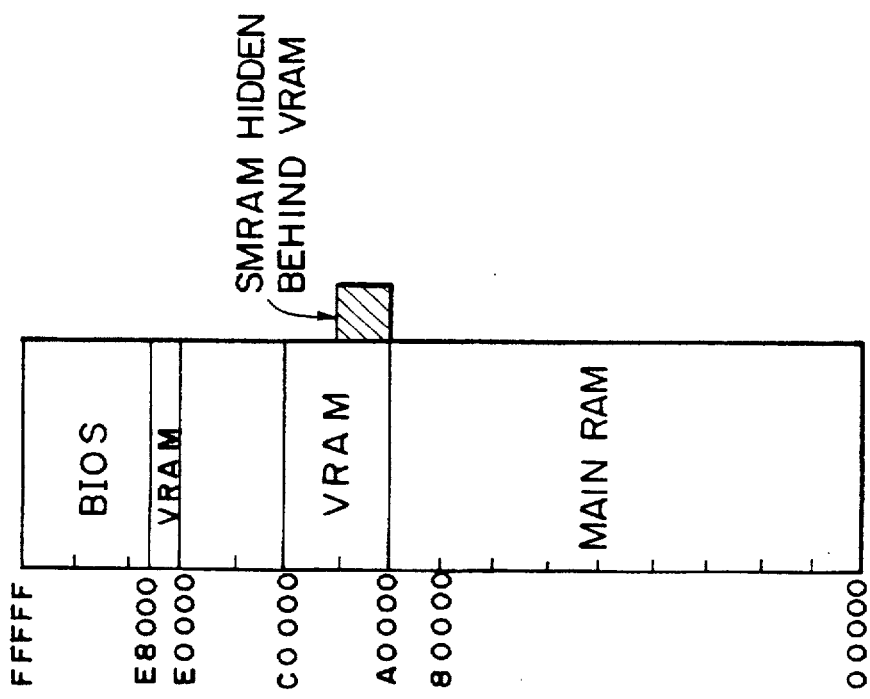

SECOND TRANSLATION METHOD

FOURTH TRANSLATION METHOD

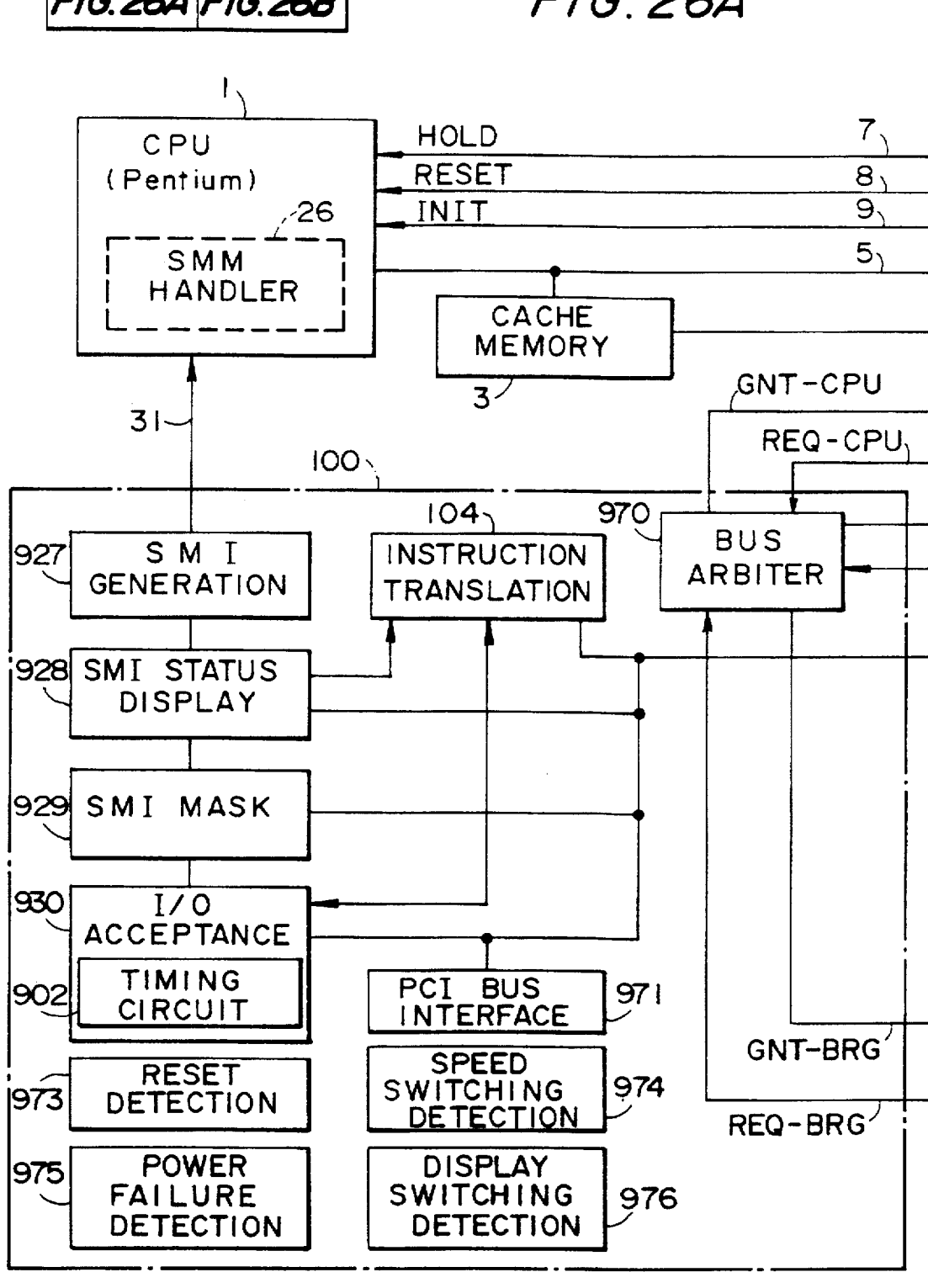

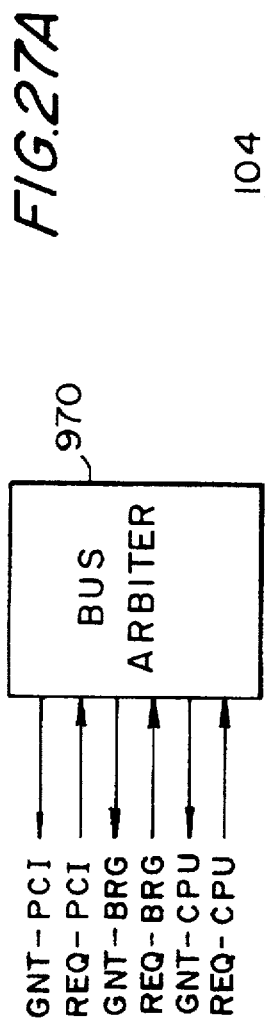
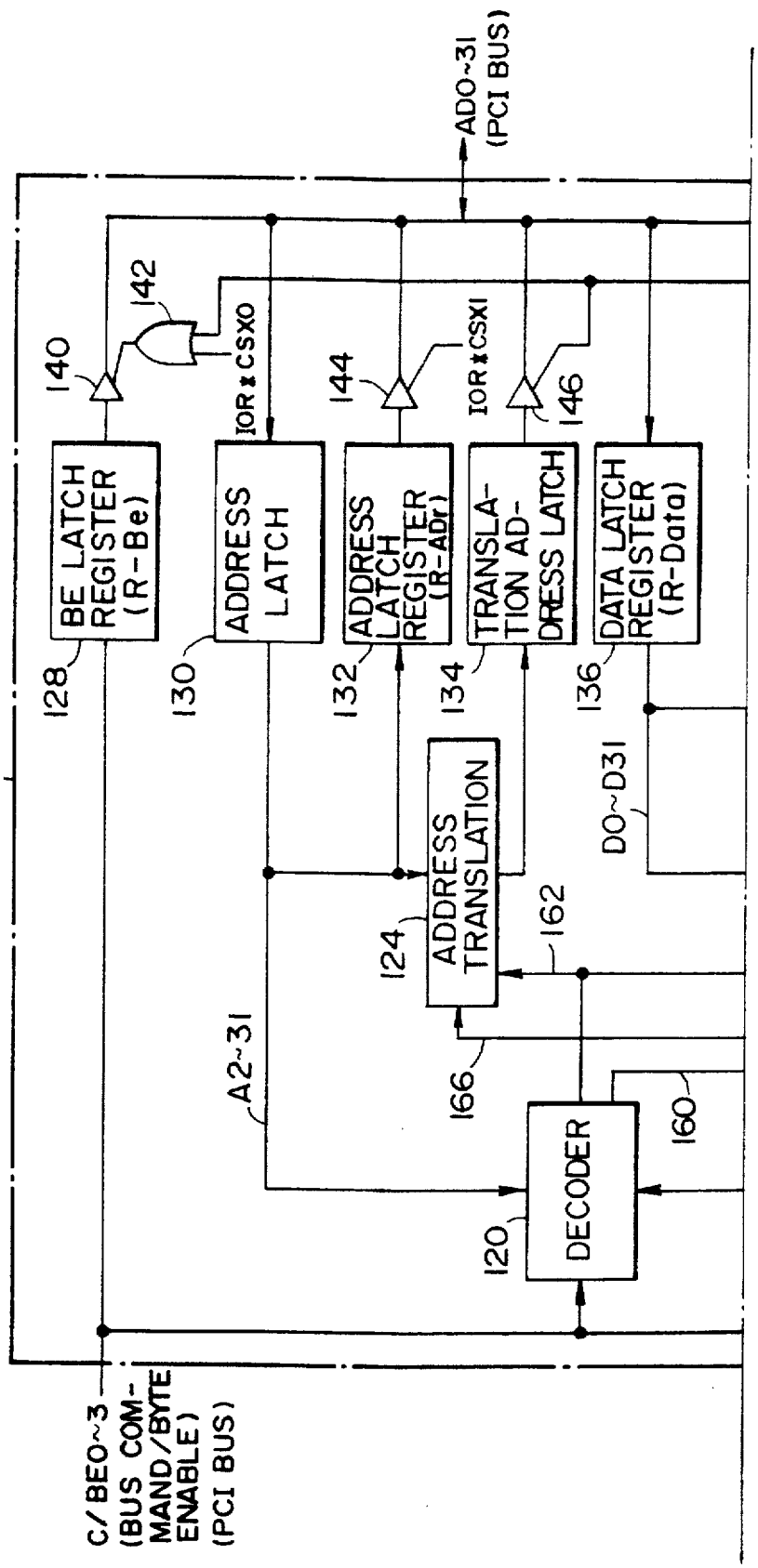
FIG. 27A

FIG. 29A

N S 16550A (FIRST SERIAL CONTROLLER)

| I/O ADDRESS | SETTING | REGISTER |
|---|---|---|
| 3F8H | DLAB=0 WRITE | TRANSMIT BUFFER REGISTER |
|  | DLAB=0 READ | RECEIVE BUFFER REGISTER |
| 3F9H | DLAB=1 | DIVISOR LATCH |
|  | DLAB=0 | INTERRUPT ENABLE REGISTER |
| 3FAH |  | INTERRUPT ID REGISTER |
| 3FBH |  | LINE CONTROL REGISTER |
| 3FCH |  | MODEM CONTROL REGISTER |
| 3FDH |  | LINE STATUS REGISTER |
| 3FEH |  | MODE STATUS REGISTER |

FIG. 29B 8251A (SECOND SERIAL CONTROLLER)

| I/O ADDRESS | SETTING | REGISTER |
|---|---|---|
| 30H | WRITE | TRANSMIT BUFFER REGISTER |
|  | READ | RECEIVE BUFFER REGISTER |
| 32H | MODE=1 WRITE | MODE REGISTER |
| 32H | MODE=0 WRITE | COMMAND REGISTER |
| 32H | MODE=0 READ | STATUS REGISTER |

EMULATION OF DATA TRANSMISSION TO RS-232C

PRESENT EMBODIMENT

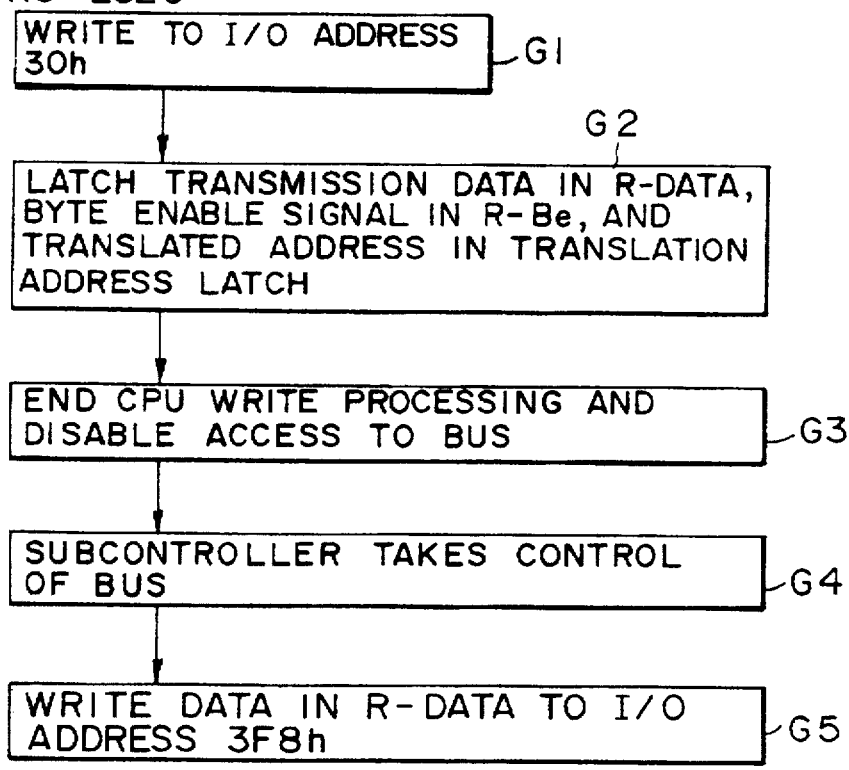
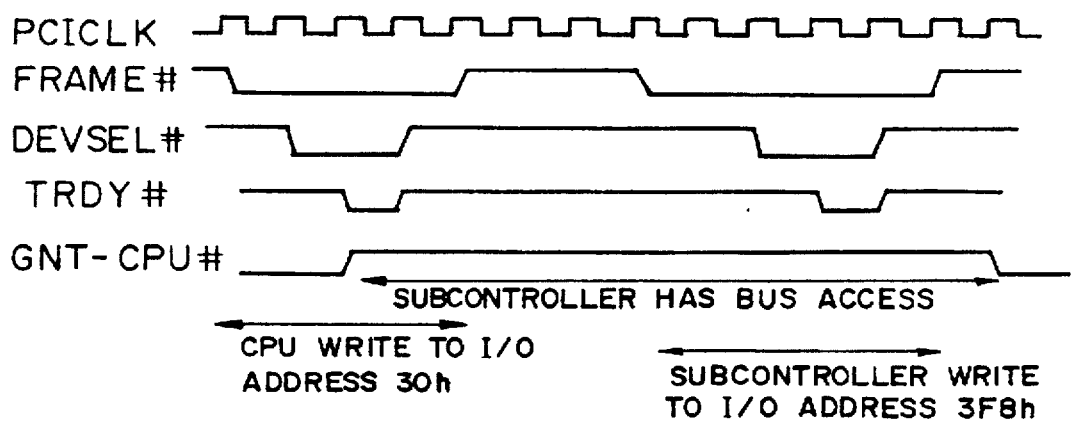

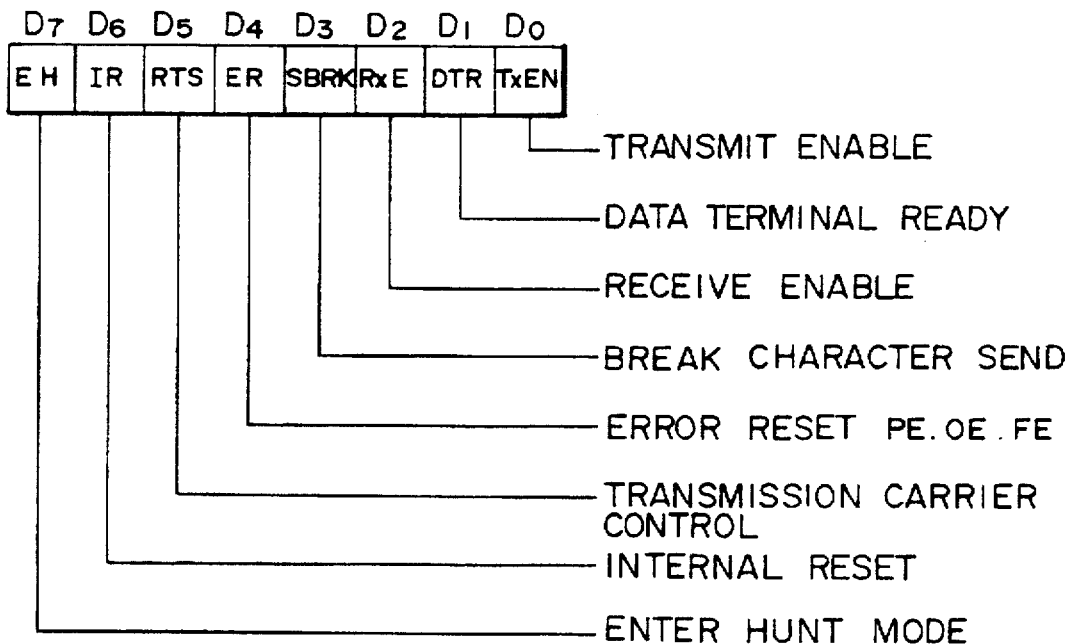
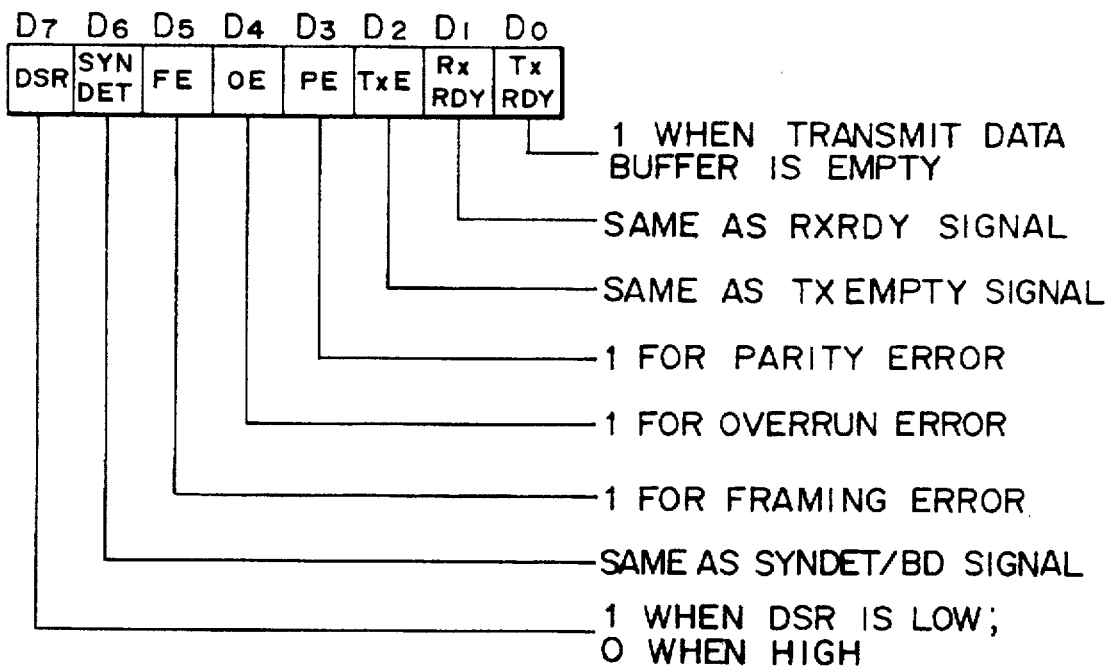

FIG. 33

********SERIAL PORT (RS232C)********

| NS16550A | | 8251A | |
|---|---|---|---|
| ADR BIT | NAME | ADR BIT | NAME |
| 3F8(DLAB=0) 0 | R Receive Buf Reg | 30 | R RECEIVE BUF |
| 3F8(DLAB=0) 0 | W Transmit Buf Reg | 30 | W TRANSMIT BUF |
| 3F9(DLAB=0) | INT ENABLE REG | | |
| 0 | EN Dat Available INT | 32 2 | W RECEIVE EN |
| 1 | EN TR Data REG Empty INT | 32 0 | W TRANSMIT EN |
| 2 | EN Receive Line ST INT | | |
| 3 | EN MODEM ST INT | | |
| 3FA | R  INT Identify Reg | | |
| 0 | 0 IF INT PENDING | | |
| 1 | INT ID Bit (0) | | |
| 2 | INT ID Bit (1) | | |
| 3 | INT ID Bit (2) | | |
| 3FA | W  FIFO CNT REG | | |
| 0 | FIFO EN | | |
| 1 | RCVR FIFO RS | | |
| 2 | XMIT FIFO RS | | |
| 3 | DMA MODE SEL | | |
| 4 | | | |
| 5 | | | |
| 6 | RCVR Trigger (LSB) | | |
| 7 | RCVR Trigger (MSB) | | |

917 → (Receive/Transmit Buf Reg)
904 → (INT ENABLE REG)

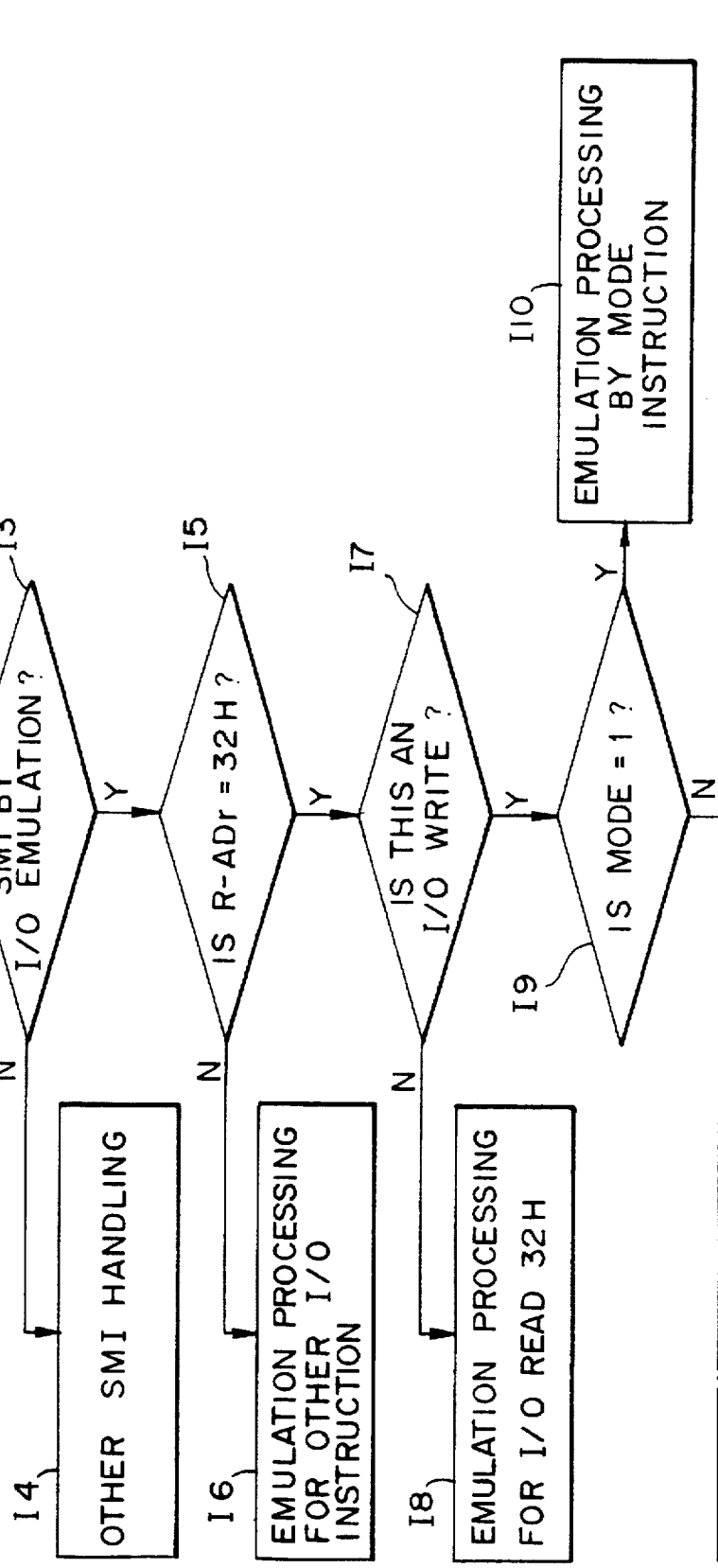

EMULATION OF COMMAND WRITE TO SIRIAL CONTROLLER

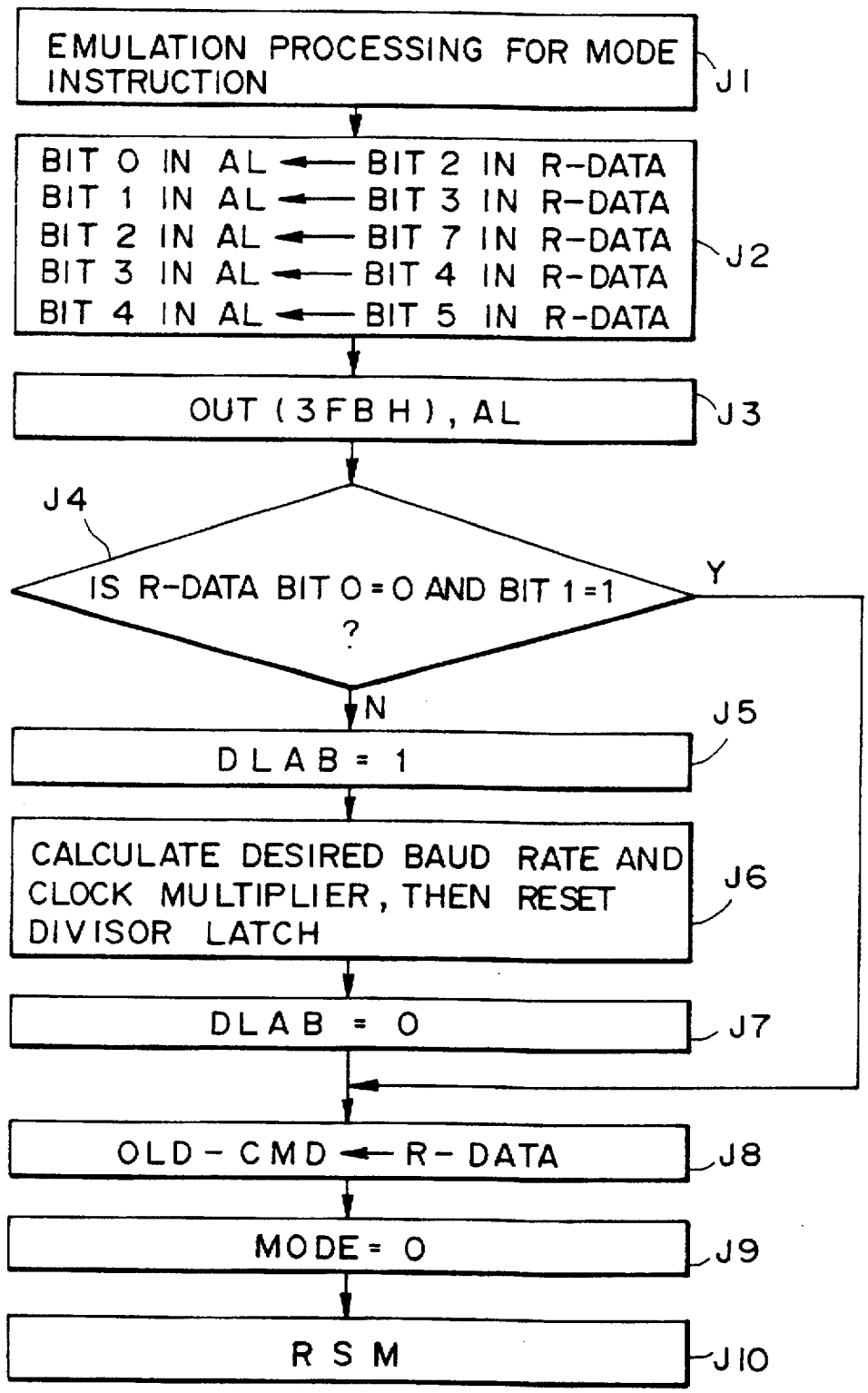

EMULATION OF DATA RECEPTION FROM RS-232C

PRESENT EMBODIMENT

EMULATION OF DATA RECEPTION FROM RS-232C

FIG. 41 EMULATION OF DATA RECEPTION FROM RS-232C

EMULATION OF STATUS READ FROM SERIAL CONTROLLER

FIG. 44

| | | | |
|---|---|---|---|
| 64 | W | DATA | CMD |
| | | 20-3F | READ 8042 RAM |
| | | 20 | READ 8042 CMD |
| | | 60-7F | WRITE 8042 RAM |
| | | -10 | IO CNT |
| | | 60 | WRITE CMD |
| | | A4 | TEST PASSWORD INST |
| | | A5 | LOAD SECURITY |
| | | A6 | EN SECURITY |
| | | A7 | DIABLE AUX DEV I/F |
| | | A8 | ENABLE AUX DEV I/F |
| | | A9 | I/F TEST (AUX) |
| | | AA | SELF TEST |
| | | AB | I/F TEST (KB) |
| | | AC | RSV |
| | | AD | DISABLE KB I/F |
| | | AE | EN KB I/F |
| | | C0 | READ INPUT PORT |
| | | C1 | POLL INPUT LOW |
| | | C2 | POLL INPUT HIGH |
| | | D0 | READ OUTPUT PORT |
| | | D1 | WRITE OUTPUT PORT |
| | | D2 | WRITE KB OUT BUF |
| | | D3 | WRITE AUX DEV OUT BUF ** |
| | | D4 | WRITE TO AUX DEV |
| | | E0 | READ TEST INPUT |
| | | F0-FF | PULSE OUT PORT |

| | | | |
|---|---|---|---|
| 43 | W | 3 | RST(SBREAK) |
| 43 | W | 2,0 | REX, TXE |

| | | | |
|---|---|---|---|
| 43 | W | 1 | RTY(DTR) |
| 43 | W | 6 | IR |
| 43 | W | | MODE SET |
| 43 | R | 4,3 | FE, OE |
| 41 | R | | KB DATA |

| 60 | R | | KB DATA (translation needed) |
|---|---|---|---|

924
928
934
930

EMULATION OF COMMAND TRANSMISSION TO KEYBOARD
(TURNING LED ON OR OFF)

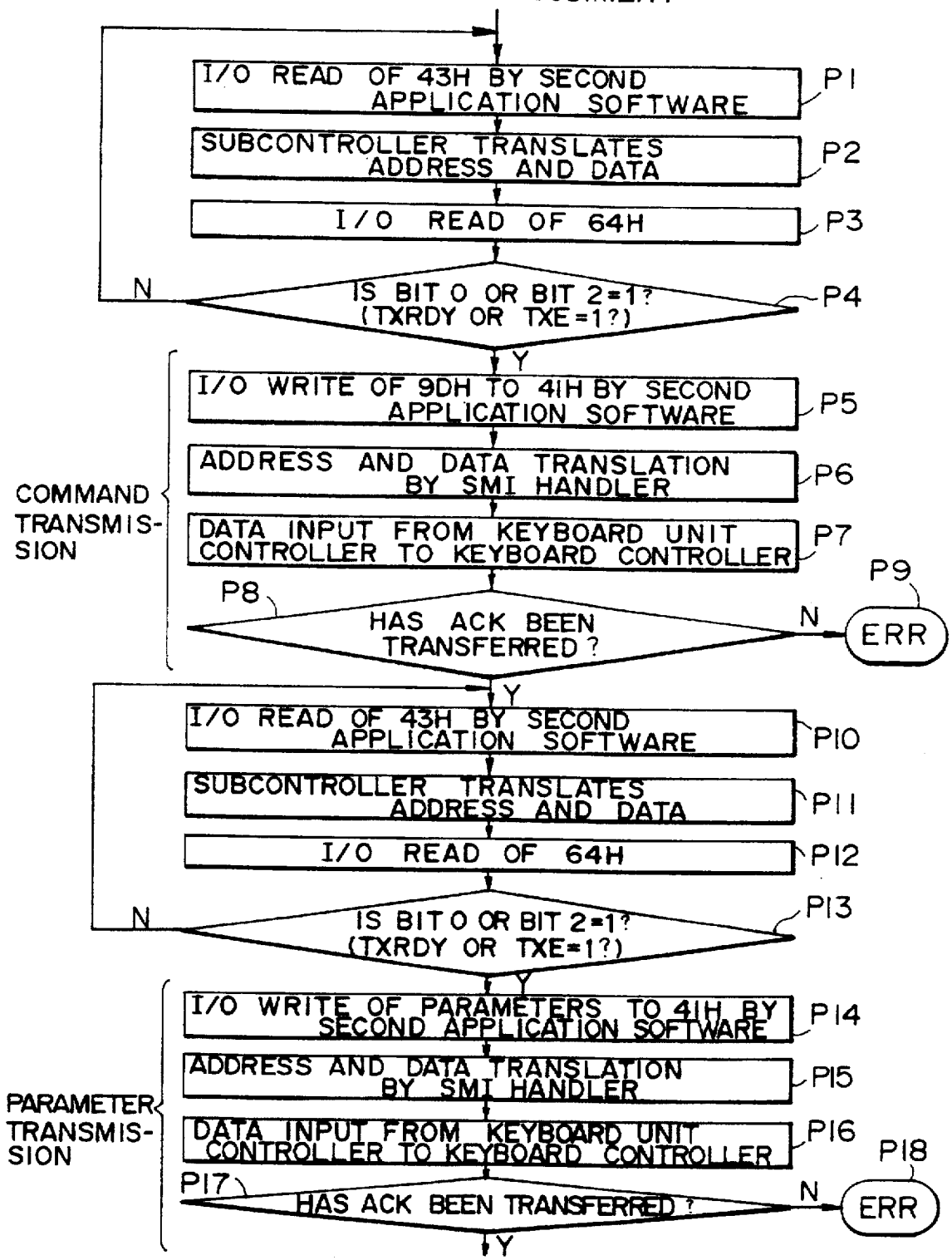

EMULATION OF COMMAND WRITE TO KEYBOARD CONTROLLER

PRESENT EMBODIMENT

EMULATION OF RECEPTION OF DATA INPUT FROM KEYBOARD
FIG. 48A
PRIOR ART
FIG. 48B
PRESENT EMBODIMENT
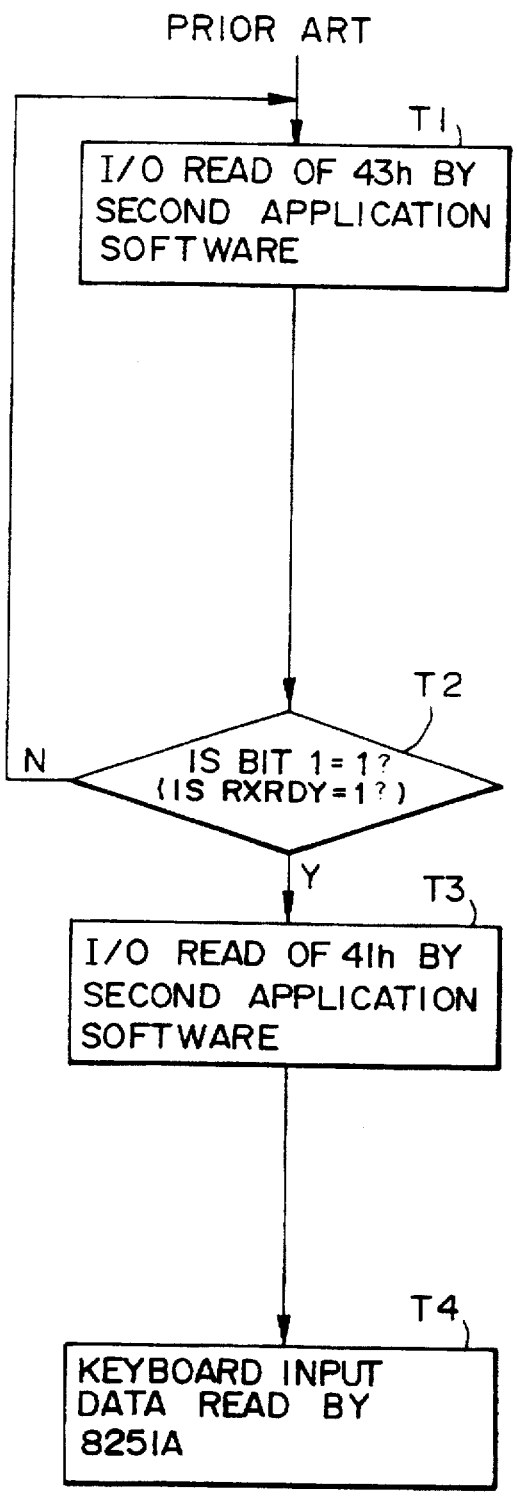
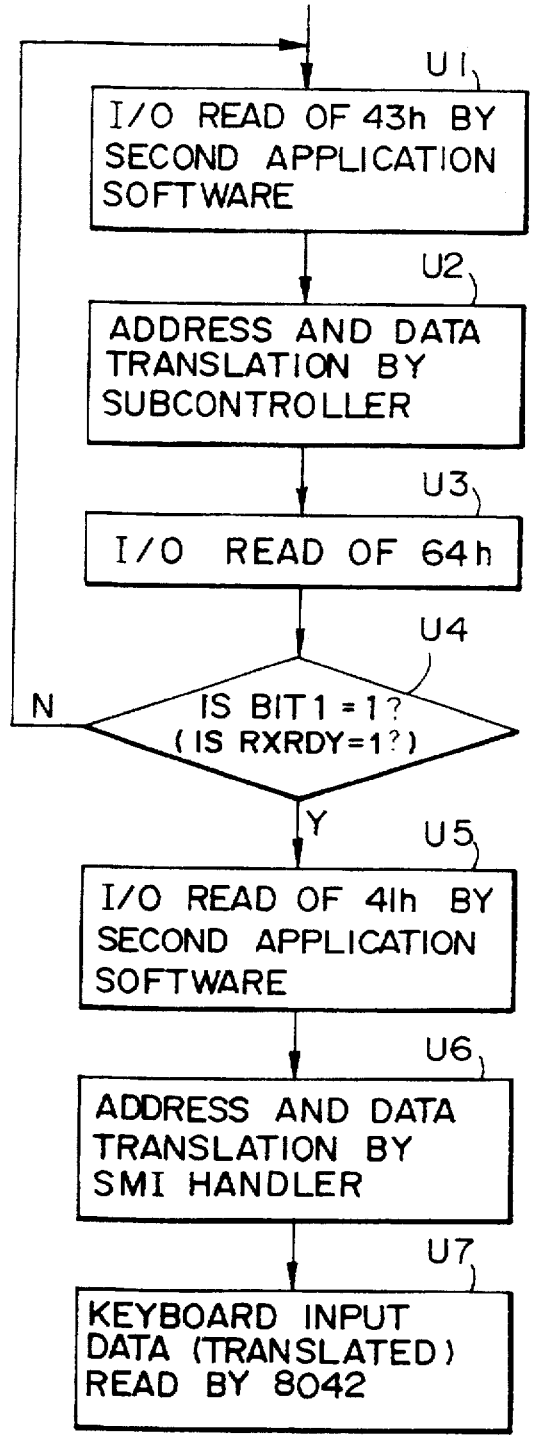

EMULATION OF RECEPTION OF DATA INPUT FRM KEYBOARD

EMULATION OF STATUS READ FROM
KEYBOARD CONTROLLER

PRESENT EMBODIMENT

FIG. 51

```
**********************INTERRUPTS***********
```

| | FIRST ARCHITECTURE | | | SECOND ARCHITECTURE | |
|---|---|---|---|---|---|
| IRQ0 | timer output 0 | $8 | | timer | $8 |
| IRQ1 | keyboard | $9 | | keyboard | $9 |
| IRQ2 | slave 8259 | $a | | CRTV | $a |
| IRQ3 | serial port 2 | $b | | INT0 | $b |
| IRQ4 | serial port 1 | $c | | RS-232C | $c |
| IRQ5 | parallel port 2 | $d | | INT1 | $d |
| IRQ6 | FDD controller | $e | | INT2 | $e |
| IRQ7 | parallel port 1 | $f | | slave 8259 | $f |
| IRQ8 | realtime clock | $70 | | centro printer | $10 |
| IRQ9 | software redirected to int0ah(irq2) | $71 | | INT3(HDD) | $11 |
| IRQ10 | rsv(slot) | $72 | | INT41(648KB FDD) | $12 |
| IRQ11 | rsv(slot) | $73 | | INT42(1MB FDD) | $13 |
| IRQ12 | rsv(slot) | $74 | | INT5 | $14 |
| IRQ13 | coprocessor | $75 | | INT6(mouse) | $15 |
| IRQ14 | HDD controller | $76 | | NDP | $16 |
| IRQ15 | rsv(slot) | $77 | | | |

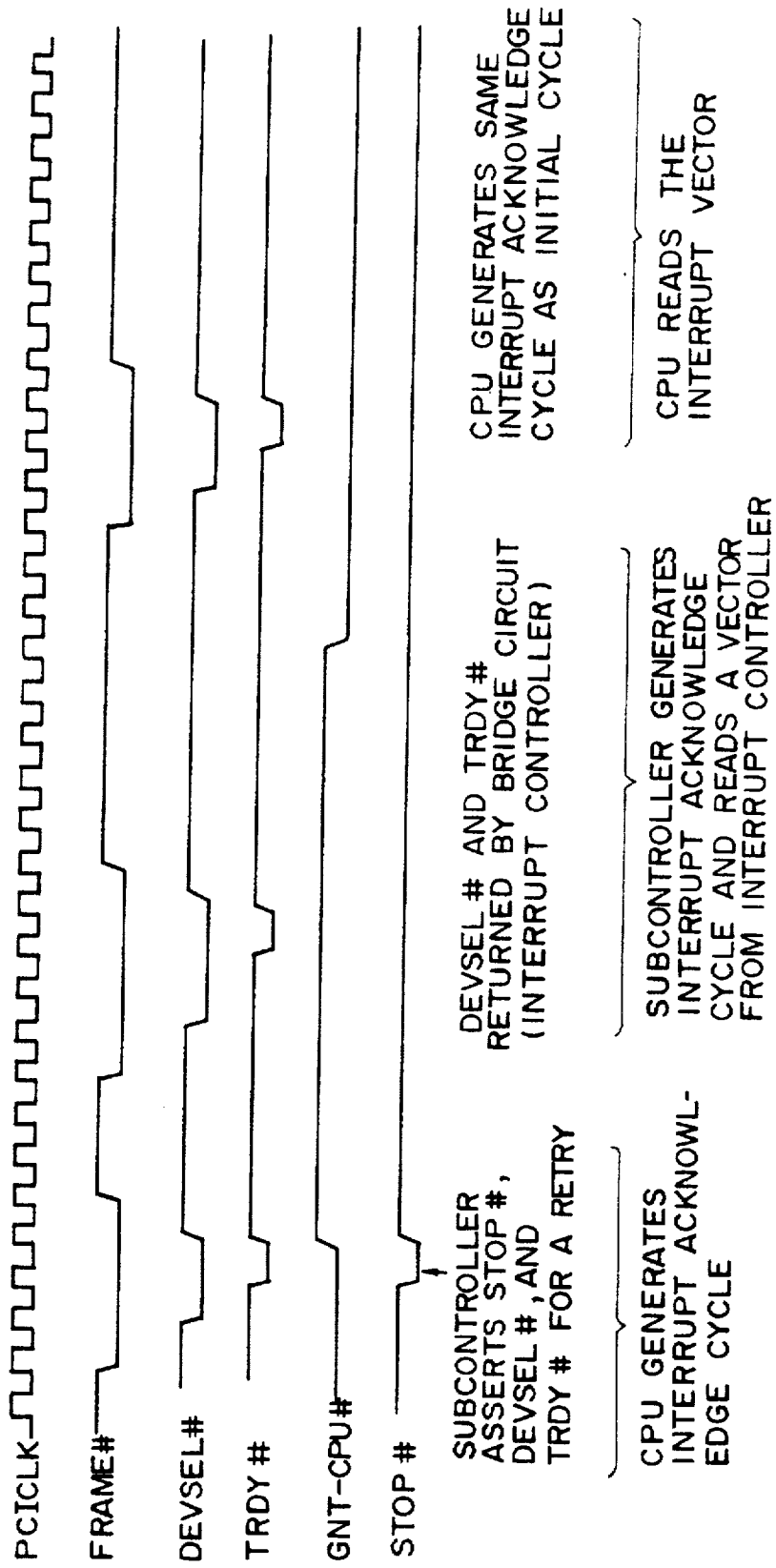

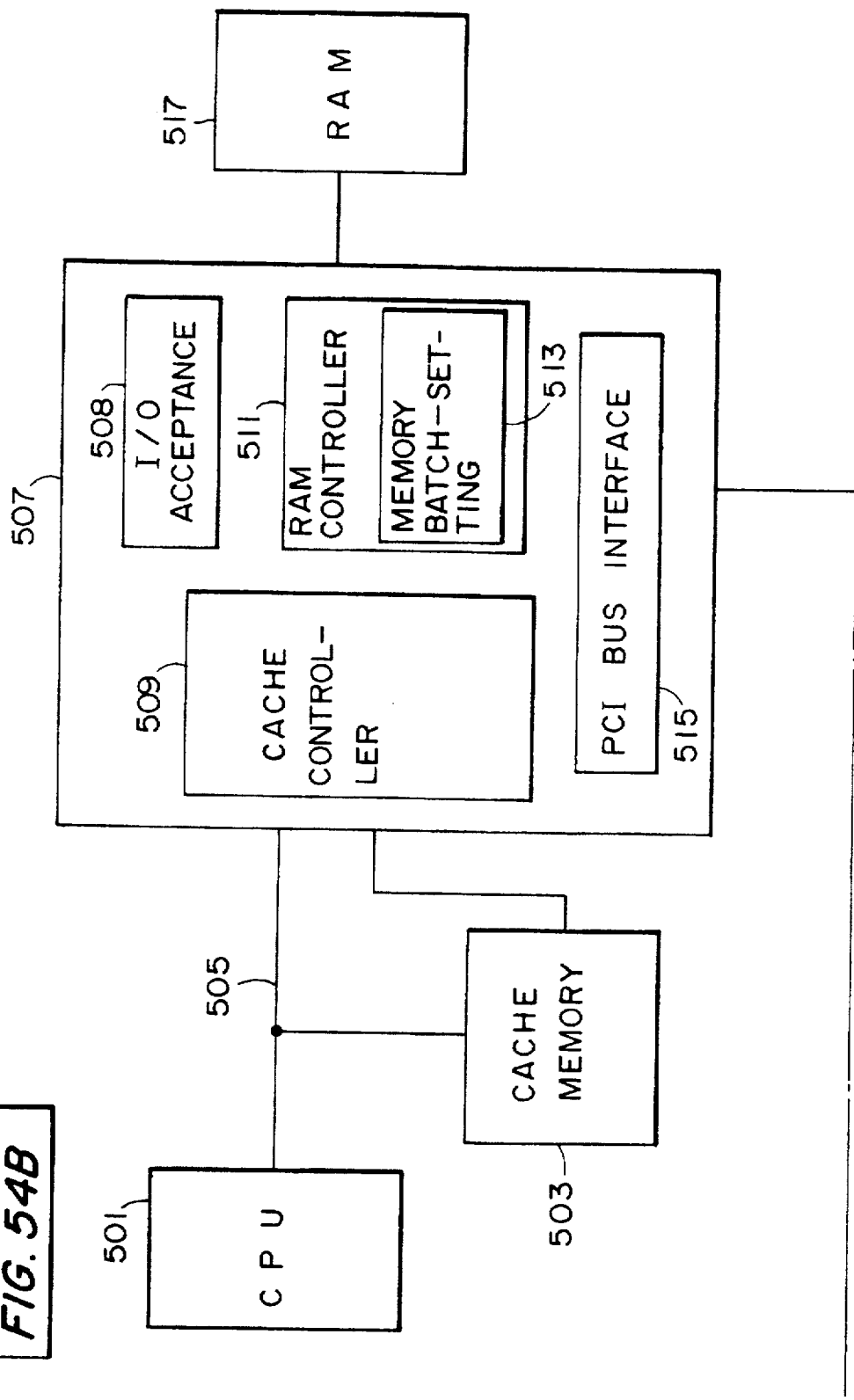

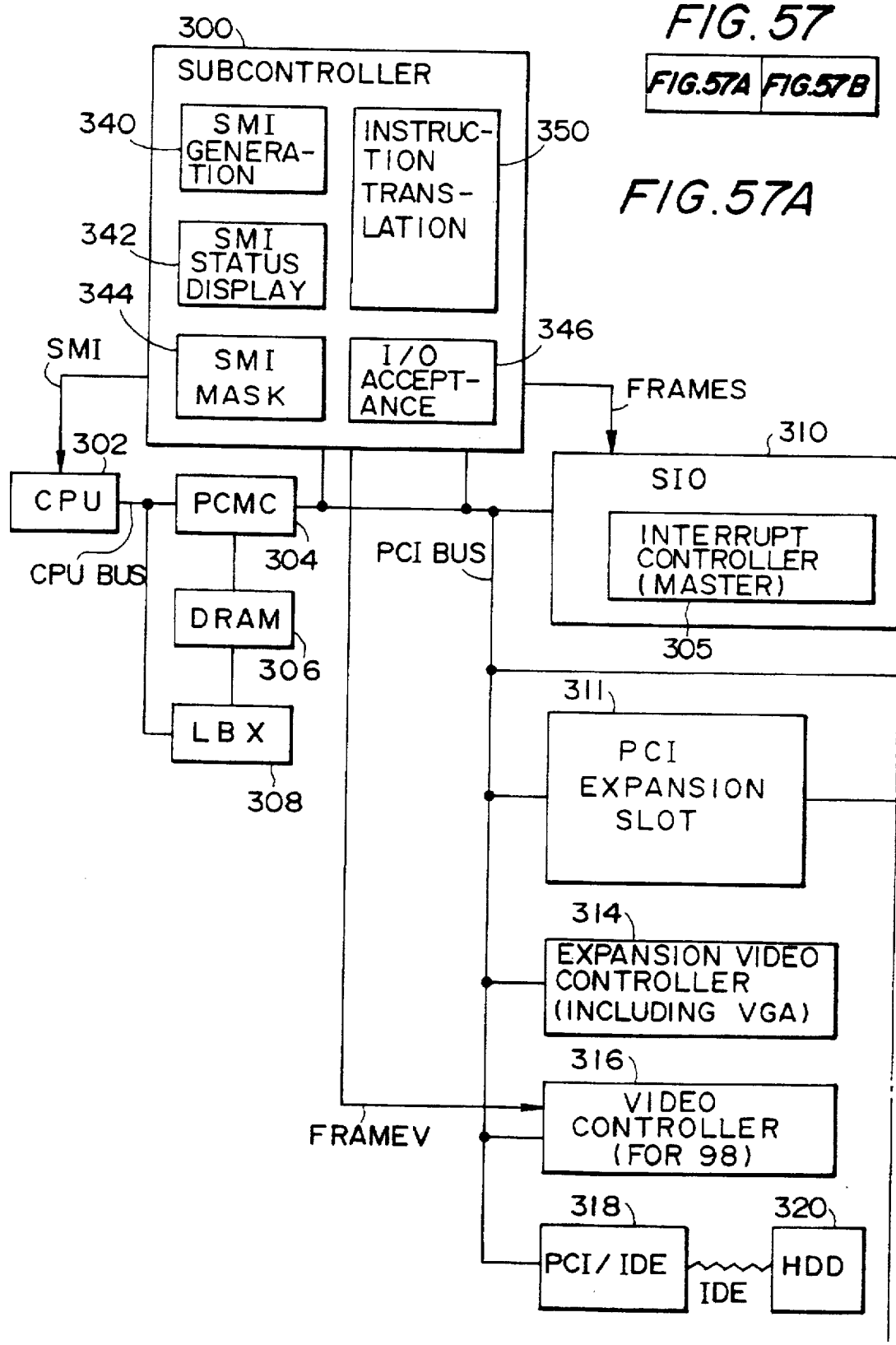

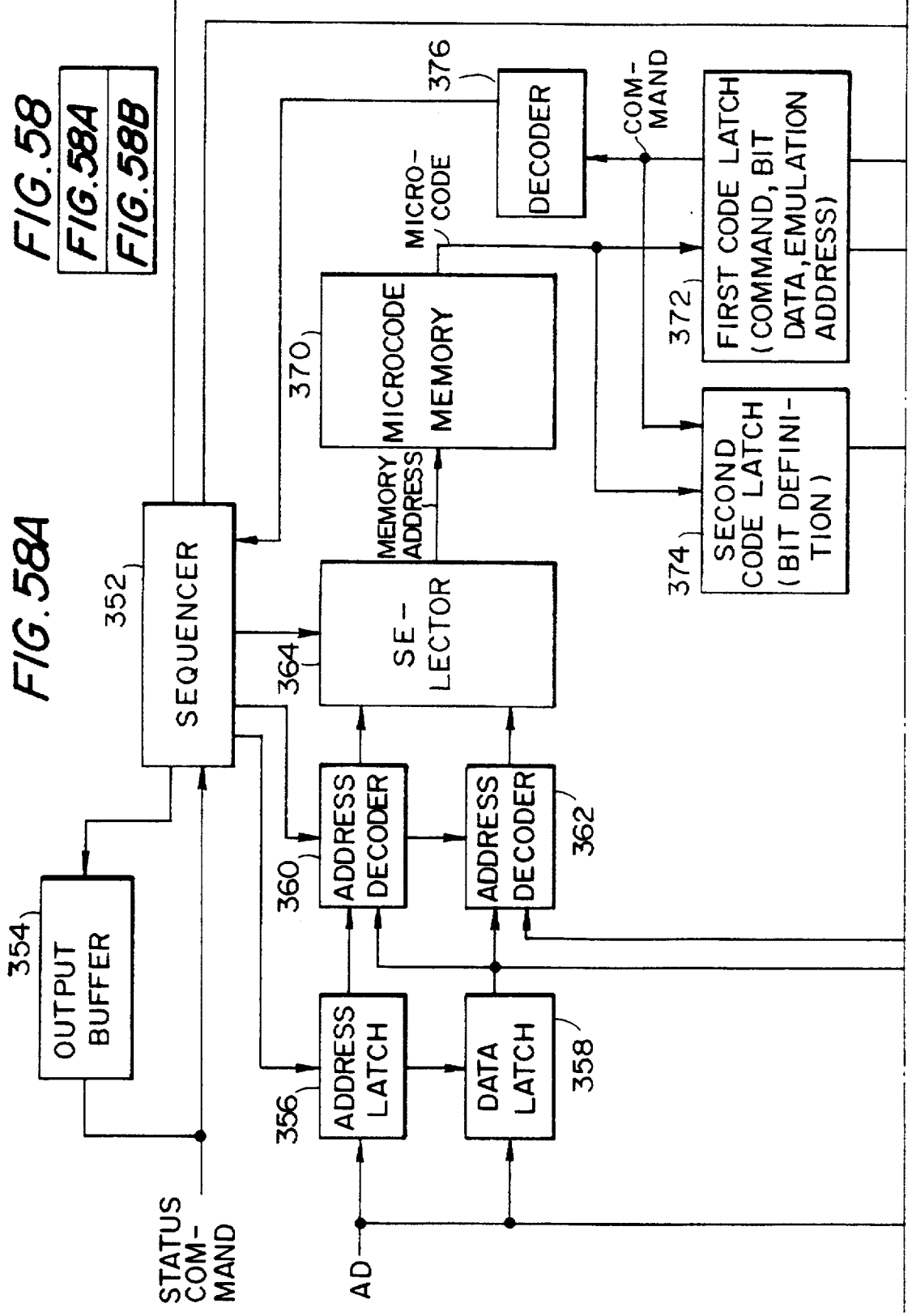

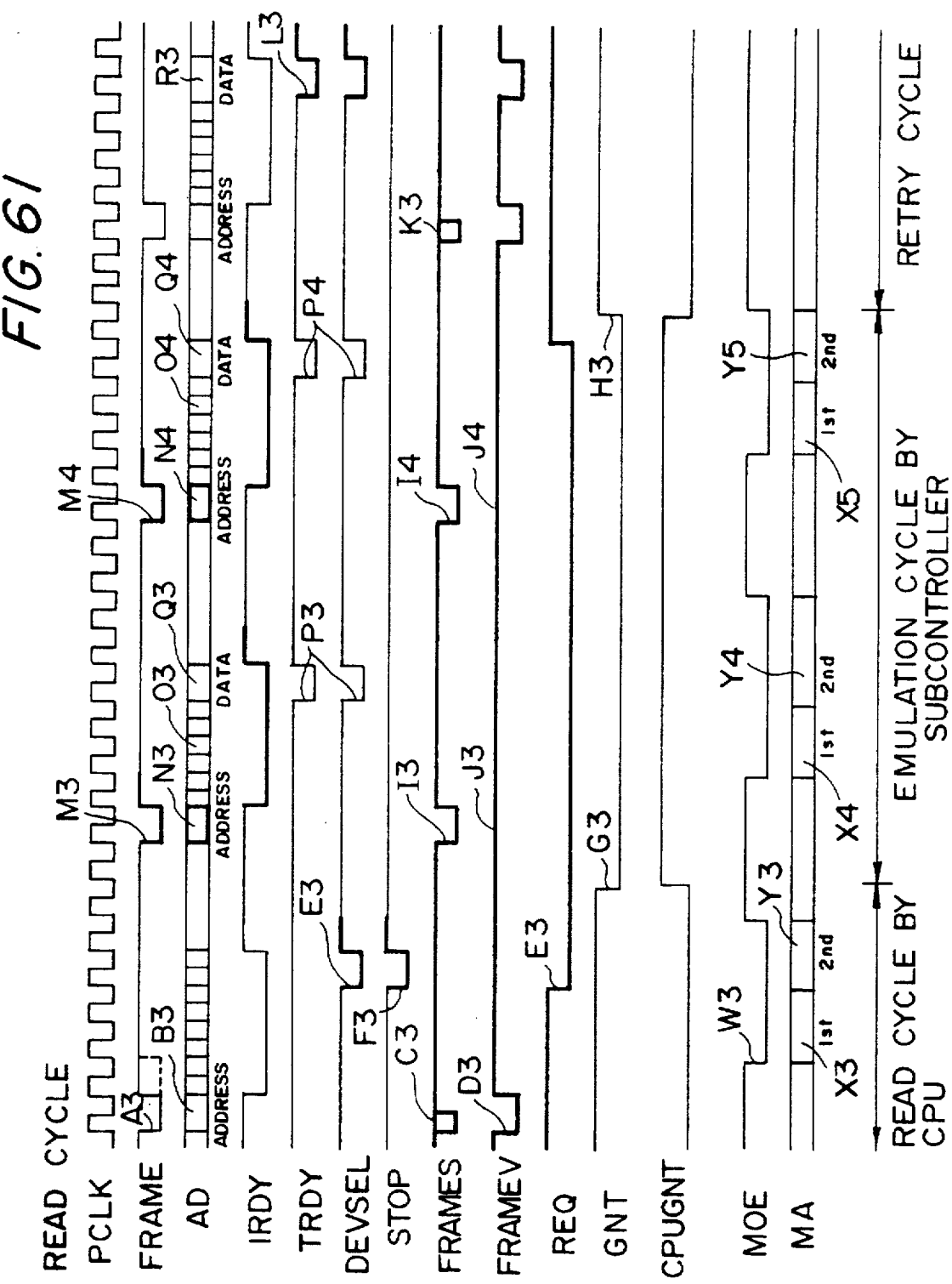

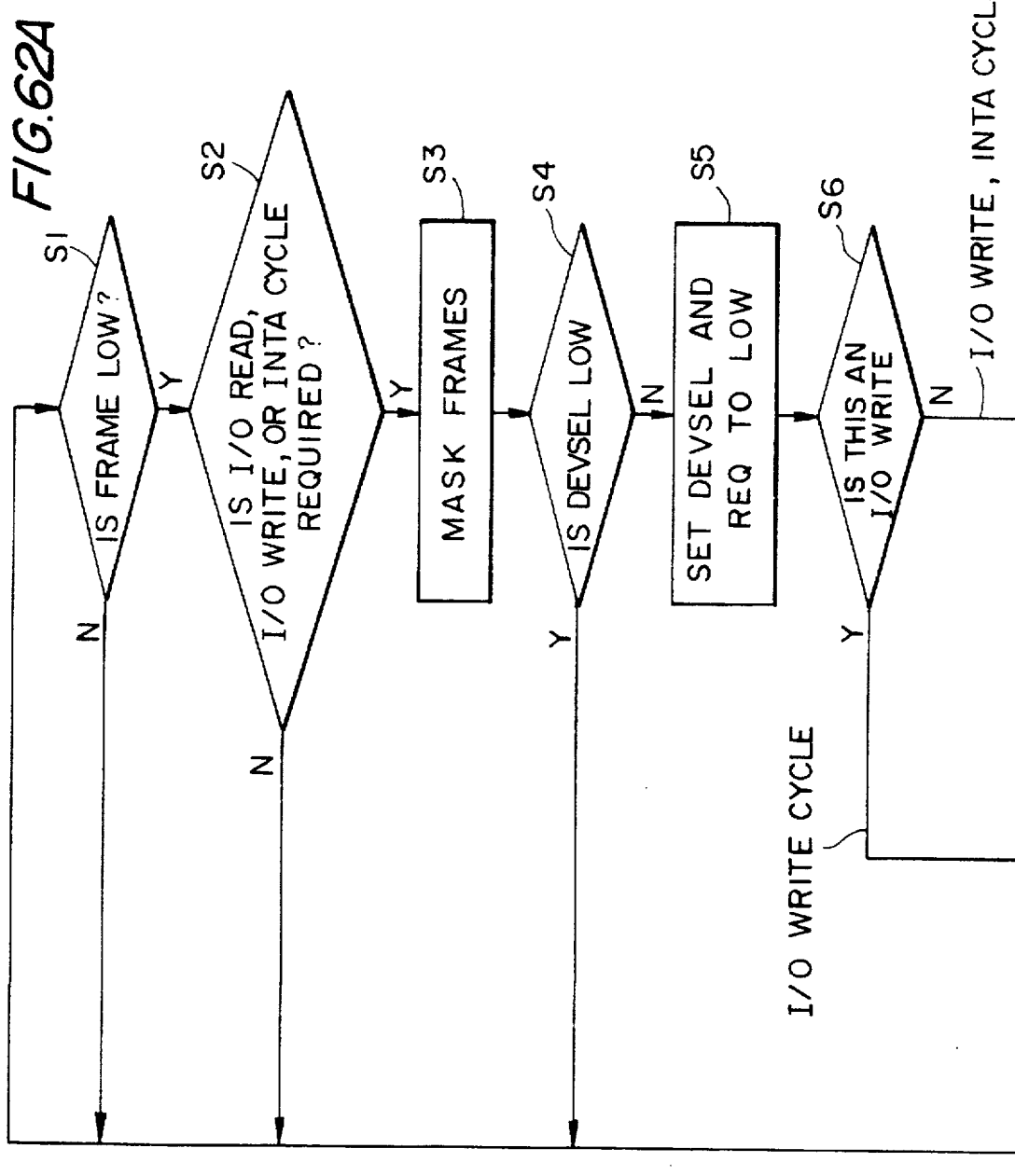

| FIG.63A |
|---------|
| FIG.63B |

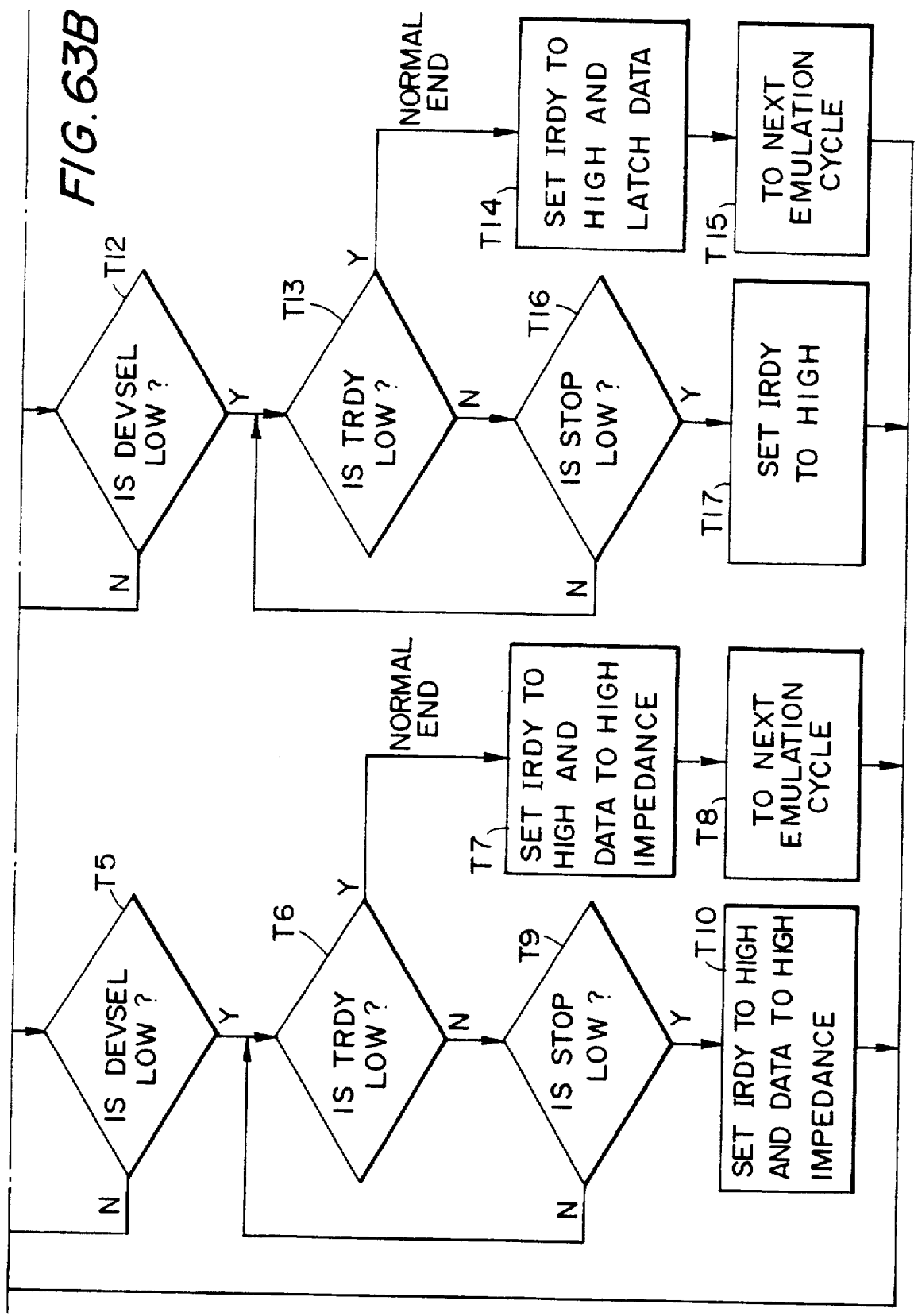

FIG. 65A

FIRST CYCLE INPUT (16 BIT)

| BIT | 15 | 14 | 13 | 12 | 11 | 10 | 9 | 8 | 7 ……… 1 | 0 |
|---|---|---|---|---|---|---|---|---|---|---|
| MEANING | R/W | CYCLE (=0) | OP1 | OP0 | EA3 | EA2 | EA1 | EA0 | A7 ……… A1 | A0 |

FIG. 65B

FIRST CYCLE OUTPUT (32 BIT)

| BIT | 31 | 30 | 29 | 28 | 27 | 26 | 25 | 24 | 23 ……… 16 | 15 ……… 0 |
|---|---|---|---|---|---|---|---|---|---|---|
| MEANING | R/W | CONTINUE | INTA | IGNORE | THROUGH | TMPW | AD | IMMEDIATE | D7 ……… D0 | A15 ……… A0 |
| | COMMAND | | | | | | | | DATA GENERATION (BIT DATA) | EMULATION ADDRESS |

FIG. 65C

SECOND CYCLE INPUT (16 BIT)

| BIT | 15 | 14 | 13 | 12 | 11 | 10 | 9 | 8 | 7 ……… 1 | 0 |
|---|---|---|---|---|---|---|---|---|---|---|
| MEANING | R/W | CYCLE (=1) | OP1 | OP0 | EA3 | EA2 | EA1 | EA0 | A7 ……… A1 | A0 |

FIG. 65D

SECOND CYCLE OUTPUT (32 BIT)

| BIT | 31...28 | 27...24 | 23...20 | 19...16 | 15...12 | 11...8 | 7...4 | 3...0 |
|---|---|---|---|---|---|---|---|---|
| MEANING | BIT 7 DEFINI-TION | BIT 6 DEFINI-TION | BIT 5 DEFINI-TION | BIT 4 DEFINI-TION | BIT 3 DEFINI-TION | BIT 2 DEFINI-TION | BIT 1 DEFINI-TION | BIT 0 DEFINI-TION |

DATA GENERATION (BIT DEFINITION)

FIG. 65E

WHEN D7 TO D0 ARE 1

```
       3 2 1 0
INVERSION  0 0 0   BIT 0 ALLOCATION
BIT        0 0 1   BIT 1 ALLOCATION
           0 1 0   BIT 2 ALLOCATION
           0 1 1   BIT 3 ALLOCATION
           1 0 0   BIT 4 ALLOCATION
           1 0 1   BIT 5 ALLOCATION
           1 1 0   BIT 6 ALLOCATION
           1 1 1   BIT 7 ALLOCATION
```

USED AS WRITE DATA FROM CPU DURING WRITE, OR EMULATION READ DATA DURING READ

FIG. 65F

WHEN D7 TO D0 ARE 0

```
3 2 1 0
0 0 0 0    0
0 0 0 1    1
0 0 1 0    PREVIOUSLY GENERATED EMULATION DATA IS ALLOCATED
0 0 1 1    TMP REGISTER
0 1 0 0    TMP REGISTER, RIGHT-SHIFTED
0 1 0 1    CPU WRITE DATA
0 1 1 0    UNDEFINED
0 1 1 1    UNDEFINED
1 0 0 0    DECODE EXPANSION 0/1 (CPU WRITE DATA)
   ⌇
1 1 1 1    DECODE EXPANSION E/F
```

FIG. 66

| 0032h (98 MACHINE) | MEANING | I/O ADDRESS (AT MACHINE) | BIT |
|---|---|---|---|
| BIT 7 | D S R | 03FEh | BIT 5 |
| BIT 6 | SYNC/BRK | 03FDh | BIT 7 |
| BIT 5 | FRAMING ERROR | 03FDh | BIT 3 |
| BIT 4 | OVERRUN ERROR | 03FDh | BIT 1 |
| BIT 3 | PARITY ERROR | 03FDh | BIT 2 |
| BIT 2 | TxEMP | 03FDh | BIT 6 |
| BIT 1 | RxRDY | 03FDh | BIT 0 |
| BIT 0 | TxRDY | 03FDh | BIT 5 |

FIG. 67

| INITIATOR (MASTER) | TARGET (SLAVE) | I/O ADDRESS | CYCLE | RESULT | DATA | MEMORY CYCLE | MEMORY ADDRESS | MICROCODE INFORMATION | | |
|---|---|---|---|---|---|---|---|---|---|---|
| CPU | SUBCONTROLLER | 0032h A1 | READ | RETRY END | B1 / 1st / 2nd | 1st | 8032h | COMMAND | BIT DATA | EMULATION ADDRESS |
|  |  |  |  |  |  |  |  | C 0 | 7 F | 03FDh — C1 |
|  |  |  |  |  |  | 2nd | D1 / C032h | BIT DEFINITION | | |
|  |  |  |  |  |  |  |  | 07312605h — E1 | | |
| SUBCONTROLLER | SIO | F1 03FDh I1 | READ | NORMAL END | G1 / 61h | 1st | H1 / 81FDh | COMMAND | BIT DATA | EMULATION ADDRESS |
|  |  |  |  |  |  |  |  | 8 0 | 8 0 | 03FEh — J1 |
|  |  |  |  |  |  | 2nd | K1 / C1FDh | BIT DEFINITION | | |
|  |  |  |  |  |  |  |  | 52222222h — L1 | | |
| SUBCONTROLLER | SIO | 03FEh | READ | NORMAL END | M1 / 20h |  |  |  |  |  |
| CPU | SUBCONTROLLER | 0032h N1 | READ | NORMAL END | 01 / 87h |  |  |  |  |  |

FIG. 68

|  | BIT 7 6 5 4 3 2 1 0 |
|---|---|
| EMULATION READ DATA AT 03FDh | 0 1 1 0 0 0 0 1 = 6 1 h |
| BIT DEFINITION INFORMATION (2nd) | 0 7 3 1 2 6 0 5 |
| BIT DATA INFORMATION (1st) | 0 1 1 1 1 1 1 1 = 7 F h |
|  | ⇓ |
| EMULATION DATA | 0 0 0 0 0 1 1 1 = 0 7 h |
| EMULATION READ DATA AT 03FEh | 0 0 1 0 0 0 0 0 = 2 0 h |
| BIT DEFINITION INFORMATION (2nd) | 5 2 2 2 2 2 2 2 |
| BIT DATA INFORMATION (1st) | 1 0 0 0 0 0 0 0 = 8 0 h |
|  | ⇓ |
| EMULATION DATA | 1 0 0 0 0 1 1 1 = 8 7 h |

FIG. 69A

| INTERRUPT LINE | INTERRUPT EVENT | |
|---|---|---|
| | 98 MACHINE | AT MACHINE |
| MASTER IRQ 0 | TIMER | TIMER |
| MASTER IRQ 1 | KEYBOARD | KEYBOARD |
| MASTER IRQ 2 | VIDEO | SLAVE |
| MASTER IRQ 3 | GENERAL (NOT USED) | GENERAL |
| MASTER IRQ 4 | SERIAL | SERIAL |
| MASTER IRQ 5 | GENERAL (NOT USED) | GENERAL |
| MASTER IRQ 6 | GENERAL (NOT USED) | GENERAL |
| MASTER IRQ 7 | SLAVE | GENERAL |

FIG. 69B

| | READ | IRR |
|---|---|---|
| 0000h (98 MACHINE) | | ISR |
| | WRITE | ICW1 |
| 0020h (AT MACHINE) | | OCW2 |
| | | OCW3 |
| | READ | IMR |
| 0002h (98 MACHINE) | WRITE | OCW1 |
| | | ICW2 |
| 0021h (AT MACHINE) | | ICW3 |
| | | ICW4 |

FIG. 70

| | I/O ADDRESS | DATA | ADDRESS | DATA | MEMORY CYCLE | MEMORY ADDRESS | MICROCODE INFORMATION | | |
|---|---|---|---|---|---|---|---|---|---|
| ICW1 | 0000h (WRITE) | 11h | → 0020h (WRITE) | R 1 ↙ 11h | 1st | 0000h | COMMAND | BIT DATA | EMULATION ADDRESS |
| | | | | | | | 0 0 | F F | 0020h ← P1 |
| | | | | | 2nd | 4000h | BIT DEFINITION | | |
| | | | | | | | 76543210h ← Q1 | | |
| ICW2 | 0002h (WRITE) | 08h | → 0021h (WRITE) | S 1 ↙ 08h | 1st | 0002h | COMMAND | BIT DATA | EMULATION ADDRESS |
| | | | | | | | 0 2 | F F | 0021h |
| | | | | | 2nd | | | | |
| ICW3 | 0002h (WRITE) | 80h | → 0021h (WRITE) | T 1 ↙ 04h | 1st | 2002h | COMMAND | BIT DATA | EMULATION ADDRESS |
| | | | | | | | 0 1 | 0 4 | 0021h |
| | | | | | 2nd | | | | |
| ICW4 | 0002h (WRITE) | 1Dh | → 0021h (WRITE) | U 1 ↙ 11h | 1st | 3002h | COMMAND | BIT DATA | EMULATION ADDRESS |
| | | | | | | | 0 2 | F 3 | 0021h |
| | | | | | 2nd | | | | |
| OCW1 | 0002h (WRITE) | 7Fh | → 0021h (WRITE) | V 1 ↙ FBh | 1st | 1002h | COMMAND | BIT DATA | EMULATION ADDRESS |
| | | | | | | | 0 0 | F F | 0021h |
| | | | | | 2nd | 5002h | BIT DEFINITION | | |
| | | | | | | | 26543710h | | |
| OCW2 | 0000h (WRITE) | 67h | → 0020h (WRITE) | W 1 ↙ 62h | 1st | 0000h | COMMAND | BIT DATA | EMULATION ADDRESS |
| | | | | | | | 0 0 | F F | 0020h |
| | | | | | 2nd | 5000h | BIT DEFINITION | | |
| | | | | | | | 76543A18h | | |
| IMR | 0002h (READ) | RETRY Y 1 0002h (READ) 7Fh | 0021h (READ) | X 1 ↙ FBh | 1st | 8002h | COMMAND | BIT DATA | EMULATION ADDRESS |
| | | | | | | | 8 0 | F F | 0021h |
| | | | | | 2nd | C002h | BIT DEFINITION | | |
| | | | | | | | 26543710h | | |

FIG. 71

|  |  | bit 7 6 5 4 3 2 1 0 |
|---|---|---|
| ICW1 | CPU WRITE DATA | 0 0 0 1 0 0 0 1 = 1 1 h |
|  |  | ↓ ↓ ↓ ↓ ↓ ↓ ↓ ↓ |
|  | BIT DEFINITION INFORMATION (2nd) | 7 6 5 4 3 2 1 0 |
|  | BIT DATA INFORMATION (1st) | 1 1 1 1 1 1 1 1 = F F h |
|  |  | ⇓ |
|  | EMULATION DATA | 0 0 0 1 0 0 0 1 = 1 1 h |
| ICW4 | CPU WRITE DATA | 0 0 0 1 1 1 0 1 = 1 D h |
|  |  | ↓ ↓ ↓ ↓    ↓ ↓ |
|  |  | 1 1 1 1 0 0 1 1 = F 3 h |
|  |  | ⇓ |
|  | EMULATION DATA | 0 0 0 1 0 0 0 1 = 1 1 h |
| OCW1 | CPU WRITE DATA | 0 1 1 1 1 1 1 1 = 7 F h |
|  | BIT DEFINITION INFORMATION (2nd) | 2 6 5 4 3 7 1 0 |
|  | BIT DATA INFORMATION (1st) | 1 1 1 1 1 1 1 1 = F F h |
|  |  | ⇓ |
|  | EMULATION DATA | 1 1 1 1 1 0 1 1 = F B h |
| OCW2 | CPU WRITE DATA | 0 1 1 0 0 1 1 1 = 6 7 h |
|  |  | ↓ ↓ ↓ ↓ ↓ ↓ ↓ ↓ INVERSION |
|  | BIT DEFINITION INFORMATION (2nd) | 7 6 5 4 3 A 1 8 |
|  | BIT DATA INFORMATION (1st) | 1 1 1 1 1 1 1 1 = F F h |
|  |  | ⇓ |
|  | EMULATION DATA | 0 1 1 0 0 0 1 0 = 6 2 h |
| IMR | 0021h READ DATA | 1 1 1 1 1 0 1 1 = F B h |
|  | BIT DEFINITION INFORMATION (2nd) | 2 6 5 4 3 7 1 0 |
|  | BIT DATA INFORMATION (1st) | 1 1 1 1 1 1 1 1 = F F h |
|  |  | ⇓ |
|  | EMULATION DATA | 0 1 1 1 1 1 1 1 = 7 F h |

FIG. 73

OCW1

BIT 7 ... BIT 0

| $M_7$ | $M_6$ | $M_5$ | $M_4$ | $M_3$ | $M_2$ | $M_1$ | $M_0$ |
|---|---|---|---|---|---|---|---|

IMR (INTERRUPT MASK REGISTER)

| 1 | INTERRUPTS DISABLED |
|---|---|
| 0 | INTERRUPTS ENABLED |

OCW2

BIT 7 ... BIT 0

| R | SR | EOI | 0 | 0 | $L_2$ | $L_1$ | $L_0$ |
|---|---|---|---|---|---|---|---|

IR LEVEL

| R | SR | EOI | | |
|---|---|---|---|---|
| 0 | 0 | 1 | ORDINARY EOI | INTERRUPT END |
| 0 | 1 | 1 | SPECIAL EOI | |
| 1 | 0 | 1 | ORDINARY EOI, PRECEDENCE ROTATION | AUTOMATIC ROTATION |
| 1 | 0 | 0 | AUTOMATIC EOI, PRECEDENCE ROTATION (SET) | |
| 0 | 0 | 0 | AUTOMATIC EOI, PRECEDENCE ROTATION (CLEAR) | |
| 1 | 1 | 1 | SPECIAL EOI, PRECEDENCE ROTATION | SPECIAL ROTATION |
| 1 | 1 | 0 | PRIORITY SETTING COMMAND | |
| 0 | 1 | 0 | NO OPERATION | |

OCW3

BIT 7 ... BIT 0

| | FSMM | SMM | 0 | 1 | | RR | RIS |
|---|---|---|---|---|---|---|---|

| RR | RIS | |
|---|---|---|
| 1 | 0 | IRR READ |
| 1 | 1 | ISR READ |

| 1 | POLL COMMAND |
|---|---|
| 0 | NON-POLL COMMAND |

| FSMM | SMM | |
|---|---|---|
| 1 | 0 | SPECIAL MASK RESET |
| 1 | 1 | SPECIAL MASK RESET |

- W1: RS
- W2: CPU ACCESSES FFFFFFF0h
- W3: CPU INTERFACE MASKS ADS, EXECUTE JMP 1FFFF0h INSTRUCTION, ENABLE BRDY
- W4: EXECUTE 98-BIOS FROM 1FFFF0h, DISABLE AT-BIOS AND MOVE 98-BIOS TO ADDRESSES E8000h TO FFFFFh
- W5: EXECUTE 98-BIOS AT E8000h TO FFFFFh

SYSTEM AND METHOD FOR EMULATING COMPUTER ARCHITECTURES

BACKGROUND OF THE INVENTION

1. Field of the Invention

This invention relates to an emulate system (hereinafter referred to as an "emulation system") and an emulate method (hereinafter referred to as an "emulation method").

2. Related Art

In computer systems such as those of personal computers (PCs), hardware of various different architectures to suit different purposes and large quantities of software have been developed for each of these architectures. As a user's investment in software increases, it is necessary to maintain the original architecture while increasing the capability of hardware to employ the latest devices, to ensure that the software can continue to operate.

It is assumed that there is a first computer architecture (such as the architecture used in personal computers produced by IBM) that dominates extremely large shares of the hardware and software markets, and a comparatively medium-sized second computer architecture (such as the architecture used in personal computers produced by Seiko Epson Co. and NEC). In such a case, it is impossible to ignore the marketing principle that hardware devices based on the second architecture and essential components that configure such hardware devices are in relatively short supply in comparison with those of the first architecture, and the scale of software development is also smaller. Thus, manufacturers developing computer systems of the second architecture encounter the problem that they cannot expect a supply of essential components in early stages of the development, and they may have to develop many of such components themselves.

The configuration of an example of prior-art hardware is shown in FIG. 54. A controller 507 that is an essential part of this system does not use standard components; it is dependent on being developed itself. A central processing unit (CPU) 501 and cache memory 503 are connected to the controller 507 by a CPU bus 505. The controller 507 is designed to correspond to a second architecture and comprises I/O acceptance means 508 that issues hardware-type instructions to components such as a memory batch-setting means 513 when an I/O instruction is received from the CPU 501, a cache controller 509 that controls the cache memory 503, a RAM controller 511 that controls a RAM 517 which is connected by the CPU bus 505 and operates at high speed, and a PCI bus interface 515 that provides an interface with a peripheral component interconnect (PCI) bus 519. In addition to enabling or disabling reading, writing, and caching for data located at addresses allocated to the RAM 517, a VRAM 521, and a ROM 531, the memory batch-setting means 513 provides memory mapping for the RAM 517.

Designed to set a standard within the industry, the PCI bus 519 is a fast, universal, future-compatible 32-bit (or 64-bit) bus on which addresses and data are multiplexed. The VRAM 521 and a hard disk drive (HDD) 525, devices that are required to transfer large quantities of data at high speed, are connected to the PCI bus 519. A VRAM switching means 523 that switches the VRAM mapping with respect to specific I/O instructions from the CPU 501 is provided within the VRAM 521. The VRAM 521 data can be displayed on a display portion (not shown in the figure).

The PCI bus 519 is connected by a bridge circuit 527 to a bus 529 that provides compatibility in a comparatively slow manner with prior-art devices. A floppy disk drive (FDD) 535 and a ROM 531 containing basic routines such as a BIOS are connected to the bus 529, as are a keyboard 537 connected by a keyboard controller 536, an RS-232C interface 539 connected by a serial controller 538, and an interrupt controller 540. Note that a ROM switching means 533 within the ROM 531 has the function of mapping ROM in accordance with I/O instructions from the CPU. 501. A keyboard unit controller 541 incorporated in the keyboard 537 is a controller on the keyboard side.

FIG. 55 is a flowchart of the operation of switching between two display modes, a first display mode (normal resolution) and a second display mode (high resolution), with the hardware of FIG. 54. If an I/O instruction from the CPU 501 is output to an I/O address 300 h in a step S100, that instruction is accepted by the I/O acceptance means 508 in a step S102, then the memory batch-setting means 513 modifies the RAM 517 mapping to set read, write, and cache for each address. The I/O instruction is also passed on to the VRAM switching means 523 and ROM switching means 533 through the PCI bus 519 and the bus 529, to switch the VRAM and ROM. All the operations of step $102 are performed by hardware logic. Thus, compatibility is maintained by following a design rule for the second architecture called "a dataset for switching to a display mode determined by I/O address 300 h."

Now, as progress continues to be made in devices such as CPUs, bus systems, and memory systems, it will be necessary to modify the designs of components such as the RAM controller 511, the cache controller 509, and the PCI bus interface 515 to cope with the latest devices. However, this causes a problem in that redesigning the controller 507 that conforms to the second architecture will greatly increase the development schedule and man-hours. On the other hand, devices for controlling the latest CPUs and memory systems in accordance with the first architecture can be developed comparatively quickly and obtained easily. Therefore, if a control device developed for the first architecture may be used, this problem of development schedule and manpower can be solved. Nevertheless, a further problem would arise in that making use of this device control means is difficult due to the differences in I/O and memory map compatibility.

To solve this problem, it is desirable to have an emulation system that can use a device control means developed for the first architecture as a structural component of hardware of the second architecture. It is further desirable that the concept of this emulation system should be expanded to implement hardware that can operate not only with respect to instructions conforming to the second architecture, but also to instructions conforming to the first architecture, in other words, hardware that enables compatibility with a plurality of architectures. If such hardware may be implemented, it would be possible to make use of the application programs based on the first architecture in addition to those based on the second architecture, and thus make the system more valuable. A further advantage of such an emulation system means that operating systems (OSs) of both the first and second architectures can be used, unlike with software emulation.

Methods in the prior art have been considered for making an application program run on hardware of the first architecture, by overwriting all the instructions from the application program as instructions of the first architecture at the operating system (OS) stage. However, these methods cause concern in that the processing involved with this software emulation is extremely slow, because only a dedicated OS can be used.

Another method of implementing an emulation system has been considered in which the emulation processing issues interrupts such as non-maskable interrupts (NMIs) to the CPU. However, one problem with NMIs is that the jump addresses (the addresses at which the handling routines corresponding to each interrupt are stored) are in an address region which the application program can easily access and overwrite. This means that emulation processing would be impossible if the application program should overwrite this address region. Another problem with NMIs is caused by the way that interrupt. handling starts in control mode (real mode, protect mode, or virtual-86 mode) as soon as the interrupt is received. This means that the most appropriate control mode should be set at the start of interrupt handling, making the processing more complicated. With an NMI, the return address is pushed onto the stack, but this stack region is used by other programs. Therefore, if there is no room in the stack region when an NMI occurs, data stored in the program data region may be destroyed. Further problems can be caused by the application program writing an incorrect value to the stack pointer which specifies the stack region.

With emulation processing that uses interrupt handling, there is also concern about how much of the processing should be made common between emulation processing relating to I/O instructions and processing concomitant with changes in the system's operating environment at power failure. A further concern relates to how to detect the presence of external input that is not supported by the first device control means, and how to handle such input if it is detected.

With emulation processing for providing compatibility with a plurality of architectures, there are problems concerning how to ensure a fast speed for the system while maintaining compatibility.

To implement an emulation system, instructions from the CPU should be translated, and this translation processing is complicated. This causes a problem concerning how to implement an emulation system employing simple hardware while maintaining high compatibility.

If, for example, it is possible to implement an emulation system that may be provided by simply installing an option board into a personal computer, the market value of such a system would be greatly increased.

SUMMARY OF THE INVENTION

This invention has been devised with the intention of solving the above problems, and has as an objective thereof the provision of an emulation system that enables the use of device control means of a first architecture as a structural component of hardware of a second architecture.

Another objective of this invention is to provide an emulation system that can cope appropriately with a change in the operating environment caused by power-failure processing or other abnormality.

Still another objective of this invention is to provide an emulation system that can cope appropriately when an external input that is not supported by the first device control means is detected.

A further objective of this invention is to provide an emulation system that can be implemented by hardware capable of operating in accordance with instructions from a plurality of architectures, in other words, implement compatibility with a plurality of architectures.

A yet further objective of this invention is to provide an emulation system that can support a high speed while maintaining compatibility.

Yet another objective of this invention is to provide an emulation system that can be implemented by a simple method, such as the installation of an option board.

In order to achieve the above objectives, a first aspect of this invention concerns an emulation system comprising:

a first device control means controlled in accordance with an instruction set conforming to a first computer architecture;

a second device control means controlled in accordance with an instruction set conforming to a second computer architecture differing from the first computer architecture; and a central control means for issuing an instruction from an instruction set conforming to the second computer architecture; wherein the emulation system further comprises:

means for transferring the instruction to the second device control means, or an object being controlled thereby when the second device control means or an object being controlled thereby exists as the destination of the instruction from the central control means;

means for accepting and analyzing the instruction when the second device control means or an object being controlled thereby does not exist as the destination of the instruction from the central control means;

means for setting event data that indicates an instruction type and also generating an interrupt in the central control means; and means activated by the interrupt for executing given processing corresponding to the event with respect to at least the first device control means or an object being controlled thereby.

In accordance with this aspect of the invention, if the second device control means that is the destination of an instruction from the central control means does not exist, an interrupt is generated in the central control means and an execution means activated by that interrupt executes given processing corresponding to that event. Thus, components such as the first device control means can be used efficiently in the second computer architecture system, enabling a reduction in the development schedule and man-hours.

A second aspect of this invention is characterized in that the emulation system further comprises a plurality of event storage means for storing the event data, wherein further detailed event data relating to event data stored in each of the event storage means is stored in event storage means of a lower hierarchical level.

Since the event storage means are arranged in a hierarchical structure in accordance with this aspect of the invention, it is possible to refer to an event at high speed, and simplifies assigning priorities to events.

A third aspect of this invention is characterized in that the emulation system further comprises means for detecting and analyzing a change in the system's operating environment setting event data that indicates the type of the change in the operating environment, and generating an interrupt in the central control means for activating the execution means.

This aspect of the invention enables emulation processing with respect to a change in the operating environment such as a power failure, a reset, or a speed change of the central control means.

In a fourth aspect of this invention, the event based on the change in the operating environment comprises at least an event caused by power-failure processing or reset processing, and the event is set to have a higher priority than an event based on an instruction issued by the central control means.

In accordance with this aspect of the invention, a power-failure or reset processing event is given a higher priority than an event based on an I/O instruction from the central control means, or the like. This ensures that processing corresponding to a change in the operating environment that should be handled promptly can be given priority.

A fifth aspect of this invention is characterized in that the event that is set based on the change in the operating environment comprises at least an event caused by power-failure processing or reset processing, and when processing based on the event is executed, the execution means holds or saves data stored in memory means that is an object to be controlled by the first or second device control means.

This aspect of the invention ensures that the power source of the system can be allowed to fail after data stored in memory means is held or saved, so that the loss of data can be prevented during power-failure or reset processing.

A sixth aspect of this invention is characterized in that the event comprises an event relating to an input from an external means that is unsupported by at least the first device control means, and, when the external input is detected, the given processing provided by the execution means is executed in such a manner that the first device control means executes processing corresponding to the external input.

In accordance with this aspect of the invention, the given processing is based on an event caused by an external input that is unsupported by the first device control means. This external input could be a change in an external switch. In such a case, the given processing allows the use of a function of the first device control means, so that the processing corresponding to the external input is based on that function. This enables the first device control means to be used efficiently in a system of the second computer architecture.

A seventh aspect of this invention further comprises means for masking some or all of the interrupts generated on the basis of the event.

This aspect of the invention can use a mask means to prevent the generation of interrupts that ought not to be generated in a certain mode.

A eighth aspect of this invention is characterized in that such interrupts are masked by the mask means after the start of power-on processing or reset processing, at least until the given processing provided by the execution means can be executed normally.

This aspect of the invention can prevent the generation of interrupts that would lead to operating errors, until the given processing can be executed normally after power-on. In this case, the processing to ensure that the given processing is executed normally could be a change in the address location of a memory region in which data necessary for the given processing is stored.

A ninth aspect of this invention is characterized in that a dummy interrupt that is unmasked by the mask means is generated after power-on processing or reset processing is started, and processing to ensure the normal execution of the given processing is executed by the execution means activated by the dummy interrupt.

This aspect of the invention ensures that the given processing is executed normally by, for example, generating a dummy interrupt by executing a dummy I/O write instruction, then using the execution means activated by this dummy interrupt to execute processing such as a change in address location.

A tenth aspect of this invention further comprises means for changing the system's operating environment to a given state while the execution means is executing the given processing.

In accordance with this aspect of the invention, the operating environment can be changed to suit the given processing, while the processing is executing. This enables a speeding-up of the emulation system while this given processing is executing, and also enables the use of I/O ports that can only be accessed during emulation processing.

A eleventh aspect of this invention is characterized in that the change in the operating environment is a change in processing speed of the central control means to a higher speed setting.

In accordance with this aspect of the invention, a function such as a speed-switching function of the central control means is used to increase the processing speed of the central control means while the given processing is executing. This enables the implementation of a fast emulation system.

A twelfth aspect of this invention further comprises a bus arbiter means that arbitrates bus access, wherein when the interrupt is generated, the bus arbiter means arbitrates bus access such that bus access by the central control means is given the highest priority.

Since this aspect of the invention increases the priority of bus access by the central control means when an interrupt is generated, the central control means can execute the given processing smoothly.

A thirteenth aspect of this invention concerns an emulation system comprising:

means for transferring an instruction to a first device control means controlled by an instruction set conforming to a first computer architecture, or an object being controlled thereby, when a central control means issues an instruction from the instruction set conforming to the first computer architecture;

means for receiving and analyzing an instruction when the central control means issues an instruction from an instruction set conforming to a second computer architecture differing from the first computer architecture;

means for setting event data that indicates an instruction type and generating an interrupt in the central control means; and means activated by the interrupt for executing given processing corresponding to the event with respect to at least the first device control means or an object being controlled thereby, wherein:

a control mode of the central control means is changed by the interrupt to a control mode managed by a given system, and data necessary for the given processing is stored in a memory region dedicated to the control mode.

In accordance with this aspect of the invention, if an instruction issued by the central control means conforms to the first architecture, the instruction is transferred as is to the first device control means; if it conforms to the second architecture, emulation processing is executed by the execution means. This implements compatibility with a plurality of architectures. This aspect of the invention also enables the execution means to provide memory management in an independent control mode, without interference from any application program or other software, based on data stored in a dedicated memory region. This simplifies complicated processing that requires the use of a translation table.

A fourteenth aspect of this invention is characterized in that an address location in the memory region at which data necessary for the given processing is stored can be changed only in the control mode.

In accordance with this aspect of the invention, the address location at which data necessary for given processing is stored can be set as desired by the system side, and the thus-set location is protected from modification by an application program or other software. This enables the implementation of a highly compatible emulation system in which operating errors hardly occur.

A fifteenth aspect of this invention is characterized in that a control mode of the central control means is changed by the interrupt to a control mode managed by a given system, the contents of internal registers of the central control means are stored in a memory region dedicated to the control mode and when the control mode ends, the stored internal register contents are returned to the central control means.

This aspect of the invention makes it possible to modify internal register contents stored in a dedicated memory region. This also makes it possible for the central control means to operate on the basis of these modified internal register contents after the given processing has ended.

A sixteenth aspect of this invention is characterized in that the address location in the memory region at which the contents of the internal register are stored can be changed only in the control mode.

In accordance with this aspect of the invention, the address location at which the contents of the internal register are stored (pushed onto the stack) cannot be overwritten by an application program or other software means. Therefore, the address location at which data necessary for given processing is stored can be set as desired by the system side, and the thus-set location is protected from modification by an application program or other software, enabling the implementation of a highly compatible emulation system in which operating errors hardly occur.

A seventeenth aspect of this invention is characterized in that the control mode of the central control means is changed by the interrupt to a control mode managed by a given system, and the given processing is executed in accordance with an instruction set independent to a control mode in which the central control means was operating before the interrupt is generated.

This aspect of the invention enables the given processing to be executed by an instruction set that is not related to the control mode in which the central control means was operating before the interrupt is generated, thus preventing complications in the program for specifying this given processing.

A eighteenth aspect of this invention is characterized in that the interrupt is a system management interrupt (SMI) for changing the central control means to system management mode Since this aspect of the invention removes the necessity of using NMI and ordinary INT interrupts that are assumed to be used in many application programs and OSs, a high level of compatibility can be maintained.

A nineteenth aspect of this invention further comprises means for controlling a memory device acting as the first device control means, and means for translating a memory map of the memory device into a memory map conforming to the second computer architecture.

This aspect of the invention enables the implementation of compatibility with a plurality of architectures by modifying a memory map, even when the memory maps of the first and second architectures are different. It also simplifies switching between a plurality of display modes, such as a normal resolution mode and a high resolution mode.

A twentieth aspect of this invention concerns an emulation system comprising:

means for transferring an instruction to a first device control means controlled by an instruction set conforming to a first computer architecture, or an object being controlled thereby, when a central control means issues an instruction from the instruction set conforming to the first computer architecture;

means for receiving and analyzing an instruction, when the central control means issues an instruction from an instruction set conforming to a second computer architecture differing from the first computer architecture;

means for setting event data that indicates an instruction type and generating an interrupt in the central control means, when the instruction has been analyzed to be an instruction of a first type;

means activated by the interrupt for executing given processing corresponding to the event with respect to at least the first device control means or an object being controlled thereby; and means for translating an instruction into an instruction conforming to the first computer architecture, when the instruction is analyzed to be an instruction of a second type, and disabling bus access by the central control means and issuing the translated instruction instead of the central control means.

In accordance with this aspect of the invention, a first type of instruction that necessitates complicated handling can be translated by the execution means. A second type of instruction that requires rapid handling is translated by means such as hardware circuitry. This ensures fast emulation processing while maintaining a high level of compatibility.

A twenty-first aspect of this invention further comprises means for halting the current processing of the central control means and disabling bus access by the central control means and issuing the translated instruction instead of the central control means, when an instruction is the second type of read instruction, and transferring the thus-obtained data to the central control means at re-executed processing of the central control means.

This aspect of the invention makes it possible to transfer data obtained from the thus translated instruction to the central control means, using functions such as retry and backoff.

A twenty-second aspect of this invention further comprises means for modifying the internal register contents of the central control means that are stored in a given memory region, on the basis of data obtained by the given processing, when an instruction is the first type of read instruction, and means for returning the thus modified internal register contents to the central control means at the end of the control mode activated in the central control means by the interrupt.

This aspect of the invention makes it possible for data obtained by the emulation processing to be automatically transferred to the central control means, without the central control means having to re-execute a read instruction.

A twenty-third aspect of this invention further comprises means for controlling an interface for data transfer acting as the first device control means, wherein, when an instruction issued by the central control means is a data transfer instruction or status read instruction, the instruction is analyzed to be an instruction of the second type.

This aspect of the invention makes it possible for high-speed hardware circuitry to translate a data transfer instruction or status read instruction for which rapid processing is required, and data dropout can be prevented.

A twenty-fourth aspect of this invention further comprises means for controlling an interface for data transfer acting as the first device control means, wherein, when an instruction issued by the central control means is a command write instruction, the instruction is analyzed to be an instruction of the first type, and the instruction is translated by the given processing of the execution means.

This aspect of the invention makes it possible to implement emulation processing that cannot translate an instruction simply by rearranging bits, or complicated emulation processing such as that in which processing has to be divided into two parts for a command instruction and mode instruction.

A twenty-fifth aspect of this invention further comprises means for controlling an interface for data transfer acting as the first device control means, wherein: when an instruction issued by the central control means is an instruction setting a baud rate for a data transfer, the instruction is analyzed to be an instruction of the first type, and the baud rate is calculated by the given processing of the execution means.

This aspect of the invention enables the use of other baud rates, even when, for example, the baud rate for transfer is fixed with respect to a clock signal in the device control means used by the first architecture.

A twenty-sixth aspect of this invention further comprises means for controlling a data input means acting as the first device control means, wherein, when an instruction issued by the central control means is a command transmission instruction, command write instruction, or data reception instruction, the instruction is analyzed to be an instruction of the first type, and the instruction is translated by the given processing of the execution means.

This aspect of the invention makes it possible to implement, for example, emulation processing in which a command and parameters are identified and processing is executed on the basis of this identification result, or complicated emulation processing that necessitates data translation based on a predetermined translation table.

A twenty-seventh aspect of this invention further comprises means for controlling a data input means acting as the first device control means, wherein when an instruction issued by the central control means is a status read instruction, the instruction is analyzed to be an instruction of the second type.

With this aspect of the invention, a status read instruction requiring fast processing can be translated by hardware circuitry.

A twenty-eighth aspect of this invention further comprises means for controlling interrupts acting as the first device control means, and vector translation means for translating an interrupt vector issued with respect to the central control means.

This aspect of the invention makes it possible to provide interrupt-activated emulation processing even if, for example, the interrupt event generation portion and the interrupt controller portion are incorporated into a single chip and thus the switching of interrupt lines is impossible.

A twenty-ninth aspect of this invention further comprises means for controlling interrupts acting as the first device control means, and means for halting the processing of the central control means and disabling bus access from the central control means, and generating a new interrupt acknowledge cycle, when an interrupt acknowledge instruction is issued by the central control means, then transferring a translated interrupt vector to the central control means at re-executed processing of the central control means.

This aspect of the invention ensures that a translated interrupt vector can be transferred to the central control means by halting and restarting the processing of the central control means.

A thirtieth aspect of this invention concerns an emulation system comprising:

a subcontroller connected to a first bus and comprising means for translating an instruction conforming to a second computer architecture issued from a central control means into an instruction conforming to a first computer architecture; and a bridge circuit for connecting the first bus to a second bus; wherein the subcontroller comprises means for disabling the transfer of the instruction to a first device control means connected to the second bus, or an object being controlled thereby, when an instruction conforming to the second computer architecture is issued, by controlling a first bus control signal that is input to the bridge circuit.

This aspect of the invention can prevent the transfer of an instruction of the second computer architecture to the first device control means, by a simple method involving control of a bus control signal.

A thirty-first aspect of this invention concerns an emulation system comprising:

a subcontroller connected to a first bus and comprising means for translating an instruction conforming to a second computer architecture issued from a central control means into an instruction conforming to a first computer architecture; and a second device control means connected to the first bus and controlled by an instruction set conforming to the second computer architecture; wherein:

the subcontroller comprises means for disabling the transfer of the instruction to the second device control means or an object being controlled thereby, when an instruction conforming to the first computer architecture is issued, and for transferring the instruction to the second device control means or an object being controlled thereby, when an instruction conforming to the second computer architecture is issued, by controlling a control signal of the first bus that is input to the second device control means.

This aspect of the invention prevents the transfer of an instruction of the first computer architecture to the second device control means connected to the first bus, but allows the transfer of an instruction of the second computer architecture. This enables the implementation of compatibility with a plurality of architectures, even when there is a device control means such as a video controller for which emulation processing is difficult.

A thirty-second aspect of this invention concerns an emulation system comprising:

a subcontroller connected to a first bus and comprising means for translating an instruction conforming to a second computer architecture issued from a central control means into an instruction conforming to a first computer architecture;

a first expansion slot which is connectable to the first bus;

a board which is insertable into the first expansion slot and comprising a means for translating the first bus signal into a signal for a second bus controlled by an instruction conforming to the second computer architecture; and an expansion slot box connected to the board by a cable and comprising one or a plurality of second expansion slots which are connectable to the second bus.

This aspect of the invention makes it possible to use a device of the first architecture as an outer casing for a new system, enabling the design of an inexpensive new system and making efficient use of existing resources.

A thirty-third aspect of this invention concerns an emulation system for translating an instruction conforming to a second computer architecture into an instruction conforming to a first computer architecture, when a central control means issues the instruction from the instruction set conforming to the second computer architecture, comprising:

microcode memory for storing microcode information comprising at least command information and emulation address information at an input memory address location; and selector means for selecting either address information included within an instruction issued by the central control means or emulation address information contained within the microcode memory, and generating the memory address therefrom, wherein:

the selector means selects the emulation address information and generates the memory address, when emulation continuation information comprised within the command information indicates that emulation is to continue.

This aspect of the invention makes it possible to repeat the emulation cycle a desired number of times, by emulation continuation information specifying that emulation is to continue. This enables simple implementation of complicated emulation processing, such as that requiring read and write cycles to be repeated a plurality of times.

A thirty-fourth aspect of this invention further comprises data generation means for executing emulation data generation processing based on microcode information from the microcode memory; wherein:

the data generation means executes emulation data generation processing for an (n+1)th emulation, based on write data from the central control means or emulation data generated by an nth (where n is a positive integer) emulation, when the emulation continuation information specifies that emulation is to continue.

This aspect of the invention makes it possible to use previously generated emulation data in the generation of emulation data in the next cycle, thus simplifying complicated emulation data generation processing.

A thirty-fifth aspect of this invention concerns an emulation system for translating an instruction conforming to a second computer architecture into an instruction conforming to a first computer architecture, when a central control means issues the instruction from the instruction set conforming to the second computer architecture, comprising:

microcode memory for storing microcode information for instruction translation at a given memory address location;

means for reading the microcode information from the microcode memory; and data generation means for generating emulation data based on the thus read-out microcode information; wherein:

the microcode memory stores first microcode information comprising at least command information and emulation address information at a first memory address location, and stores second microcode information comprising part or all of at least data generation information at a second memory address location obtained by translating the first memory address;

the reading means reads the command information that is stored at the first memory address location by a first memory read cycle, then when it is determined that data generation processing by the data generation means is necessary based on the command information, activates a second memory read cycle and reads the data generation information stored at the second memory address location; and the data generation means executes the data generation processing based on first microcode information read out in the first memory read cycle and second microcode information read out in the second memory read cycle.

This aspect of the invention makes it possible to prevent unnecessary memory read cycles, by determining whether or not a second memory read cycle is to be activated, based on command information read out in the first memory read cycle.

A thirty-sixth aspect of this invention is characterized in that the data generation information comprises bit definition information, the data generation means defines the value of each bit of emulation data based on the bit definition information, and executes the data generation processing.

This aspect of the invention simplifies processing such as decoding development and translating bits and imposing fixed values on data, by using bit definition information.

A thirty-seventh aspect of this invention is characterized in that the first microcode information comprises a predetermined number of bits of data and the command information comprises information specifying that the predetermined number of bits of data is to be output as emulation data.

This aspect of the invention makes it possible to use a predetermined number of bits of data contained within microcode information as emulation data, without modification.

A thirty-eighth aspect of this invention is characterized in that the command information comprises information specifying that only address translation is to be executed and data translation is not to be executed.

This aspect of the invention makes it possible to speed up emulation processing in which only address translation is necessary.

A thirty-ninth aspect of this invention further comprises address decoding means for obtaining the memory address by decoding address information included within the instruction issued by the central control means, wherein:

the address decoding means comprises means for obtaining different memory addresses from identical address information, when address information included within instructions issued by the central control means is identical.

This aspect of the invention makes it possible to implement emulation processing for an I/O instruction with respect to a single I/O port, if, for example, different data can be read to or written from that I/O port, depending on the state of the port.

A fortieth aspect of this invention concerns an emulation system for translating an instruction conforming to a second computer architecture into an instruction conforming to a first computer architecture, when a central control means issues the instruction from the instruction set conforming to the second computer architecture, and transferring the instruction to a first device control means controlled by the instruction set conforming to the first computer architecture, or an object being controlled thereby; wherein:

means for accepting an interrupt and setting event data indicating an instruction type when a first interrupt is generated, when the first device control means informs the central control means of an instruction issue request by generating the first interrupt, and generating a second interrupt for the central control means;

execution means activated by the second interrupt for executing given processing corresponding to the event, and setting a state in which an instruction conforming to the second computer architecture can be issued to the first device control means or an object being controlled thereby; and means for generating the first interrupt and posting an instruction issue request with respect to the central control means.

This aspect of the invention enables simple implementation of emulation processing relating to a device control means that generates interrupt and executes an instruction issue request.

A forty-first aspect of this invention further comprises a keyboard controller acting as the first device control means, wherein:

the given processing provided by the execution means uses a data translation table to translate input data from a keyboard and stores the thus-translated data in storage means which can be read by the central control means.

This aspect of the invention makes it simple to translate keyboard input data, which requires complicated processing, by using a translation table.

A forty-second aspect of this invention further comprises a mouse controller acting as the first device control means, wherein:

the given processing provided by the execution means converts input data from a mouse into data that can be read by an instruction conforming to the second computer architecture and stores the thus-translated data in storage means which can be read by the central control means.

This aspect of the invention simplifies translation processing of input data from a mouse, even between first and second computer architectures with widely differing mouse data formats.

A forty-third aspect of this invention further comprises a first subcontroller connected to a first bus that is directly connected to a central control means, wherein the first subcontroller comprises:

means for disabling the transfer of an instruction to a first device control means controlled in accordance with an instruction set conforming to a first computer architecture, or an object being controlled thereby, when a central control means issues an instruction from an instruction set conforming to a second computer architecture; and means for translating the instruction issued from the central control means into an instruction conforming to the first computer architecture and transferring the translated instruction to the first device control means or an object being controlled thereby.

This aspect of the invention enables emulation processing in which the first controller directly controls the first bus connected to the central control means. This enables the provision of an emulation system that is implemented by simply inserting an option board or the like. In addition, an optimal emulation system can be provided for an inexpensive information processing device that has only the first bus.

A forty-fourth aspect of this invention is characterized in that the means for transferring the instruction comprises means for halting and re-executing the processing of the central control means, by controlling an input signal of the central control means, and transferring data obtained from a translated instruction or a control signal from the first device control means at the re-execution of the processing.

This aspect of the invention restarts processing after halting the processing of the central control means by using a function of the central control means such as the backoff function, and enables the transfer to the central control means of data obtained by the emulation processing if the instruction is a read instruction, or a control signal such as a ready signal if the instruction is a write instruction.

A forty-fifth aspect of this invention further comprises a second subcontroller connected to a second bus differing from the first bus, wherein:

the second subcontroller comprises second device control means controlled by an instruction set conforming to the second computer architecture.

This aspect of the invention makes it possible to make effective use of a second device control means having a function such as a video controller that is not supported by a first computer architecture.

A forty-sixth aspect of this invention concerns an emulation system comprising a first subcontroller connected to a first bus that is directly connected to a central control means and a second subcontroller connected to a second bus differing from the first bus, wherein:

the first subcontroller comprises means for translating an instruction into an instruction that is unacceptable to a first device control means controlled in accordance with an instruction set conforming to a first computer architecture, or an object being controlled thereby, when the central control means issues an instruction from an instruction set conforming to a second computer architecture; and the second subcontroller comprises means for translating the instruction issued from the central control means into an instruction conforming to the first computer architecture and transferring the translated instruction to the first device control means or an object being controlled thereby.

This aspect of the invention enables emulation processing in which the first subcontroller directly controls the first bus connected to the central control means. This makes it possible to provide an emulation system that is implemented by simply inserting an option board or the like. It also makes it possible to implement compatibility with a plurality of architectures for an information processing device in which only the first bus is present. Moreover, since the circuitry of the first subcontroller connected to the central control means is so compact, it is also advantageous from the space point of view.

A forty-seventh aspect of this invention is characterized in that the translation processing for translating an instruction into an instruction that is unacceptable to the first device control means or an object being controlled thereby is processing that translates address information comprised within an instruction from the central control means into an address that is not used by the first device control means or an object being controlled thereby.

By translating the address of an instruction into an address that cannot be used by the first device control means, this aspect of the inventions ensures that the first device control means can be prevented from responding to an instruction of the second computer architecture.

A forty-eighth aspect of this invention is characterized in that the means for transferring the instruction comprises means for halting and re-executing the processing of the central control means, by controlling the second bus signal, and transferring data obtained from a translated instruction or a control signal from the first device control means at the re-execution of the processing.

This aspect of the invention restarts processing after halting the processing of the central control means by using a function of the central control means such as the retry function which is controlled by a bus signal, and enables the transfer to the central control means of data obtained by the emulation processing if the instruction is a read instruction, or a control signal if the instruction is a write instruction.

A forty-ninth aspect of this invention further comprises means for transferring an interrupt signal from the second subcontroller to the central control means.

This aspect of the invention enables the implementation of an emulation system that uses such interrupt signals, even when there are no interrupt signal terminals in the expansion slot.

A fiftieth aspect of this invention is characterized in that the first subcontroller comprises means for transferring the instruction to the first device control means or an object being controlled thereby, when the instruction issued from the central control means conforms to the first computer architecture.

In accordance with this aspect of the invention, if an instruction is one conforming to the first computer architecture, the instruction is transferred as is, without being translated, thus speeding up the processing.

A fifty-first aspect of this invention is characterized in that the first subcontroller comprises means for delaying a control start signal for the first bus generated by the central control means, in order to determine whether or not the instruction issued from the central control means is issued with respect to means for controlling a memory device or an object being controlled thereby.

This aspect of the invention determines whether or not memory is to be accessed, and, if memory is to be accessed, enables the bus cycle to start immediately by a delayed bus control start signal. Therefore, the inevitable drop in speed of memory access can be suppressed to a minimum.

A fifty-second aspect of this invention further comprises:
means for activating a BIOS conforming to the second computer architecture in preference to a BIOS conforming to the first computer architecture after a reset or after power is turned on, and
mode selection switching means that either transfers an instruction issued by the central control means without translation or translates the instruction into an instruction conforming to the first computer architecture and transfers it, based on a command from a data input means.

Since this aspect of the invention enables the preferential activation of the BIOS of the second computer architecture after a reset, it enables the implementation of an emulation system with improved compatibility. Since the mode can be selected by a data input means, there is no need to provide a switch or other mode selection means. This enables the use of a device of the first architecture as an outer casing for a new system.

A fifty-third aspect of this invention concerns an emulation system comprising:
a first board having at least a first subcontroller for subjecting an instruction issued by a central control means to emulation processing, wherein the first board comprises:
a first connection means for connecting a first group terminals of the central control means to a first group terminals of a second socket of a third board having at least the second socket which is accommodable to the central control means; and
a second connection means for connecting a second group terminals of the central control means to a second group terminals of the second socket, with the first subcontroller in between.

In accordance with this aspect of the invention, first of all the central control means can be removed from the second socket on the third board. The first group terminals of the central control means is connected to the first group terminals of the second socket by the first connection means of the first board. The second group terminals of the central control means is connected to the second group terminals of the second socket by the second connection means, with the first subcontroller in between. This provides an emulation system that can be implemented by simply inserting the first board and providing control by some of the signals from the central control means, using the first subcontroller.

A fifty-fourth aspect of this invention is characterized in that the first board comprises a first socket accommodable to the central control means; a connector having a plurality of pins insertable into a plurality of pin holes provided in the second socket; and wiring means for connecting terminals of the first socket, terminals of the subcontroller, and terminals of the connector.

In accordance with this aspect of the invention, an emulation system can be implemented by simply removing the central control means from the second socket, inserting it into the first socket and a connector into the second socket.

A fifty-fifth aspect of this invention is characterized in that the first board comprises the central control means, a connector having a plurality of pins insertable into a plurality of pin holes provided in the second socket, and wiring means for connecting terminals of the central control means, terminals of the subcontroller, and terminals of the connector.

In accordance with this aspect of the invention, the central control means is provided in the first board and an emulation system can be implemented by simply inserting the connector of this first board into the second socket. This makes it possible to install the central control means in the first board by using means such as tape carrier package (TCP), reducing the mounting area.

A fifty-sixth aspect of this invention further comprises a second board having at least a second subcontroller for executing the emulation processing together with the first subcontroller, and being insertable into an expansion slot that is capable of transferring signals to and from terminals of the second socket on the third board.

This aspect of the invention enables the implementation of an emulation system using first and second controllers, by inserting the second board to the expansion slot.

A fifty-seventh aspect of this invention further comprises a signal line for transferring signals between the first and second boards, wherein:
the signals comprise an interrupt signal generated from the second subcontroller on the second board with respect to the central control means on the first board.

In accordance with this aspect of the invention, an emulation system can be implemented by using this interrupt signal, even if there is no suitable interrupt signal terminal in the expansion slot.

BRIEF DESCRIPTION OF THE DRAWINGS

FIGS. 8A and 8B are figures illustrative of the hierarchical structure of event and mask registers;

FIGS. 17A–17C shows part of the setting state of a memory map and memory setting register corresponding to two display modes;

FIGS. 21A to 21C are memory maps illustrative of SMI handling and NMI handling;

FIGS. 29A and 29B list the types and I/O port addresses of registers in the serial controller;

FIG. 31A is a flowchart of emulation processing of data transmission and FIG. 31B is a signal waveform chart of corresponding signals;

FIGS. 32A to 32C list the contents of the mode register, command register, and status register of an 8251A;

FIG. 33 shows the location and contents of each register of the serial controller of an NS16550A;

FIG. 38 is a detailed flowchart of emulation processing for a mode instruction;

FIGS. 43 and 44 list the location and contents of each register in the Intel 8042 and 8251A;

FIGS. 45A and 45B are flowcharts of command transmission to the keyboard by prior-art hardware and a fourth embodiment;

FIGS. 48A and 48B are flowcharts of data reception by prior-art hardware and the fourth embodiment;

FIG. 51 is a list contrasting interrupt vectors of the first and second architectures;

FIG. 53 is a signal waveform chart of interrupt vector translation emulation processing;

FIG. 61 is a signal waveform chart illustrating the operation of the sixth embodiment during a read cycle;

FIGS. 65A to 65F are figures illustrative of microcode information;

FIG. 66 shows the contents of the status register of the serial controller;

FIG. 67 is a figure illustrative of Example 1 of the sixth embodiment;

FIG. 68 is a figure illustrative of an instruction translation method;

FIG. 69A shows the allocation of interrupt events with respect to interrupt lines and FIG. 69B is a figure illustrative of 8259A I/O ports;

FIG. 70 is a figure illustrative of Example 2 of the sixth embodiment;

FIG. 71 is a figure illustrative of an instruction translation method;

FIG. 73 is a figure illustrative of OCW1 to OCW3;

DESCRIPTION OF THE PREFERRED EMBODIMENTS

The present invention will be described below with reference to preferred embodiments thereof.

First Embodiment

1. Description of Overall Configuration

Figure 1B:
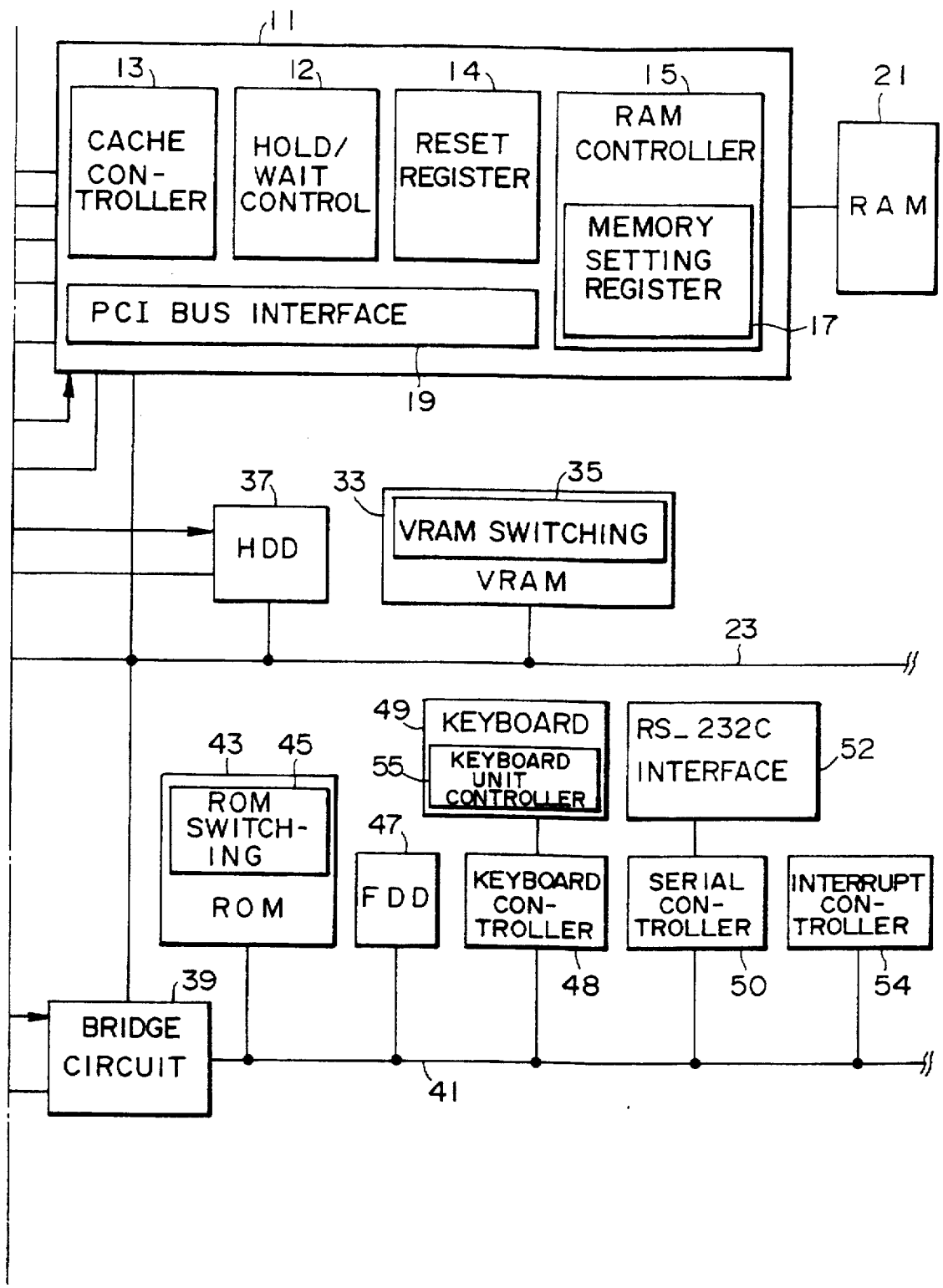
FIG. 1 comprising of FIGS. 1A and 1B is a block diagram illustrating the hardware of a first embodiment of the present invention.

A block diagram illustrating the hardware of a first embodiment of the present invention is shown in FIG. 1.

Figure 54B:
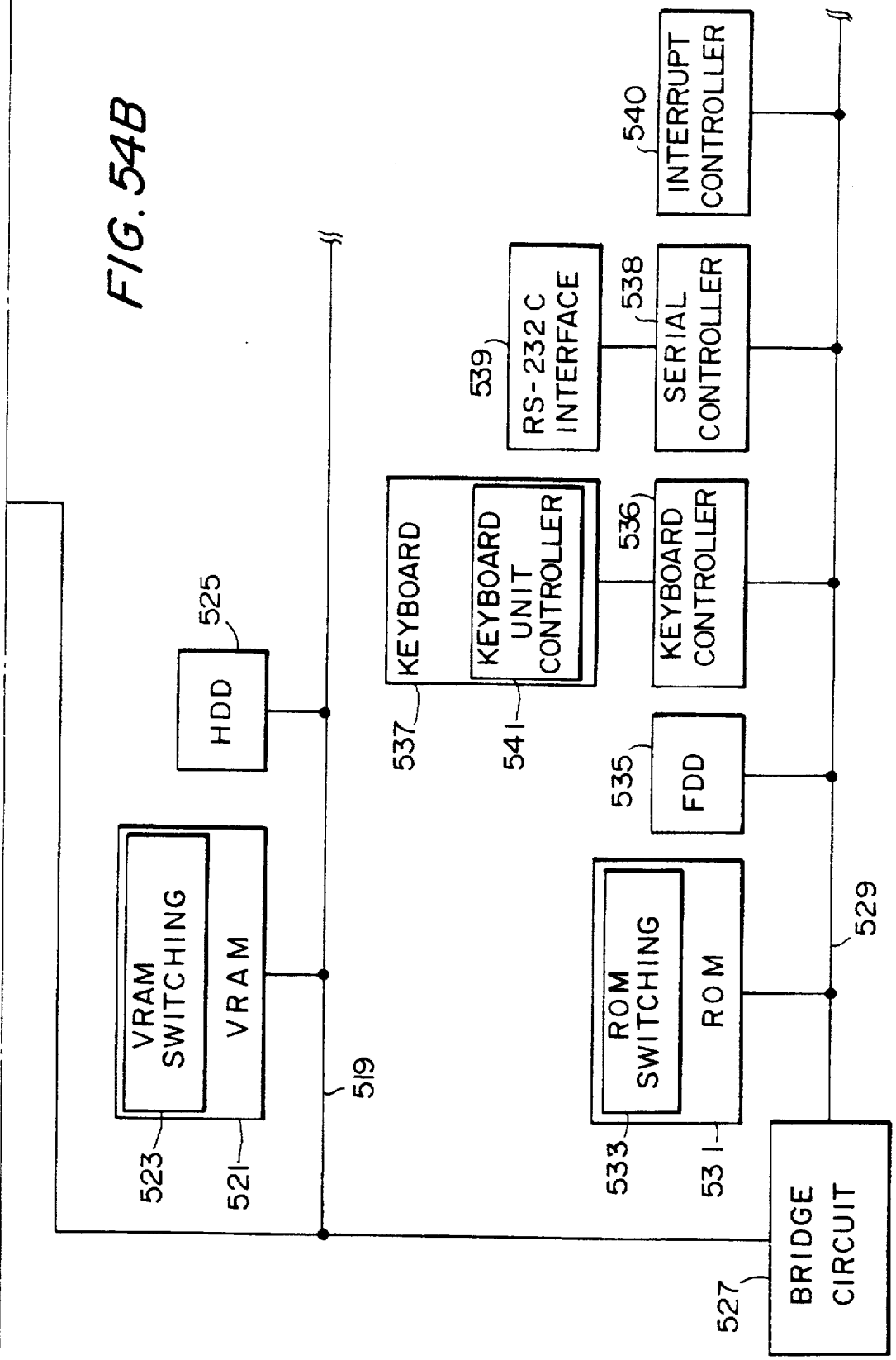
FIG. 54 comprising of FIGS. 54A and 54B shows the configuration of prior-art hardware.
Figure 55:
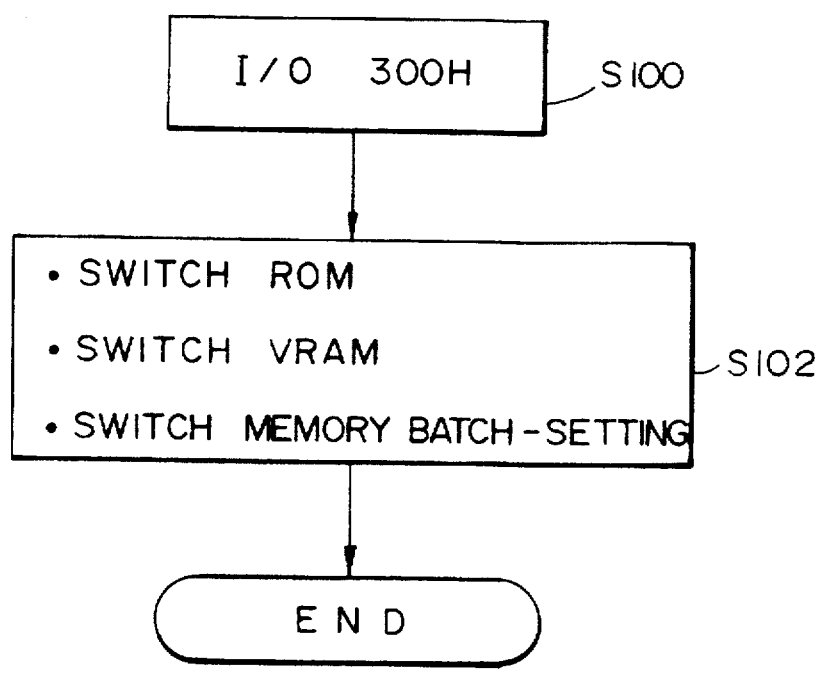
FIG. 55 is a flowchart of the operation of switching between two display modes in the prior-art hardware.

This configuration differs from the prior art shown in FIG. 54 in that a standard component that was designed in accordance with the first architecture is used as the memory controller 11, in other words, an Intel 82434LX (PCMC: registered trademark) is used (in the prior art example, a special controller 507 was used). Thus this embodiment concerns a system in which a memory controller of the first architecture (device control means) 11 is used in combination with a hardware system conforming to a second architecture. In line with this addition of the memory controller 11, this embodiment is provided with a subcontroller 25 which is intended to maintain compatibility.

A CPU 1 and a cache memory 3 are connected to the memory controller 11 by a CPU bus 5. In this embodiment, the CPU 1 is an Intel Pentium (registered trademark) processor. This CPU is designed to provide high-level performance by features such as pipeline processing. In addition, an Intel 82433LX LBX (not shown in the figure) is used as a bus buffer.

A cache controller 13 that controls the cache memory 3, a RAM controller 15 that provides control over RAM 21 operating at high speed connected to the CPU bus 5, and a PCI bus interface 19 designed to act as an interface with a PCI bus 23 are provided within the memory controller 11. The memory controller 11 also contains a hold/wait control means 12 for controlling the operating speed of the CPU 1 by outputting a HOLD signal 7 to the CPU 1 to cause it to wait, and a reset register 14 for activating a hard reset by outputting a RESET signal 8 to the CPU 1 and a soft reset by outputting an INIT signal 9 to the CPU 1. A memory setting register 17 provided within the RAM controller 15 enables/disables memory mapping of the RAM 21 and read, write, and caching with respect to the RAM 21, VRAM 33, and a ROM 43 mapped to memory addresses, by operations based on the first architecture. The memory setting register 17 is part of a config register (not shown in the figure) that performs various settings for the memory controller 11.

A VRAM 33 and a hard disk drive (HDD) 37, devices that are required to transfer large quantities of data at high speed, are connected to the PCI bus 23. The VRAM 33 is provided with a VRAM switching means 35 that switches the mapping of the VRAM 33 with respect to a specific I/O instruction from the CPU 1. Data in VRAM 33 is displayed on a display portion (not shown in the figure). The PCI bus 23 is connected to the subcontroller 25 that is an essential component of this first embodiment. The subcontroller 25 comprises an I/O acceptance means 30 that accepts I/O instructions from the CPU 1, a system management interrupt (SMI) status display means 28 for setting an interrupt event, an SMI generation means 27 that generates SMIs, an SMI mask means 29 for masking the generation of SMIs, a bus arbiter 70 for arbitrating the use of the PCI bus 23, a PCI bus interface 71 intended to be an interface with the PCI bus 23, a reset detection means 73 that detects a reset, a speed switching detection means 74 that detects a speed change, a power failure detection means 75 that detects a power failure, and a display switching detection means 76, as shown in FIG. 1.

Since the memory controller 11 is designed for the above described first architecture, it cannot handle an I/O instruction conforming to the second architecture issued from the CPU 1. Therefore, the I/O instruction is received by the I/O acceptance means 30 within the subcontroller 25 (instructions from the CPU 1 can pass straight through the memory controller 11, so that a device connected to the PCI bus 23 or the bus 41 can receive such an instruction directly). The I/O acceptance means 30 sets an event in the SMI status display means 28 in accordance with the contents of the I/O instruction and, at the same time, the SMI generation means 27 informs the CPU 1 of the SMI by an SMI signal 31. In other words, processing that would have been executed by hardware logic in the prior art is allocated to the CPU 1 instead, by an SMI handling routine. On the other hand, if an instruction from the CPU 1 is issued with respect to the device control means of the second architecture, that instruction is transferred as is to the second device control means. Whether the instruction was issued for the first or the second device control means is determined by the I/O acceptance means 30 analyzing the instruction from the CPU 1. More specifically, the determination is based on a method such as decoding an address by a decoder means incorporated within the I/O acceptance means 30.

The PCI bus 23 is connected by a bridge circuit 39 to the bus 41 that is compatible with comparatively slow prior art devices. A floppy disk drive (FDD) 47 and the ROM 43 containing basic routines such as a BIOS are connected to the bus 41, as are a keyboard 49 connected by a keyboard controller 48, an RS-232C interface 52 connected by a serial controller 50, and an interrupt controller 54. Note that a ROM switching means 45 has the function of mapping ROM in accordance with I/O instructions from the CPU 1. A keyboard unit controller 55 incorporated in the keyboard 49 is a controller on the keyboard side.

Figure 2:
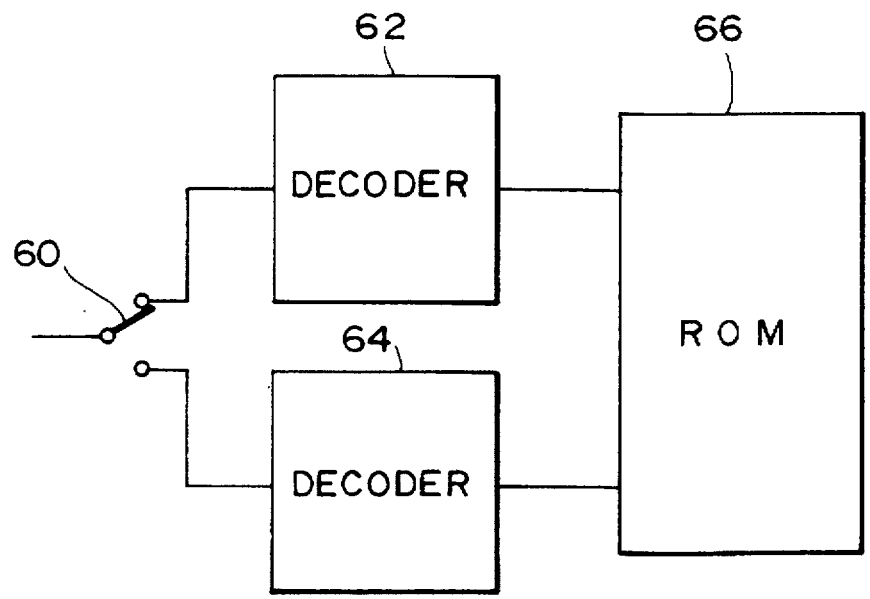
FIG. 2 is a figure illustrative of a hardware configuration for switching the memory mapping.

A diagram illustrating the configuration of hardware for switching the memory mapping is shown in FIG. 2. Assuming that this figure shows the ROM 43 of FIG. 1, a ROM chip 66 contains a system BIOS for controlling all the hardware, as well as a plurality of expansion BIOSs for controlling individual peripheral components such as a HDD 37. The allocations of addresses with respect to the CPU 1 in each BIOS are converted by the ROM switching means 45 of FIG. 1 to suit the operating mode of the hardware. If an I/O instruction that switches the operating mode is received from the CPU 1, the ROM switching means 45 selects one of two decoders 62 and 64 by a switch means 60. More specifically, a decoder enable signal is generated by a switching signal, and a ROM selection signal is generated from the selected decoder. Note that switching of the memory maps of the memory setting register 17 and VRAM switching means of FIG. 1 are performed in a similar manner.

Figure 3:
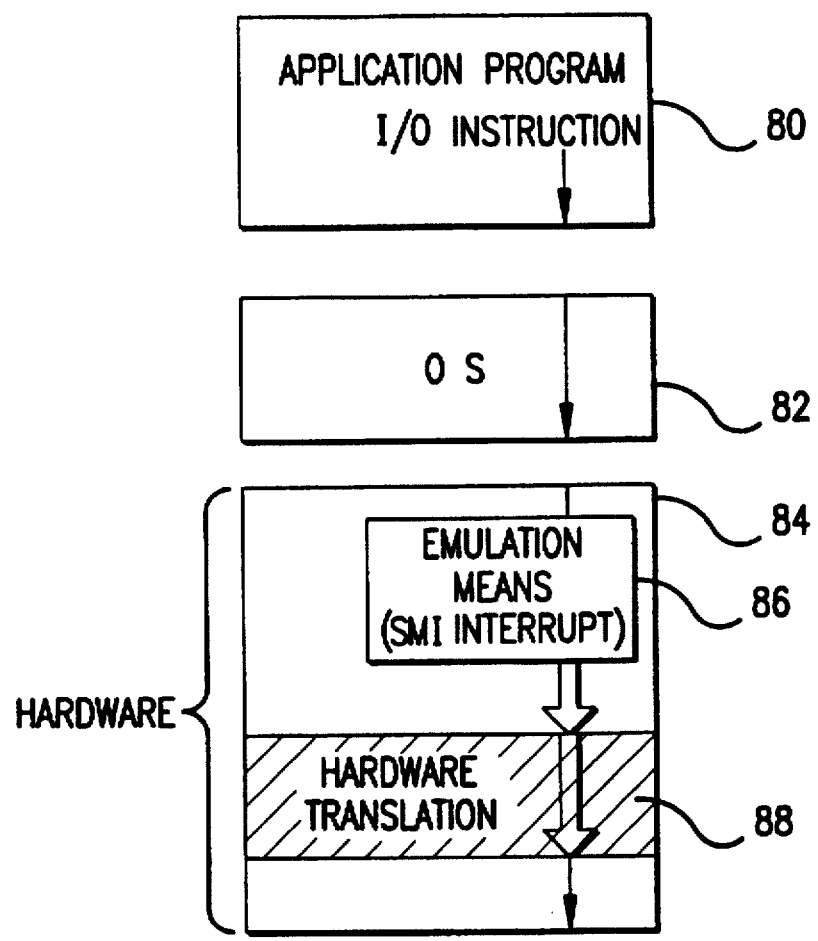
FIG. 3 is a figure illustrative of the concept of this invention.

The basic concept of this first embodiment will now be described with reference to FIG. 3. When an I/O instruction is generated by an application program 80 designed for the second architecture, an OS 82 passes the instruction on to hardware 84 without recognition. Emulation means 86 (equivalent to the SMI activated by the subcontroller 25 of FIG. 1) within the hardware 84 (which includes a BIOS) emulates the received instruction into a form in which a hardware translation portion 88 (equivalent to the memory controller 11 of FIG. 1) can operate upon, so that the hardware translation portion 88 can operate based on the original instruction. Thus, if the emulation could be executed within the hardware 84, not only will compatibility with the second architecture of the application program 80 and the OS 82 be ensured, but also the operation can be speeded up.

2. Description of SMI Processing

The description now turns to the SMI handling. Note that SMIs are used in this embodiment as the interrupts that enable emulation processing. An SMI is an interrupt that occurs at a transition to system management mode (SMM), which is supported by Intel processors such as the SL Enhanced 486 and Pentium (registered trademarks). The issue of system management interrupts is a function provided in the latest Intel CPUs as a special interrupt means for power control, and this invention is characterized in making use of SMIs in the emulation system. In other words, one method of implementing the emulation system could be considered in which emulation processing is activated by a non-maskable interrupt (NMI) to the CPU. However, an attempt to implement emulation processing by an NMI would raise various problems, as will be described later. SMIs are provided as interrupt means for power control, and have the problem that a fixed time is required from the input of the SMI signal to an SMI terminal of the CPU until the interrupt ends. This is because the system must go through a predetermined sequence from the acceptance of the SMI signal until the end of SMI handling, and time is required for this sequence. When an SMI is used for power control, this does not cause much of a problem, but it does cause a problem with emulation processing. The present inventors have observed that the speed of SMI handling causes virtually no problem with processing such as memory map conversion. Further, it is considered that the speed problem can be solved by handling emulation processing that requires speed, such as that illustrated later by a second embodiment of this invention, separately from emulation processing that does not require speed, so that this SMI can be used in emulation processing.

An outline of the SMI handling operation will now be given.

1) When the system inputs an SMI signal to the CPU, the CPU asserts an SMI ACT# signal (where # indicates that the signal is asserted at the zero level), posting that fact that SMRAM (SMM-dedicated physical memory) is enabled.

2) The CPU pushes the CPU state (contents of the internal CPU registers) onto the stack, starting at address location 3FFFFb of SMRAM, downwards.

3) The CPU control mode changes to the SMM processor environment (pseudo-real mode). SMM is a control mode that is independent of real mode, protect mode, and virtual-86 mode.

4) The CPU jumps to absolute address 38000 h in SMRAM, and executes the SMM handler. In other words, an SMM handler that operates in accordance with an independent instruction set detects an SMI generation event and executes the given processing.

5) The SMM handler restores the CPU state (contents of internal registers) from SMRAM, deasserts the SMI ACT# signal, and executes the RSM instruction that returns control to the program (application program or OS) in which the interrupt occurred. Note that, if SMBASE locate is set before RSM is executed, the address location allocated in SMRAM can be changed for the next SMI event. This also means that SMBASE locate can be enabled only within the SMI handling routine.

Thus the interrupt used for emulation processing in this embodiment is not an NMI but an SMI, as described above. Reasons are given below.

1) Since the SMM handler can use the same instruction set in SMM, regardless of the current operating mode of the CPU, development is simple. This is described in more detail below.

With an NMI, the subsequent NMI handling is executed in the CPU control mode (either of protect mode, virtual-86 mode, and real mode) that was current when the NMI was activated. Memory addresses in virtual-86 mode or real mode are 16 bits long (up to 1 MB), while they are 32 bits long (up to 4 GB) in protect mode, so the addressing method is inevitably different. This makes it necessary to write the program to ensure that it operates correctly during NMI handling in all operating modes, making program development difficult. One method of solving this problem could be to use prefixes within the program to convert addressing from 16 bits to 32 bits, or from 32 bits to 16 bits. However, it is necessary to specify how the prefixes set the basis of addressing, to either 16 bits or 32 bits, for each operating mode. It is also necessary to write data to the VM bit of EFLAG, one of the CPU's internal registers, for this mode setting. However, this VM bit is protected by a privilege level, and data can only be written to this bit if it has the highest privilege level. Setting the NMI handling to have the highest privilege level requires specification of the value of DPL in the interrupt descriptor table (IDT), which makes the processing even more complicated. On the other hand, an SMI has advantages in that it is not dependent on the pre-interrupt control mode of the CPU, the CPU always enters an SMM mode called a pseudo-real mode, and, since an SMI handler using the same instruction set is used in SMI, none of the above described problems can occur.

Further, if an attempt is made to perform an I/O access by the NMI handler while in protect mode, it is possible that an I/O trap (I/O with respect to the DMA or HDD) will be set, leading to the problem that correct I/O access will not be possible if the highest privilege level is not set. In addition, to set the privilege level to the highest level, it is necessary to set the DPL value in the IDT, as described above.

2) With an NMI, the jump address for interrupt start (the address at which the handling routine corresponding to the interrupt is stored) is stored at an address location (such as 0008 h to 000 Bh) that an application program or the OS can easily overwrite. Therefore, if the application program or other software should overwrite this address, the interrupt handling will be disabled. In contrast, the jump address for an SMI is set in SMBASE, which is a register within the CPU. When an SMI is started, processing jumps to the start address set by this SMBASE. In this case, SMBASE can be changed only when control is returned from SMM by the RSM instruction, and thus the jump address cannot be changed except by the SMM handler, in other words, it cannot be changed if SMM has not been entered. In this regard, SMI is greatly superior to NMI. This point is discussed in more detail below.

Figure 4A:
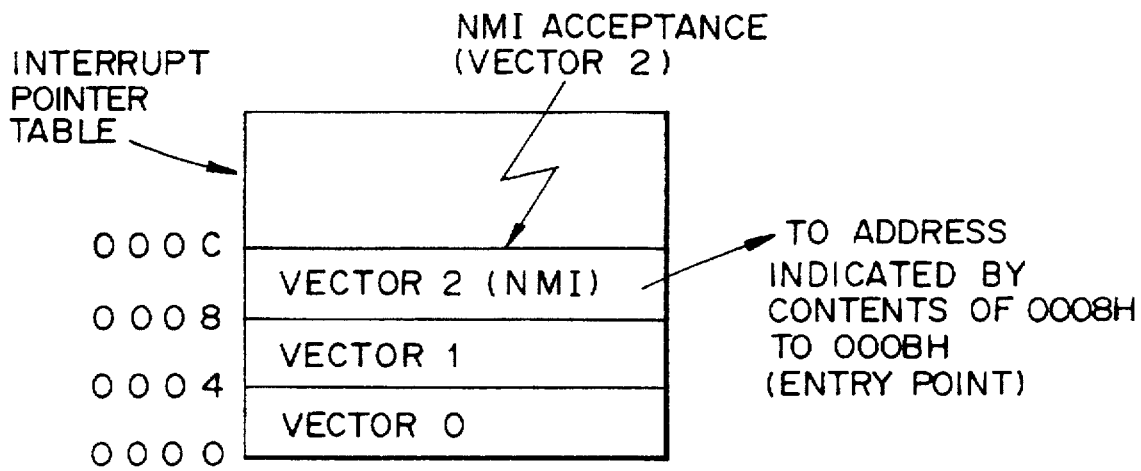
FIG. 4A shows the operation of NMI handling in real mode and FIG. 4B shows a flowchart thereof.
Figure 4B:
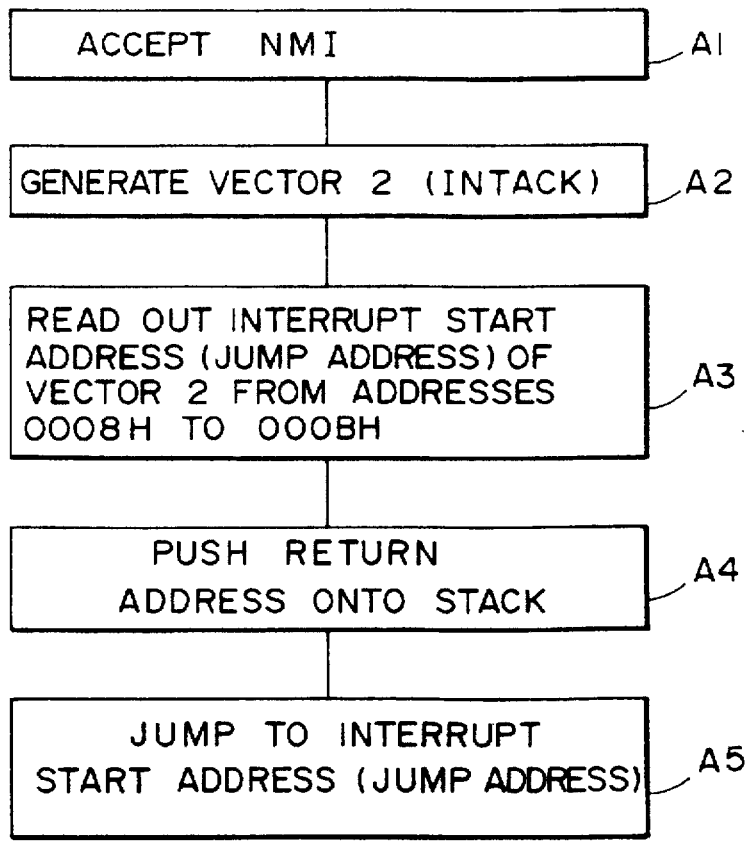

An example of NMI handling in real mode is shown in FIG. 4A and a flowchart thereof is shown in FIG. 4B. When an NMI is received (step A1) and vector 2 is generated (step A2), the interrupt start address (jump address) of vector 2 is read out from addresses 0008 h to 000 Bh of an interrupt pointer table in main RAM (step A3). After the return address is pushed onto the stack in main RAM (step A4), the processing jumps to the interrupt start address (step A5) and NMZ handling is executed in accordance with the routine stored at that interrupt start address. Note that an NMZ differs from an SMI in that the contents of the CPU register are not automatically pushed onto the stack.

Figure 5A:
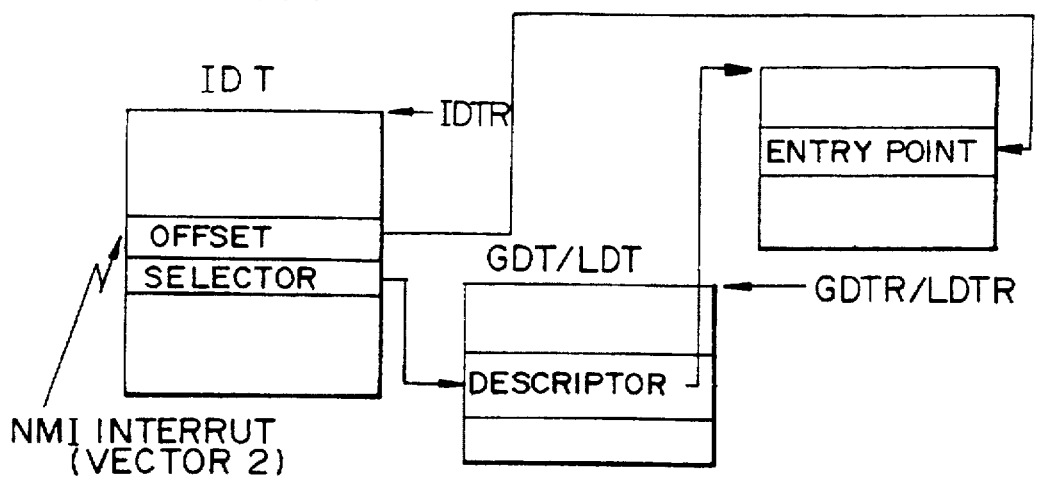
FIG. 5A shows the operation of NMI handling in protect mode.
Figure 5B:
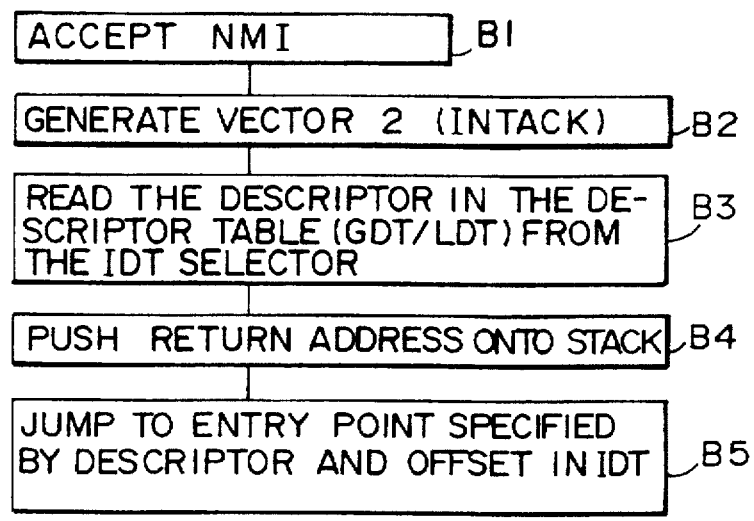
FIG. 5B is a flowchart thereof.

By way of contrast, an example of NMI handling in protect mode is shown in FIG. 5A and a flowchart thereof in FIG. 5B. In this case, the start address of the interrupt descriptor table (IDT) stored in main RAM is specified by IDTR, which is a register within the CPU, and the start address of GDT/LDT (another descriptor table) stored in the same main RAM is specified by GDTR/LDTR, another of the internal CPU registers. The offset and selector for vector 2 generated by the NMI are also stored in the IDT, and this selector specifies a descriptor stored in the GDT/LDT. An upper address specified by this descriptor and a lower address specified by the offset in the IDT specify the address at which the NMI handling routine is stored, in other words, the entry point. The operation in protect mode is as described below.

When an NMI is received (step B1) and vector 2 is generated (step B2), the descriptor in the GDT/LDT is specified by the selector in the IDT and read out (step B3). The return address is then pushed onto the stack (step B4) and the processing jumps to the entry point specified by descriptor and offset in the IDT that were read out in step B3, to perform the NMI handling.

As should be clear from the above description, unless the interrupt start address (jump address) is correctly written to addresses 0008 h to 000 Bh when the operation is in real mode, the NMI handling cannot start from the required address. However, it is easy for an interrupt start address that is stored in main RAM to be overwritten by the application program or OS. In addition, the location at which the interrupt start address is stored for an NMI is fixed, and it cannot be changed to a location that cannot be accessed by the application program or OS.

In protect mode, the IDT and GDT/LDT are allocated to addresses specified by IDTR and GDTR/LDTR in the CPU, and the IDT and GDT/LDT, as well as IDTR and GDTR/LDTR can be freely set by the application program or OS, and thus can be freely changed thereby. In other words, under Microsoft Windows, which is an OS that enables multitasking, each of the active tasks (windows) could have different values in the corresponding IDT. Therefore, since emulation processing is executed from the system side, if an attempt is made to change the area in which this IDT is stored to an address location where it cannot be accessed by an application program or other software, the system side cannot check which OS is being used and thus such a change is impossible. Further, assuming that such a change in the address location were made, the application program or other software would overwrite this address location subsequently. It should be clear from the above that it would be extremely difficult to implement the emulation processing of this embodiment by using NMIs.

On the other hand, with SMIs, the start address for SMI handling is fixed at a default address of 38000 h in SMBASE, which is an internal CPU register, immediately after power-on or a reset. This default address 38000 h in SMBASE cannot be overwritten by application programs or other software. This means that, in order to change this 38000 h, SMM must be activated and the above described SMBASE locate function used. Since an SMI can only be generated by a hardware signal, the SMI signal, software other than the system cannot activate SMM. Thus the start address for SMI handling cannot be overwritten by application programs or other software, which is why SMIs are most suitable as the interrupts used for the emulation processing of this invention.

3) At a transition to SMM, the CPU status (contents of internal registers) is saved to a state save region in SMRAM, and those contents are automatically restored to the internal CPU registers by the RSM instruction. This enables the CPU to return automatically to fits original state. Some of the registers in this state save region could also be read and modified by the SMM handler, and the modified values could be restored to the internal CPU register by the RSM instruction. This means that details that have been modified by the SMM handler could be set in the internal CPU registers.

Figure 5C:
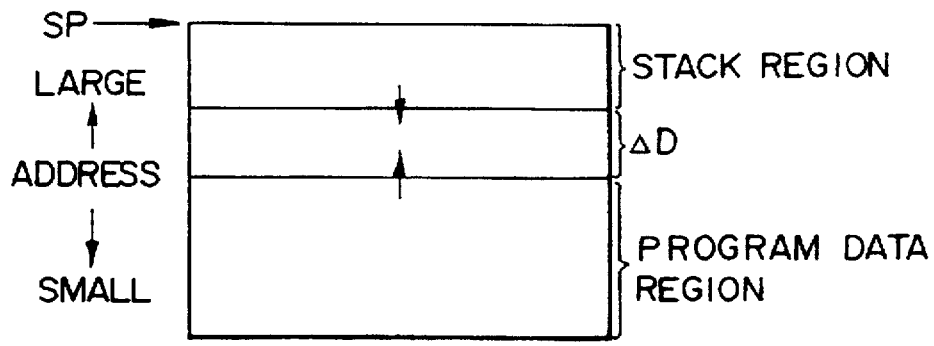
FIG. 5C is a figure illustrative of the stack region.

In contrast, with an NMI, the return address is automatically pushed onto the stack, but nothing else is saved in this manner, even the contents of the internal registers. Further, data is stored sequentially in the stack region in decreasing magnitude of address, starting from the address indicated by the stack pointer (SP), as shown for example in FIG. 5C. This stack region is not used only for NMIs; it could also be used by other software. The program stored in the program data region is executed starting from the lowest address, as shown in FIG. 5C. In this case, there is some free space (ΔD) between the stack region and the program data region, but if it is less than 4 bytes when an NMI is generated, data stored in the program data region might be destroyed. Such a collision between the stack region and the program data region could be prevented by setting the location of the SP in such a manner that collision cannot occur. However, FIG. 5C makes it clear that if the stack region is being used by other software and an NMI is generated when the free space is small, it would be impossible to prevent such a collision. In addition, the SP can be easily overwritten by an application program or other software, so that an invalid value could be written to the SP by a bug in the software.

Other methods could be considered, such as one in which constants are written to the internal CPU register, as described below. With this method, the stack region is set in ROM or somewhere similar, data is read by instructions such as popA, popB, . . . etc., from the ROM area that has been set as the stack region, and this data is set in internal CPU registers A, B, . . . etc. In this case, a popA instruction reads data that are pushed onto the stack and writes it to the A register in the CPU. This instruction makes the programming much easier in comparison with the use of such an instruction as that moves the data. However, use of this method requires that the stack region is set in ROM. Therefore, since writing to ROM is disabled, if an interrupt is generated by an NMI with this setup, the return address is not written to ROM, and thus the program cannot return from the NMI and it runs away. Even if the stack region is set in RAM, data written to RAM might be destroyed by the NMI handler.

In contrast, with an SMI, the contents of the internal CPU registers are stored in SMRAM, which is memory dedicated to SMIs, so that the above described problem with NMIs does not occur.

4) Assuming a case in which non-maskable interrupts (NMIs) and ordinary interrupts (INTs) are used by an application program conforming to the second architecture, while compatibility may not be maintained by carelessly allocating other functions, SMIs have such a short history, unlikely that other application programs use them. An SMI also has a higher priority than an NMI or ordinary interrupt.

5) When an SMI is generated, the SMI ACT# signal is output by the CPU and thus the activation of the SMI routine can be detected in a hardware manner. Thus SMRAM, which is dedicated SMI RAM, can be allocated to any desired address, and also hardware processing can be triggered by the SMI ACT# signal.

Figure 6:
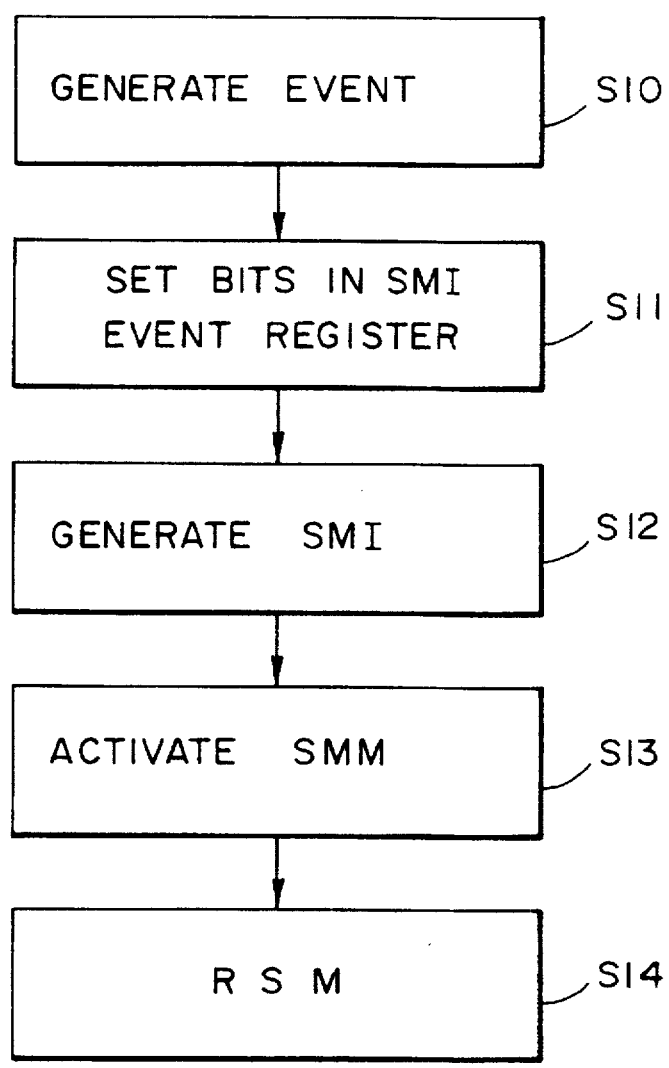
FIG. 6 is a flowchart illustrative of the operating principle of SMI handling.

The operating principle of SMI according to this first embodiment will now be described, using FIG. 6. When an event (an I/O instruction) is generated in a step S10, the acceptance means 30 receives it in a step S11, the event is set in the event register in the SMI status display means 28 by the hardware logic, and the SMI is generated in a step S12. SMM is activated in a step S13, the SMM handler 26 (see FIG. 1) reads the event register (the event register is mapped in such a manner that it can be read and written by all CPUs), the processing corresponding to that event is executed, and control is returned by the RSM instruction in a step S14.

3. Description of Subcontroller

Figure 7:
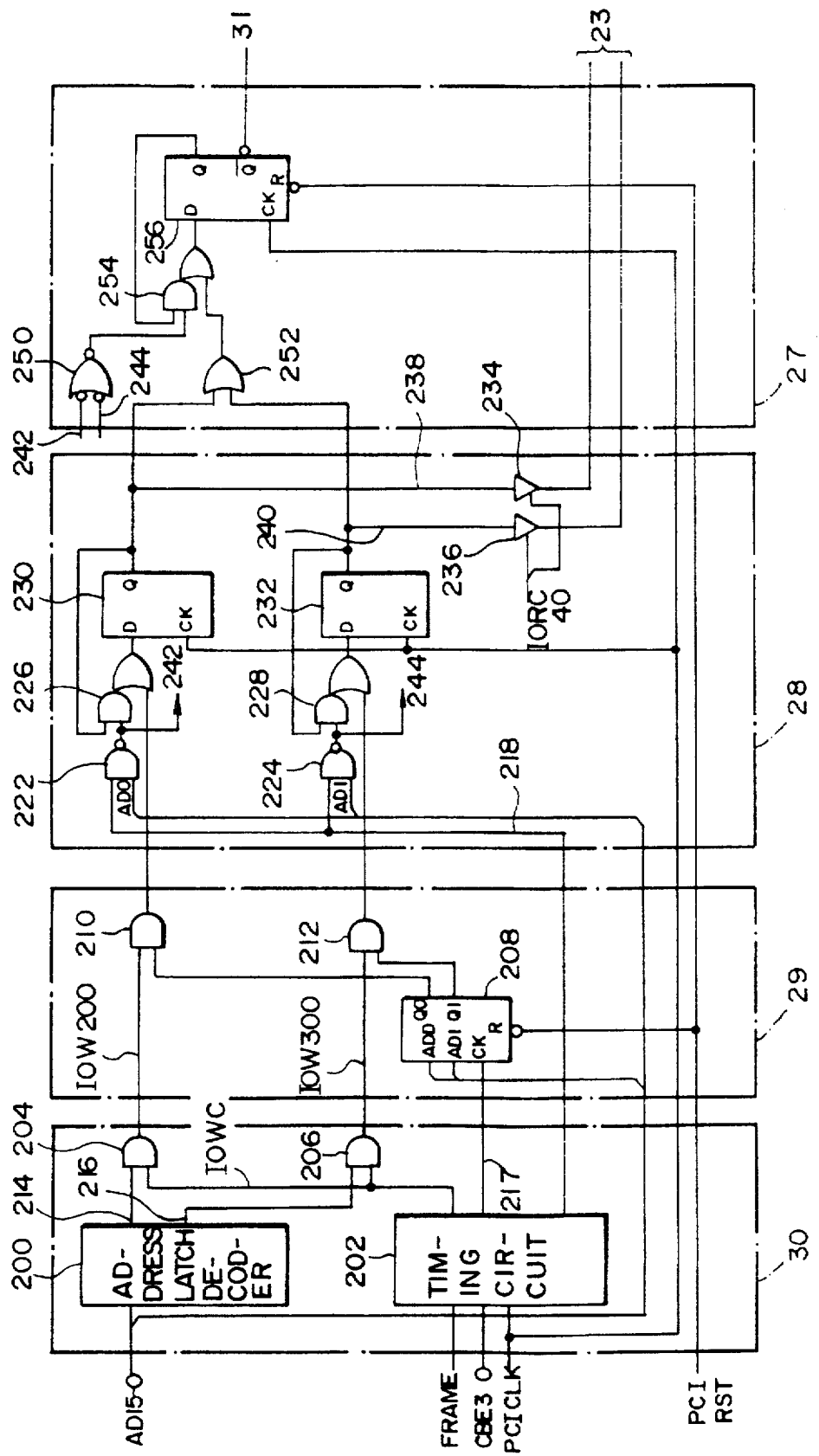
FIG. 7 shows an example of the circuit configuration of I/O acceptance means, SMI mask means, SMI status display means, and SMI generation means within the subcontroller.

An example of the circuit configuration of the I/O acceptance means 30, SMI mask means 29, SMI status display means 28, and SMI generation means 27 within the subcontroller 25 is shown in FIG. 7. The I/O acceptance means 30 comprises an address latch decoder 200, a timing circuit 202, and AND circuits 204 and 206. Address signals AD15 to AD0 (in practice, addresses and data are multiplexed) are input to the address latch decoder 200. If the address specified by AD15 to AD0 is 200 h, a signal 214 becomes 1; if it is 300 h, a signal 216 becomes 1. A FRAME signal, CBE3 to CBE0 signals, and a PCICLK (PCI clock) signal are input to the timing circuit 202, and an IOWC signal of a predetermined width is output therefrom at predetermined timing. In other words, if the instruction from the CPU is an I/O instruction, and the mode is a write mode, the IOWC signal becomes 1. An IOW200 signal and an IOW300 signal are generated from this IOWC signal and the signals 214 and 216. Thus the IOW200 or IOW300 signal is asserted when the address input to the CPU is 200 h or 300 h, respectively, and there is an I/O write instruction.

The SMI mask means 29 comprises a mask register 208 and AND circuits 210 and 212. The mask register 208 is a register that stores signals for masking SMIs. A write signal 217 is input to a CK terminal thereof from the timing circuit 202, and data is fetched in sequence from AD0 and AD1 based on this write signal 217. Reset is by the input of a PCZRST signal to an R terminal. Outputs of the mask register 208 are input to AND circuits 210 and 212, and these can mask the transfer of the corresponding IOW200 and IOW300 signals to the next stage.

The SMI status display means 28 comprises logic circuits 222 to 228, event registers 230 and 232, and tristate buffers 234 and 236. The event registers 230 and 232 store the data input from the I/O acceptance means 30 through the SMI mask means 29, as event data. For example, if the mask is not set when the IOW200 signal is 1, in other words, if the output Q0 of the mask register 208 is 1, a 1 is written in the event register 230. This means that an event that generated a data write instruction has been set at address 200 h by the CPU. To clear this event, an output signal 218 of the timing circuit 202 may be set to 1 and 1 data may be written by AD0 and AD1. In accordance with this embodiment, either or both of the events stored in the event registers 230 and 232 can be cleared. Outputs 238 and 240 of the event registers 230 and 232 are controlled through the tristate buffers 234 and 236 by an IORC40 signal from an event identification port, and are output thereby to the PCI bus 23. The outputs 238 and 240 of the event registers 230 and 232 are also output to the SMI generation means 27.

The SMI generation means 27 comprises logic circuits 250 to 254 and an SMI generation register 256. When an event has been set in either of the event registers 230 and 232, the SMI generation register 256 asserts the SMI signal 31 and thus issues an interrupt in the CPU 1. Outputs 242 and 244 of NAND circuits 222 and 224 are input to the SMI generation register 256 through logic circuits 250 and 254. When the events in the event registers 230 and 232 are cleared in this manner, the SMI signal 31 is also cleared. Note that the PCIRST signal is input to an R terminal of the SMI generation register 256 to enable reset.

In the above described manner, when an I/O instruction from the CPU 1 is issued for the port corresponding to the subcontroller 25, that I/O instruction is stored in the event registers 230 and 232 as event data and the SMI signal generated. The SMM handler (execution means) 26 activated by the SMI signal controls the IORC40 signal through the event identification port and thus reads the event data. The SMM handler 26 then reads the port data at I/O address 200 h and thus identifies the event in detail. It then executes the processing corresponding to this event data and the data written to the port.

The types of event that can be set in the event register of this embodiment can be divided into the following main categories:

Event a: I/O port access handling for executing display mode switching emulation, RAM window emulation, and emulation for switching the expansion ROM region to RAM
Event b: CPU speed switching handling
Event c: CPU reset (RESET, INIT) handling
Event d: Power failure handling The above events are identified by a first group of event registers, as shown in FIG. 8A. If event a is set, a more detailed breakdown of the event (e to h) can be investigated from a second group of event registers. In a similar manner, if event c is set, a more detailed breakdown of the event (i or j) can be investigated from a third group of event registers. Thus the event register of this embodiment has a hierarchical structure in which second and third groups of registers are arranged below a first group of event registers, enabling rapid reference to the event. In other words, if all possible events are arranged in parallel, the first reference sweep would have to investigate all of the events. However, with this embodiment, the first reference sweep only needs to investigate four events, making the reference far faster.

With this embodiment, it is also possible to arrange the mask register in a hierarchical structure to correspond directly with that of the event register, as shown in FIG. 8B. Thus if, for example, event a is masked (SMI disabled) by the first mask register, all of events e to h are also masked. On the other hand, if only the mask of event a is released (SMI enabled) by the first mask register, only the events corresponding to enabled bits in the second mask register are able to generate an SMI.

Figure 9B:
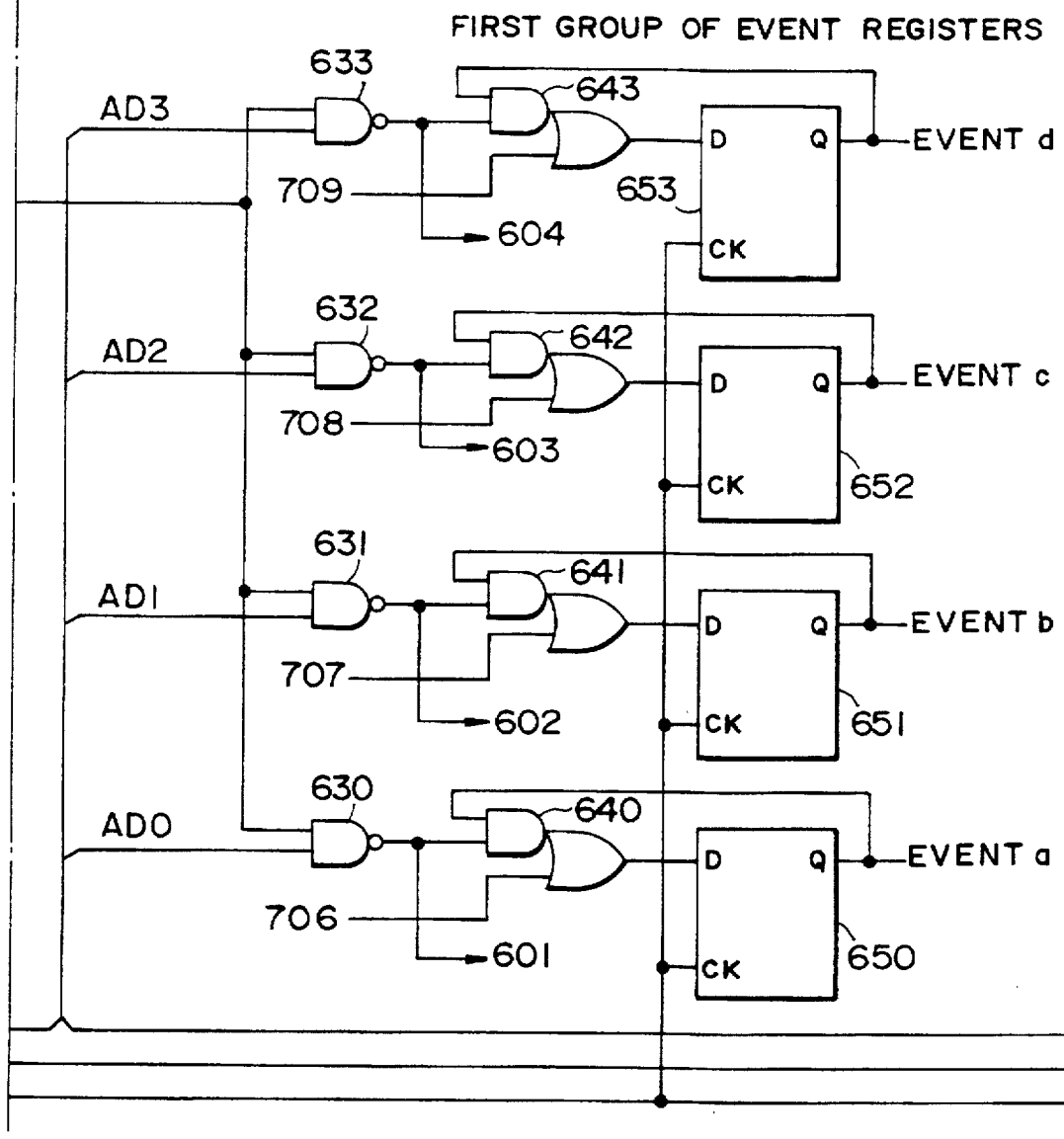
FIG. 9 comprising of FIGS. 9A–9C shows an example of the hierarchical structure of the event and mask registers.
Figure 9C:
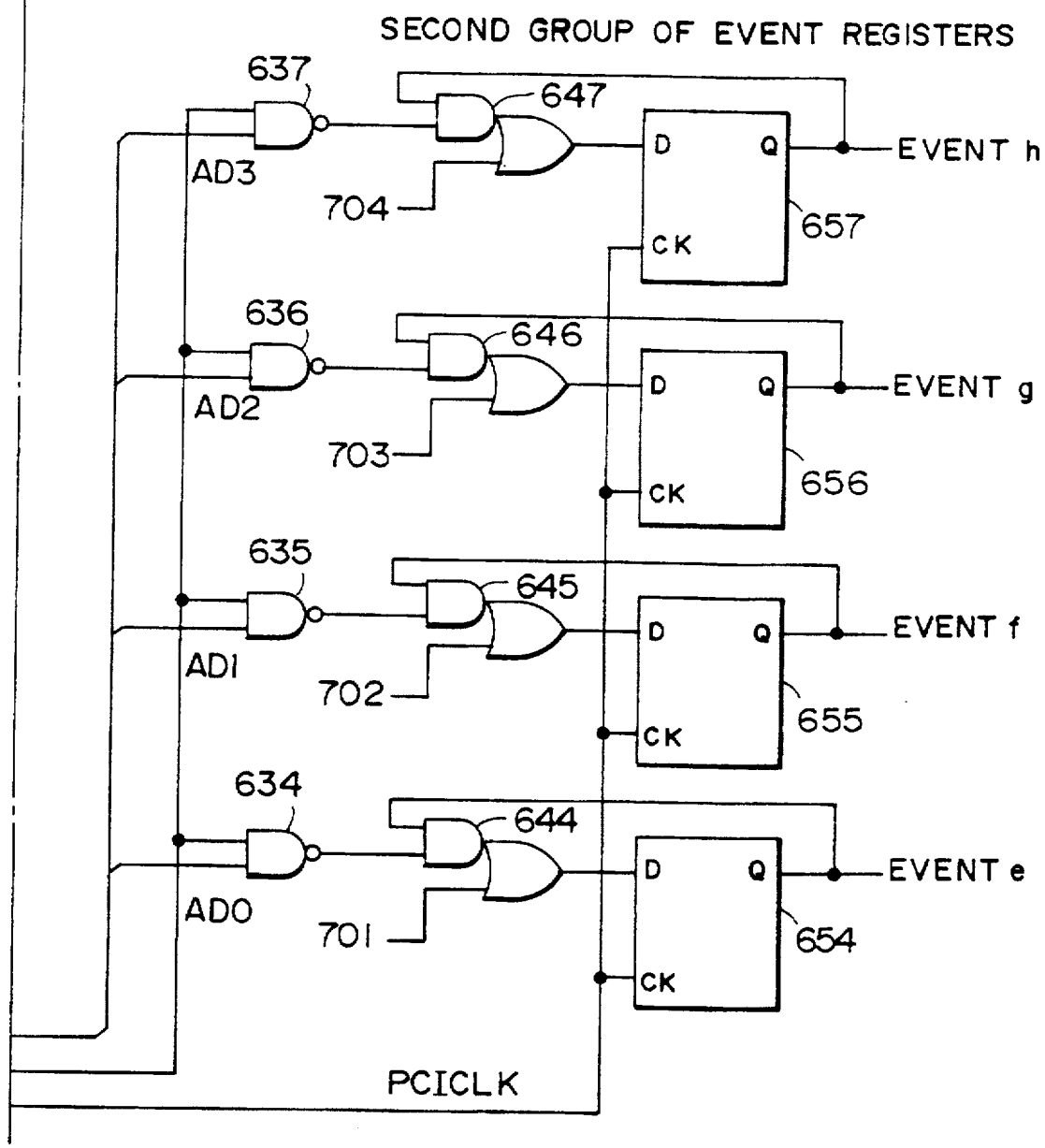
Figure 10B:
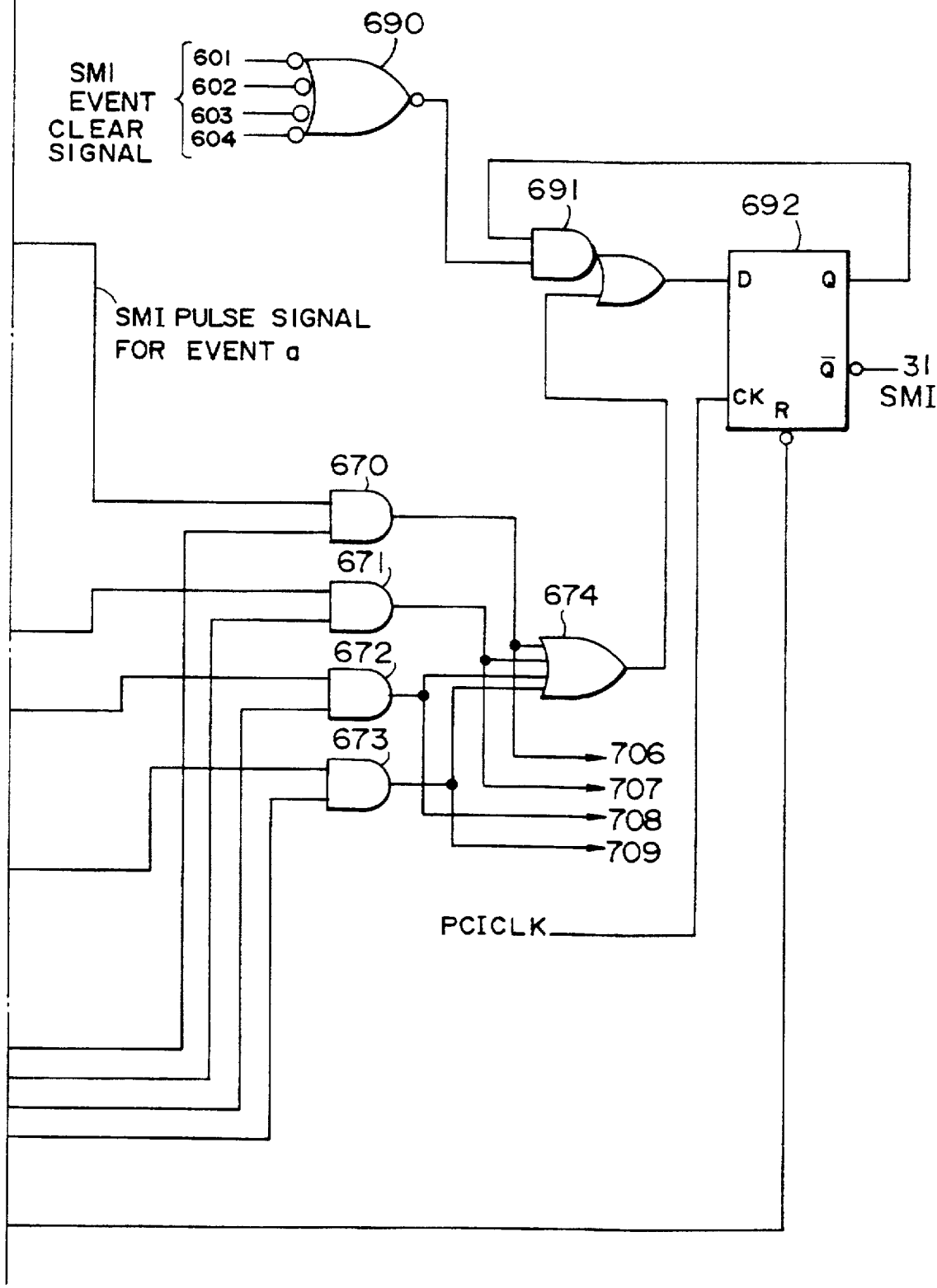
FIG. 10 shows another example of the hierarchical structure of the event and mask registers.
Figure 11A:
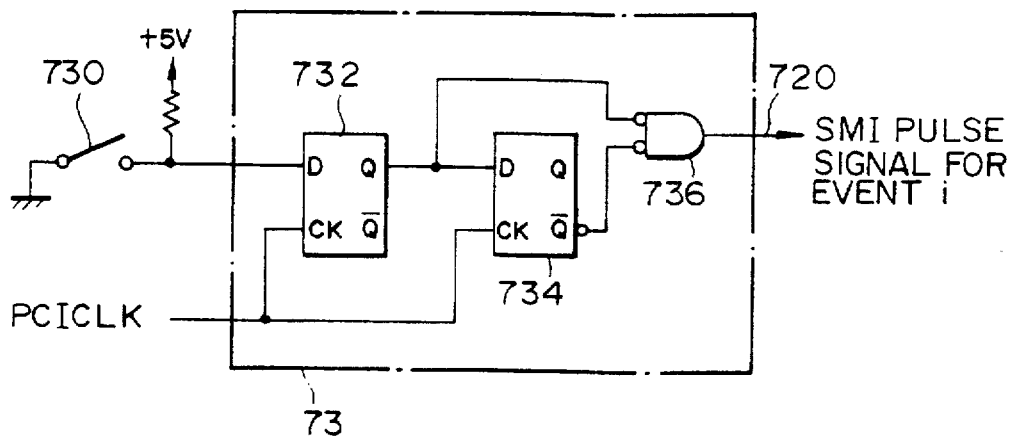
FIGS. 11A to 11C show examples of the circuit configuration of reset detection means, speed switching detection means, and power failure detection means.
Figure 11B:
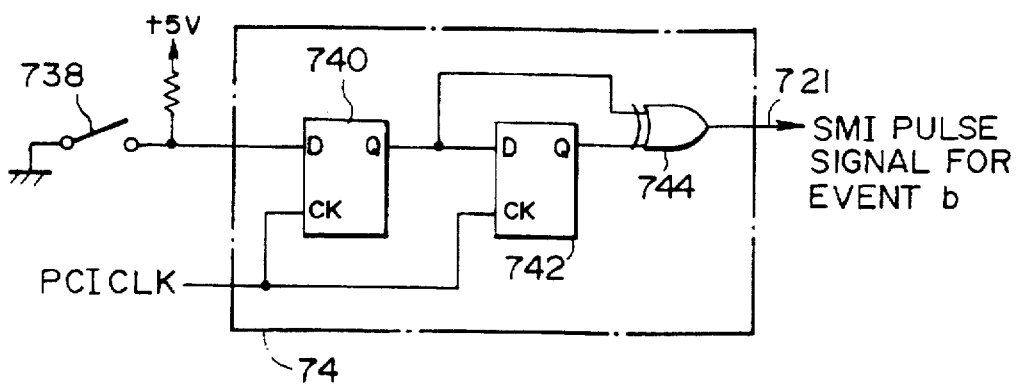
Figure 11C:
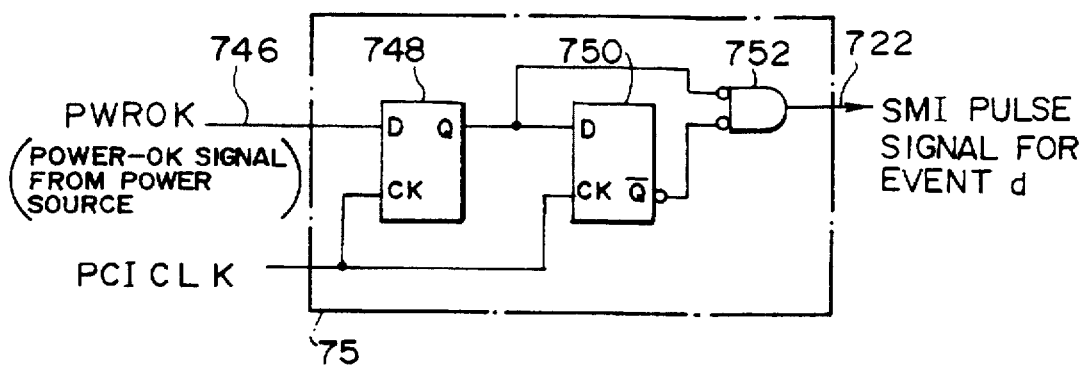

Examples of circuit configurations for the above described hierarchical structures of the event and mask registers are shown in FIGS. 9 and 10. Similarly, examples of specific circuit configurations for the reset detection means 73, speed switching detection means 74, and power failure detection means 75 are shown in FIGS. 11A to 11C. Note that the display switching detection means 76 is configured in a similar manner as the other detection means, although it is not shown in these figures.

When the CPU 1 accesses a predetermined I/O port, event a is set and then one of events e to h is set, and an SMI pulse signal is generated based on these events. In other words, an address decode signal from the address latch decoder 200 and an I/O write pulse signal IOWC from the timing circuit 202 are input to AND circuits 622 to 625, and signals 606 to 609 that are SMI pulse signals corresponding to events e to h are generated thereby, as shown in FIG. 9. These signals 606 to 609 and outputs from the second mask register 661 are input to AND circuits 675 to 678 from which signals 701 to 704 are generated, as shown in FIG. 10, and these signals are input to an OR circuit 679 from which an SMI corresponding to event a is output. Thus the second mask register 661 can be used to mask each of events e to h. If an SMI pulse signal is generated by one of events e to h, the SMI pulse signal for event a is also generated. The signals 701 to 704 are also input through logic circuits 644 to 647 to the second group of event registers 654 to 657, as shown in FIG. 9, to set those registers for events e to h. At the same time, the SMI pulse signal for event a and an output of the first mask register 660 are input to an AND circuit 670, as shown in FIG. 10, to generate a signal 706. This means that if event a is masked, events e to h are also masked. The signal 706 is input through a logic circuit 640 to an event register 650, which is one of the first group of event registers shown in FIG. 9, to set event a. In other words, if events e to h are set, event a also set.

When a speed switching switch 738 shown in FIG. 11B closes, or opens, and speed switching processing starts, a signal 721 that is an SMI pulse signal for event b is generated by D-flipflops (abbreviated to DFFs hereafter) 740 and 742 and a logic circuit 744. As shown in FIG. 10, this signal 721 and an output from the first mask register 660 are input to an AND circuit 671, which generates a signal 707. In other words, event b can also be masked by the mask register. The signal 707 is input through a logic circuit 641 to an SMI event register 651, which is one of the first group of event registers shown in FIG. 9, to set event b.

When a reset switch 730 shown in FIG. 11A is closed and hard reset processing starts, a signal 720 that is an pulse signal for event i is generated by DFFs 732 and 734 and a logic circuit 736. If I/O write processing for a soft reset is executed, a signal 605 that is an SMI pulse signal for event j is generated from an address decode signal from the address latch decoder 200 and the I/O write pulse signal IOWC from the timing circuit 202, as shown in FIG. 9. These signals 720 and 605 and outputs from the third mask register 662 are input to AND circuits 680 and 681 from which signals 710 and 711 are generated, as shown in FIG. 10, and these signals are input to an OR circuit 682 from which an SMI corresponding to event c is generated. Thus the third mask register 662 can be used to mask either of events i and j. If an SMI pulse signal is generated by either of events i and j, the SMI pulse signal for event c is also generated. The signals 710 and 711 are also input through logic circuits 648 and 649 to the third group of event registers 658 and 659, as shown in FIG. 9, to set these registers for events i and j. At the same time, the SMI pulse signal for event c and an output of the first mask register 660 are input to an AND circuit 672, as shown in FIG. 10, to generate a signal 708. This means that if event c is masked, events i and j are also masked. The signal 708 is input through a logic circuit 642 to an event register 652, which is one of the first group of event registers shown in FIG. 9, to set event c. In other words, if events i and j are set, event c is also set.

When a power-OK signal from a power unit falls and power-failure processing starts, a signal 722 that is an SMI pulse signal for event d is generated by DFFs 748 and 750 and a logic circuit 752, shown in FIG. 11C. As shown in FIG. 10, this signal 722 and an output from the first mask register 660 are input to an AND circuit 673, which generates a signal 709. The signal 709 is input through a logic circuit 643 to an event register 653, which is one of the first group of event registers shown in FIG. 9, to set event d.

Finally, as shown in FIG. 10, these signals 706 to 709 are input through an OR circuit 674 and a logic circuit 691 to an SMI generation register 692, and the SMI signal 31 is output therefrom. Note that the events in the event registers 650 to 659 of FIG. 9 can be cleared by inputting I/O write pulse signals IOWC100, IOWC200, and IOWC300 through NAND circuits 630 to 639. If events a to d are cleared, the SMI generation register 692 is also cleared by a logic circuit 690 (see FIG. 10) to which the signals 601 to 604 are input, and the SMI signal 31 is deasserted. Mask data in the first to third mask registers 660 to 662 is set by signals IOWC400 to IOWC600 that are I/O write pulse signal signals for mask writing.

Figure 12A:
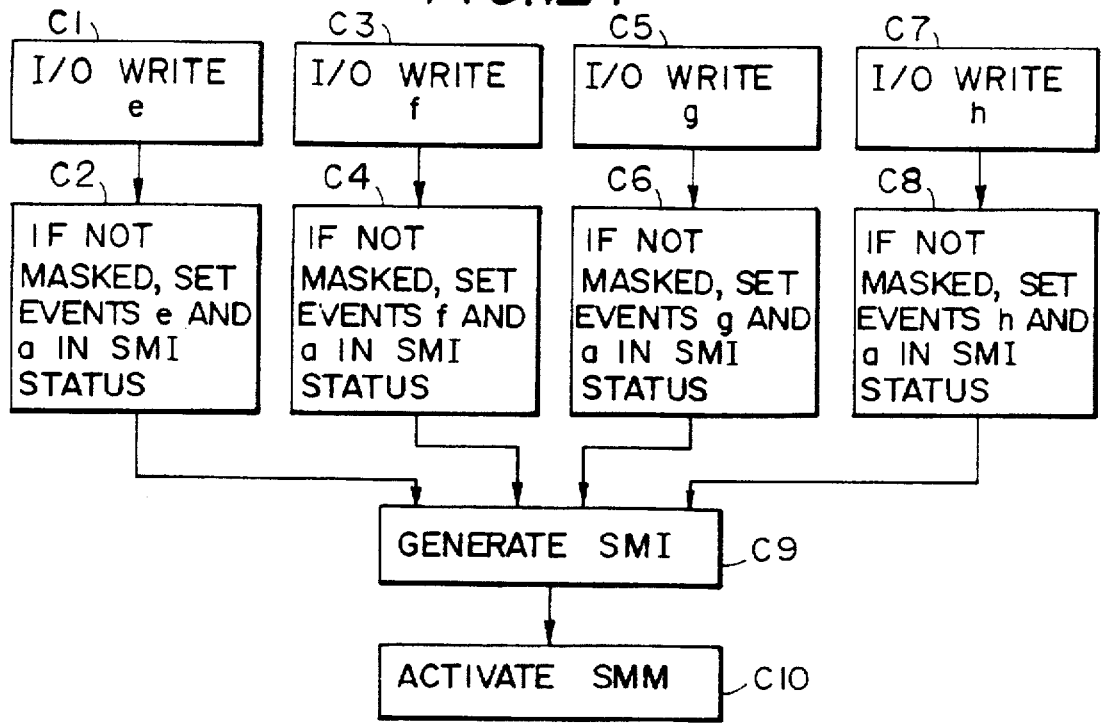
FIGS. 12A and 12B are flowcharts of the operation of the subcontroller that has a hierarchical structure.
Figure 12B:
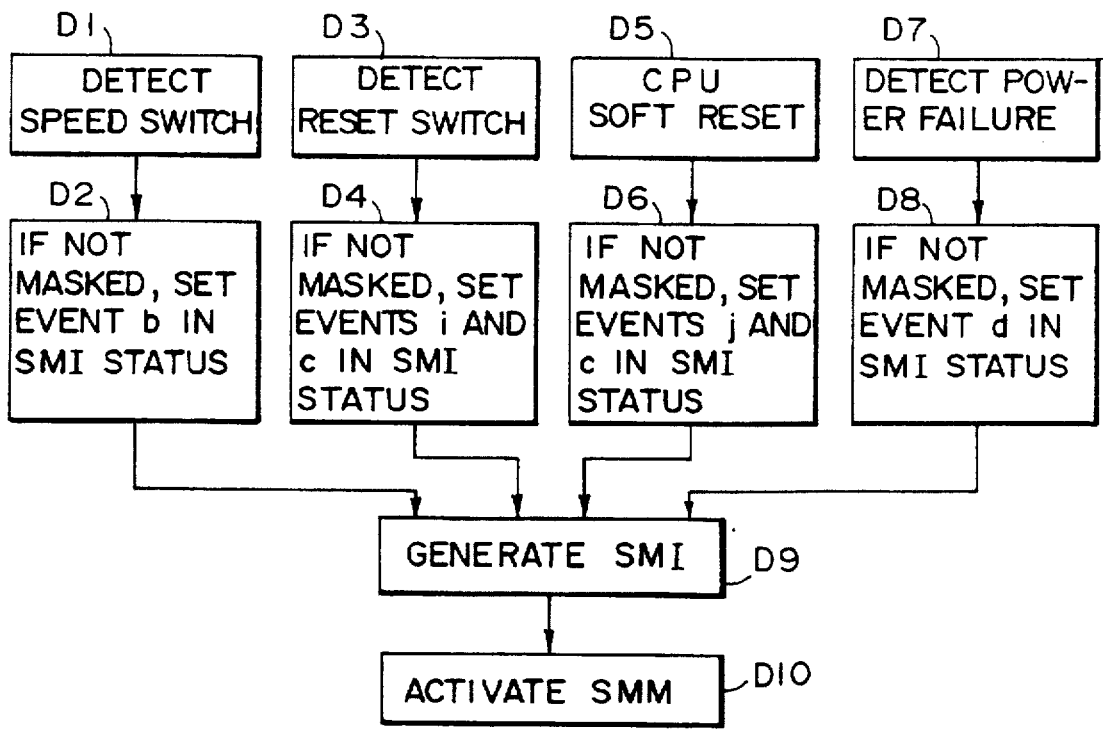

Flowcharts of the above described processing are given in FIGS. 12A and 12B. If, for example, I/O write processing is executed for event e (step C1) and that event is not masked, both events e and a are set in the SMI status (step C2), this generates an SMI, and the mode changes to SMM (steps C9 and C10). I/O write processing for events f, g, and h is done in the same manner. Similarly, if the speed switch detection processing for event b is executed (step D1) and that event is not masked, event b is set in the SMI status (step D2), this generates an SMI, and the mode changes to SMM (steps D9 and D10). If reset switch detection processing is executed (step D3) and that event is not masked, both events i and c are set in the SMI status (step D4), this generates an SMI, and the mode changes to SMM (steps C9 and C10). CPU soft reset processing and power-failure processing are handled in a similar manner.

The above described configuration of this embodiment, in which the event register has a hierarchical structure and each event can be masked, enables the advantages described below. A first advantage is that the initial event reference need only cover events a to d, which speeds up the reference. A second advantage is that the masking of these events in a hierarchical structure enables the setting of priorities to the events and the corresponding SMIs. Thus emulation processing relating to changes in the system's operating environment, such as a power failure, can be assigned a priority higher than emulation processing for I/O port access. A third advantage is that some emulation processing does not require operation (for example, VRAM or IPF processing with a high-resolution display), depending on the mode of the computer system, so that the above described emulation processing may be prevented from operating by masking such events.

Figure 13:
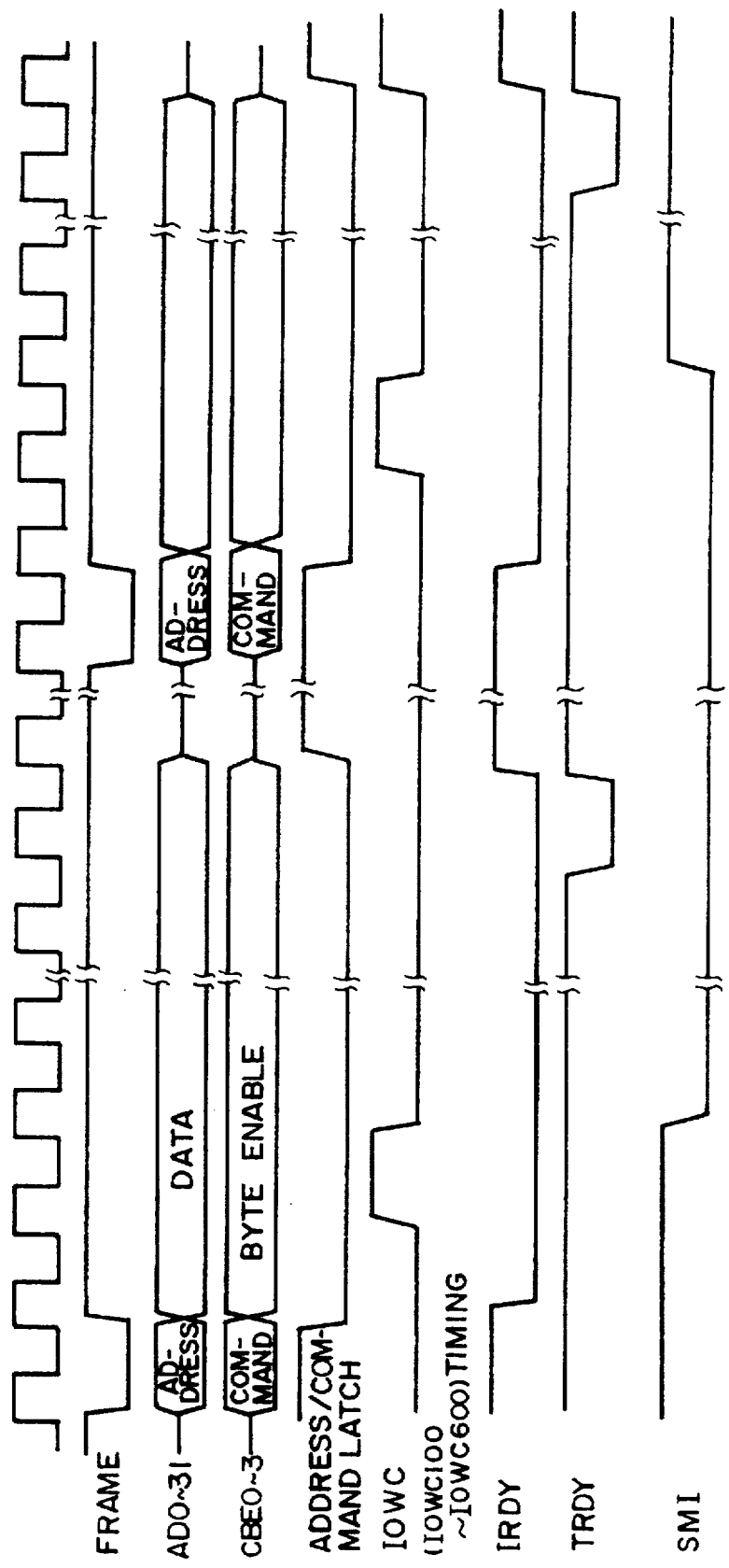
FIG. 13 shows an example of a signal waveform chart during the setting of event data.

An example of a signal waveform chart for the setting of event data is shown in FIG. 13. When a FRAME signal is asserted and a PCI bus access cycle starts, the address signals AD0 to AD31 and the command signals CBE0 to CBE3 are latched at the address latch decoder 200 and the timing circuit 202 are latched at the first subsequent clock signal, and an initiator ready (IRDY) signal is asserted. After the second clock signal, the IOWC signal from the timing circuit 202, which is an I/O write pulse signal, is asserted, and this sets the event in the event register and also asserts the SMI signal 31 to start the SMI handling. This bus access cycle ends when both the IRDY signal and a target ready (TRDY) signal are asserted. The event is cleared in the next bus access cycle shown in FIG. 13, and this deasserts the SMI signal 31.

4. Description of Overall System Operation

Figure 14:
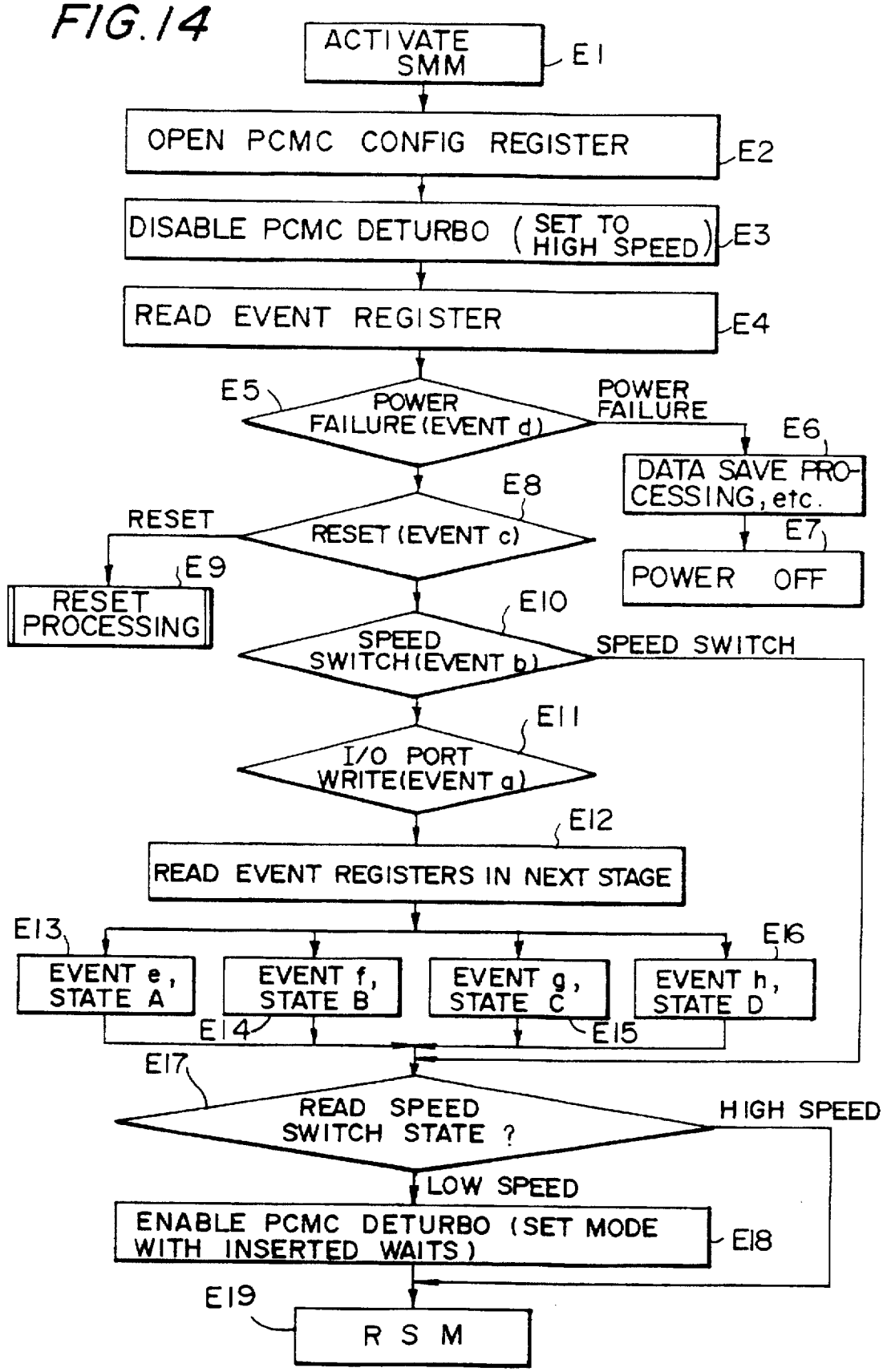
FIG. 14 is a flowchart of the operation after SMM is activated.
Figure 15:
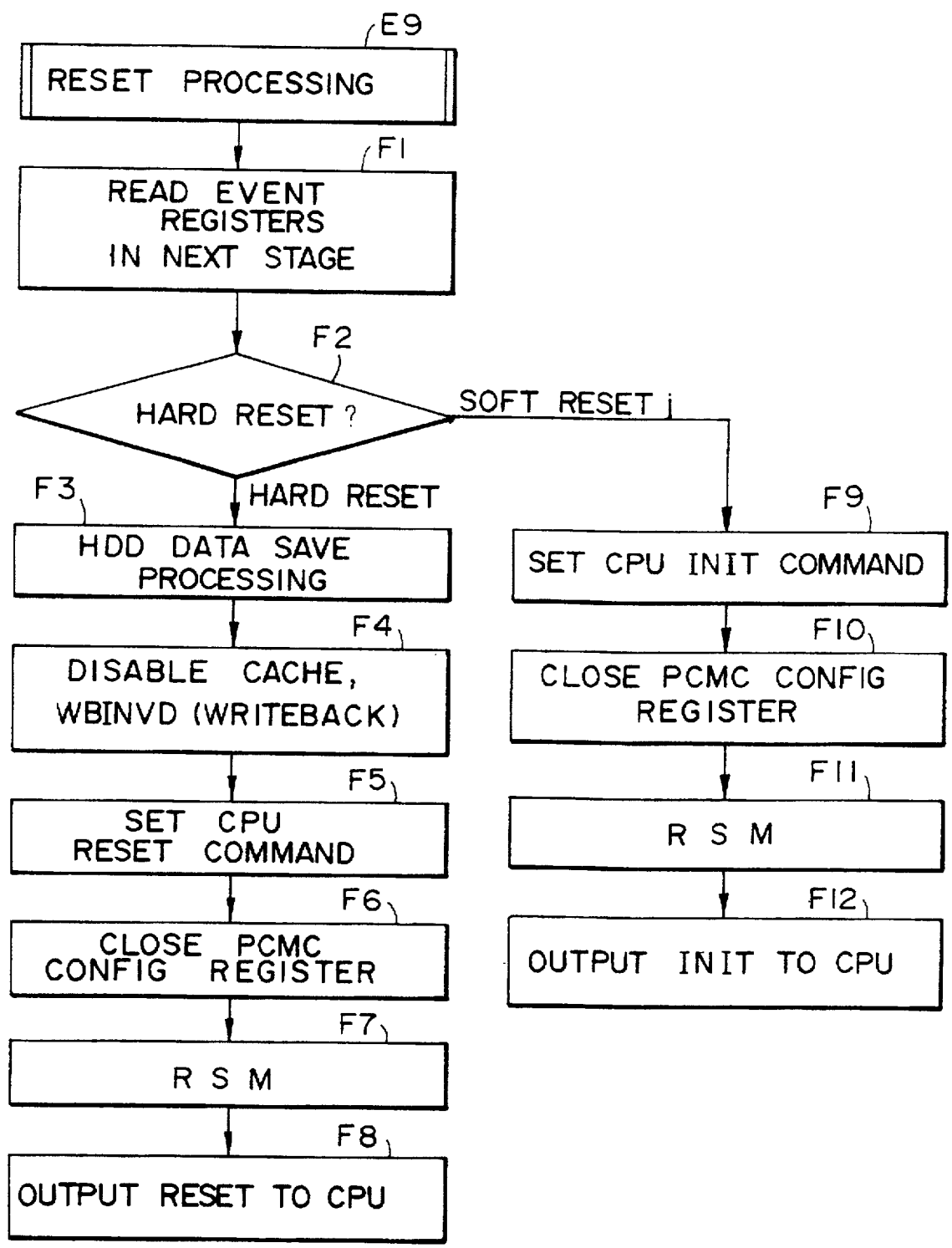
FIG. 15 is a flowchart of reset processing.

A flowchart of the operation of this embodiment when the system has entered SNN is shown in FIGS. 14 and 15. The system first enters SMM in a step E1 and, if the SNM handler 26 is activated, the config register of the PCHC 11 is opened and the Deturbo function of the PCHC 11 is disabled. In other words, the mode changes to a mode in which a wait (the HOLD signal 7) is not set for the CPU 1 from the hold/wait control means 12 (see FIG. 1), so that the CPU 1 operates at high speed. Thus the CPU 1 operates at its maximum speed during the subsequent emulation processing, enabling an increase processing speed. The operating speed switching switch of the CPU 1 is provided for application programs which cannot operate at high speed or in which high-speed operation would be inconvenient (such as action games). But, with emulation processing faster the operation speed of the CPU 1 the better it is, and therefore it is set in the foregoing way in this embodiment. Note that, although the change in system operating environment that is cited in this embodiment refers to a change in operating speed, the present invention is not limited thereto. For example, making a change so that a manufacturer's system-independent I/O port (an I/O port of which the setting varies between the manufacturers' system) is visible from the I/O space during the emulation process may be considered as this change in operating environment. In other words, the operation of an application program or other software may be halted by an interrupt during the emulation process. This means that, even if the manufacturer's system-independent I/O port is made visible during this time, the I/O port cannot be accessed by the application program or other software. By making the manufacturer's system-independent I/O port visible, it is possible to increase the number of I/O ports that can be used during the emulation processing, enabling an increase in the flexibility of the design of the emulation system.

Note that the method of changing the operating environment of the system as described above is not limited to the emulation system described by this embodiment; emulation systems implemented by other methods may also be applied. In such a case, the interrupt that activates the emulation processing is not limited to an SMI; an NMI may be used instead.

Next, the event register (status) is read by the SMM handler 26 in a step E4, and it is determined in a step E5 as to whether the read-out event is a power failure (event d). In other words, this embodiment allocates priorities to events that must be processed after emulation has started, with the power failure event having the highest priority. In this case, the event priorities may be set by a physical arrangement of registers, or by a software processing sequence. When a power failure of this type occurs, a fatal system error will result if it is not processed immediately. This embodiment has a configuration that enables easy setting of priorities between events, by providing means for masking emulation processing and event registers of a hierarchical structure. Giving a higher priority to power-failure processing than I/O emulation processing prevents system errors.

If a power failure event is detected in step E5, the flow branches to a step E6 in which HDD and other data is saved. An example of a power failure event that may be considered is the battery run down of a portable personal computer. Processing for detecting this sort of power failure is also necessary when designing a system in which data is not destroyed when the power switch is turned off. After the data has been saved, a power-off command is issued to the power unit in a step E7, and the system's power falls. If power failure is not detected in step E5, the flow continues to a step E8 in which a reset detection (event c) is read (reset detection is the event with the next highest priority after power failure detection).

If reset is detected, the flow branches to a step E9. Note that the processing of step E9 onward is shown in FIG. 15. In a step F1, the next-stage event registers (event registers 658 and 659 of FIG. 9) are read. If the event is a hard reset (event i), the flow branches to a step F3; if it is a soft reset (event j), it branches to a step F9.

For a hard reset, the HDD and other data is saved in preparation for initializing the entire system (step F3). Data in the cache memory is then flushed by the WBINVD command and saved (step F4). With a BASIC warm boot, the data in main RAM should also be saved at a hard reset. However, if a hard reset occurs in a system using a writeback cache (memory in which, if there is a write instruction from the CPU, data is written only to cache memory, not to main RAM), neither cache writeback nor warm boot is possible.

Since a writeback cache memory is also used in devices such as the HDD, this embodiment executes the processing of step F4 in order to solve these problems. After the reset register 14 is reset by the RESET command in a step F5, if the config register of the PCMC 11 is closed and the RMS instruction is issued, the RESET signal 8 is output to the CPU 1 (steps F6 to F8).

A soft reset, on the other hand, is performed by a write operation with respect to an I/0 port (FOH). The first computer system has a port that is similar to a keyboard controller, but this is a separate port; it does not use the function of the reset register 14 of the PCMC 11. Since this embodiment uses the PCMC functions, emulation processing for a soft reset is also performed by SMI. With a soft reset, only the CPU 1 need be initialized, so it is not necessary to save data and thus the INIT command is set in the reset register 14 in a step F9. If the config register of the PCMC 11 is then closed and the RMS instruction is issued, the INIT signal 9 is output to the CPU 1 (steps F10 to F12).

The description returns to FIG. 14. If reset detection (event c) was not read in step E8, the flow continues to a step E10 in which speed switching (event d) is read and, if speed switching is detected, it then branches to a step E17 in which the speed switch state is read. If the speed has been set to slow, the Deturbo function of the PCMC 11 is enabled in a step E18 (the CPU 1 is made to wait, so as to slow the processing). If the speed has been set to high, on the other hand, control is returned by the RSM instruction in a step E19. If no change in the operating environment, such as a power failure, has been detected in steps E5, E8, and E10, the flow continues to a step E11 in which I/O port write (event a) is read out. If event a is set, events e to h are read from the event registers of the next level (the event registers 654 to 657 of FIG. 9). Emulation processing is then executed based on the set event (steps E13 to E16). The flow continues to step E17 in which the speed switch state is read. This processing is necessary to return the state to that which is set by the speed switch, because the CPU 1 has been set to the high-speed operating state in steps E2 and E3.

Thus this embodiment uses the power failure detection means 75, the reset detection means 73, the speed switching detection means 74, and the display switching detection means 76 to detect changes in external switches, and executes emulation processing based on detection results. In the prior art, the controller 507 shown in FIG. 54 has external input terminals relating to these external switches, and therefore it is not necessary to execute emulation processing relating to changes in the external switches. In contrast, the PCMC 11 that is the first device control means of this embodiment does not have external input terminals of this type. This means that it is necessary to execute emulation processing relating to changes in these external switches, in an emulation system in which a first device control means is combined with a second computer system, such as that of this embodiment. In other words, if there is an external input that is supported by the second device control means but not by the first device control means, it is necessary to provide a method of emulating the external input. To implement this emulation processing, a detection means is provided in the subcontroller of this embodiment (this detection means may be arranged anywhere), an event is set based on a detection result therefrom, and processing corresponding to that event is executed by an SMI handler or other routine. In other words, the function of the second device control means is used to provide emulation processing that can execute power-failure and other processing.

Note that a switch for adjusting contrast or brightness in the display unit of a portable personal computer may also be considered as an example of emulation processing activated by an external switch. Note also that the object of the emulation processing of this embodiment is not limited to such changes in external switches. In other words, the emulation processing of this embodiment may be applied to an external input which is supported by a first computer system but which does not exist in a second device control means, when such a second device control means is combined with the first computer system. The emulation processing of this embodiment may also be applied when there is an external input that is supported by the bridge circuit 39 but not by the first device control means, for example, when a device control means of a first architecture is used in place of the bridge circuit 39. It should also be noted that this external input is not limited to an input from an external switch as described with reference to this embodiment. Various other external inputs may be considered; for example, those from a sub-CPU, a control device, or a temperature detection terminal.

The operation of I/O write emulation processing will now be described with reference to FIGS. 16 and 17A to 17C. I/O address 300 h is a port for outputting an instruction of changing a hardware switch between a first display mode (normal resolution) and a second display mode (high resolution). Note that the switching of the display mode is detected by the display switching detection means 76 in the subcontroller 25. When a display mode switching instruction is output in a step S20 of FIG. 16, the system starts operating to map the RAM 21, VRAM 33, and ROM 43 to the corresponding display mode 1 or display mode 2 memory map shown in FIG. 17B or 17C. The VRAM switching means 35 and ROM switching means 45 directly accept the I/O instruction for the CPU 1 in the same manner as in the prior art, and switch the mapping of the VRAM 33 and ROM 43 as appropriate in a step S21. The subcontroller 25 accepts the instruction via the I/O acceptance means 30, sets an event indicating display mode-switching in the SMI status display means 28, and generates an SMI. SMM is activated in a step S26, the SMM handler 26 reads the SMI status display means 28 in a step S27, and the display mode-switching operation starts.

The display mode 1 and display mode 2 memory maps and the memory setting register 17 (part of the config register that sets various PCMC settings) of the memory controller 11 (PCMC) corresponding thereto will now be described with reference to FIGS. 17A to 17C. With the second architecture, there is a huge difference in mapping of memory addresses 0 h to 100000 h between display modes 1 and 2, as shown in FIGS. 17B and 17C. The registers corresponding to the memory setting portion of the memory setting register 17 are shown in FIG. 17A, with the left side showing the settings for display mode 1 and the right side that for display mode 2. Note that the RAM shown in FIGS. 17B and 17C is equivalent to the RAM 21 of FIG. 1, G-VRAM (graphics VRAM) and T-VRAM (text VRAM) are together equivalent to the VRAM 33, and the ROM is equivalent to the ROM 43. Addresses 0 h to A0000 h in display mode 1 are RAM, and flags that enable cache (C), write (W), and read (R) are set for that RAM (the RAM controller 15 also has a function that determines that a memory address which has both W and R set for it is RAM, automatically decodes such addresses, and allocates the RAM 21). Addresses A0000 h to C0000 h and E0000 h to E8000 h are allocated to four planes of VRAM, and the VRAM 33 which has already been switched to the display mode 1 mapping is addressed by the memory setting register 17 specifying access to the PCI bus 23. Access to the PCI bus 23 for ROM addresses C0000 h to E0000 h and E8000 h to 100000 h is also specified by the memory setting register 17, and the ROM 43 is addressed thereby. Similarly, in display mode 2, addresses in RAM, VRAM, ROM are set by the memory setting register 17. Note that a bank-switching method is used for the four planes of G-VRAM in mode 2, to ensure sufficient capacity for high resolution, but trouble-free access is enabled by a bank-switching control means provided together with a decoder.

Figure 16:
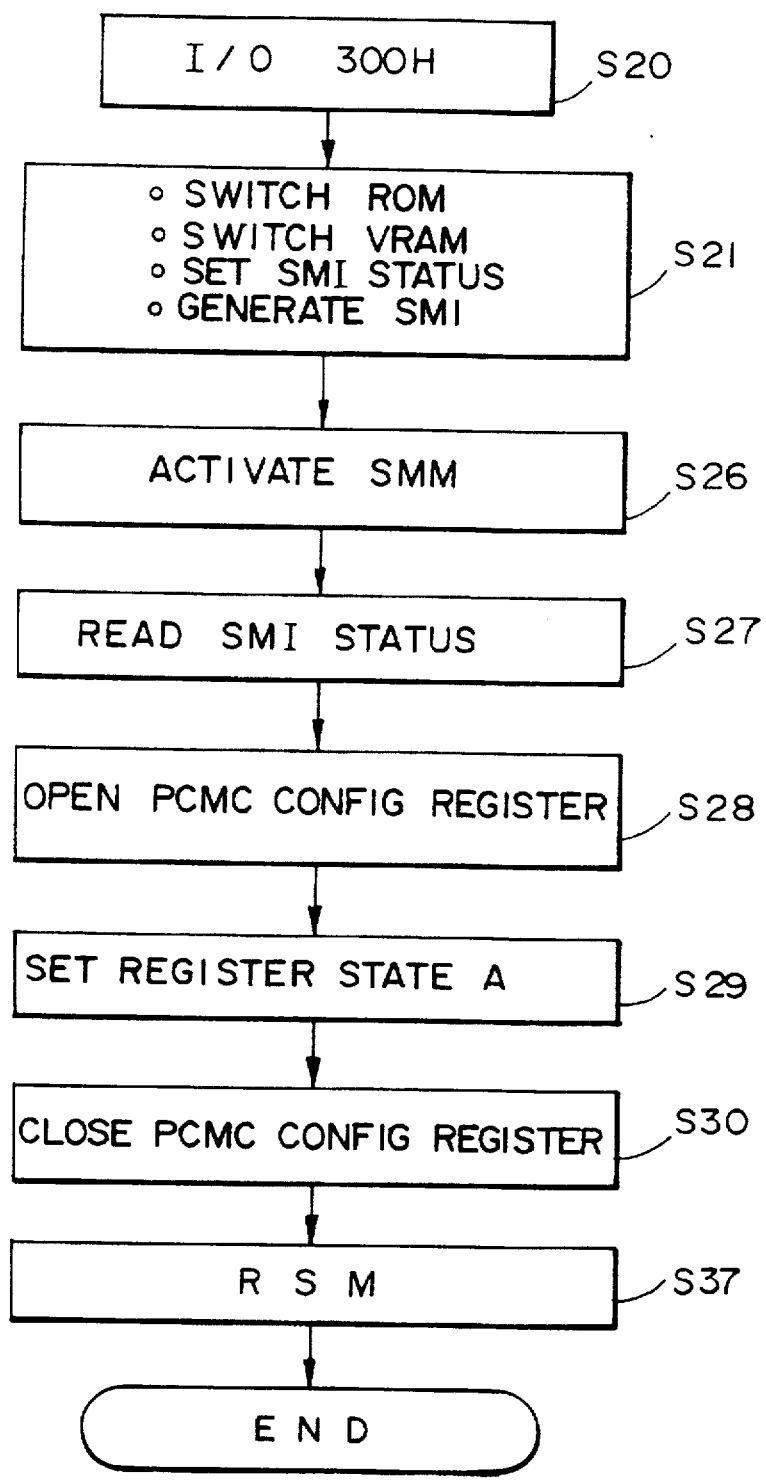
FIG. 16 is a flowchart of the operation of I/O write emulation processing.

The description returns to FIG. 16. The CPU 1 opens the PCMC config register in a step S28, and sets the state to either display mode 1 or display mode 2 in a step S29 (in this figure, state A is set). It closes the config register in a step S30, then issues the RSM instruction in a step S37 to release SMM.

The above described processing provides the following effects to enable an I/O instruction to correspond to the second architecture:
1) mapping conversion for the VRAM 33 by the VRAM switching means 35
2) mapping conversion for the ROM 43 by the ROM switching means 45
3) mapping conversion for the RAM 21 and conversion of memory address settings by the memory controller 11.

5. Description of Bus Arbiter

The bus arbiter 70 will now be described. The bus arbiter 70 arbitrates the right to access the PCI bus 23. This arbitration is performed by accepting REQ-CPU, REQ-PCI, and REQ-BRG signals, which are request signals from the memory controller 11, the PCI bus master (the HDD 37), and the bridge circuit 39, and outputting corresponding GNT-CPU, GNT-PCI, and GNT-BRG signals, which are permission-granted signals. During SMI handling, the priority of the bus access right to the PCI bus 23 that is assigned to the CPU 1 is preferably high. If it were not high, and another component such as the HDD 37 were to access the PCI bus 23 during SMI handling, the bus access right would pass from the CPU 1 to the HDD 37, which would reduce the speed of the emulation processing. Two methods may be considered for increasing this bus access right priority, as follows.

Figure 18:
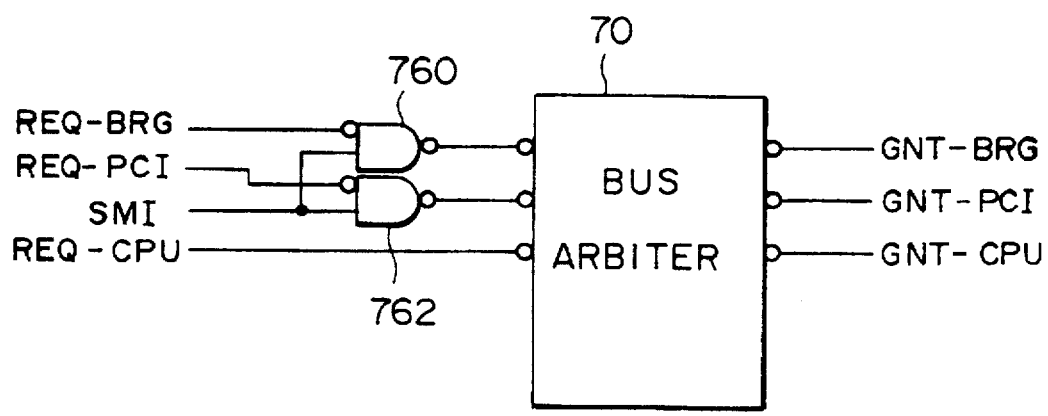
FIG. 18 shows an example of the configuration of a bus arbiter.

The first method masks the REQ-BRG and REQ-PCI signals input to the bus arbiter 70, using the SMI signal input logic circuits 760 and 762 as shown in FIG. 18. This ensures that the REQ-BRG and REQ-PCI signals are not received by the bus arbiter 70, leaving the REQ-CPU from the CPU I with priority. In this case, the SMI signal 31 may be input directly to the logic circuits 760 and 762, or a predetermined value may be set in a predetermined register by the SMM handler 26, and an output of that register is input to the logic circuits 760 and 762. This would put the timing at which the arbitration priority is changed under software control.

Figure 19:
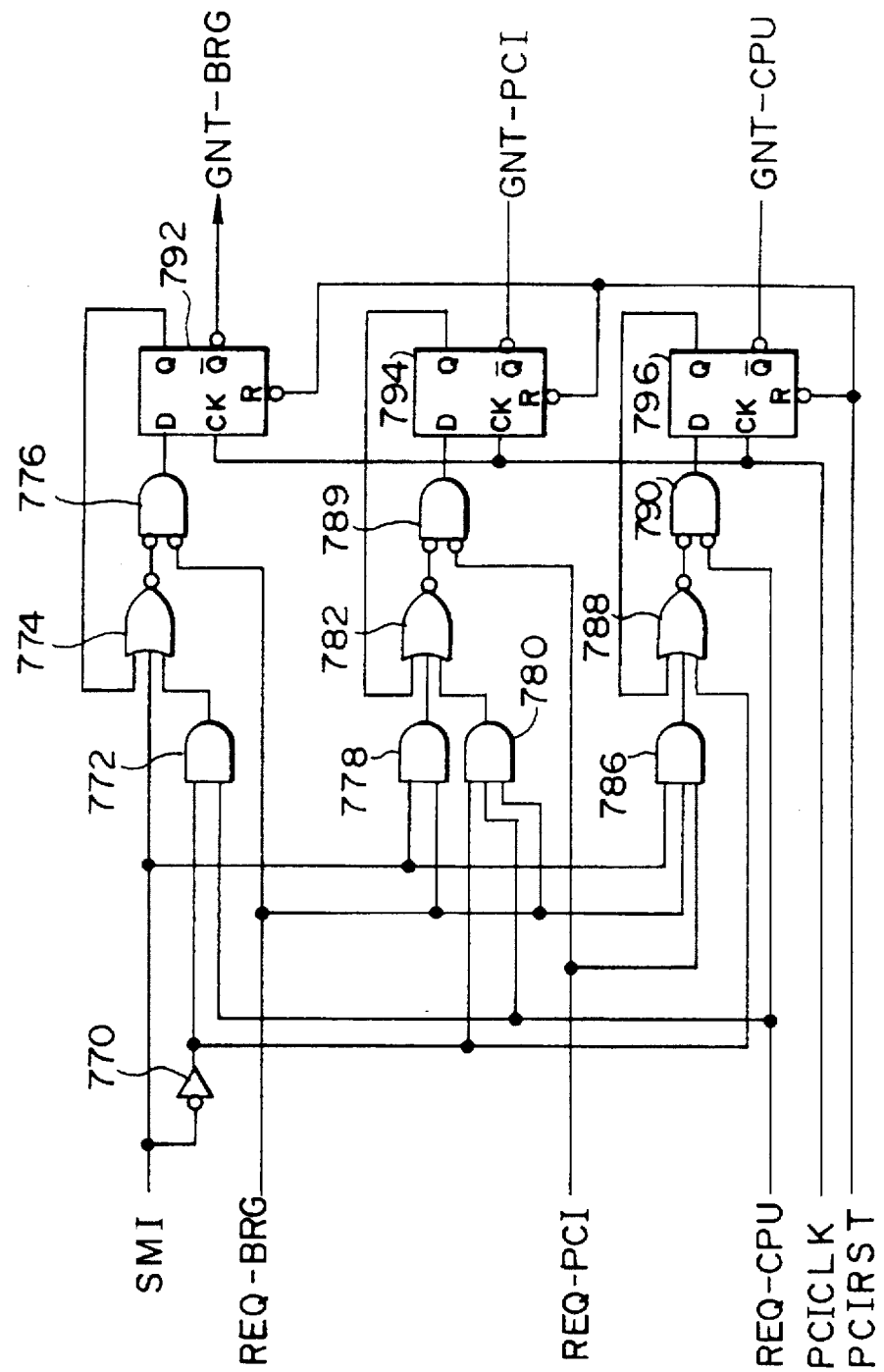
FIG. 19 shows another example of the configuration of the bus arbiter.
Figure 20:
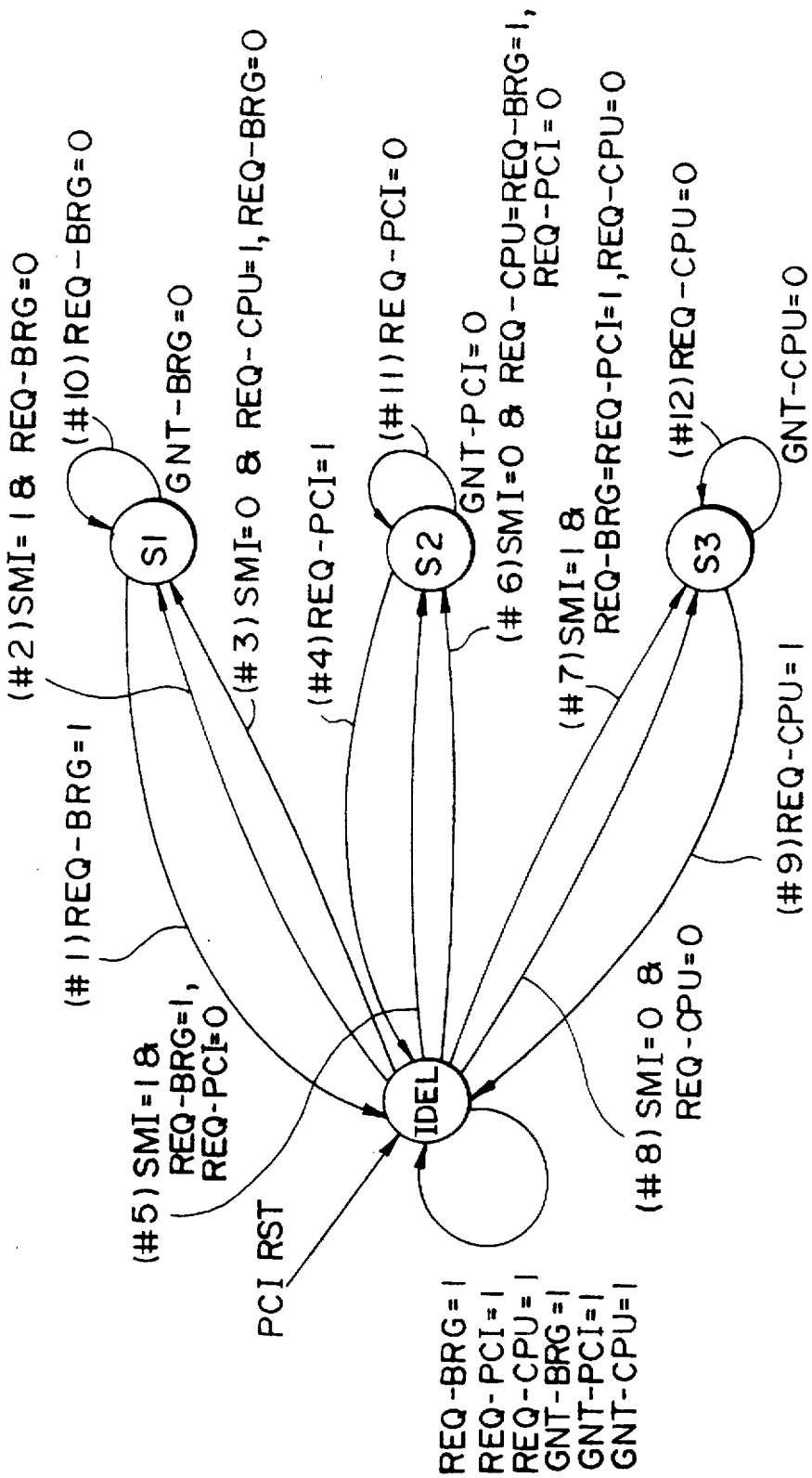
FIG. 20 is a status transition diagram of the operation of the bus arbiter.

With the second method, the bus arbiter 70 comprises logic circuits 772 to 790 and DFFs 792 to 796, as shown in FIG. 19. A circuit status transition diagram of FIG. 20 shows that this circuitry has four states: IDLE, S1, S2, and S3. The IDLE state is imposed immediately after a reset by PCIRST, wherein all of the REQ-BRG, REQ-PCI, REQ-CPU, GNT-BRG, GNT-PCI, and GNT-CPU signals are 1. Each of states S1, S2, and S3 returns GNT-BRG, GNT-PCI, or GNT-CPU is 0 when the corresponding REQ-BRG, REQ-PCI, REQ-CPU is 0. In this embodiment, the priority is changed by the SMI signal (or it may be done as described above by having the SMM handler 26 set a predetermined value in a register) as follows. When SMI is 1 (deasserted), the priorities are set in the sequence of REQ-BRG, REQ-PCI, and REQ-CPU, with REQ-BRG having the highest priority. In contrast, when SMI is 0 (asserted), the priorities are set in the sequence of REQ-CPU, REQ-BRG, and REQ-PCI, with REQ-CPU having the highest priority. For example, as shown by #8 in FIG. 20, if REQ-CPU becomes 0 when SMI is 0, the state changes immediately to S3 because REQ-CPU has the highest priority. When REQ-CPU becomes 0, GNT-CPU also becomes 0 (#12) and thus the CPU 1 is granted bus access. When REQ-CPU subsequently changes to 1 (#9), the IDLE state returns. On the other hand, when SMI is 1 (#7), the priorities are in the ordinary sequence of BRG, PCI, and CPU, so that the state changes to S3 only when REQ-BRG and REQ-PCI are 1 and REQ-CPU is 0. Transitions to the S2 state occur in a similar manner. In other words, when SMI is 0 (#6), REQ-CPU has the highest priority and thus a transition to S2 occurs only when both REQ-CPU and REQ-BRG are 1, even if REQ-PCI is 0. When the state has changed to S2, GNT-PCI becomes 0. On the other hand, when SMI is 1 (#5), the priorities are in the ordinary sequence, so that the state changes to S2 when REQ-BRG is 1 and REQ-PCI is 0, irrespective of the value of REQ-CPU. Transitions to the S1 state occur in exactly the same manner as described above.

Note that the bus arbiter 70 may be incorporated within the bridge circuit 39.

6. SMM Region Change Immediately after Power-on or Reset

Immediately after power-on or a reset, an SMI handling routine is loaded into an SMM region in RAM by the BIOS. With a Pentium or similar processor, the address of the SMM region into which the SMI handling routine is loaded in the initial state (immediately after power-on or a reset) is fixed at the SHBASE default value of 38000 h. Since this region is in main RAM, it is necessary to change the SMM address location to a region where no application programs are loaded. Note, however, that if a separate memory device is provided and rear RAM is provided in a region corresponding to 38000 h, bank-switching would not be necessary; nevertheless, this provision of a separate memory device causes problems from the cost point of view. With this embodiment, for example, the address location is changed to a 64-Kbyte region in VRAM (A0000 h to BFFFFh). In normal operation, this region is hidden behind the VRAM on the PCI bus 23, and thus it cannot be accessed by application programs. In contrast, when in SMM, the PCMC 11 that has received SMI ACT# changes the VRAM region to the RAM region, as shown in FIG. 21B. Therefore, if this region (A0000 to B0000) is set so that it becomes address locations in SMRAM, a region to which application programs are not loaded can be set to an address location in SMRAM, and also enables SMI handling to operate normally by an SMI handling routine loaded into RAM.

This change in the address location is done by the sequence described below.

1) After power-on or a reset, the BIOS loads the SMBASE locate handler into main RAM at 38000 h. At this point, the BIOS switches the VRAM banks and loads the SMM handler into the rear-RAM part of VRAM.

2) Next, a dummy SMI is generated. This dummy SMI is generated when a suitable I/O read instruction is executed to act as an SMI generation event. Processing jumps at the dummy SMI to 38000 h, in accordance with the default SMBASE value in the CPU. The SMBASE setting is overwritten at RSM by the handler loaded at 38000 h in step 1 in such a manner that the SMBASE relocation function used so that SMM is started from VRAM.

3) The next SMI starts processing from the VRAM address set in SMBASE. Ordinarily, the VRAM region appears as VRAM, but the banks are switched at the same time that the SMI is generated, so the VRAM region appears to be SRAM. This enables the start of SMI handling.

A dummy SMI is generated in the above step 2 because SMI handling should be started and the SMI's SMBASE relocation function should be used to enable a change in address location set in SMRAM. In other words, unlike with an NMI, an application program or other software cannot make this change in address location. After the address location has been changed, data in SMRAM cannot be overwritten by an application program or other software because SMRAM is behind VRAM.

Once the above sequence has started, acceptance by the original SMI handling routine is enabled. Conversely, there is a danger that operating errors will occur in the system if separate SMI handling is executed before the sequence is initiated. This embodiment is given an SMI masking function, in other words, it is provided with the SMI mask means 29, so as to prevent the above described operating errors. This SMI masking function masks the generation of SMIs after power-on or a reset, to ensure that no SMIs are generated (or events are set) until they can be accepted correctly by the original SMI handling routine.

Note that a memory map for SMI emulation processing is shown in FIG. 21C for reference. As shown in this figure, the NMI handling routine should be placed under BIOS control, and it is stored in the BIOS region because it should be placed in a region where an application program cannot be loaded. This BIOS region is small and there is little empty area, because other programs are stored in it. Therefore, if an attempt is made to execute emulation processing using an NMI, the size of the program using this processing is limited. In contrast, if an SMI is used, the SMI handling routine is stored in SMRAM which has sufficient empty space, so that the above problem does not occur and thus even a long program can be stored therein, enabling more complicated emulation processing. A further problem with NMI is caused by the way in which the NMI interrupt vector is stored in main RAM, as shown in FIG. 21C, so that it can be freely overwritten by an application program or other software. If that happens, NMI handling cannot start. In contrast, with SMI, the address location in SMRAM after power is turned on is fixed at 38000 h, and that address location cannot be modified unless the SMI handling has started. This means that the address location in the SMRAM region cannot be modified by an application program or other software, and also the SMRAM region can be set to a region where an application program or other software cannot access, as shown in FIGS. 21A and 21B. The result is extremely secure emulation processing.

Yet another problem with NMI concerns the way in which the return address is placed in the stack region in main RAM, so that there is a danger of the return address being overwritten by an application program or other software. In contrast, with SMI, the return address and the contents of the internal CPU registers are stacked in the SMRAM region, which has the advantage of protecting them from being overwritten by an application program or other software.

7. Other Details

When the PCMC 11 is combined with the second computer system, the subcontroller 25 of this embodiment provides the control described below. For example, the PCMC 11 has a function called a write buffer. If, for example, the instruction for the CPU 1 is 8 bits wide but the data in the VRAM 33 is 32 bits wide, this write buffer accumulates four instructions from the CPU 1 then outputs the accumulated data in a batch to the VRA 33. The PCMC 11 does have this function, but in this embodiment bus arbitration is performed by the bus arbiter 70. When this write buffer is used, it is necessary to prevent the access right to the bus from being transferred to another device, before all of the data accumulated in the write buffer is extracted. The above problem is solved in this embodiment by the subcontroller 25 controlling data extraction from the write buffer of the PCMC 11. This embodiment supports other PCMC 11 functions, such as the upper limit register and sideband signal, maintaining the compatibility of the PCMC 11 when it is combined with a second computer system.

Second Embodiment

The first embodiment concerns an example of a PCMC 11 used as a first device control means included in a second computer system. However, note that the first device control means is not limited thereto. For example, a first device control means such as an SIC (Intel 82378IB) may be used in the bridge circuit 39. If the first device control means is used in the bridge circuit 39, it is necessary to use devices of the first architecture as the device control means such as the keyboard controller 48 and serial controller 50. If the concept of an emulation system in which a first device control means is combined with a second computer system is to be developed further, it is preferable to implement hardware that enables compatibility with a plurality of architectures. To implement compatibility with a plurality of architectures, it is necessary to have device control means and devices that always operate with respect to instructions of a plurality of architectures issued from the CPU. If the special case of double compatibility is taken as an example of compatibility with a plurality of architectures, it is possible to operate both an application program based on the first architecture and an application program based on the second architecture on the same hardware. Similarly, operating systems of both the first and second architectures, such as Microsoft MS-DOS and Windows, can be operated on the same hardware.

Figure 56A:
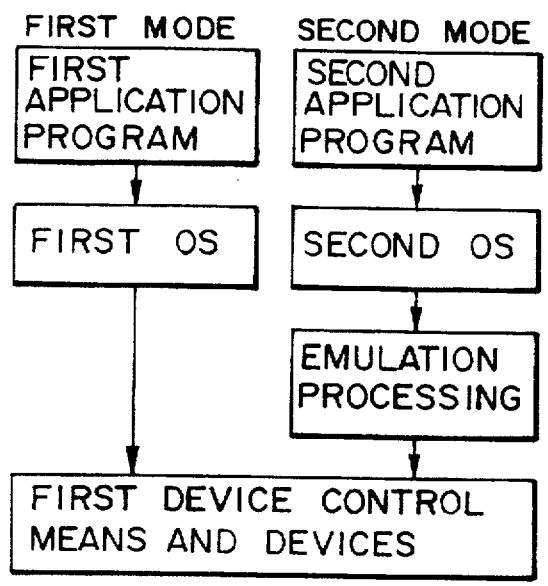
FIGS. 56A to 56C show specific examples of arrangements for implementing compatibility with a plurality of architectures.
Figure 56B:
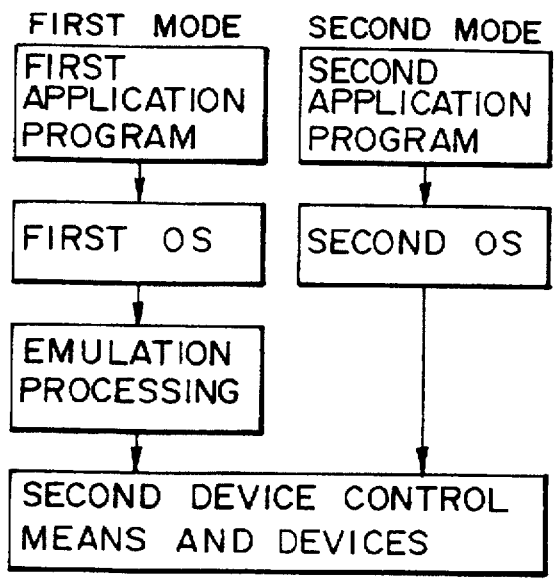
Figure 56C:
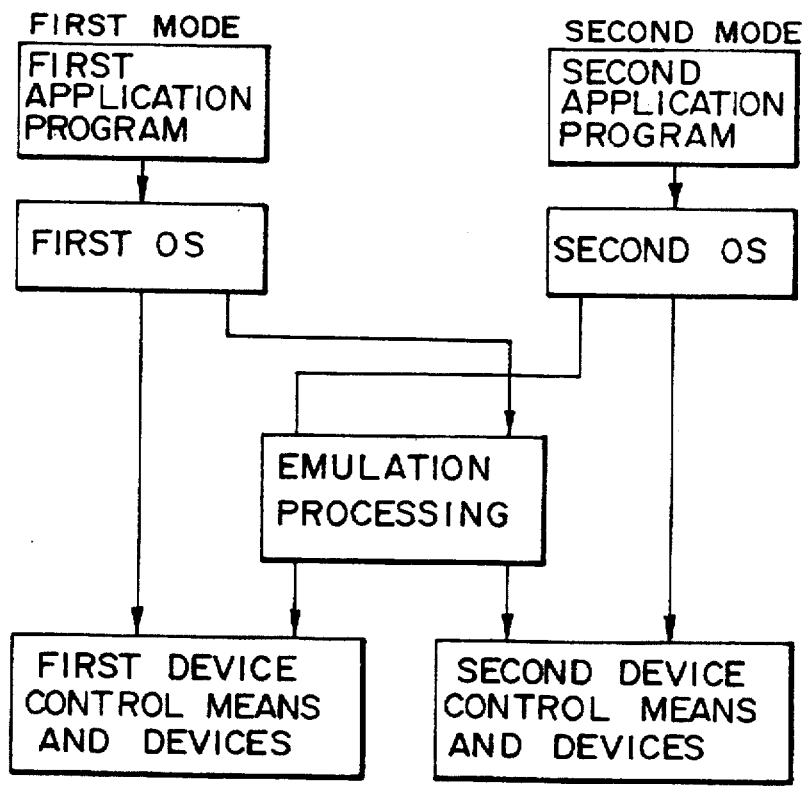

Specific examples of arrangements for implementing compatibility with a plurality of architectures by an emulation system of the present invention are shown in FIGS. 56A to 56C. Note that, "conforming to a first (second) architecture" in FIGS. 56A to 56C is abbreviated to "first (second)," and thus the expression "first application program" means "an application program conforming to the first architecture." These expressions are also used in the descriptions below.

Although double compatibility is used as an example of compatibility with a plurality of architectures in FIGS. 56A to 56C, it should be noted that the present invention is not limited thereto. The present invention enables application programs and OSs of three or more architectures to operate on the same hardware. In this case, the second architecture of FIG. 56A means a plurality of second architectures that differ from the first architecture. Similarly, the first architecture of FIG. 56B means a plurality of first architectures that differ from the second architecture. This also applies to FIG. 56C.

The example shown in FIG. 56A is based on the premise that all (or virtually all) of the device control means and devices are of the first architecture. In order to implement compatibility with a plurality of architectures in this case, when the system is operating in a first mode, in other words, a mode in which instructions are issued by a first application program and OS, those instructions are transferred as is to the first device control means and devices. On the other hand, when the system is operating in a second mode, in other words, a mode in which instructions are issued by a second application program and OS, the instructions are translated by emulation processing and then transferred to the first device control means and devices. If the first device control means and devices in this case are the latest devices which dominate the market, and which can be developed comparatively quickly and acquired in profusion, a high-performance, inexpensive information processing device can be developed rapidly.

Similarly, the example shown in FIG. 56B is based on the premise that (or virtually all) of the device control means and devices are of the second architecture. In order to implement compatibility with a plurality of architectures in this case, an inverse relationship to that of FIG. 56A applies, whereby instructions in a first mode are translated by emulation processing and instructions in a second mode are transferred as is to the second device control means and devices. In this case, it is necessary to use a component of the second architecture as the device control means, and thus it may be comparatively inferior to the example of FIG. 56A from the viewpoints of capabilities, development period, and cost. However, in order to transfer instructions from second application programs and the OS to the device control means without emulation processing, it is considered that the best performance is obtained when operation is centered on the second application programs. Therefore, if more emphasis is placed on software assets of the second architecture, for example, the configuration of FIG. 56B would be preferable. An example in which the hardware comprises a combination of first and second device control means and devices is shown in FIG. 56C. In this case, instructions in a first mode are transferred as is to the first device control means and devices, but are transferred through an emulation system to the second device control means and devices. In a second mode, the relationships are reversed. With the above hardware configuration, it is preferable that there is a transition period during which the second control means is substituted for the first device control means.

There are various ways in which this compatibility with a plurality of architectures may be implemented, and the following description concerns only one of them that is shown in the example of FIG. 56A. In the above first embodiment, the description mainly concerns a case in which the object to be controlled by the device control means is a memory device, but it should be noted that the present invention is not limited thereto. It could equally well be applied to a case in which the object to be controlled is an I/O device. The description below focus on a case in which the object to be controlled by the device control means is an I/O device. The previously described SMI is originally provided as a power control interrupt and causes problems in terms of operating speed. This second embodiment uses four different translation methods, depending on the instruction type, so as to solve the problem of operating speed.

First Translation Method

The first translation method is used for a type of instruction that should be processed rapidly, such as an I/O write instruction.

Figure 22:
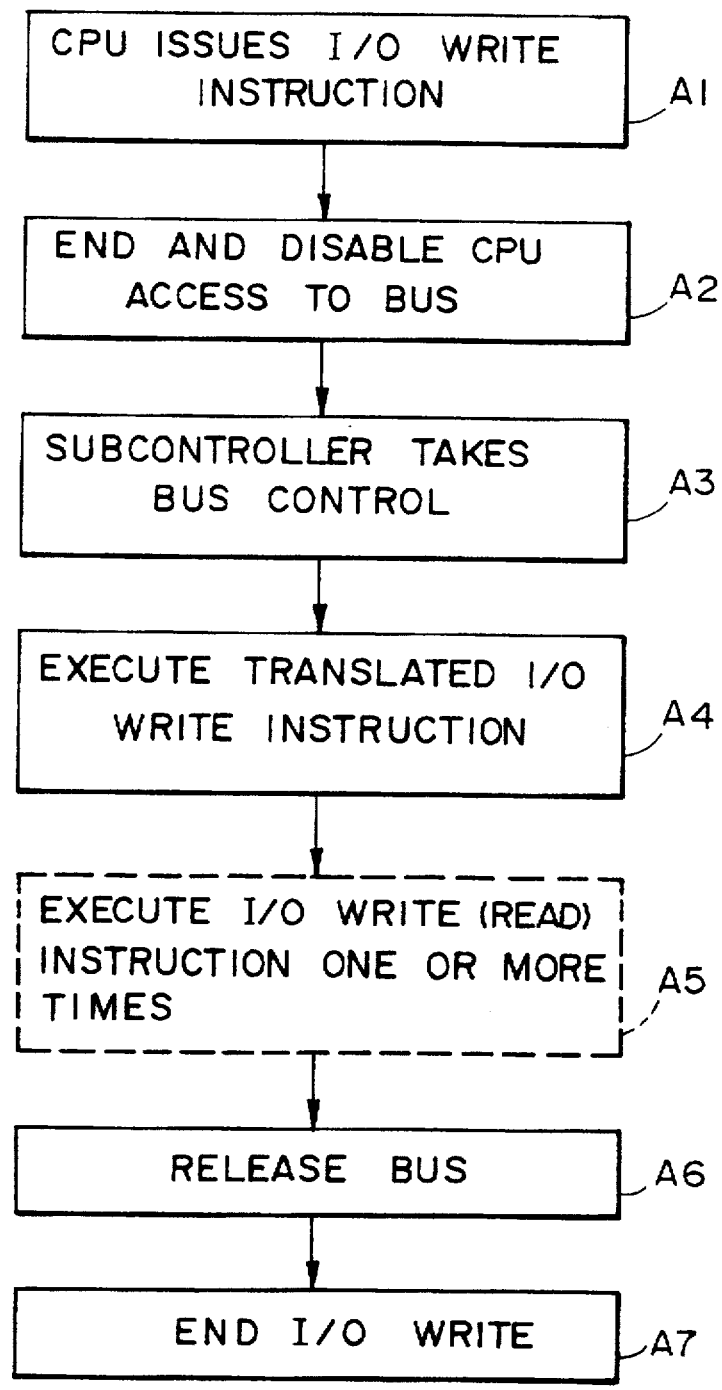
FIG. 22 is a flowchart of a first translation method.

First, when an I/O instruction conforming to the second architecture is issued by the CPU in a step A1 of FIG. 22, the CPU bus access is ended and further access is disabled in a step A2. A subcontroller that is an essential component of this invention then takes control of the bus as bus master in a step A3. Note that the configuration of this subcontroller differs from that of the above described first embodiment, as will be described in detail later.

The translated I/O write instruction is then issued by the subcontroller in a step A4. In this case, the I/O write instruction is translated by means such as an instruction translation means incorporated within the subcontroller. More specifically, this instruction translation means latches the I/O write instruction (containing an I/O address, data, and bus enable flag) that is issued by the CPU, then translates the latched I/O write instruction in such a manner that it conforms to the first architecture. The thus translated I/O write instruction is then issued to the device control means of a first architecture, or a device connected thereto.

Note that there are differences in format between I/O instructions of the first and second architectures, and it is possible that the emulation processing for the first I/O instruction may not be completed. This may happen if an I/O instruction is allocated to a single I/O (port) address under the second architecture, but to two I/O addresses under the first architecture. In such a case, the I/O write instruction (or I/O read instruction) is executed one or more times in a step A5. At the end of the processing, the bus is released in a step A6, and the I/O write is completed.

In accordance with this first translation method, an I/O instruction conforming to the second architecture and issued from the CPU can be translated so as to conform to the first architecture, then is issued to a device control means or device that can accommodate such an instruction. Since the emulation processing required for this method is executed by hardware circuitry, it is most suitable for processing that is required to be fast.

Second Translation Method

Figure 23:
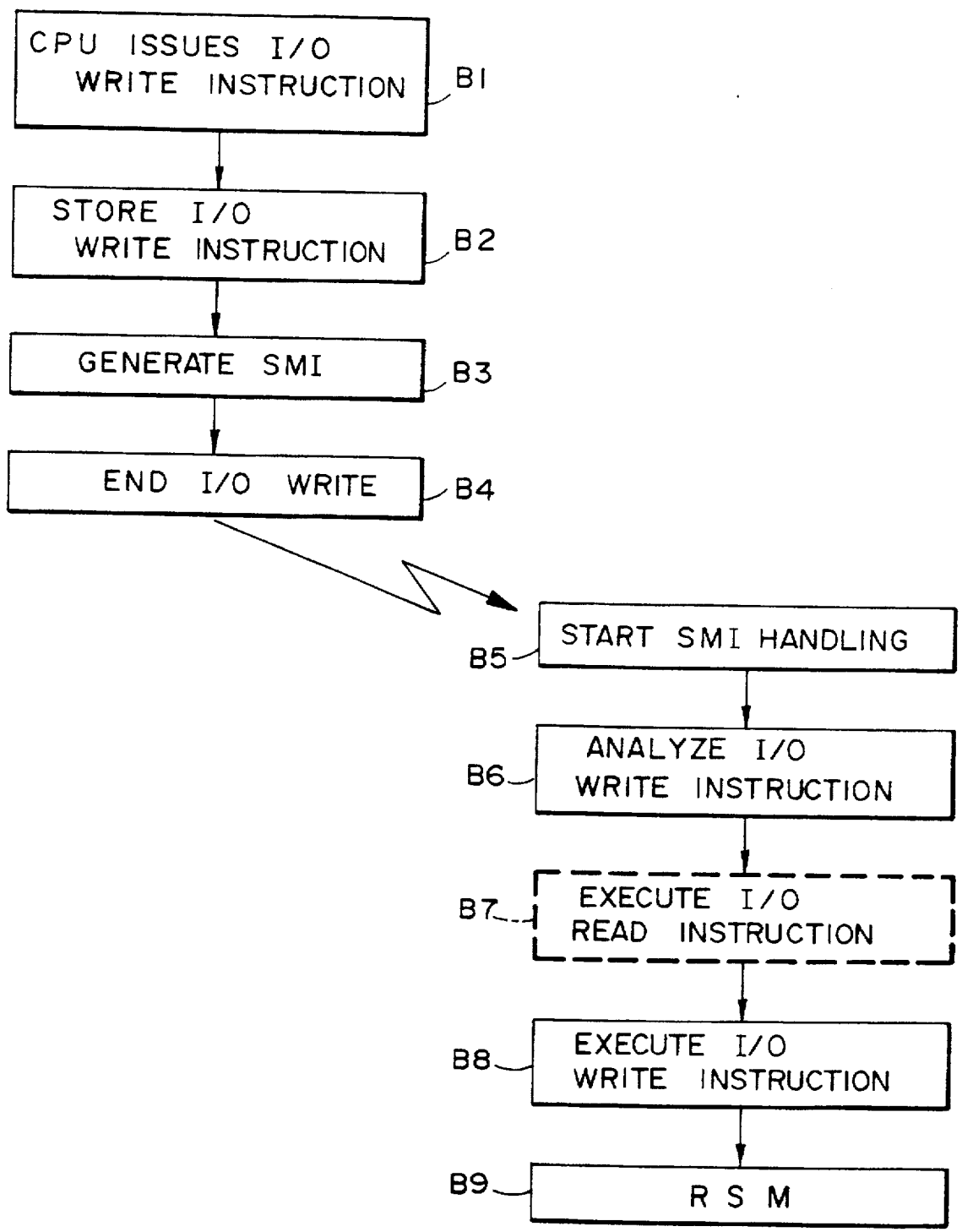
FIG. 23 is a flowchart of a second translation method.

The second translation method is used for a type of instruction that requires more complicated handling, such as an I/O write instruction where an I/O read instruction is also necessary. Since the handling of such an instruction by the first translation method would require a subcontroller with larger, more complicated circuitry, the second translation method shown in FIG. 23 is used for SMI handling instead. First, when an I/O instruction conforming to the second architecture is issued by the CPU in a step B1, that I/O write instruction (containing an I/O address, I/O data, and bus enable flag) is latched in a step B2. The SMI signal is generated by the subcontroller in a step B3, then SMI handling starts from a step B5 onward. Note that the SMI signal is generated in this case before the CPU executes the next I/O instruction cycle. The latched I/O write instruction is analyzed in a step B6. Given processing is then executed based on the result of this analysis, that is, either the execution of the translated I/O write instruction (step B8) or that of an I/O read instruction (step B7) is executed, if required. The SMI handling is then ended by the RSM instruction in a step B9.

In accordance with this second translation method, processing corresponding to the I/O instruction is executed by an SMI handler that operates according to an independent instruction set. This means that this translation method is effective when the translation of an I/O instruction between first and second architectures is complicated.

Third Translation Method

The third translation method is used for a type of instruction that should be processed rapidly, such as an I/O read instruction. First, when an I/O read instruction conforming to the second architecture is issued by the CPU in a step C1 of FIG. 24, read I/O processing by the CPU is halted in a step C2. This halting is done by, for example, executing retry processing if the bus is a PCI bus, or by asserting an input signal at a backoff terminal of the CPU if the bus is a local bus known as a VL bus. The subcontroller then takes control of the bus in a step C3. The I/O read instruction that has been translated to conform to the first architecture is then executed in a step C4, and the read-out data is stored in a predetermined storage means by that instruction. In this case, the I/O read (or write) instruction is executed one or more times in a step C5. Note that the I/O read instruction executed in step C4 (or C5) latches the I/O instruction (containing an I/O address and bus enable flag) issued by the CPU, and the latched I/O read instruction is translated to conform to the first architecture. Next, after the bus is released in a step C6, the CPU I/O processing is re-executed in a step C7. When this CPU processing is being re-executed, the data that is stored in step C4 is output to the CPU (or bus) in a step C8. This enables the CPU to end the read operation normally.

In accordance with this third translation method, an I/O read instruction issued from the CPU is translated and issued to the device control means or device that is the target of that instruction, and the CPU can read the data read out by the translated I/O instruction as normal. Since the emulation processing required for this method is executed by hardware circuitry, it is most suitable for processing that is required to be fast.

Fourth Translation Method

The fourth translation method is used for a type of instruction that is an I/O read instruction where the processing activated by the read instruction is extremely complicated. As shown in steps D1 to D3 of FIG. 25, when an I/O read instruction conforming to the second architecture is issued, the contents of that I/O read instruction (I/O address and bus enable signal ) are stored and an SMI signal is generated by the subcontroller. This causes the SMI handling of a step D5 onward to start.

The stored instruction is then analyzed and given processing is executed based on these analysis results, such that the translated T/O read instruction is executed or an I/O read instruction is executed a plurality of times, as shown in steps D6 to D8. The data read out by the I/O read instruction is then saved in a state save region in SMRAM, as shown in a step D9. When RSN1 is issued in a step D10, the data saved in the state save region is restored to the internal CPU registers and SMI handling ends.

In accordance with this fourth translation method, processing corresponding to the I/O instruction is executed by the SMM handler, so this translation method is effective when translation processing is complicated. By saving the read-out data in the state save region, the fourth translation method automatically enables the restoration of the read-out data in the internal CPU registers, simplifying the processing. In other words, after generating an SMI in step D3, the fourth translation method provisionally ends the I/O read instruction processing by the CPU in step D4. This means that the CPU can read any kind of data, such as undetermined data on the bus. Once the SMI handling is started, such undetermined data is saved to the state save region in SMRAM as described above. The data subsequently read out as normal by the given processing shown in steps D5 to D8 is then saved in the state save region in step D9. This ensures that the undetermined data saved in the state save region is overwritten, then the correct read data is saved in the state save region. When the RSM is issued in step D10, the correct read data saved in the state save region is restored to the internal CPU registers as described above. This enables verification that correct read processing identical to that of steps D1 to D4 has been executed.

Figure 26B:
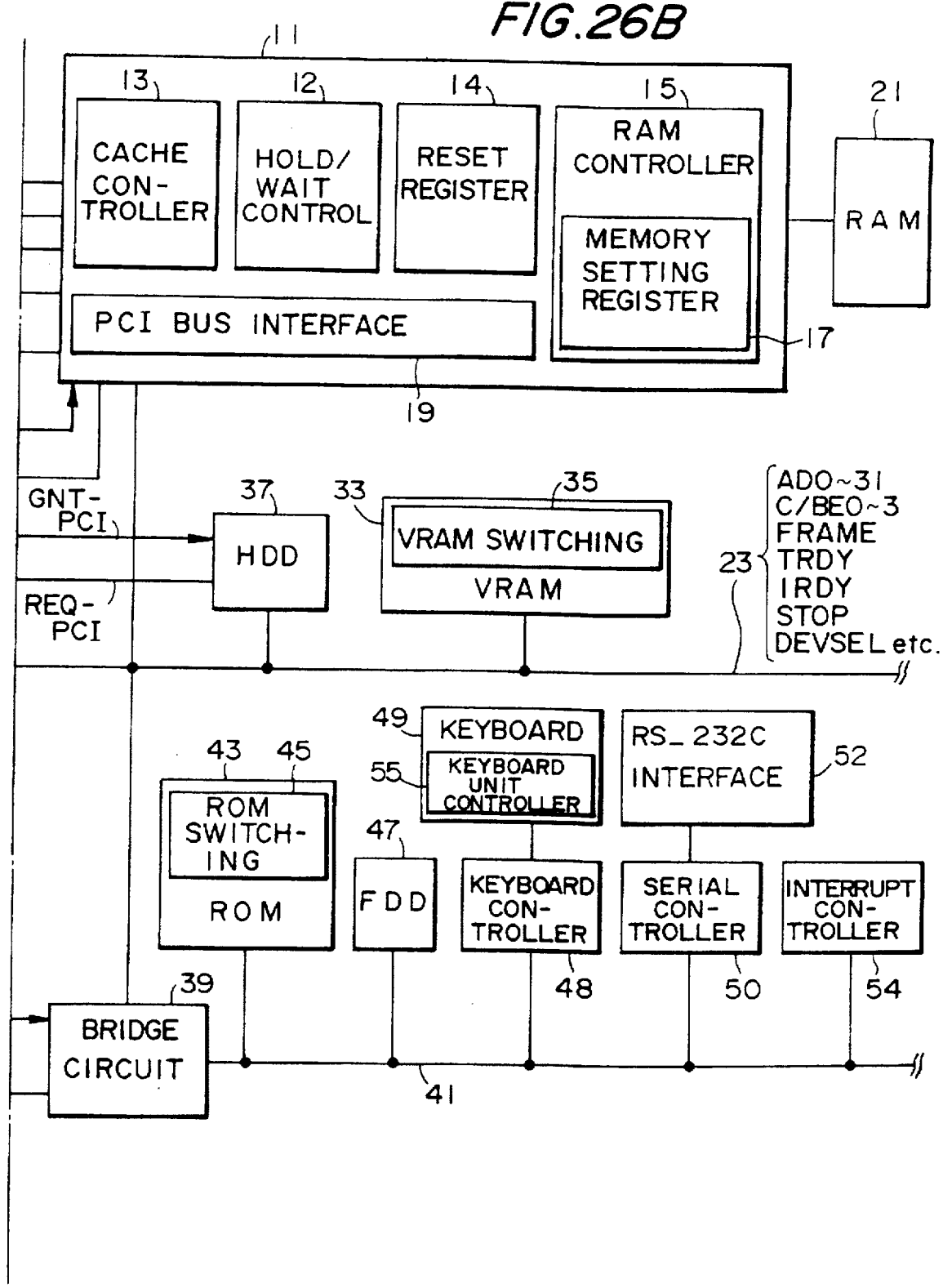
FIG. 26 comprising of FIGS. 26A and 26B is a block diagram of a second embodiment.

A block diagram illustrating the hardware of this second embodiment is shown in FIG. 26.

A subcontroller 100 of this second embodiment comprises an instruction translation means 104, a bus arbiter 970, an SMI generation means 927, an SMI status display means 928, an SMI mask means 929, an I/O acceptance means 930, a PCI bus interface 971, a reset detection means 973, a speed switching detection means 974, a power failure detection means 975, and a display switching detection means 976, and is configured in roughly the same manner as the first embodiment, except that it is provided with the instruction translation means 104.

Note that which of the above first to fourth translation methods is to be used for each instruction issued by the CPU 1 is determined by the I/O acceptance means 930 accepting the instruction and identifying the type of the accepted instruction. The instruction translation means 104 executes processing such as translating an I/O instruction from the CPU 1 into an instruction conforming to the first architecture. The bus arbiter 970 also arbitrates the access right to the PCI bus 23.

Signals such as AD0 to AD31, C/BE0 to C/BE3, FRAME, TRDY, IRDY, STOP, and DEVSEL flow on the PCI bus 23. The I/O acceptance means 930, with an incorporated timing circuit 902, generates these signals (the FRAME, TRDY, STOP, and DEVSEL signals) and timing signals for the instruction translation means.

The meanings of each of the signals on the PCI bus 23 will now be described. Multiplexed address and data signals flow through signal lines AD0 to AD31 (32 bits), with an address signal flowing during an address phase and a data signal flowing during a data phase. On the PCI bus 23, address signals are transferred during an address phase that is the initial phase after access start. Data signals are transferred during a data phase that follows this address phase. A C/BE0 to C/BE3 (4 bits) signal is a bus command/byte enable signal, with a bus command signal flowing during an address phase and a byte enable signal flowing during a data phase. In this case, the bus command signal indicates the type of address signal flowing through AD0 to AD31. In other words, the processor can determine whether each address signal refers to an I/O write instruction (hereinafter abbreviated to I/O write) or an I/O read instruction (hereinafter abbreviated to I/O read), memory read or memory write based on this bus command signal.

On the other hand, the byte enable signal determines which part of the byte train of the data signals flowing through AD0 to AD31 constitutes valid data. The FRAME, TRDY, IRDY, STOP, and DEVSEL are bidirectional signals. The FRAME signal indicates access start and the period of the access. The TRDY signal indicates when the target is in a ready state, and the IRDY signal indicates when the bus master (initiator) is in a ready state. Note that data transfer over the PCI bus 23 includes data transferred between the bus master and the target. The STOP signal requests the current target to stop the current processing with respect to the bus master. Finally, the DEVSEL signal indicates the device that is selected, wherein a device that is selected as the target asserts this DEVSEL signal.

Figure 27B:
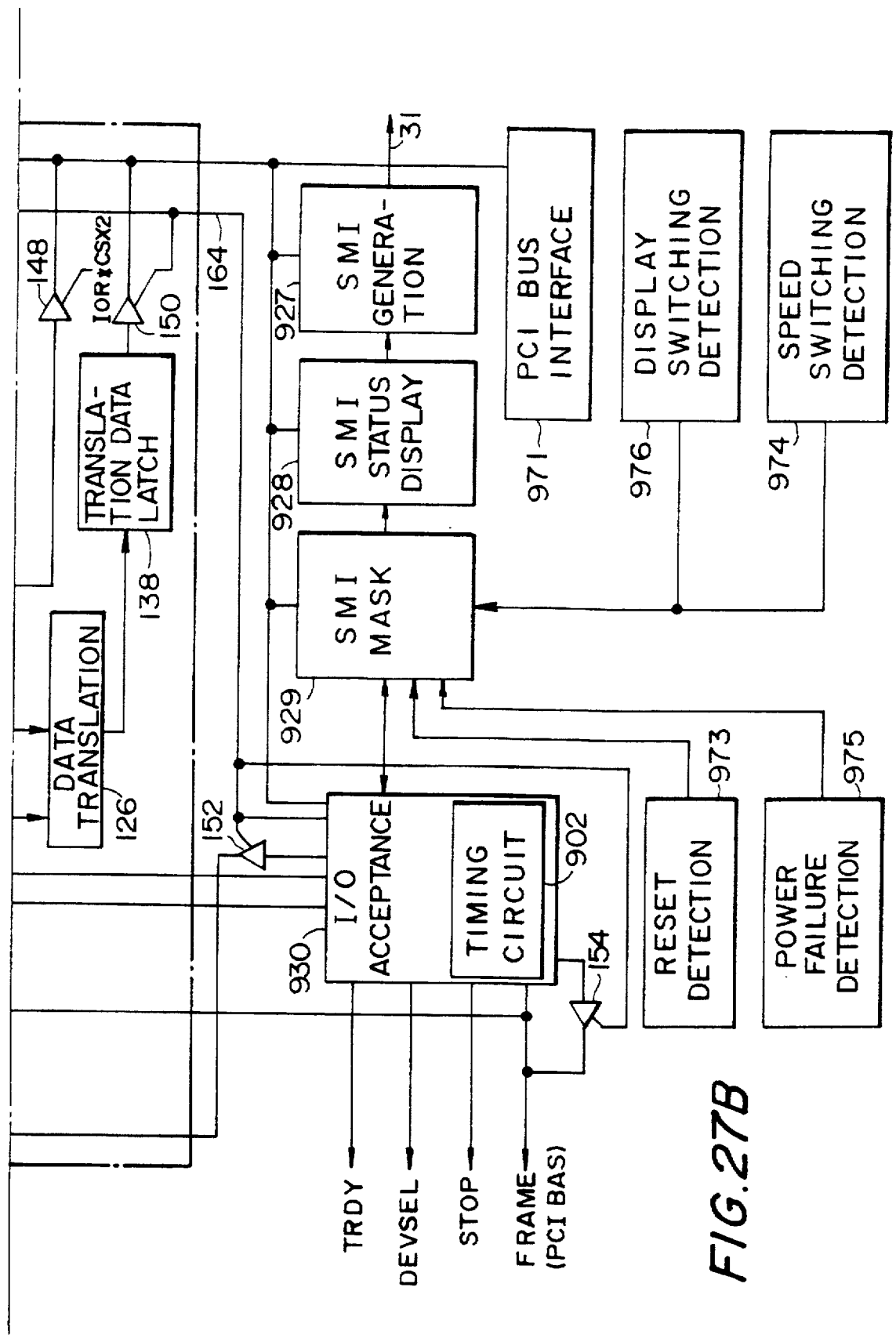
FIG. 27 comprising of FIGS. 27A and 27B is a detailed block diagram of a subcontroller.

A detailed block diagram of the interior of the subcontroller 100 is shown in FIG. 27. A BE latch register (R-Be) 128 in this figure latches a byte enable signal and bus command signal input from C/BE0 to C/BE3. An address latch 130 and an address latch register (R-ADr) 132 latch an address signal input through AD0 to AD31. The latched address signal is translated by an address translation portion 124 into a form conforming to the first architecture, and is latched by a translation address latch 134. In a similar manner, a data latch register (R-Data) 136 latches a data signal that is input from AD0 to AD31. The latched data signal is translated by a data translation portion 126 then is latched by a translation data latch 138. Note that the reasons for providing two means for latching the address signal, the address latch 130 and the address latch register 132, are given below. The address signal on the PCI bus 23 is valid for only one clock period. Therefore, if an address signal that has become valid is latched by the address latch 130 each time, a decode operation with plenty of room is executed, even when some time is required for decoding the address signal.

A decoder 120 decodes the C/BE0 to C/BE3 (bus command) signal and address signal, and determines whether the input I/O instruction is to use a translation method activated by SMI. In other words, it determines whether an I/O instruction issued from the CPU 1 is to use either the above described first or third translation method, or the second or fourth translation method. Based on this identification result, the decoder 120 outputs a sequence start signal 160 to the I/O acceptance means 930 to start the sequence of I/O instruction translation processing. For example, an ST30W or ST30R signal is output to the I/O acceptance means 930 as the sequence start signal 160 for translating an I/O write or I/O read, respectively, to address 30 h. Note that the FRAME signal is also input to the decoder 120 to provide timing for the sequence start signal 160 and other signals. The decoder 120 also generates a control signal 162 for controlling the address translation portion 124 and the data translation portion 126. In other words, the address translation portion 124 and the data translation portion 126 determine the translation method by the I/O instruction (address), and whether translation is required. In this case, the C/BE0 to C/BE3 signals and the address signal are decoded by the decoder 120, and these signals generate the control signal 162 for the translation circuitry. The decoder 120 also generates CSX0 to CSX2 signals from the decoded address signal and C/BE0 to C/BE3 signals. These CSX0 to CSX2 signals are chip-select signals for the BE latch register 128, the address latch register 132, and the data latch register 136, respectively, where the CSX0 signal is input to a three-state buffer 140 through an OR circuit 142 and the CSX1 and CSX2 signals are input to three-state buffers 144 and 148, respectively. The CPU 1 can read the byte enable/bus command state at SMI generation from the BE latch register 128 by asserting the CSX0 signal. Similarly, the CPU1 can read the address/data signal state at SMI generation from the address latch 45 register 132 and data latch register 136 by asserting the CSX1 and CSX2 signals.

An output enable signal 164 is for enabling three-state buffers 140, 146, 150, 152, and 154 when the subcontroller 100 has become the bus master and drives the PCI bus 23. The BE latch register 128, the translation address latch 134, the byte enable (bus command) signal latched by the translation data latch 138, the translated address signal, the data signal, respectively, are output to the PCI bus 23 by asserting the output enable signal 164. Other signals such as the C/BE0 to C/BE3 signals generated by the I/O acceptance means 930 and the FRAME signal are similarly output to the PCI bus 23 by asserting the output enable signal 164.

The internal timing circuit 902 of the I/O acceptance means 930 generates the TRDY, DEVSEL, STOP, and FRAME signals at the trigger of the sequence start signal 160 from the decoder 120. The I/O acceptance means 930 also accepts the I/O instruction from the CPU 1, analyzes the event, sets the event in the event register within the SMI status display means 928, and also outputs the SMI signal to the CPU 1 by the SMI generation means 927. This activates the SMM handler (execution means) 26 to execute the predetermined SMI handling. Note, however, that if the I/O instruction does not require SMI handling (if the above described first or third translation method is to be used), the SMI signal is not generated. The I/O acceptance means 930 generates a signal 166 and outputs it to the address translation portion 124, to provide control if a plurality of address translations are necessary for one I/O instruction. The timing circuit 902 within the I/O acceptance means 930 also generates latch signals for the various latches within the instruction translation means 104. Note that the generation of these various signals in the I/O acceptance means 930 (the timing circuit 902) is complicated, but can be implemented by logical operation means using microcodes, for example.

The REQ-PCI, REQ-BRG, and REQ-CPU signals that are inputs to the bus arbiter 970 indicate whether the corresponding HDD 37, I/O bridge 39, and memory controller 11 (the CPU 1) wish to use the PCI bus 23. The GNT-PCI, GNT-BRG, and GNT-CPU signals that are outputs from the bus arbiter 970 indicate whether access to the bus has been granted to the corresponding PCI bus 23 bus master, I/O bridge 39, and memory controller 11 (the CPU 1).

Figure 28:
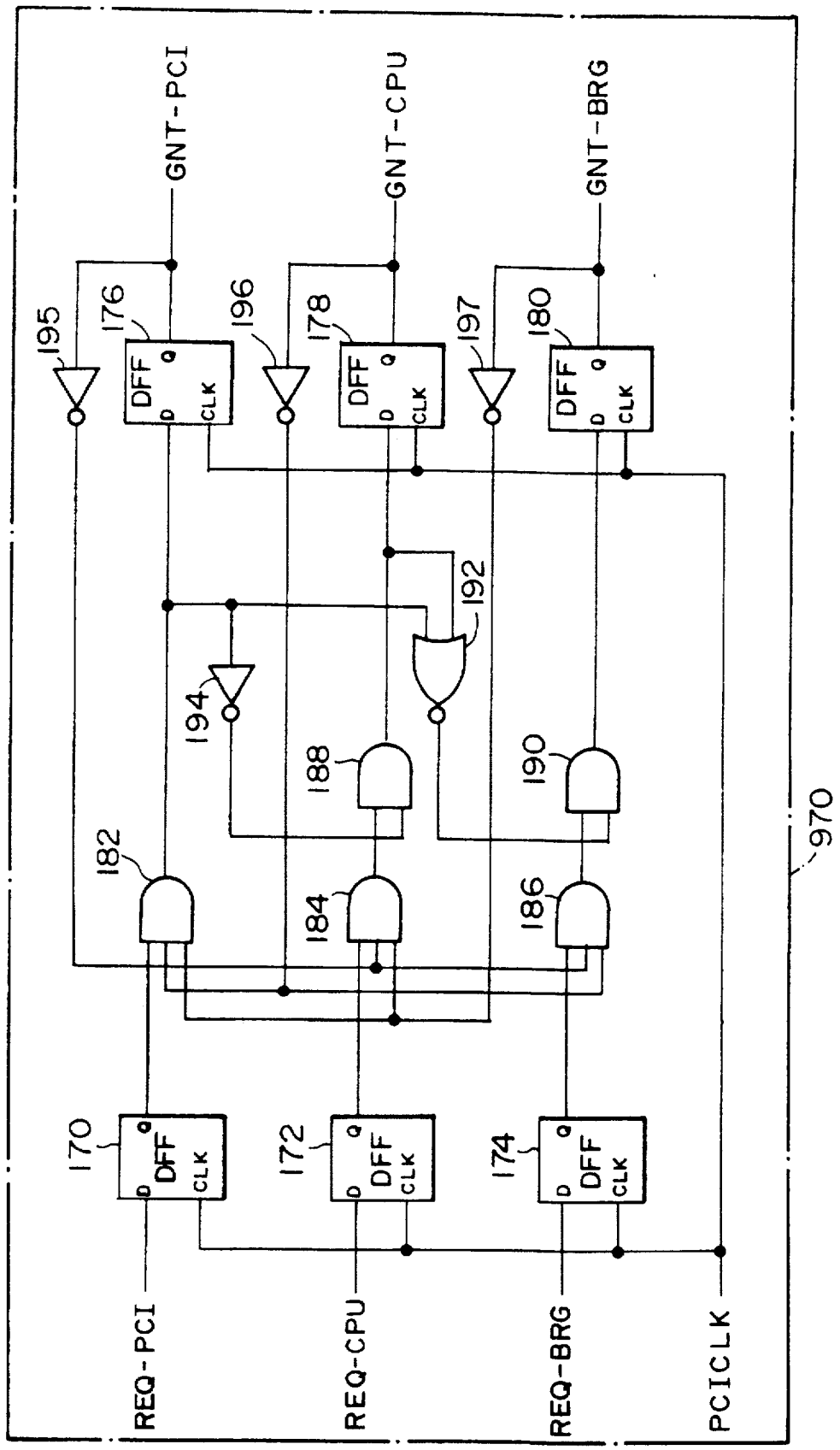
FIG. 28 shows an example of the circuit configuration of the bus arbiter.

An example of the circuit configuration of this bus arbiter 970 is shown in FIG. 28. As shown in this figure, the bus arbiter 970 comprises DFFs 170 to 180, AND circuits 182 to 190, NOR circuits 192, and inverter circuits 194 to 197. The REQ-PCI, REQ-CPU, and REQ-BRG signals that are request signals from agents on the PCI bus 23 are input to the DFFs 170 to 174 which are driven by PCICLK (the reference clock signal on the PCI bus 23), and are held thereby. The GNT-PCI, GNT-CPU, and GNT-BRG signals that are bus access permission-granted signals for the agents on the PCI bus 23 are held by the DFFs 176 to 180. The logic circuits 182 to 197 determine the relative priorities of these signals. In the example shown in FIG. 28, REQ-PCI is set to have the highest priority and REQ-BRG is set to have the lowest. Note that priorities can be set as desired within the bus arbiter 970.

The second embodiment of this configuration can implement the above described first to fourth translation methods. Specific details of the instructions issued for the various device control means and devices, and details of how the instruction translation is executed, are given below by way of third to fifth embodiments of the present invention.

Third Embodiment

In a third embodiment of the present invention, the I/O device is the RS-232C interface 52 (hereinafter referred to simply as RS-232C) and the device control means is the serial controller 50. In this case, it is necessary for a serial controller used by the first architecture, such as a National Semiconductor NS16550A, emulates in such a manner that it operates in accordance with I/O instructions of a second architecture. An Intel 8251A is used as the serial controller of the second architecture. The types of registers incorporated in the NS16550A and the 8251A are listed in FIGS. 29A and 29B together with the I/O (port) addresses of those registers. It is clear from these figures that the NS16550A and 8251A have different I/O addresses and bit arrangements. In particular, both the command register (mode register) and status register are assigned to the same I/O address of 32 h with the 8251A, whereas they are assigned to a plurality of I/O addresses 3F9 h to 3FEh with the NS16550A. This means that the objective is conforming the serial controller (NS16550 A) of the first architecture, having registers of such a different configuration, to the second architecture.

1. Emulation of Data Transmission to RS-232C

The serial controller 50 has two functions: converting parallel data input from the CPU 1 into serial data for data transmission to an external device through the RS-232C; converting serial data input from the RS-232C into parallel data for reception by the CPU 1. The description that follows concerns emulation of this data transmission. The I/O address of the transmit buffer register is 30 h in the 8251A whereas it is 3F8 h (DLAB=0) in the NS16550A, as shown in FIGS. 29A and 29B. However, the meaning (function) of each bit of the transmit buffer registers is the same, and since the RS-232C specifications are regulated, only the write I/O address need be translated. Since it is necessary to execute the write processing for transmission data rapidly, this third embodiment uses the first translation method shown in FIG. 22.

Figure 30A:
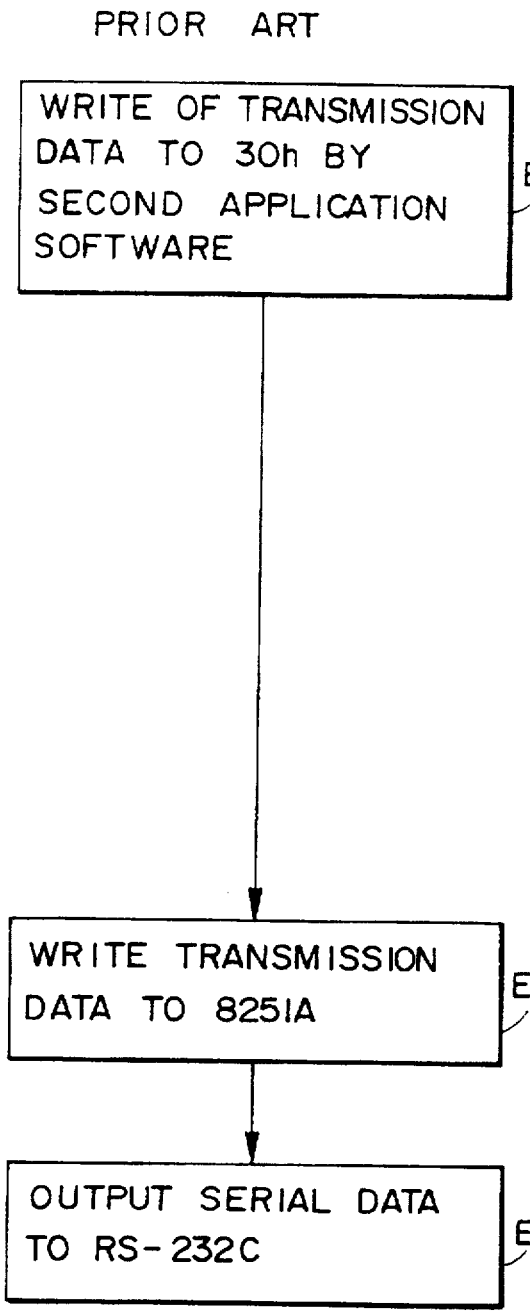
FIGS. 30A and 30B are flowcharts of data transmission by prior-art hardware and a third embodiment.
Figure 30B:
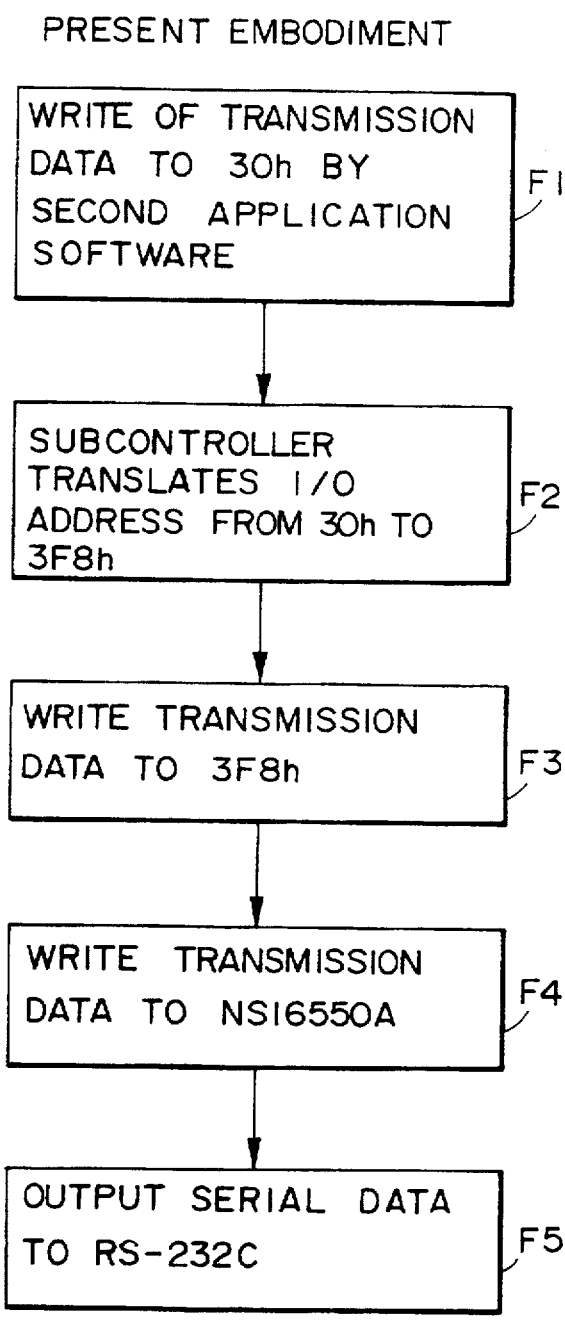

Flowcharts of data transmission by prior-art hardware and this embodiment are shown in FIGS. 30A and 30B. When transmission data is written to I/O address 30 h by the second application software of the prior-art hardware (step E1), that transmission data is written as is to the 8251A's transmit buffer register (step E2). This outputs serial data through the RS-232C (step E3). In contrast, when transmission data is written to I/O address 30 h in this embodiment (step F1), the I/O address is translated from 30 h to 3F8 h by the subcontroller 100 (step F2). Next, when the transmission data is written to the translated I/O address 3F8 h (step F3), the same transmission data is written to the NS16550A's transmit buffer register (step F4) and serial data is output to the RS-232C (step F5).

A more detailed flowchart of data transmission emulation processing is shown in FIG. 31A and a signal waveform chart of signals on the PCI bus 23 is shown in FIG. 31B. When the CPU 1 writes transmission data to I/O address 30 h in a step G1, the transmission data and the byte enable signal are latched in the data latch register (R-Data) 136 and BE latch register (R-Be) 128 of FIG. 27 in a step G2. The I/O address that has been translated from 30 h to 3F8 h by the address translation portion 124 is latched in the translation address latch 134. The write processing of the CPU 1 is ended in a step G3 and access to the bus is disabled. More specifically, the I/O acceptance means 930 within the subcontroller 100 generates the DEVSEL and TRGY signals, and the bus arbiter 970 generates the GNT-CPU signal, as shown in FIG. 31B. The CPU 1 is informed that it is selected over other agents on the PCI bus 23, such as the HDD 37 and the bridge circuit 39, by the assertion of DEVSEL. Access from the CPU 1 is ended by asserting TRDY. Bus access by the CPU 1 is disabled so that the CPU 1 cannot proceed to the next I/O access cycle, by deasserting GNT-CPU. This ensures that the subcontroller 100 takes control of the PCI bus 23 in a step G4. The transmission data latched in the data latch register 136 is then written to I/O address 3F8 h in a step G5. In this case, the byte enable signal latched in the BE latch register 128 determines which part of the byte train in the transmission data is to be selected. The transmission data itself simply passes through the data translation portion 126, and is not translated. The DEVSEL and TRDY signals in FIG. 31B are asserted by the bridge circuit 39 connected to the serial controller 50.

2. Emulation of Command Write to Serial Controller

As shown in FIGS. 29A and 29B, the command setting registers (mode register and command register) are assigned to one I/O address 32 h in the 8251 A, whereas they are assigned to four I/O addresses 3F9 h to 3FCh in the NS16550A. The functions allocated to each bit of the registers of the NS16550A and 8251A are contrasted in FIGS. 33 and 34, and it is clear from these figures that the functions of these bits differ widely. Further, commands in the 8251A have the same I/O addresses but are divided into mode instruction (mode register) and command instruction (command register). Since this makes translation processing for command write extremely complicated, this embodiment uses emulation by the second translation method of FIG. 23. Note that the hardware of the second architecture does not use the 8251A's synchronous mode, so that emulation of synchronous mode is not possible.

Figure 32A:
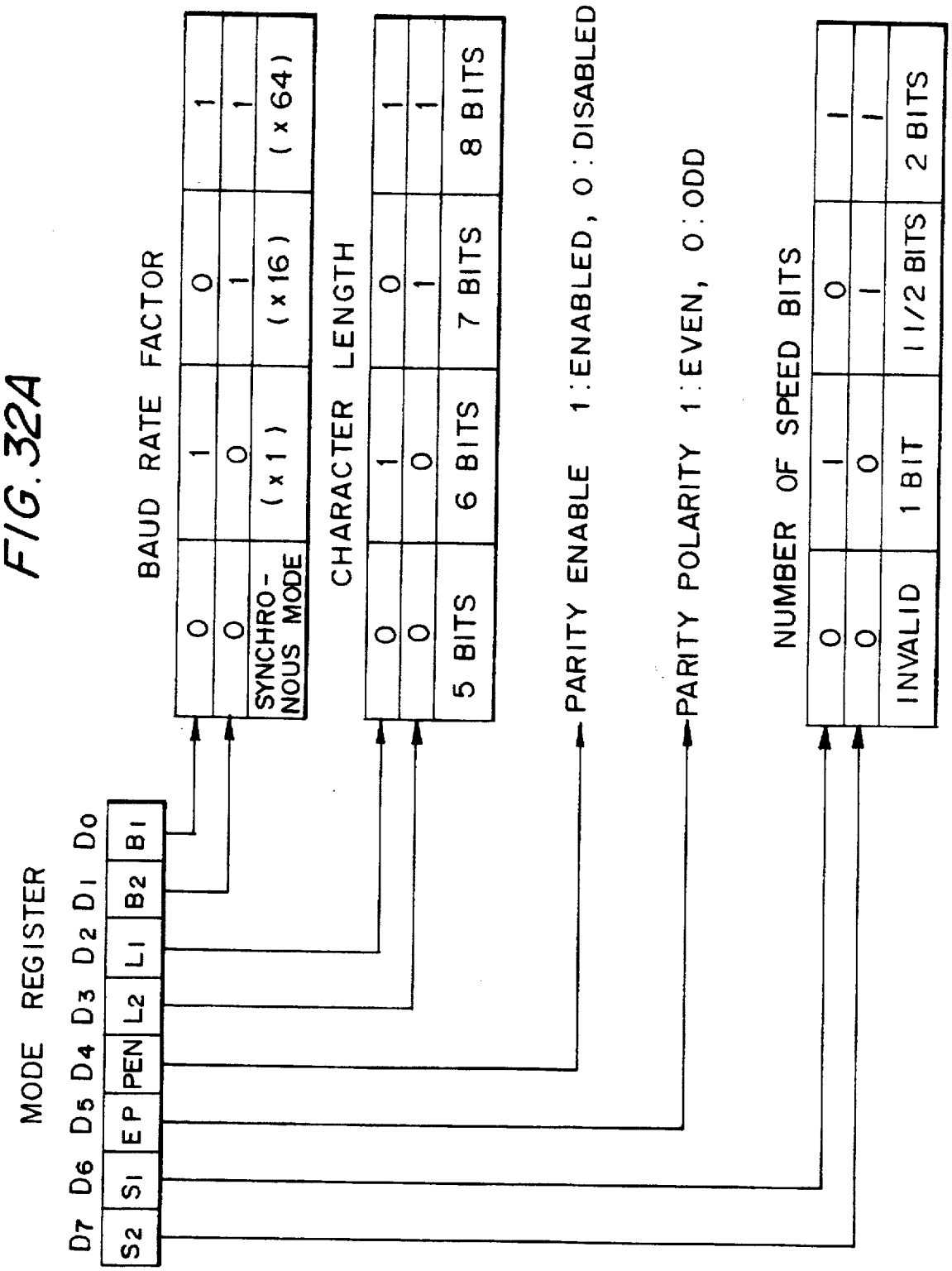

The functions allocated to the bits of the 8251A's mode register, command register, and status display means are listed in FIGS. 32A to 32C. Parallel data that is set in the 8251A by the CPU 1 is translated into serial data of a format specified by a mode instruction, then is output to the RS-232C. For example, as shown in FIG. 32A, bits 0 and 1 of the mode register specify the baud rate, and bits 2 and 3 specify the character length. Control during the data transfer is provided by the command register shown in FIG. 32B. For example, bit 0 of the command register determines whether the data transfer is transmission or reception, and bit 1 sets whether or not the data terminal is ready. The status register is used for verifying the transmission or reception state during data transfer. For example, bits 0 and 1 can be used to determine whether or not the transmit buffer register and receive buffer register are empty.

Figure 35A:
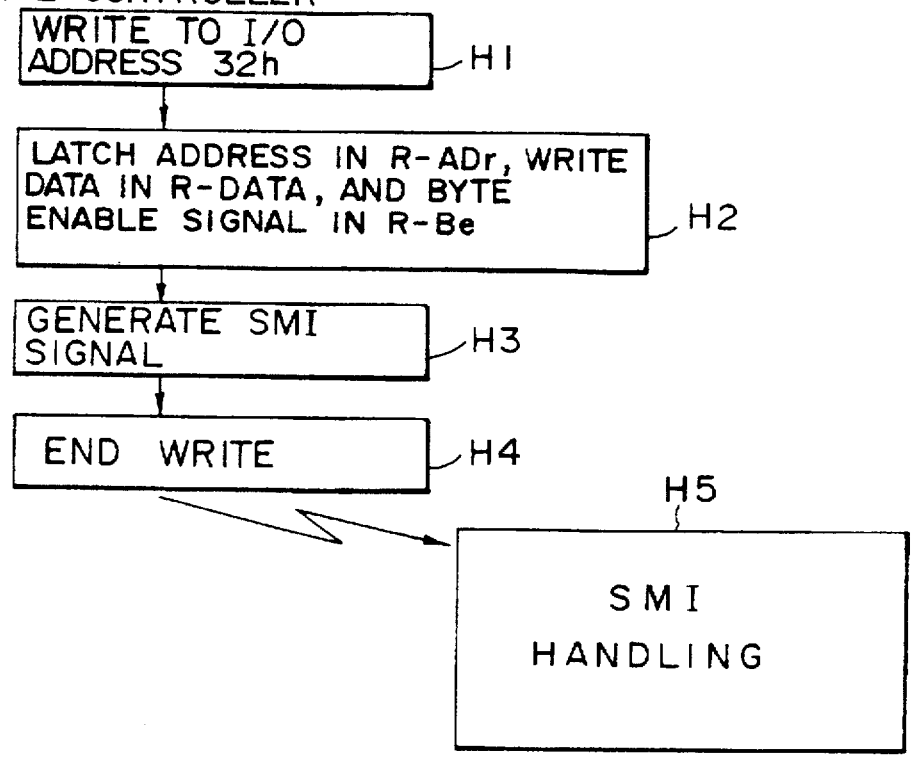
FIG. 35A is a flowchart of emulation processing of command write and FIG. 35B is a signal waveform chart of corresponding signals.
Figure 35B:
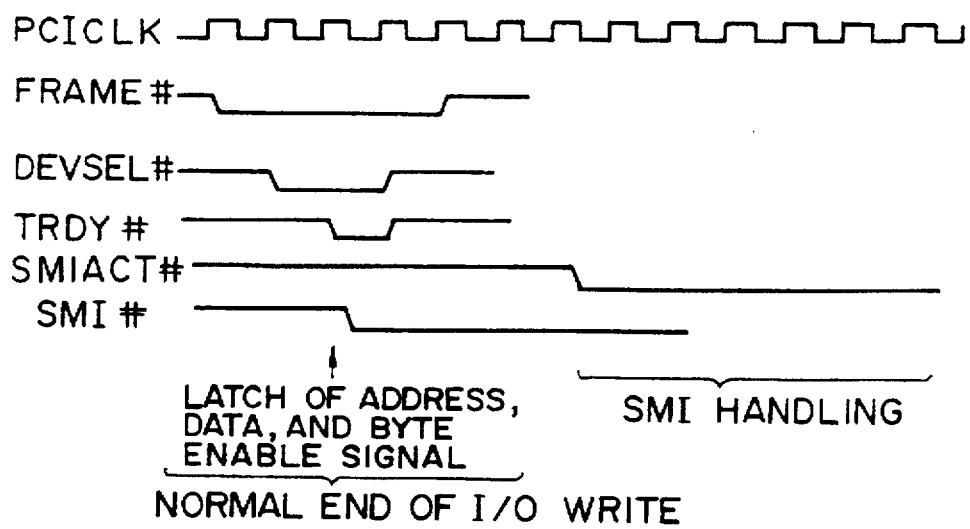

A flowchart of command write emulation processing is shown in FIG. 35A and a signal waveform chart thereof is shown in FIG. 35B. As shown in FIG. 35A, when a write is performed to I/O address 32 h (command register and mode register) in a step H1, the address, data, and byte enable signals are latched in the address latch register 132, data latch register 136, and BE latch register 128 (step H2), the SMI signal is generated (step H3), the write ends (step H4), and then the SMI handling starts (step H5). In this case, the SMI signal is asserted simultaneously with TRDY, as shown in FIG. 35B, or a few clock signals beforehand. This prevents the CPU 1 from ending the I/O access and entering the next instruction cycle.

Figure 36B:
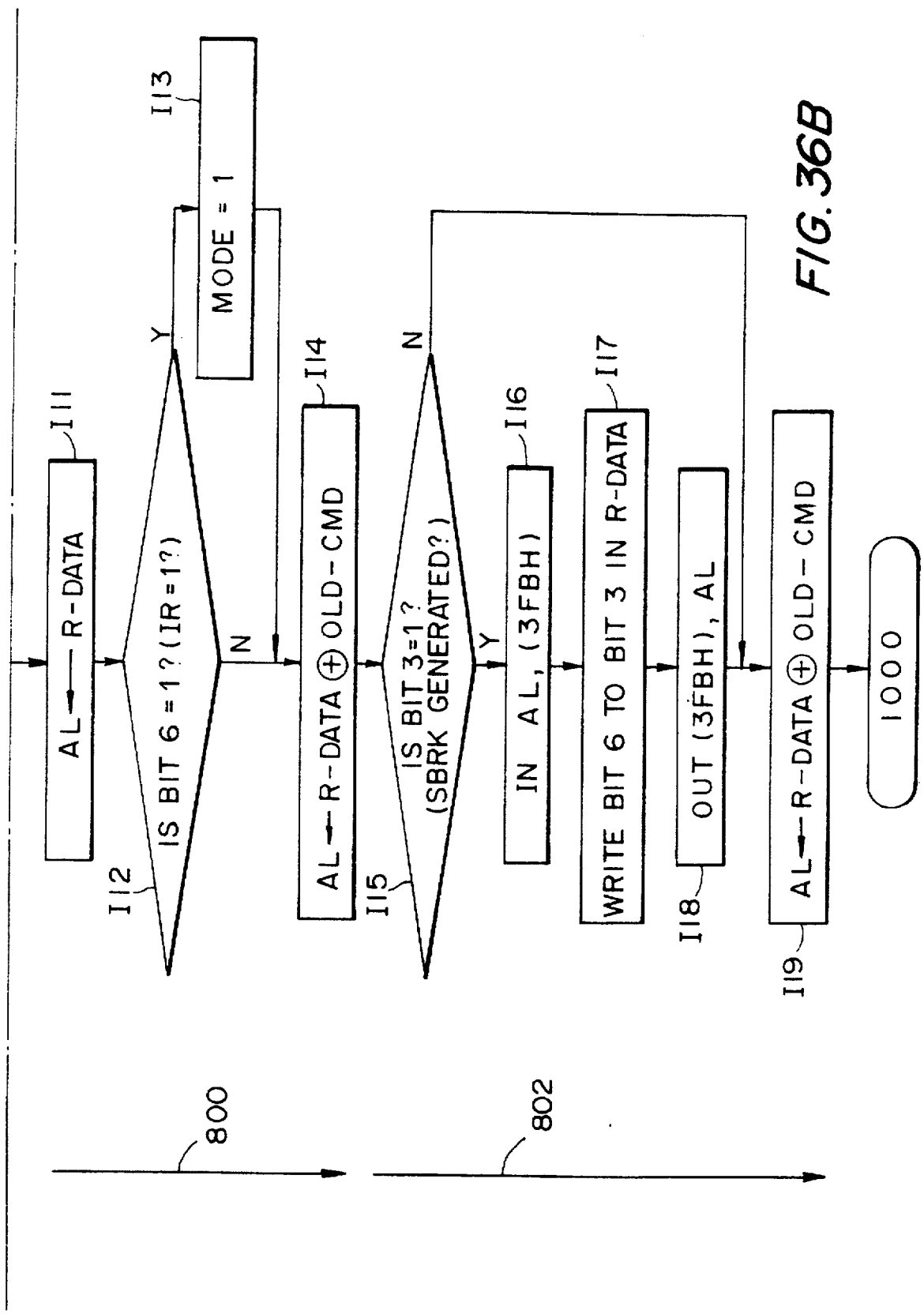
FIG. 36A comprsing of FIGS. 36A and 36B is a detailed flowchart of emulation processing of command write.
Figure 37:
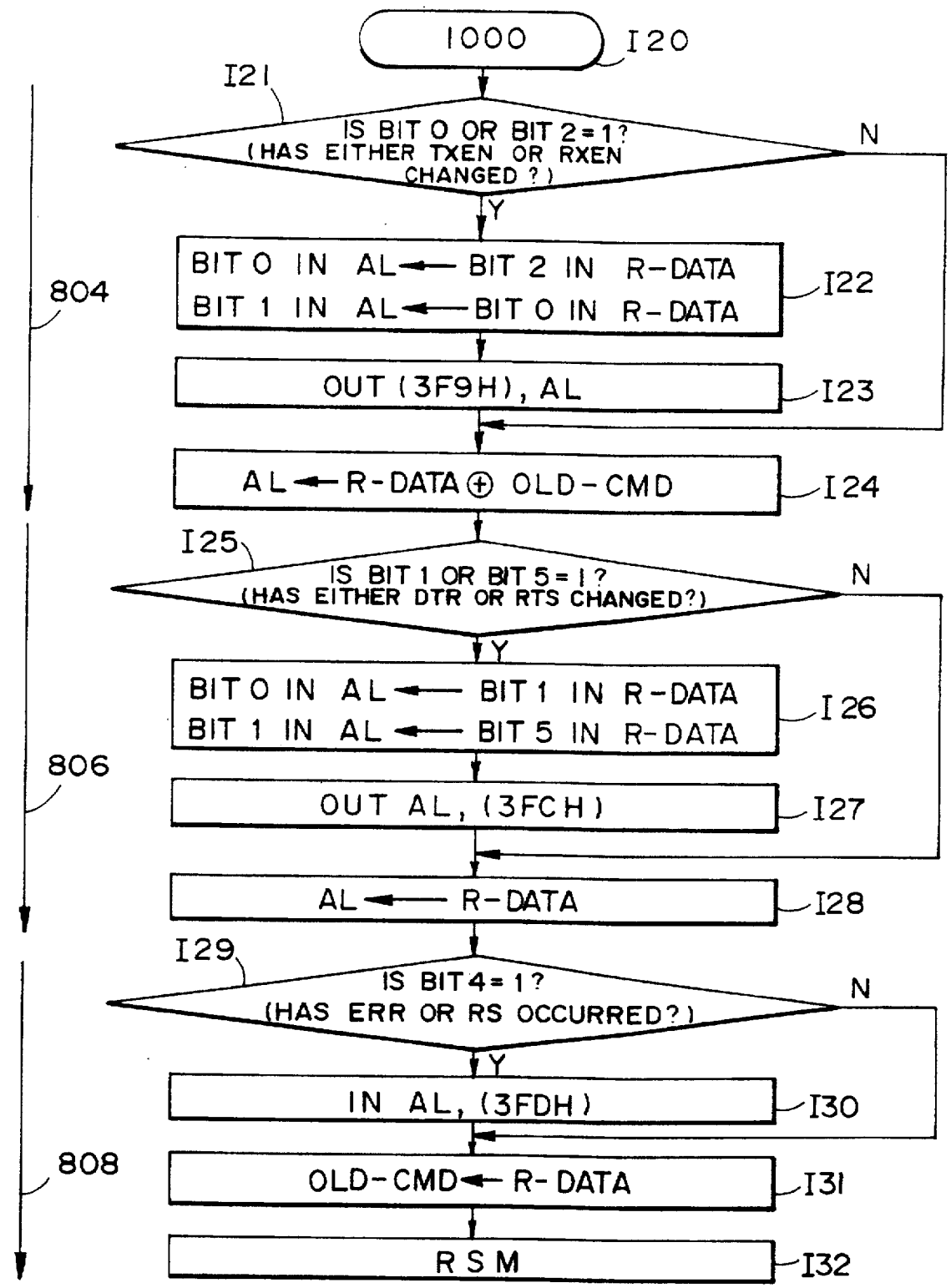
FIG. 37 is another detailed flowchart of emulation processing of command write.

An example of SMI handling is shown in FIGS. 36 and 37. After SMI handling starts (step I1), the SMI status display means 928 is first read by the SMM handler 26 (step I2). it is determined from the event data set in the SMI status display means 928 as to whether or not an SM1 is to be generated by I/O emulation, (step I3), and other SM1 handling is executed if an SMI is not to be generated (step I4). Next, it is determined whether or not the address latched in the address latch register 132 is 32 h (step I5), and, if it is not 32 h, emulation processing for another I/O instruction is executed (step I6). The C/BE0 to C/BE3 signal (bus command) latched in the BE latch register 128 is read. It is determined whether or not that instruction is an I/O write instruction (step I7), and if it is not, emulation processing for I/O read 32 h is executed (step I8). it is then determined whether or not the mode is 1, in other words, whether or not the I/O instruction is a mode instruction (step I9). If the mode is 1, the flow proceeds to emulation processing for a mode instruction (step I10, and see FIG. 38). Note that the mode of an 8251A is set to 1 immediately after a reset, and the mode becomes 0 when the mode instruction processing ends. If IR becomes 1 in the command instruction, the mode is once again set to 1. A flag indicating this mode is stored at a predetermined address in SMRAM. The data that was latched in the data latch register 136 in step H2 of FIG. 35A, in other words, data on the I/O instruction issued by the CPU 1 (the contents of the command instruction) is stored in an internal register of the CPU 1 (step I11).

After the above processing ends, the flow proceeds through steps 800, 802, 804, 806, and 808. The processing of the flow stages 800 to 808 corresponds to processing shown at 900 to 908 in FIGS. 33 and 34.

The processing of flow stage 800 (equivalent to 900 in FIG. 34) determines whether or not bit 6 in AL is 1 (step I12). If bit 6 is 1, it is determined that IR=1 has been set in the command instruction, and the mode is set to 1 (step I13). Next, an exclusive OR (XOR) is taken of R-Data and OLD-CMD (the command data of the previous cycle), and the result is stored in AL (step I14). This exclusive OR makes it possible to overwrite only those bits that have been changed. In processing of flow stage 802 (equivalent to 902 in FIG. 34), it is determined whether or not bit 3 in AL is 1 (step I15). If bit 3 is 1, it is determined whether SBRK has been generated, and the contents of the NS16550A register at 3FBh are stored in AL (step I16). Next, bit 6 is written to bit 3 in R-Data (step I17), the contents of AL are written back to address 3FBh of the NS16550A (step I18), then the processing of a step I19 is executed. This overwrites the contents of the NS16550A register at 3FBh. In processing of a flow stage 804 (equivalent to 904 in FIG. 33), it is determined whether or not bit 0 or bit 2 in AL is 1 (step I21), then, if bit 2 is 1, the contents of bits 2 and 0 in R-Data are stored in bits 0 and 1 in AL (step I22). The contents of AL are then output to 3F9 h and the processing of a step I24 is executed. This overwrites the contents of the NS16550A register at 3F9h. In a flow stage 806 (equivalent to 906 in FIG. 34), processing similar to that of flow stage 804 is executed if bit 1 or bit 5 is 1 (steps I25 to I28). This overwrites the contents of the NS16550A register at 3FCh. In processing of a flow stage 808 (equivalent to 908 in FIG. 34), it is determined whether or not bit 4 is 1 (step I29), and if bit 4 is 1, the contents at 3FDh are read into AL (step I30). Since an error flag is reset by reading 3FDh in the NS16550A, the above described processing is executed. Finally, the contents of R-Data are set in OLD-CMD (step I31) and RSM is issued (step I32). Note that bit 7 of the command register has meaning only in synchronous mode, so this emulation processing is not executed.

Figure 34:
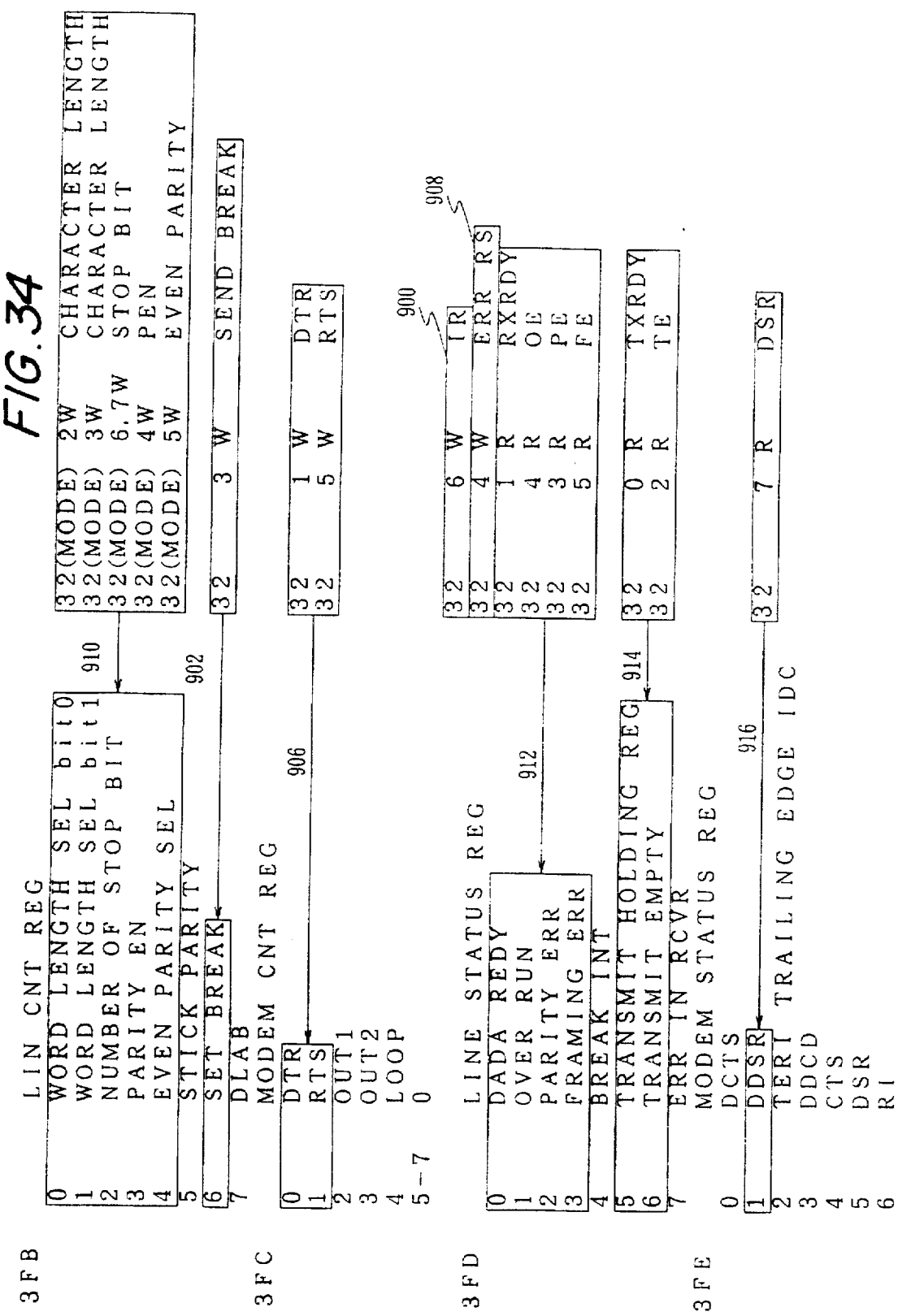
FIG. 34 shows the location and contents of each register of the serial controller of the 8251A.

Emulation processing for a mode instruction will now be described, with reference to the flowchart of FIG. 38. The translation processing shown at 910 in FIG. 34 is necessary for a mode instruction. Thus, the contents of bits 2, 3, 7, 4, and 5 of R-Data are stored in bits 0, 1, 2, 3, and 4 of AL in a step J2, then the contents of AL are output to the NS16550A register at 3FBh (step J3). This enables the execution of the desired mode instruction in the NS16550A. In a step J4, it is determined whether or not bits 0 and 1 in R-Data are 0 and 1, in other words, whether or not the baud rate factor is 16 times (see FIG. 32A). If the baud rate factor is not 16 times, after DLAB is set to 1 (step J5), the desired baud rate and clock multiplier are calculated and the divisor latch is reset (enabled by DLAB=1) in a step J6 (I/O write to 3F8 h and 3F9h). Since the baud rate of the transfer is fixed at 16 times the clock signal in the NS16550A, if it is set to 1 time or 64 times in the 8251A, it is necessary to modify the contents of the divisor latch and control the clock signal of the NS16550A. After the divisor latch is modified, the processing of steps J7 and J8 is executed and, after the mode has returned to 1 (step J9), control is returned by RSM (step J10).

The above processing enables emulation of command write.

3. Emulation of Data Reception from RS-232C

Figure 24:
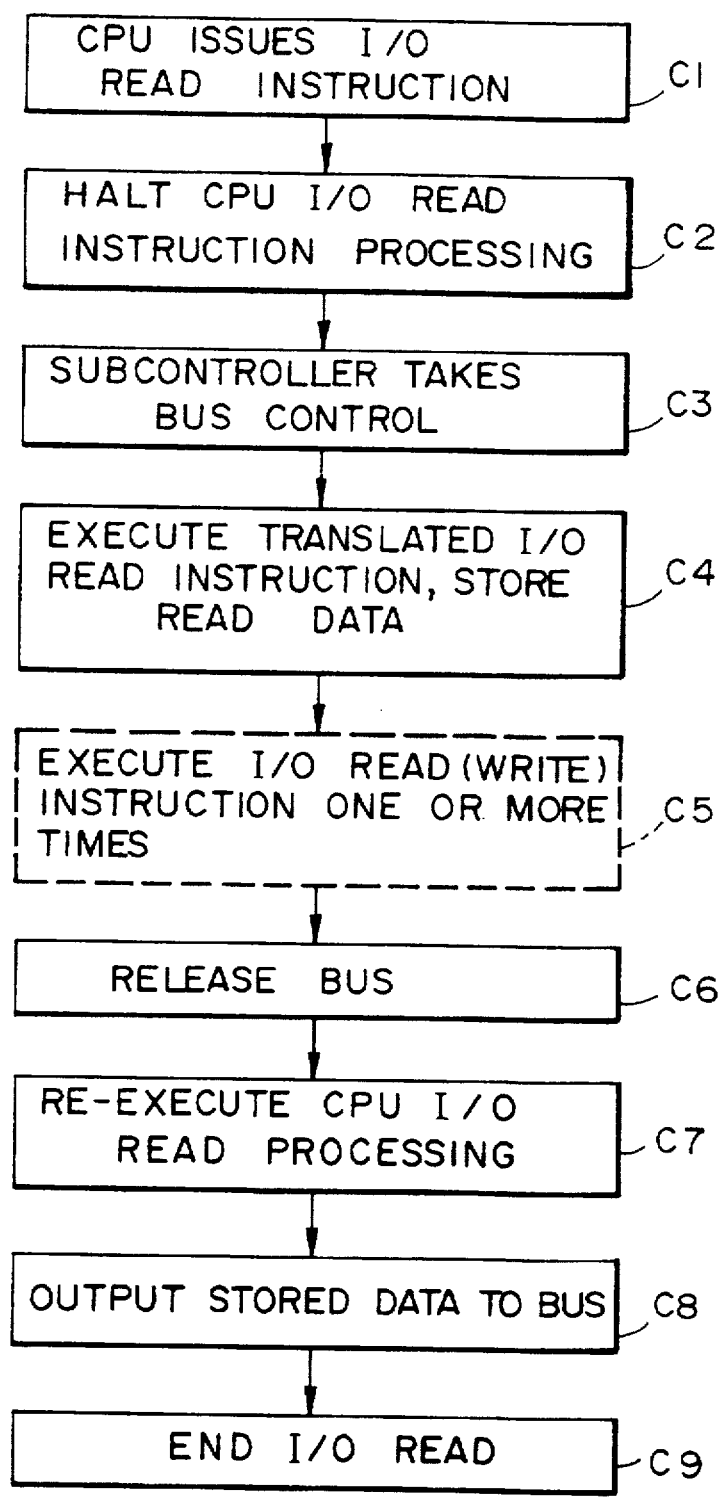
FIG. 24 is a flowchart of a third translation method.

The I/O address of the receive buffer register is 30 h in the 8251 A but 3F8 h (DLAB=0) in the NS16550A. However, since the meanings of the bits of the receive buffer registers are the same, only the I/O address need be translated (see 917 of FIG. 33). Since it is also necessary to execute the receive data read processing at high speed, the third translation method of FIG. 24 is used.

Figure 39A:
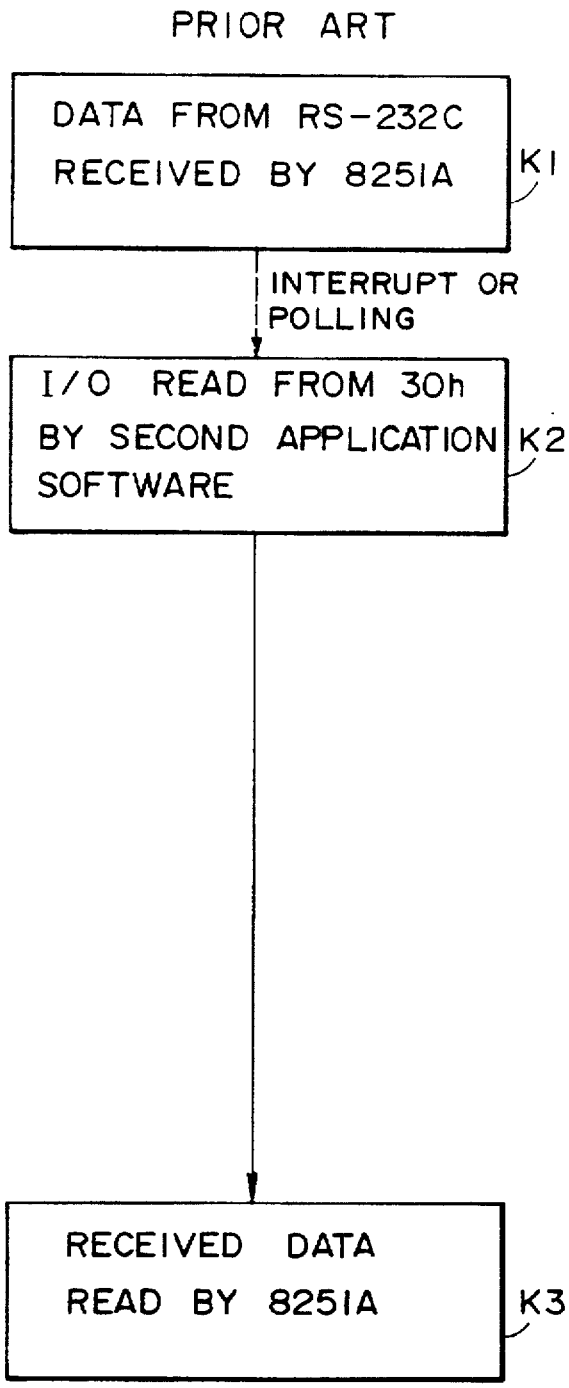
FIGS. 39A and 39B are flowcharts of data reception by prior-art hardware and the third embodiment.
Figure 39B:
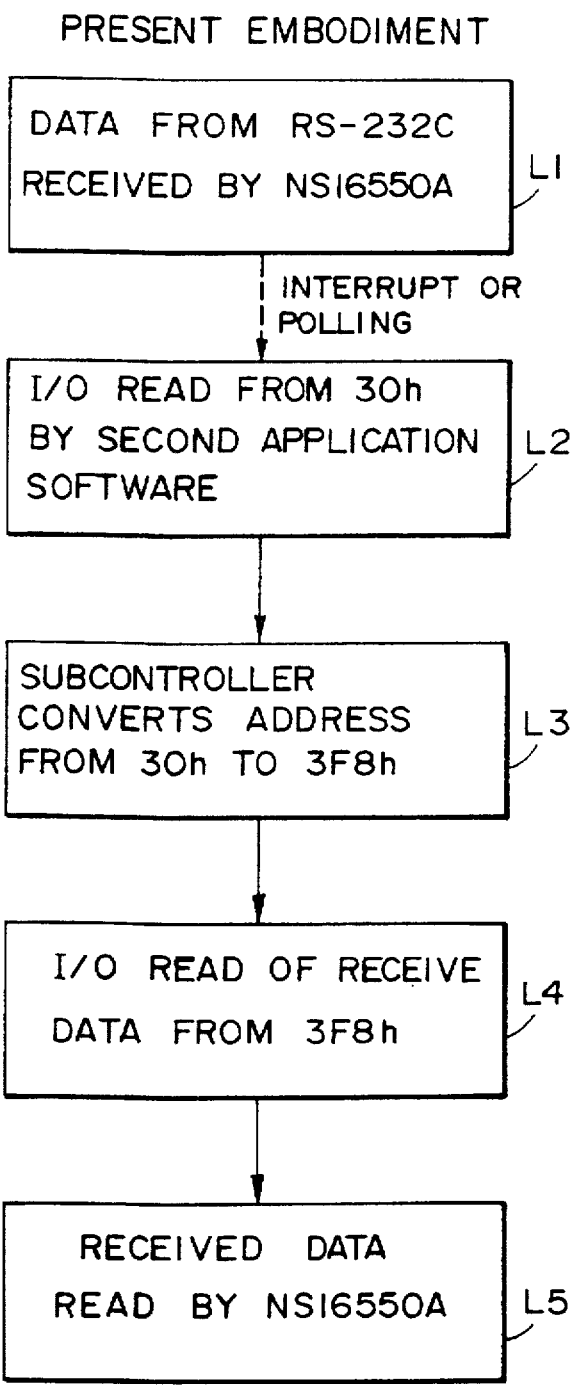

Flowcharts of data reception by prior-art hardware and this embodiment are shown in FIGS. 39A and 39B. These figures differ in the way that, when I/O read is executed from address 30 h by the second application software, the subcontroller 100 translates the address from 30 h to 3F8h and I/O read is executed on the receive data from the translated address 3F8h.

Figure 40:
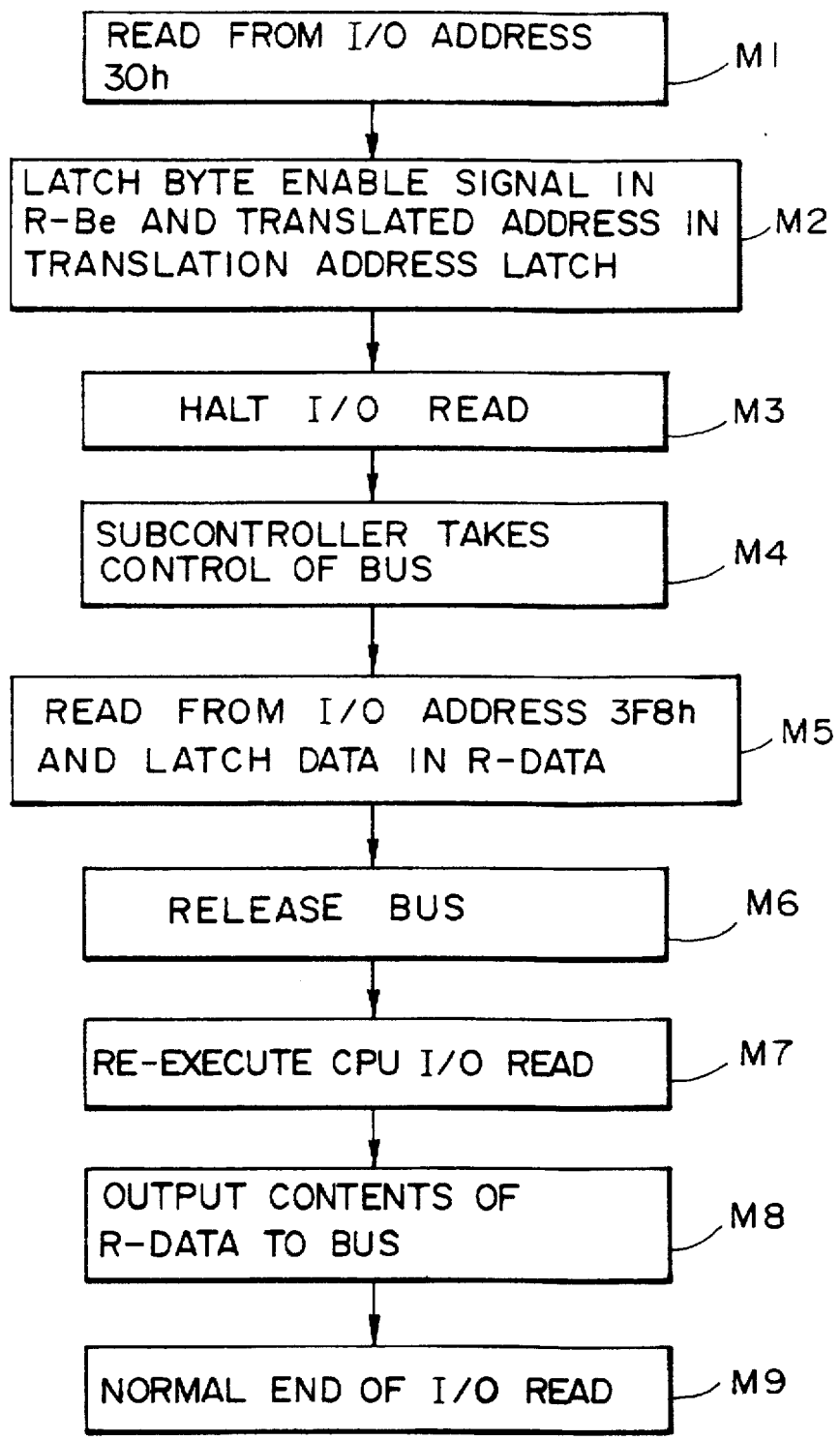
FIG. 40 is a detailed flowchart of data reception emulation processing.
Figure 41:
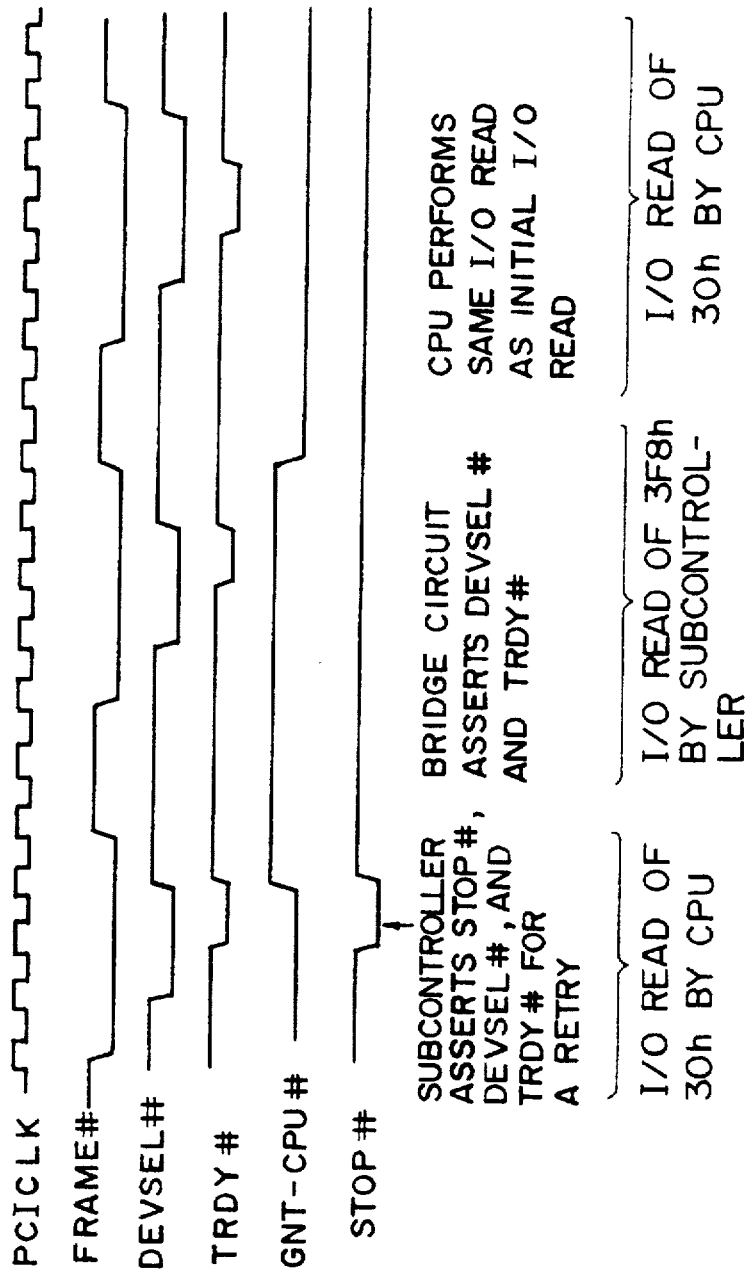
FIG. 41 is a signal waveform chart of data reception emulation processing.

A more detailed flowchart of data reception emulation processing is shown in FIG. 40 and a signal waveform chart of signals in this case is shown in FIG. 41. When the CPU 1 reads receive data from I/O address 30h (step H1), the byte enable signal and the address signal translated from 30 h to 3F8h are latched in the BE latch register 128 and the translation address latch 134 (step M2). The read processing of the CPU 1 is then temporarily halted in a step M3. More specifically, the read processing is halted by the subcontroller 100 asserting STOP, DEVSEL, and TRDY for a retry, as shown in FIG. 41. This retry processing can also be executed by asserting STOP while DEVSEL is asserted. Note that if the bus is an VL bus but not a PCI bus, this halt processing could be implemented by asserting backoff, ostensibly ending I/O read, then causing the CPU 1 to re-execute the same I/O read. Next, GNT-CPU is deasserted and the subcontroller 100 takes control of the bus (step M4), and receive data that has been read from the NS16550A register at 3FSh is latched in the data latch register 136 (step M5). In this case, the byte enable signal is output by the BE latch register 128 and the address is output by the translation address latch 134. GNT-CPU is then asserted and the bus is released (step M6), and the CPU 1 re-executes the I/O read (step M7). When this happens, the data latched into the data latch register 136 is output onto the PCI bus 23 (step M8), and the I/O read ends normally (step M9).

4. Emulation of Status Read from Serial Controller

As is shown in FIGS. 29A, 29B, 33, and 34, the contents of each bit of the 8251A status register are separated at two addresses, 3FDh and 3FEh, in the NS16550A, and the bit arrangement also differs. It is preferable that this status register is read rapidly. Since the serial controller 50 transfers data while observing changes in status whenever a delay in status is read problems such as data dropout can occur. That is why the third translation method of FIG. 24 is used, even though it makes the circuitry somewhat more complicated.

Figure 42:
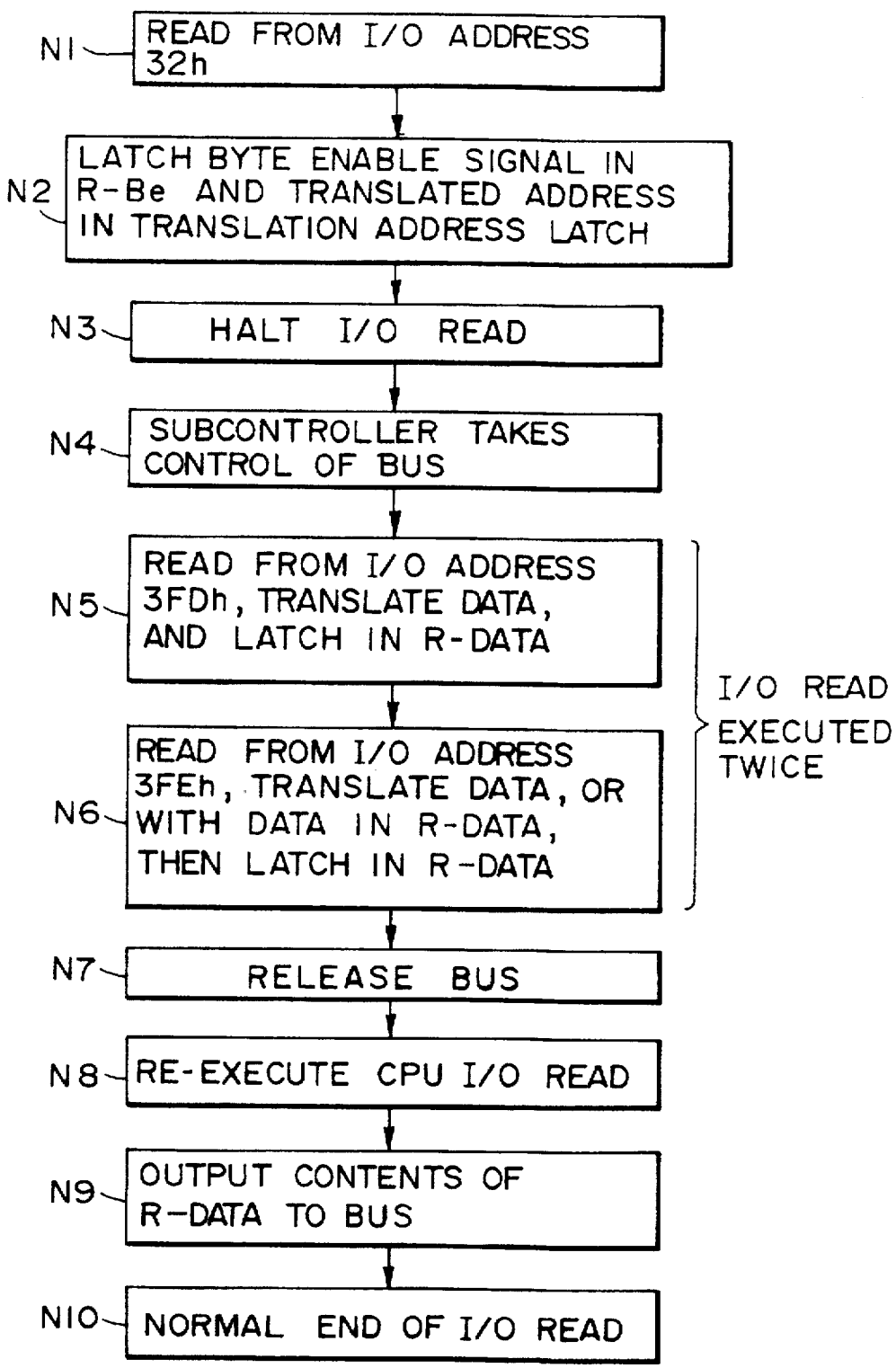
FIG. 42 is a flowchart of status read emulation processing.

A flowchart of status read emulation processing is shown in FIG. 42. First, processing of steps N1 to N4 is executed in the same manner as the data reception of FIG. 40. Status data is then read from the NS16550A line status register at 3FDh, data translation processing is executed, and the translated data is latched in the data latch register 136 (step N5). In this case, the data translation processing is executed by the data translation portion 126, more specifically, the data translation processing of 912 and 914 of FIG. 34 is executed. Next, data translation processing is executed on status data that has been read from the modem status register at 3FEh, that data is ORed with the data latched in the data latch register 136 in step N5 to obtain a single item of data, and the result is once again latched in the data latch register 136 (step N6). In this case, the data translation processing shown at 916 of FIG. 34 is executed. The processing of steps N7 to N10 is then executed in the same manner as in FIG. 40, to end the status read.

The processing this third embodiment, described in the above sections 1 to 4, enables the device control means (NS16550A) and devices of the first architecture to conform to a system of the second architecture,

Fourth Embodiment

A fourth embodiment of the present invention is applied to system in which an I/O device is the keyboard 49 and the device control means is the keyboard controller 48. An Intel 8042 is used as the keyboard controller of the first architecture, and an Intel 8251A is used in the same manner as the example of use of RS-232C for the second architecture. The I/O addresses and bit functions of the 8042 and 8251A are contrasted in FIGS. 43 and 44. It is clear from these figures that the I/O addresses and bit arrangements of the 8042 and 8251A differ, and the keyboard input data sent from the keyboard is also different. This makes it necessary to use emulation processing to translate addresses and data.

1. Emulation of Command Transmission to Keyboard

The emulation of command transmission to the keyboard 49 is comparatively complicated, because addresses and data must be translated and identification of parameters is also necessary. Since the frequency of such command transmission is low, the second translation method of FIG. 23 is used.

Figure 45A:
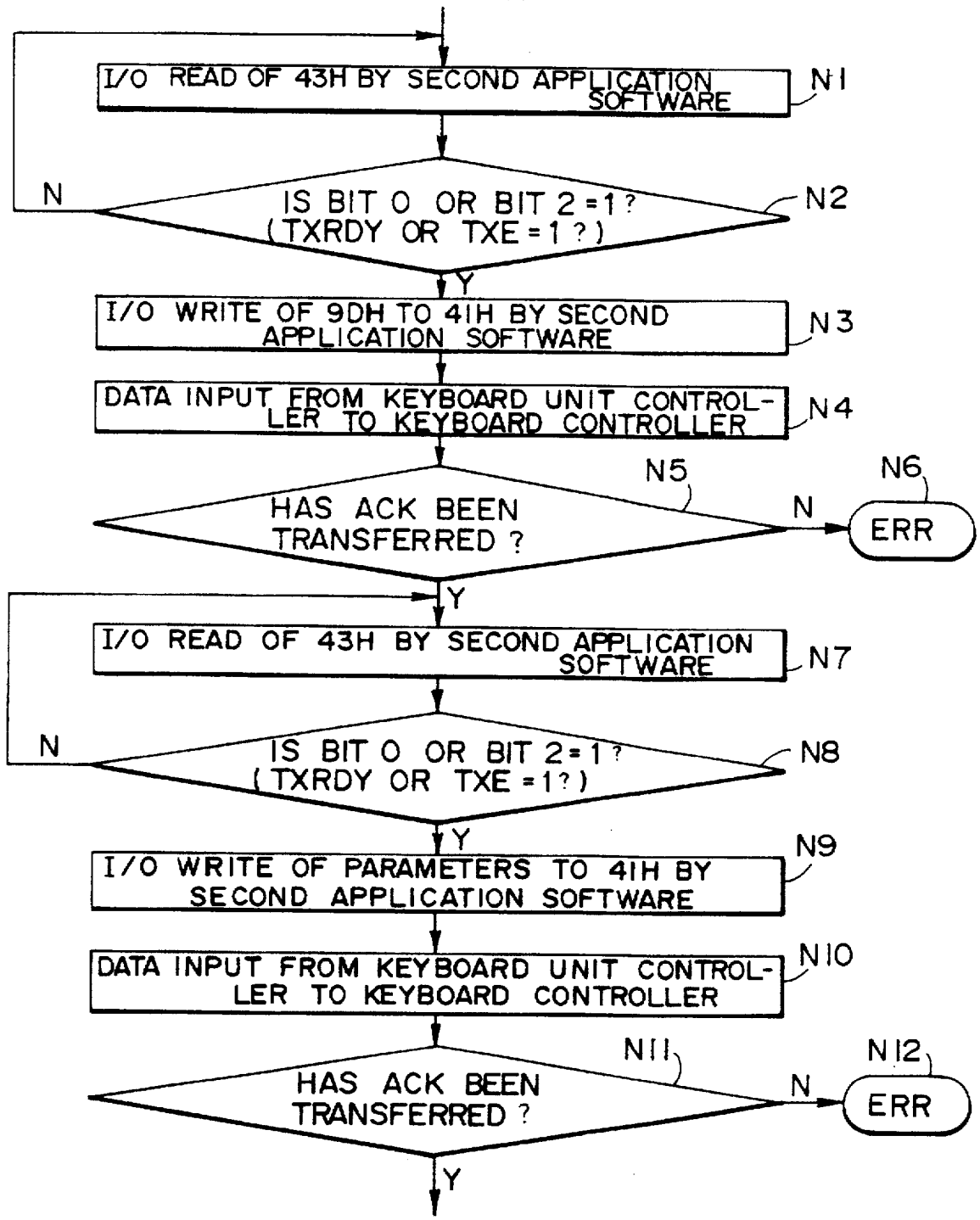

Flowcharts of command data transmission to the keyboard 49 by prior-art hardware and this embodiment are shown in FIGS. 45A and 45B. In this case, an example of an LED on/off command is given as the command sent to the keyboard 49, but it is possible to execute emulation processing of a command for setting repeat intervals by a similar method. The processing for turning an LED on the keyboard on or off, using the prior art second architecture, is shown in steps N1 to N12 of FIG. 45A and described below. In other words, after checking as to whether data transmission is enabled or not, 9 Dh (a code input by a key when a command is to be sent to the keyboard) is written to I/O address 41 h by the second application software. When this I/O write is acknowledged, it is determined whether or not data transmission is enabled, then the parameters for instruction execution are written to I/O address 41 h by the second application software. When this I/O write is acknowledged, the LED is turned on or off. The above described emulation processing with the fourth embodiment is shown in FIG. 45B.

Figure 46:
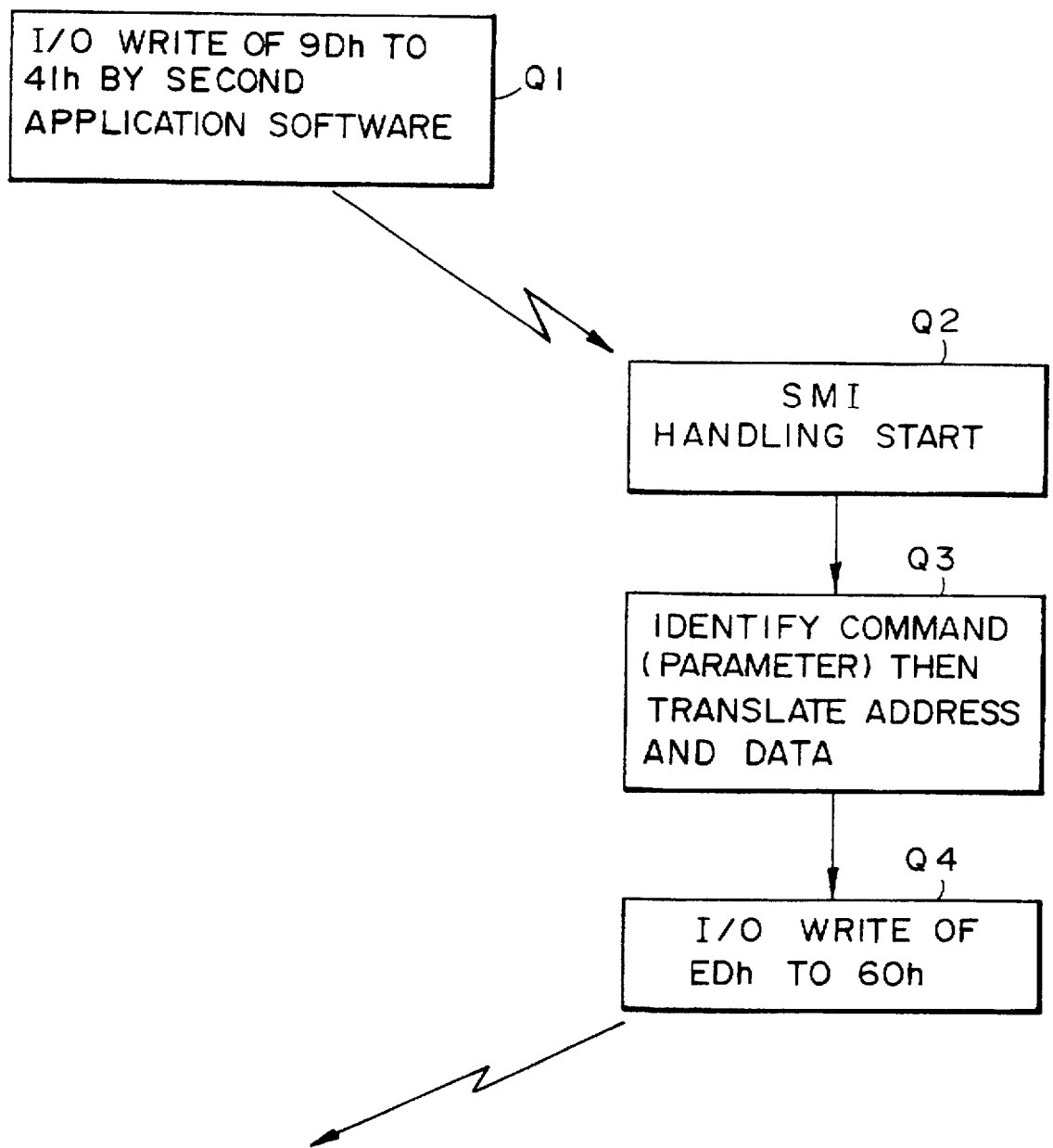
FIG. 46 is a detailed flowchart of command transmission emulation processing.

In FIG. 45B, the second application software first executes an I/O read at 43 h (step P1), then it is determined whether or not bit 0 or bit 2 is 1, in other words, whether or not transmission is enabled (step P4). In this case, the address and data are translated by the subcontroller 100 of the fourth embodiment (step P2), and the status is thereby read from 64 h of the 8042 (step P3). This enables the determination as to whether or not the TXRDY (transfer ready) or TXE (transmit buffer register is empty) bit is 1 (step P4, see FIG. 32C). If it is determined that transmission is enabled, 9 Dh is written to 41 h by the second application software (step P5), and the address and data translation processing is started by the SMI handling, unlike in the prior art shown in FIG. 45A (step PG, and see FIG. 46). As shown in FIG. 46, this SMI handler first identifies the command, then executes address and data translation processing in accordance with the identification result (step Q3). The contents of EDh, obtained by translating 9 Dh to conform to the first architecture, are written to 60 h (step Q4). Subsequently, as shown in a step P7 in FIG. 45B, data is input to the keyboard controller 48 from the keyboard unit controller 55 incorporated in the keyboard 49, and in a step P8 it is determined whether or not the ACK (acknowledge, OF8 h) code has been transferred. If the ACK has not been transferred, it is determined that an error has occurred (step P9). The above procedure transfers a command to the keyboard 49. Next, it is determined whether or not data transmission is enabled, in the same manner as steps P1 to P4 (steps P10 to P13). If it is determined that data transmission is enabled, the parameters for executing the command are transferred, as shown by steps P14 to P17. The transfer processing for these parameters is performed in the same manner as in steps P5 to P8. Note, however, that the parameters are identified during this SMI handling, and the address and data translation processing is executed based on this identification result.

The above processing enables an LED on the keyboard to be turned on or off.

2. Emulation of Command Write to Keyboard Controller

Figure 43:
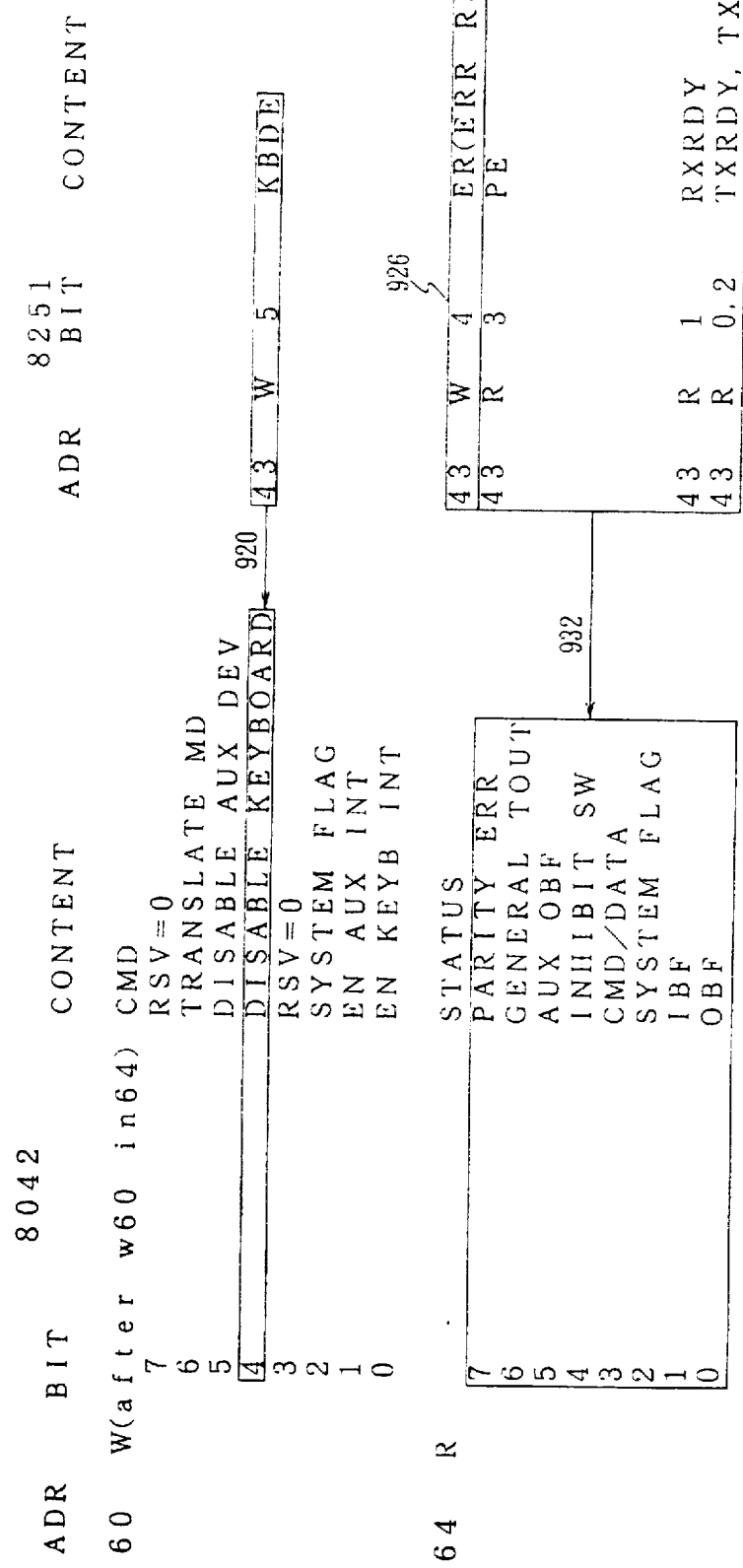

Emulation of command write to the keyboard controller 48 corresponds to one write to the 8251A, but it is extremely complicated in the 8042 because it necessitates a plurality of writes (see 920 and 924 of FIGS. 43 and 44). Since the frequency of such a command write is low, the second translation method of FIG. 23 is used. This embodiment is aimed at executing emulation processing for 8251A command bits that do not exist in the 8042 and the 8251A mode instruction (see 926 and 928 of FIGS. 43 and 44).

Figure 47A:
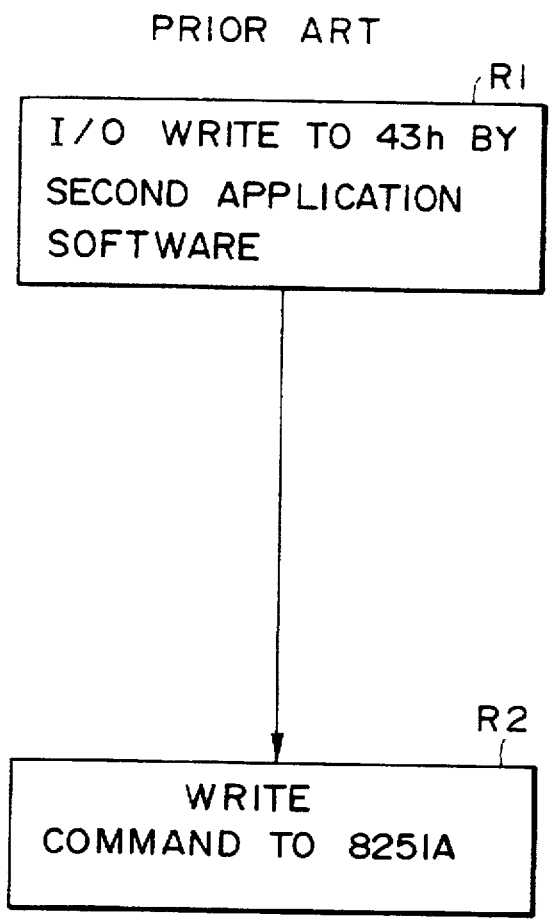
FIGS. 47A and 47B are flowcharts of command write by prior-art hardware and the fourth embodiment.
Figure 47B:
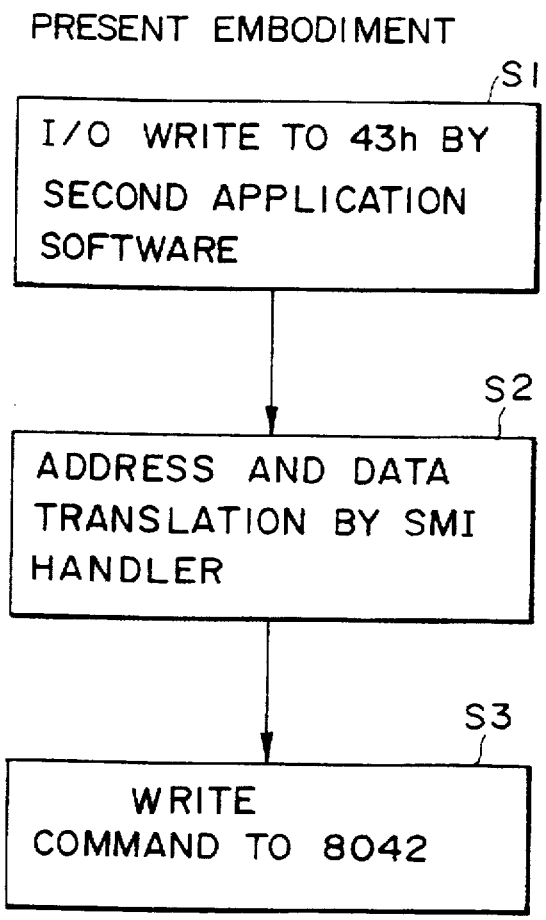

Flowcharts of command write by prior-art hardware and the fourth embodiment are shown in FIGS. 47A and 47B. If I/O write to 43h is performed by the second application software in the prior art (steps R1 and R2), the command is written as is to the 8251A. In contrast, if I/O write to 43h is performed with this embodiment (steps S1 to S3), the address and data are translated by the SMI handler, and the command is written to the 8042.

3. Emulation of Reception of Data Input from Keyboard

Figure 25:
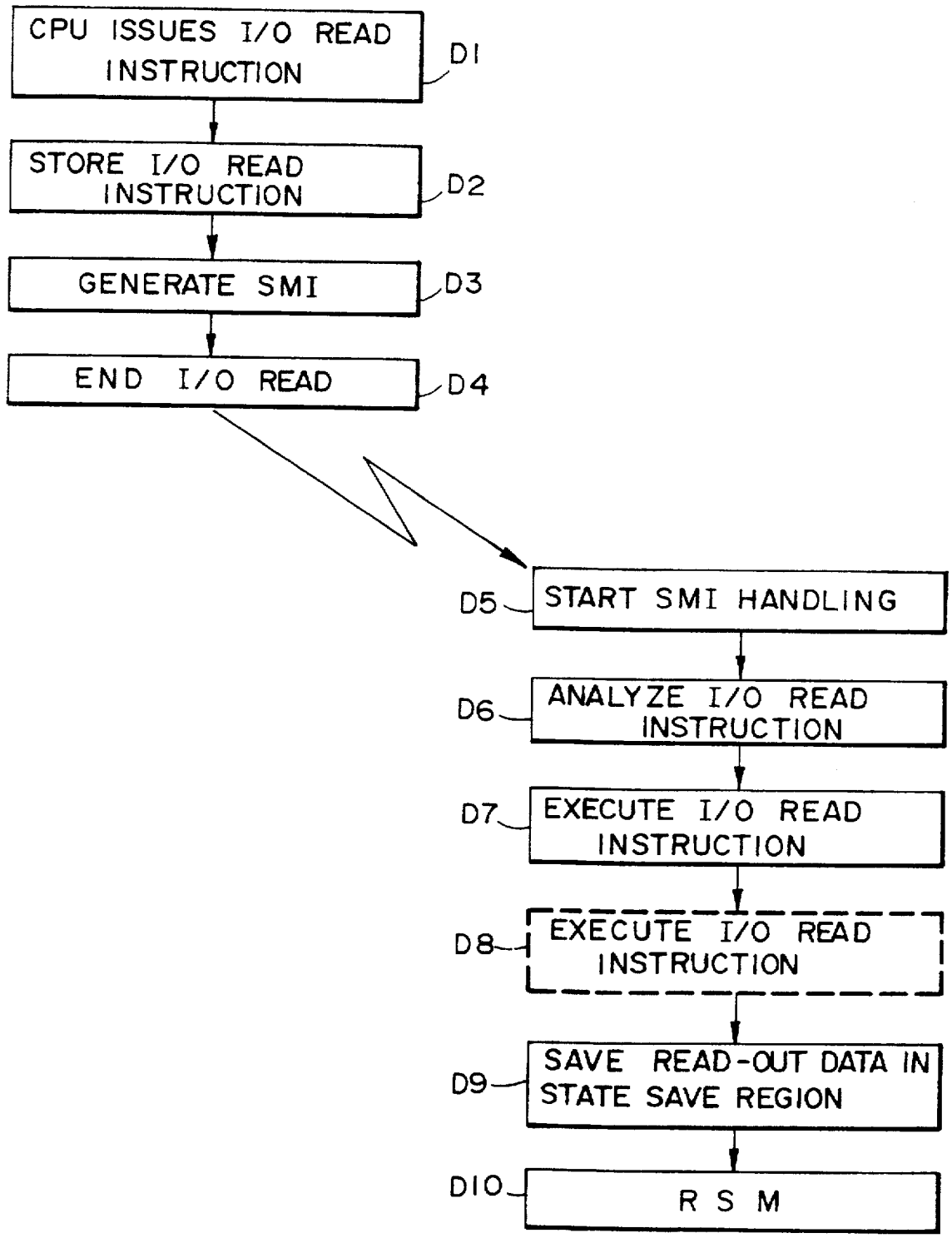
FIG. 25 is a flowchart of a fourth translation method.

Data input from the keyboard 49 is extremely complicated, because addresses are different and the input data must be completely translated. That is why the fourth translation method of FIG. 25 is used.

Flowcharts of data reception by prior-art hardware and the fourth embodiment are shown in FIGS. 48A and 48B. The processing of steps U1 to U4 determine whether or not bit 1 of the status register is 1, in other words, whether or not the system is ready for data reception (see FIG. 32C). This case differs from the prior art of FIG. 48A in that the address and data are translated by processing of a step U2. If 41h is read by the second application software when the system is ready for data reception (step U5), the SMI handling is started and the address and data are translated (step U6, and see FIG. 49). This enables the reception of keyboard input data from the 8042 (step U7).

Figure 49:
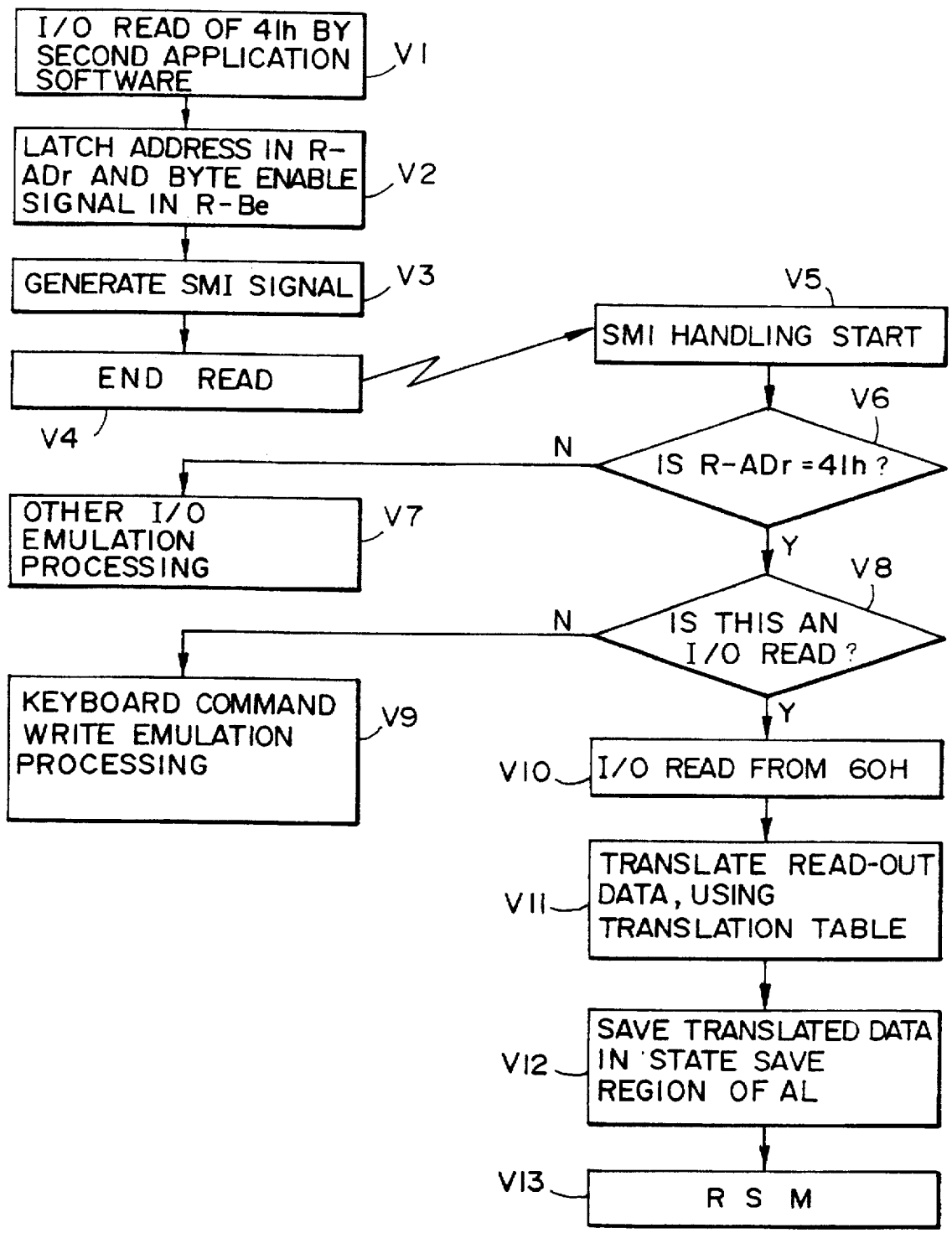
FIG. 49 is a detailed flowchart of data reception emulation processing.

The SMI handling in this case is shown in more detail in FIG. 49. The translation processing shown at 930 in FIG. 44 is executed by this SMI handling. When the SMI handler starts after steps V1 to V4 (step V5), it is determined whether or not the I/O address latched in the address latch register (R-ADr) 132 is 41h (step V6), and if the I/O address is not 41h, other I/O emulation processing is executed (step V7). Next, it is determined whether or not this is an I/O read by the bus command latched in the BE latch register R-Be 128 (step V8), and if this is not an I/O read, keyboard command write emulation processing is executed (step V9). If this is an I/O read, an I/O read from I/O address 60h is performed (step V10), then the read-out data is translated in accordance with a predetermined translation table stored in SMRAM (step V11). The data translated in step V11 is saved in a state save region allocated to the internal register AL of the CPU 1 (step V12). An RSM is subsequently issued and the internal CPU 1 register contents saved in SMRAM are returned (step V13).

As described above, reception emulation processing for data input from the keyboard is executed by this fourth embodiment. In this case, the data translated by the SMI handling is automatically returned to the internal register of the CPU 1, so that the processing is extremely simple.

4. Emulation of Status Read from Keyboard Controller

Status read emulation processing may be executed as shown at 932 in FIG. 43 by translating the I/O address from 43h to 64h, then translating the data bits. Since bits 4 and 3 (FE and OE) at 43h of the 8251A have functions that do not exist in the 8042, as shown at 934 in FIG. 44, they require emulation processing. Since a status read must be done at high speed, the third translation method of FIG. 24 is used.

Figure 50A:
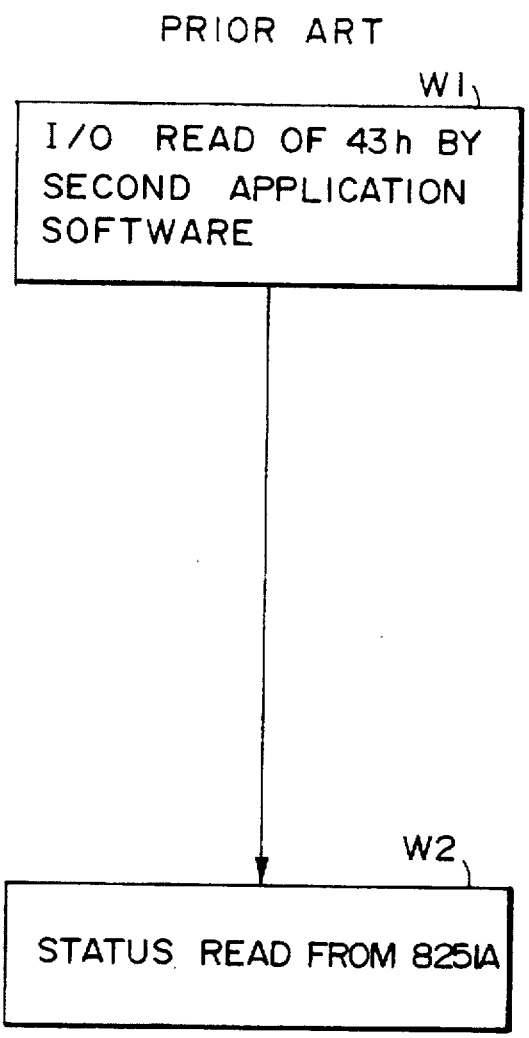
FIGS. 50A and 50B are flowcharts of status read by prior-art hardware and the fourth embodiment.
Figure 50B:
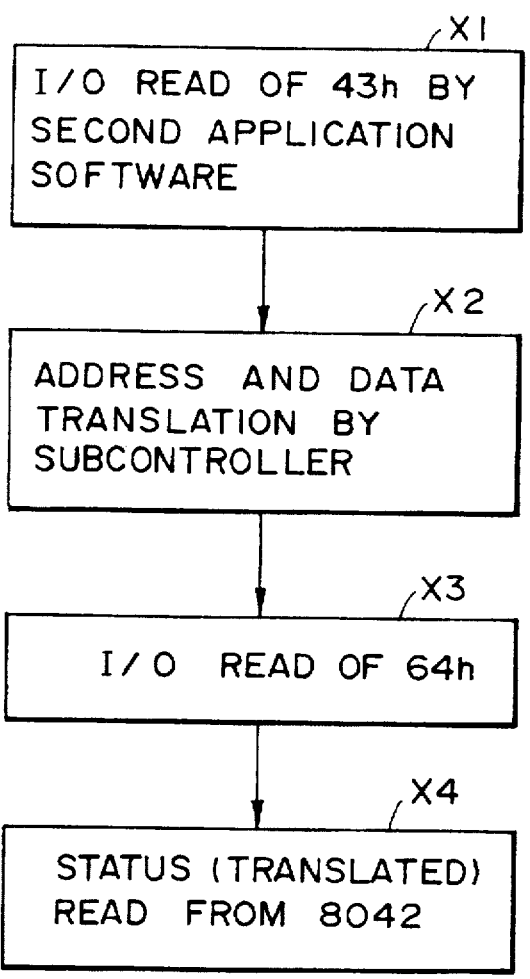

Flowcharts of status read by prior-art hardware and the fourth embodiment are shown in FIGS. 50A and 50B. As shown in FIG. 50B, this embodiment differs from the prior art example in that, if 43h is read by the second application software (step X1), the subcontroller 100 translates the address and data (step X2), and bit-translated data from the translated address 64h are read (step X3). This enables the status to be read from the 8042 (step X4).

With this fourth embodiment, the procedures of the above sections 1 to 4 enable a device control means used by the first architecture (8042) to conform to a system of the second architecture.

Fifth Embodiment

This fifth embodiment relates to the translation of interrupt vectors. To maintain compatibility, it is preferable that interrupt vectors are also subject to translation. As shown in FIG. 51, the allocation of interrupt vectors to interrupts from various I/O devices (such as a timer and keyboard) differ between the first and second architectures. This means that the interrupt controller 54 should not only translate I/O addresses, it should also translate the allocation of interrupt lines. This interrupt line translation can be implemented in a simple manner by the method described below. Means such as a selector 252 is provided in front of an interrupt control portion 250, as shown in FIG. 52B. A mode-switching signal 254 switches interrupt lines between a first (architecture) mode and a second (architecture) mode. This means that interrupt lines IRQ0 to IRQ15 can be switched to IRQ'0 to IRQ'15. However, if the interrupt event generation portion and interrupt control portion are incorporated together into a single chip, the above described method cannot be used. A chip in which the interrupt event generation portion and interrupt control portion are incorporated no longer needs external interrupt lines, and thus switching of the interrupt lines is no longer possible. However, with a hardware configuration of the first architecture, the interrupt event generation portion and interrupt control portion are incorporated into a single chip.

The fifth embodiment of the present invention translates an interrupt vector on the PCI bus 23 (or VL bus, etc.) when the CPU 1 fetches the interrupt vector in an interrupt acknowledge cycle. In this case, the generation of the interrupt acknowledge cycle by the PCI is implemented by driving the C/BE0 to C/BE3 and FRAME signals.

Figure 52A:
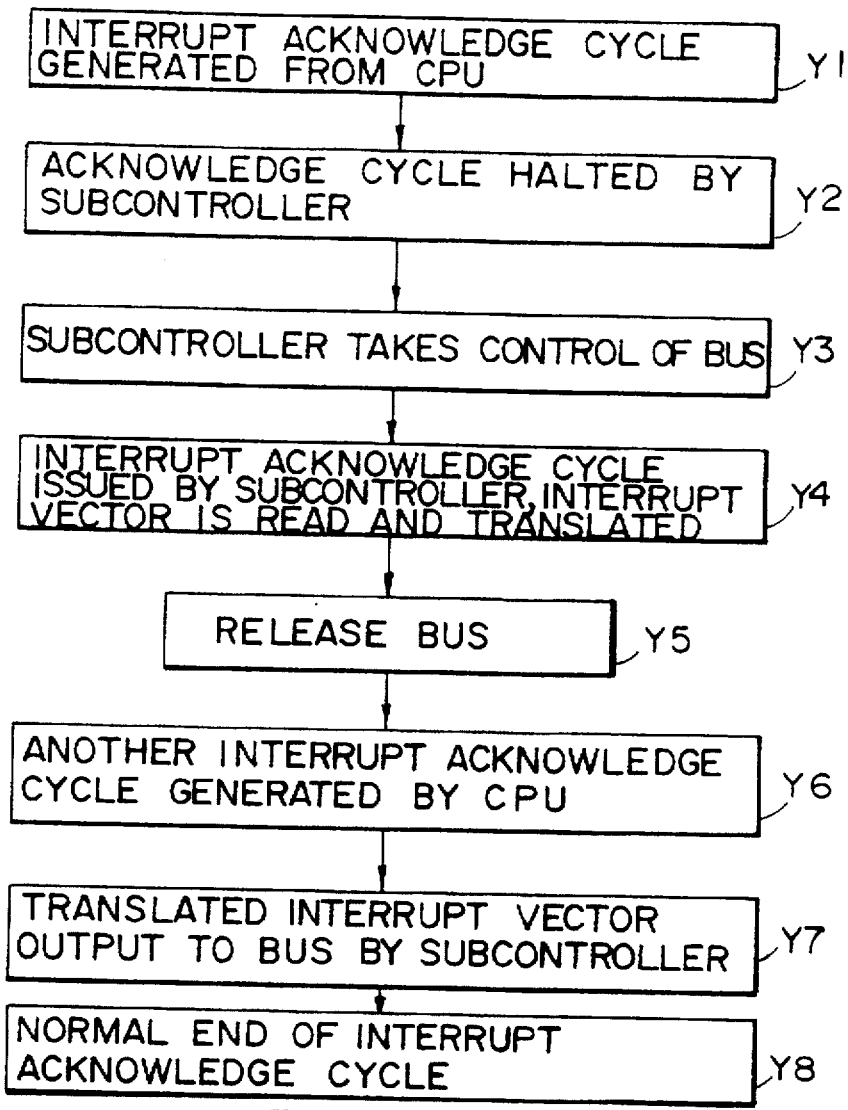
FIG. 52A is a flowchart of interrupt vector translation emulation processing and FIG. 52B is a figure illustrative of a method used to switch interrupt vectors by mode switching.
Figure 52B:
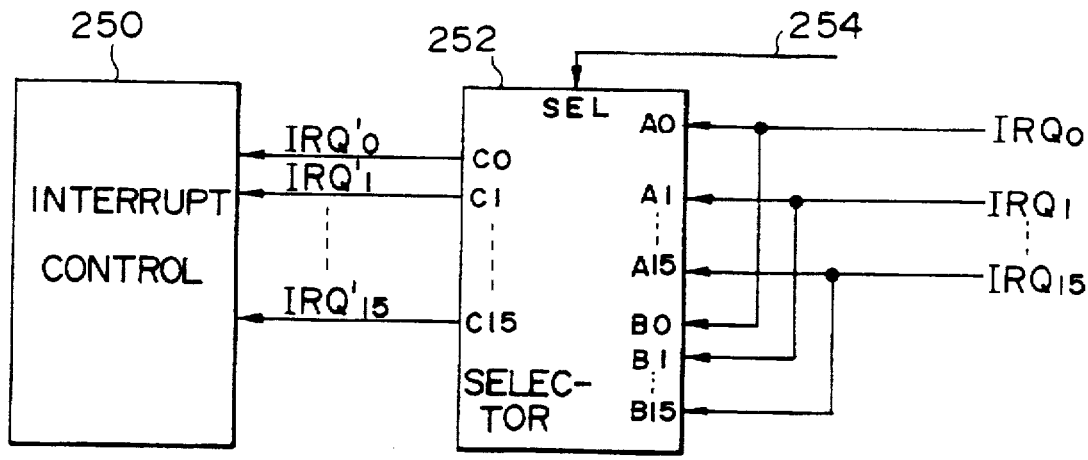

A flowchart of this emulation processing is shown in FIG. 52A and a signal waveform chart of the various signals during this processing is shown in FIG. 53. This emulation processing is similar to the third translation method of FIG. 24. When the CPU 1 generates an interrupt acknowledge cycle (step Y1), the acknowledge cycle is halted by the subcontroller 100 (step Y2). This is implemented by the subcontroller 100 asserting the STOP, DEVSEL, and TRDY signals and executing retry processing. Next, GNT-CPU is deasserted and the subcontroller 100 takes control of the bus (step Y3). The subcontroller 100 subsequently issues an interrupt acknowledge, the interrupt vector is read from the interrupt controller, and this vector is translated into the predetermined interrupt vector (step Y4). The bus is then released (step Y5) and the CPU 1 once again generates another interrupt acknowledge cycle (step Y6). By outputting the translated interrupt vector to the PCI bus 23 (step Y7), the subcontroller 100 ends the interrupt acknowledge cycle normally (step Y8).

The above processing enables the translation of an interrupt vector, without using the method shown in FIG. 52B. In this case, components such as the FDD controller of FIG. 51 are not present under the second architecture. This configuration may be used when dedicated hardware is provided in the subcontroller 100 to provide interrupt control.

Sixth Embodiment

1. Description of Overall Configuration

Figure 57B:
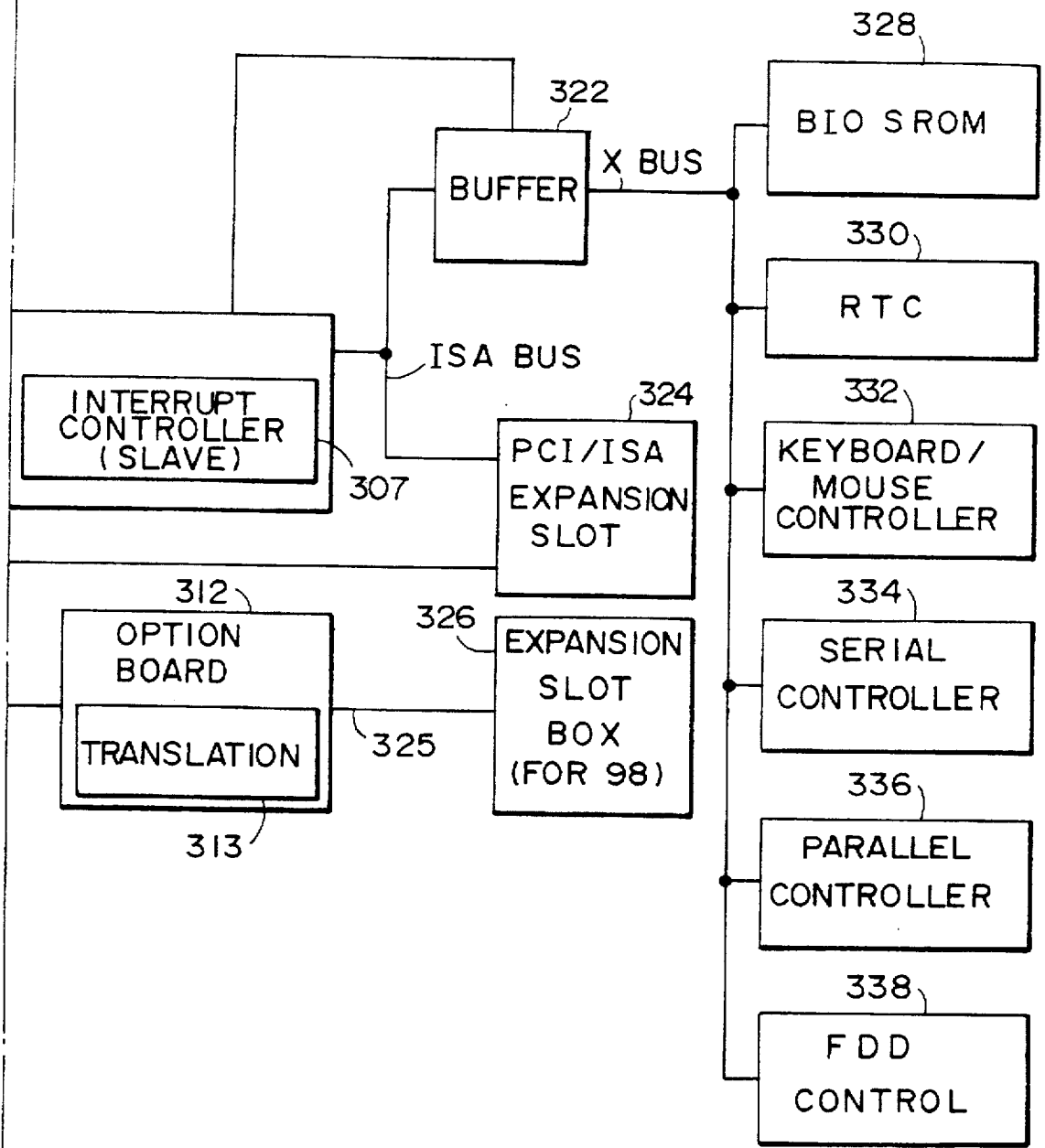
FIG. 57 comprising of FIGS. 57A and 57B shows the entire configuration of a sixth embodiment of the present invention.
Figure 58B:
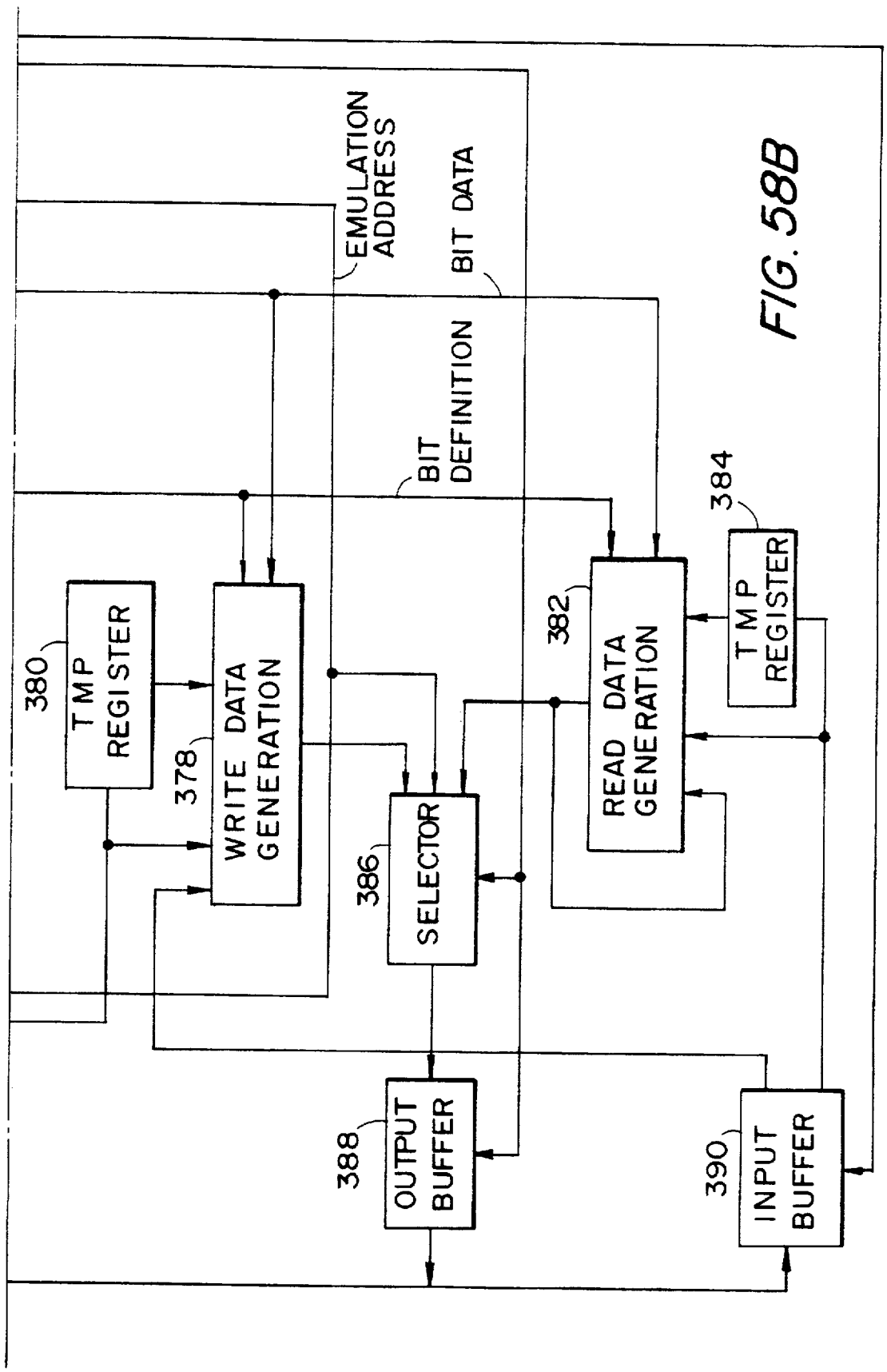
FIG. 58 comprising of FIGS. 58A and 58B shows an example of the circuit configuration of instruction translation means.

A sixth embodiment of the present invention implements compatibility with a plurality of architectures by incorporating a subcontroller into a personal computer system conforming to the first architecture (for example, an IBM PC/AT or PC/XT), and modifying the hardware slightly. The entire configuration of this sixth embodiment is shown in FIG. 57. Devices such as a PCMC 304 are connected to a CPU bus that is directly connected to a CPU 302. A subcontroller 300, SIO 310, PCI expansion slot 311, expansion video controller (also having a VGA function) 314, a 98-orientated video controller 316, and a PCI/IDE module 318 that acts as an interface for the HDD 320 are connected on a PCI bus. A buffer 322 and PCI/ISA expansion slot 324 are connected to an ISA bus, and components such as a BIOS ROM 328, RTC 330, and keyboard/mouse controller 332 are connected to an X bus. With this sixth embodiment, components such as the subcontroller 300, an option board 312, an expansion slot box 326, and the video controller 316 are added to a personal computer system based on a first architecture (hereinafter referred to as "AT machine" or simply "AT"), to implement compatibility with a plurality of architectures. The subcontroller 300 comprises an SMI generation means 340, an SMI status display means 342, an SMI mask means 344, an I/O acceptance means 346, and an instruction translation means 350, and executes emulation processing for translating instructions from the CPU 302. An example of the configuration of the instruction translation means 350 is shown in FIG. 58. This instruction translation means 350 comprises a microcode memory 370, and emulation processing is implemented based on microcode information read out of the microcode memory 370.

The subcontroller 300 outputs a FRAMES signal that masks the FRAME signal from the SIO 310, which incorporates a bridge circuit. This disables the transfer of an instruction to the device control means (such as the PCI/ISA slot 324 and the keyboard/mouse controller 332) connected to the ISA bus and X bus, when an instruction of the second architecture has been issued from the CPU 302. In other words, when the PCMC 304 connected to the CPU 302 has asserted the FRAME signal which is a PCI bus access start signal, the subcontroller 300 masks that FRAME signal (see FIGS. 60 and 61) and transfers to the SIO 310 a FRAMS signal obtained by the mask processing. When this happens, the FRAME signal is not transferred to the SIO 310, and thus the SIO 310 do not respond to the instruction from the CPU 302. This ensures that device control means on the ISA bus and X bus do not respond to an instruction of the second architecture, making it possible to implement compatibility with a plurality of architectures. The video controller 316 is used in a personal computer of the second architecture (such as a Seiko Epson PC 386 or PC 486, or an NEC PC 9801 or PC 9821, hereinafter referred to simply as a "98 machine" or a "98"). Since the video controller 316 requires complicated and rapid processing, it does not translate instructions in this sixth embodiment, and it is configured of two controllers: the AT expansion video controller 314 and the 98-orientated video controller 316. Therefore, it is necessary to prevent the 98-orientated video controller 316 from responding to an instruction of the first architecture, and conversely, to ensure that it responds to an instruction of the second architecture. In this embodiment, the subcontroller 300 outputs a FRAMEV signal for the 98-orientated video controller 316. In other words, when an instruction of the first architecture that has been translated by the emulation processing is issued, the subcontroller 300 masks the FRAME signal (see FIGS. 60 and 61) and the masked FRAMEV signal is transferred to the 98-orientated video controller 316. On the other hand, when the CPU 302 has issued an second architecture instruction, mask processing is not executed, and the FRAMEV signal is transferred to the video controller 316. This ensures that the correct instruction is transferred to the 98-orientated video controller 316, and enables compatibility with a plurality of architectures. Note that in this embodiment, the transfer of an instruction is disabled by mask processing executed on the FRAME signal, but the present invention is not limited thereto; other bus control signals may be used instead.

Figure 59:
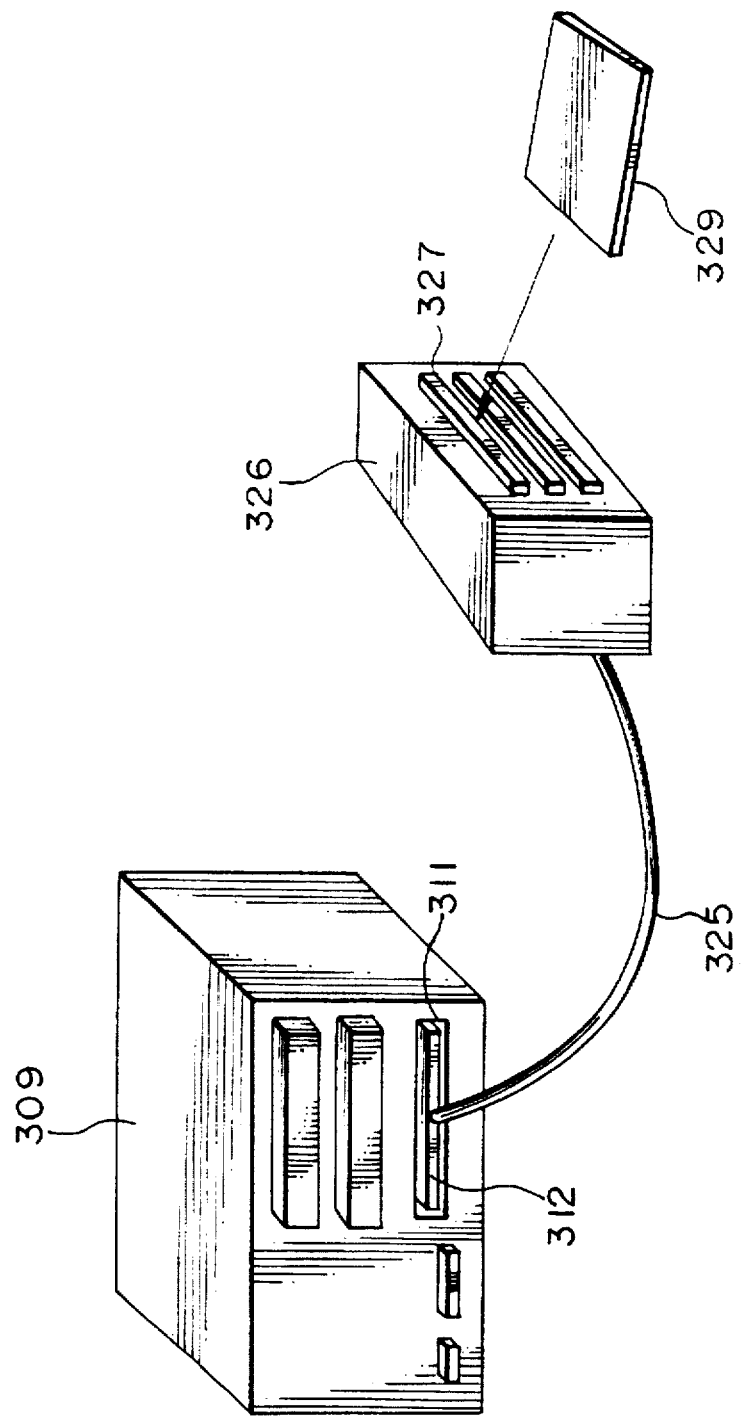
FIG. 59 shows the relationship between the main device and an expansion slot box.

The PCI expansion slot 311 is connected to the POI bus, and the option board 312 comprising a translation portion 313 can be inserted into this expansion slot. The translation portion 313 translates PCI-orientated bus signals into 98-orientated bus signals, with the translated bus signals being transferred to the 98-orientated expansion slot box 326 via a cable 325. In other words, as shown in FIG. 59, the option board 312 is inserted into the PCI expansion slot 311 provided in a main unit 309, and the translated 98-orientated bus signals are transferred to the expansion slot box 326 via the cable 325. The expansion slot box 326 is provided with a plurality of 98-orientated expansion slots 327. Therefore, if the user wishes to use an 98-orientated option board 329, it can be inserted into one of these expansion slots 327. This enables efficient use of option boards such as SCSI, memory, and LAN boards that have been developed by many manufacturers up to the present, to make optimal use of existing resources.

An AT machine is provided with a PCI expansion slot as standard. Therefore, with the configuration shown in FIG. 59, an AT machine may be used as the outer casing of the main unit 309, enabling a reduction in costs.

Note that it is necessary to make sure that, when an instruction of the first architecture has been issued, device control means and devices on the 98-orientated option board 329 do not respond to that instruction. For that reason, it is preferable that memory and I/O spaces used by this device control means are fixed using a configuration register. The option board 312 in this case has been inserted into the PCI expansion slot 311, but other configurations may be used such as one in which the configuration of the translation portion 313 is modified and the option board 312 is inserted into an expansion slot on the ISA bus or X bus.

2. Description of Operation

Figure 60:
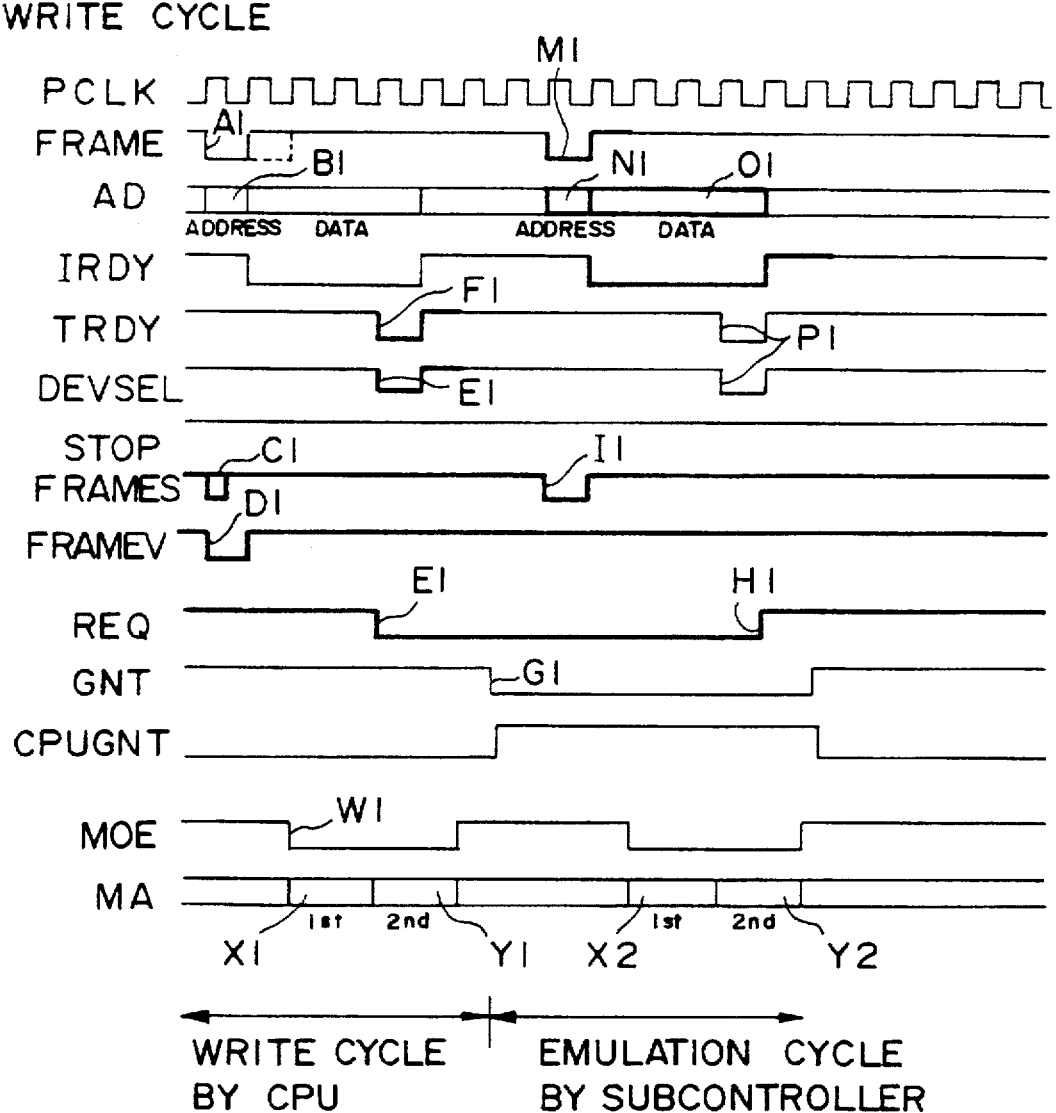
FIG. 60 is a signal waveform chart illustrating the operation of the sixth embodiment during a write cycle.
Figure 62B:
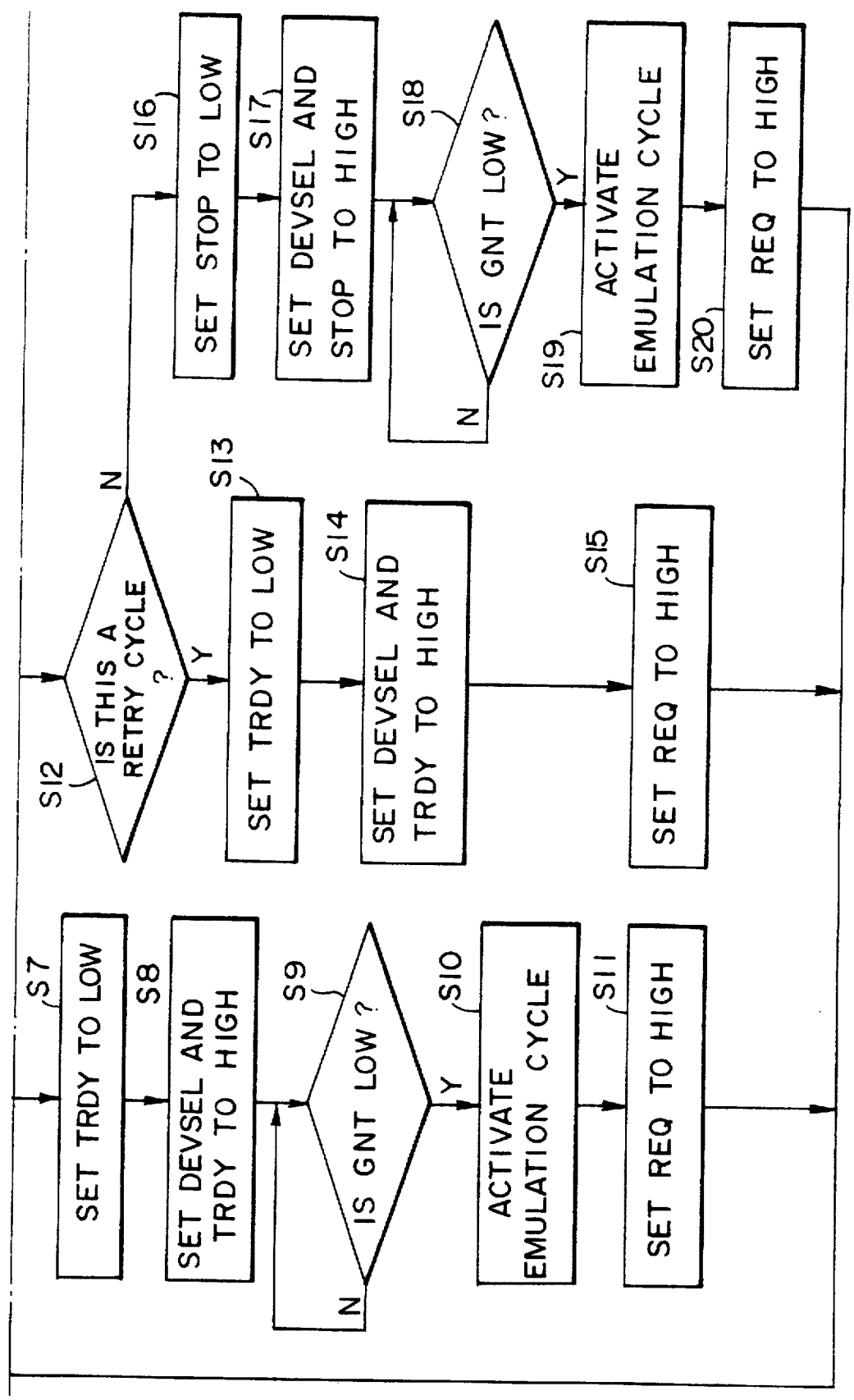
FIG. 62 is a flowchart of the operation of the sixth embodiment.

Two signal waveform charts and a flowchart for illustrating the operation of this sixth embodiment in a read cycle and a write cycle are shown in FIGS. 60, 61, and 62. The operation of this embodiment will be described below with reference to these figures. Note that bold lines in FIGS. 60 and 61 indicate periods during which the subcontroller 300 operates.

The description below takes as an example a case in which the system of this embodiment is set in 98 mode (a mode in which application programs and the OS operate under the second architecture). This means that the CPU 302 in this case issues an instruction of the second architecture. The subcontroller 300 translates this instruction into an instruction of the first architecture, and transfers it to a first device control means. First, in a step S1 of FIG. 62, it is determined whether or not FRAME is low, and, if FRAME is low (A1 of FIG. 60 or A3 of FIG. 61), it is determined whether one of the I/O read, I/O write, and interrupt acknowledge cycles is required for the issued instruction (B1 of FIG. 60 or B3 of FIG. 61). If one of these cycles is requested, the FRAMES signal is masked (C1 or C3, and step S3). This prevents the transfer of an instruction to a device control means on the ISA bus or X bus.

Note that FRAMEV is not masked in this case (D1 and D3). Therefore, if the instruction of the second architecture is directed at the video controller 316, that instruction is transferred to the 98-orientated video controller 316. Conversely, in AT mode (a mode in which application programs and the OS operate under the first architecture), not FRAMES but FRAMEV is masked.

Next, another target on the PCI bus monitors the DEVSEL signal to determine whether or not the DEVSEL signal is low (a bus control signal is asserted when low) (step S4), and the subcontroller 300 holds DEVSEL and REQ low (E1 or E3 and step S5) if the other target has not asserted the signal until slow timing (PCI has fast, medium, and slow timing) is set. For an I/O write, the cycle in which TRDY is low ends normally (F1 and steps S6 and S7), and DEVSEL and TRDY are set high (step S8). An emulation cycle is then activated when GNT is set low (G1 and step S10), and REQ becomes high when the emulation ends (H1 and step S11). Note that the FRAMES signal is not masked in an emulation cycle but the FRAMEV signal is masked. This transfers an instruction of the first architecture that has been translated by the emulation processing to the first device control means on the ISA bus or X bus. This instruction is not transferred to the 98-orientated video controller 316.

For an I/O read cycle which does not require a retry cycle (steps S6 and S12), STOP is set low (F3 and step S16), then same processing is performed in the same manner as I/O write (G3, H3, etc., and steps S17 to S20). If there is a retry cycle, the subcontroller 300 that is the target masks the FRAMES signal and sets TRDY low, then responds to the read instruction from the CPU 302 (K3, L3 and steps S13 to S15). This enables the data obtained by the emulation processing to be transferred to the CPU 302.

Figure 63:
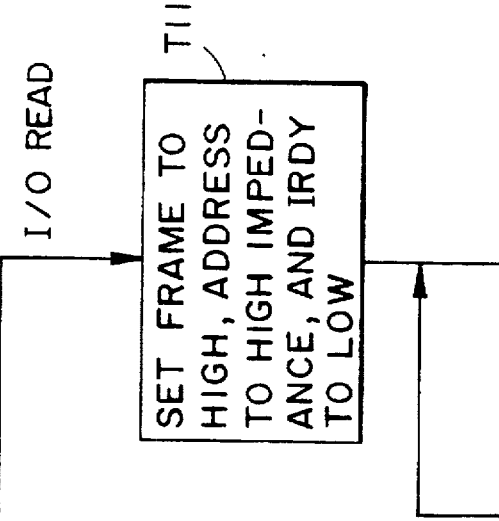
FIG. 63 is a flowchart of the operation of the emulation cycle of the sixth embodiment.
Figure 63A:
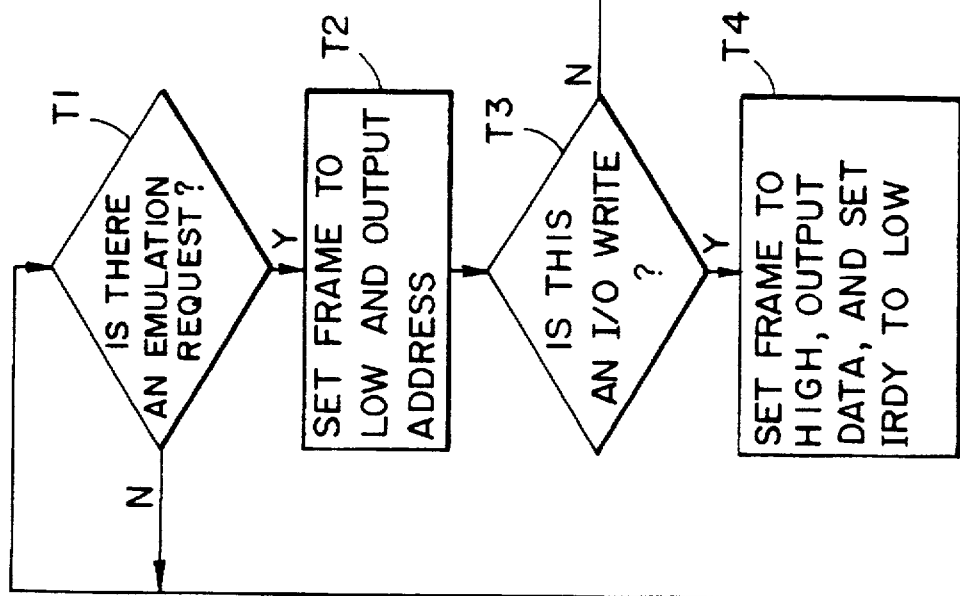

A flowchart of the emulation cycle of steps S10 and S11 of FIG. 62 is shown in FIG. 63. A step T1 first determines whether or not there is an emulation request. This is determined from an ignore bit (bit 28) and continue bit (bit 30) in command information (see FIG. 65B) that is output from the microcode memory. In other words, if the ignore bit is 1 (indicating that emulation processing is not required) and the continue bit is 0 (indicating that emulation processing is not to continue), the flow does not proceed to a step T2 onward.

Next, the subcontroller 300 sets FRAME to low to output the emulation address to the PCI bus (M1 to M4 of FIG. 60 or N1 to N4 of FIG. 61, and step T3). For an I/O write, FRAME is set high, write data is output to the PCI bus, and IRDY is set low (O1 and step T4). When the target on the PCI bus sets DEVSEL and TRDY to low, the write instruction is ended normally by the subcontroller 300 (P1 and steps T5 and T6). The IRDY goes high and the data bus is set to a high impedance state, which enables a transition to the next emulation cycle (steps T7 and T8). Note that if TRDY and STOP are both low, a target abort occurs and the same emulation cycle is repeated (steps T9 and T10).

If it is determined in step T3 that I/O read is required, FRAME goes high and the address bus is set to the high impedance state, and IRDY goes low (O3, O4, and step T11). If the target sets DEVSEL and TRDY to low (P3, P4, and steps T12 and T13), normal end occurs and the data output from the target (Q3 and Q4) is latched by the subcontroller 300 (step T14). The CPU 302 reads this latched data during a retry cycle, and the data obtained by this emulation is transferred to the CPU 302 (see R3). The other processing option is performed in a similar manner as I/O write (steps T15 to T17).

3. Description of Instruction Translation Means

The configuration of the instruction translation means 350 will now be described with reference to FIG. 58. A sequencer 352 is a circuit for timing control that outputs control signals to components such as an address decoder 360 and selector 364, and also receives status and command signals on the PCI bus and controls these signals through an output buffer 354. An address latch 356 and data latch 358 latch an address and data included in an instruction from the CPU 302. The address decoder 360 decodes the latched address and another address decoder 362 decodes an emulation address read out from the microcode memory 370. The selector 364 selects one of the outputs from the address decoders 360 and 362 and outputs it as a memory address to the microcode memory 370. The microcode memory 370 is configured of ROM and RAM, etc., and stores the microcode information at the input memory address location. This microcode information comprises command and data generation information (bit data and bit definition) and emulation address information.

Microcode information read out from the microcode memory 370 is latched by a first code latch 372 in a first cycle, then by a second code latch 374 in a second cycle. The command information latched in the first code latch 372 is transferred to the sequencer 352 via a decoder 376, and the operation of the entire circuitry is determined based on this command information. The emulation address information latched in the first code latch 372 is output to the address decoder 362, and the memory address of the microcode memory 370 is generated thereby. The emulation address information is output to the PCI through a selector 386 and output buffer 388, and this provides an address for the emulation cycle.

The data generation information (bit data, bit definition) latched into the first and second code latches 372 and 374 is output to a write data generation portion 378 and a read data generation portion 382. The write data generation portion 378 generates write data during the emulation cycle, based on bit data information, bit definition information, write data from the CPU, and data obtained from the emulation. The read data generation portion 382 generates read data during the emulation cycle, based on bit data information, bit definition information, and data obtained from the emulation. Note that TMP registers 380 and 384 temporarily latch data input from the data latch 358 and an input buffer 390.

Figure 64:
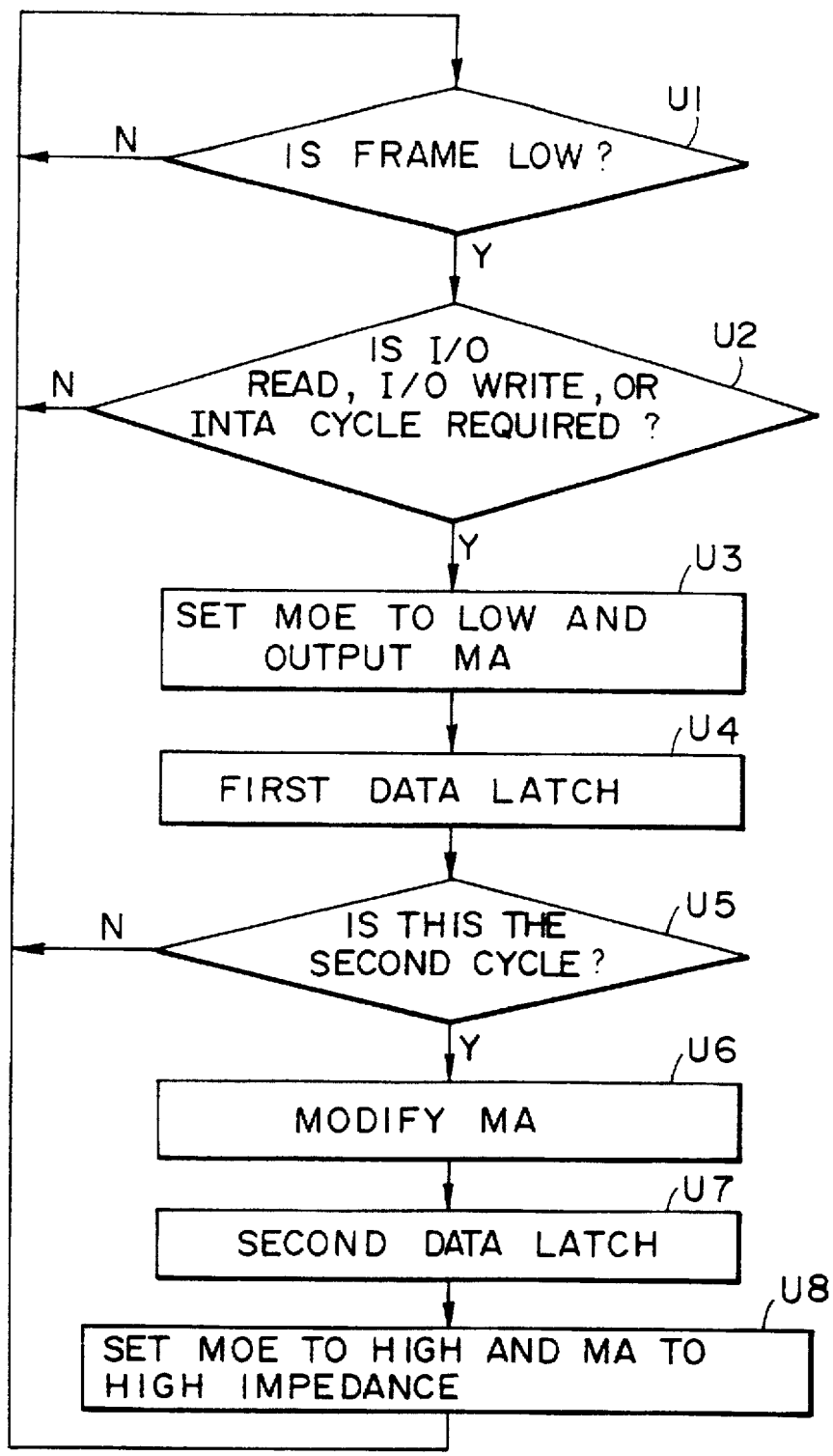
FIG. 64 is a flowchart of the operation of the instruction translation means.

The operation of the instruction translation means 350 will now be described with reference to the flowchart of FIG. 64. First it is determined whether or not FRAME is low (A1 in FIG. 60 or A3 in FIG. 61) (step U1), and if FRAME is low, it is determined whether the instruction issued by the CPU (B1 or B3) requires one of the I/O read, I/O write and interrupt acknowledge cycles (step U2). If one of these cycles is requested, the output enable signal MOE of the microcode memory 370 is set low, the memory address of the microcode memory 370 is input (W1, W3 and step U3), and the first read cycle of the microcode memory 370 starts. The memory address MA in this case is obtained by the address decoder 360 decoding the address information (B1 and B3) from the CPU. Microcode information obtained by the first read cycle (X1 and X3) is latched in the first code latch 372 (step U4). Command information included within the latched microcode information is input to the sequencer 352 through the decoder 376, and the sequencer 352 determines whether or not a second read cycle (Y1 or Y3) is necessary, based on this command information (step U5). If a second cycle is determined to be necessary, the selector 364 changes the memory address MA, based on a specification from the sequencer 352 (step U6). More specifically, this change processing is implemented by changing the cycle bit (bit 14 in FIG. 65A) of the memory address used in the first read cycle from 0 to 1. Microcode information obtained by the second read cycle is latched in the second code latch 374, then MOE is set high and MA to high-impedance (step U8). The address and data (N1 or N3 and O1 or R3) during the emulation cycle is generated on the basis of the microcode information latched in the first and second code latches 372 and 374.

In the emulation cycle, emulation address information input from the first code latch 372 through the address decoder 362 is selected by the selector 364, and a memory address in the microcode memory 370 is generated therefrom. In other words, in this embodiment, the emulation address (N3) becomes the memory address MA (X4) of the microcode memory 370 during the emulation cycle. Similarly, if a second emulation cycle is activated, this emulation address (N4) becomes the memory address MA (X5). The instruction translation means 350 repeats the above operations until emulation cycles are no longer necessary. In this case, it is determined whether or not another emulation cycle is to be activated from a continue bit (bit 30 in FIG. 65B) contained within the microcode information. In accordance with this embodiment as described above, the memory addresses for the second and subsequent emulation cycles is determined by the emulation address information contained within the previous read-out microcode information. Similarly, whether or not another emulation cycle is to be activated is determined by the command information (continue bit) of the read-out microcode information. This means that emulation cycles with different emulation addresses can be activated any desired number of times, simply by changing the emulation address information and command information (continue bit) stored in the microcode memory 370. This simplifies complicated emulation processing, and also improves the compatibility with a plurality of architectures.

4. Microcode Information Description

The microcode information stored in the microcode memory 370 will now be described with reference to FIGS.

65A to 65F. The data formats of memory addresses input to the microcode memory 370 are shown in FIGS. 65A and 65C. FIG. 65A shows the first cycle and FIG. 65C shows the second cycle, with the only difference between these two cycles being the value of the cycle bit (bit 14). EA3 to EA0 and A7 to A0 are obtained by data compression of address information or emulation address information included in the instruction from the CPU. Option bits OP0 and OP1 are used when it is required to obtain different microcode information where EA3 to EA0 and A7 to A0 are the same. In other words, different memory addresses can be output to the microcode memory 370 by making these option bits different, even when EA3 to EA0 and A7 to A0 are the same, and thus different microcode information can be obtained. The cycle bit distinguishes the first cycle from the second cycle, and the R/W bit indicates whether the activated cycle is a read cycle or a write cycle.

Microcode information output by the first cycle comprises command and data generation (bit data) and emulation address information, as shown in FIG. 65B. The emulation address information A15 to A0 and data generation information D7 to D0 are used to obtain the address and data for the emulation cycle. The immediate bit indicates whether D7 to D0 are to be used without modification as emulation data. In other words, when the immediate bit is 1, the write data generation portion 378 selects the bit data D7 to D0 from the first code latch 372. This ensures that the bit data D7 to D0 is output as emulation data through the selector 386 and output buffer 388 onto the PCI bus. The AD bit indicates that only the address is to be translated. When the AD bit is 1, only address translation is performed during the emulation, with the data from the CPU being selected without modification as emulation data. Note that, in this case, the bit data D7 to D0 is used as data for masking the data from the CPU. The TMPW bit indicates that data is stored in the TMP registers 380 and 384. The through bit indicates that the address and data are not to be translated and are to be output as is. The ignore bit indicates that the emulation cycle itself is not to be activated. When the through bit is 1, the instruction from the CPU is transferred as is to the device control means on the X bus or ISA bus. In contrast, when the ignore bit is 1, FRAMES is masked so that the instruction from the CPU is not transferred to this device control means. This makes it possible to transfer an instruction to only a device such as the 98-orientated video controller 316 alone. The INTA bit indicates special translation for the interrupt acknowledge cycle (see the description of the fifth embodiment). The continue bit indicates that another emulation cycle is to be activated; the next emulation cycle is activated when this continue bit is 1. Using this continue bit enables the emulation cycle to be activated the desired number of times. The R/W bit indicates whether the activated emulation cycle is a read cycle or a write cycle.

Bit definition information shown in FIG. 65D is used in emulation data generation processing, together with the bit data information D7 to D0 of FIG. 65B. This data generation processing is executed after the second (memory read) cycle ends. Whether or not the second cycle is to be activated is determined by bits 24, 25, 27, and 28 of the command information shown in FIG. 65B. For instance, when the immediate bit is 1, the bit data D7 to D0 is used without modification as emulation data, and thus there is no need to activate a second cycle. In this manner, this embodiment determines whether or not a second cycle is to be activated, based on command information that is read in the first cycle. This prevents the activation of unnecessary memory read cycles. This embodiment is also characterized in that data generation information is divided into bit data information that is read out in the first cycle and bit definition information that is read out in the second cycle. This means that the microcode information for both the first and second cycles can be made 32 bits long, and the output bus of the microcode memory 370 can be a 32-bit bus. This simplifies the memory control and enables the hardware to be made more compact.

Data generation processing will next be described, taking bit 7 of the emulation data as an example. If bit data D7 is 1, the table of FIG. 65E is used. In other words, if the bit 7 definition information (bits 31 to 28 in FIG. 65D) is (0000), bit 0 of the write data from the CPU or the emulation read data is allocated to bit 7 of the emulation data. Similarly, if the definition information is (0001), bit 1 is thus allocated. When the definition information is (1000), in other words, when the inversion bit is 1, the inversion of bit 0 is allocated to bit 7. Note that whether CPU write data or emulation read data is to be allocated is determined by whether this is a write cycle or a read cycle.

On the other hand, the table of FIG. 65F is used when D7 is 0, when the definition information is (0001) and (0000) bit 7 is fixed at 0 and 1, respectively. When the definition information is (0010), the previously generated emulation data is allocated. When the definition information is (0011) to (1111), the processing is as shown in FIG. 65F. Note that the decode expansion of FIG. 65F is used when mode is set by a parallel controller.

EXAMPLE 1

An example of the emulation processing performed by a serial controller in accordance with the sixth embodiment will now be described. As described above with reference to the third embodiment, an 8251A is used as serial controller in a 98 machine, whereas an NS16550A (8250A) is used in an AT machine. The I/O (port) addresses of this serial controller are 0030h to 0032h in the 98 machine or 03F8h to 03FFh in the AT machine. The I/O address of the status register of the serial controller of the 98 machine is 0032h. As shown in FIG. 66, DSR is at bit 7 of 0032h in the 98 machine, but at bit 5 of 03FEh in the AT machine. Similarly, SYNC/BRK is at bit 6 of 0032h in the 98 machine, but at bit 7 of 03FDh in the AT machine. Therefore, when the I/O port at 0032h has been read, the subcontroller 300 should read two I/O ports, at 03FEh and 03FDh. The sequence of this read will now be described with reference to FIGS. 67 and 68.

1) When 0032h is read by the CPU (see A1 of FIG. 67), the FRAME signal is asserted and the first (memory read) cycle of the microcode memory 370 is activated. During this read cycle, bit 15 (the R/W bit) in FIG. 65A is 1. Therefore, the address 0032h from the CPU is decoded by the address decoder 360 to become memory address 8032h (see B1 of FIG. 67). This memory address contains microcode information C07F03FDh (see C1). Since the command information is C0h, all of bits 24, 25, 27, and 28 (see FIG. 65B) are zero, and it is determined that data generation is necessary. This causes the second cycle to be activated. Since the memory address for the second cycle is the same as the memory address 8032h of the first cycle but with bit 14 (the cycle bit) set to 1, it is C032h (see D1). This address contains data 07312605h (see E1). As described above, the thus-obtained data C07F03FDh and 07312605h is latched in the first and second code latches 372 and 374.

2) Since there is no target on the PCI bus having the I/O address 0032h, the DEVSEL signal is not asserted. As a result, if the subcontroller 300 asserts the DEVSEL and STOP signals at the subtraction timing, the activated PCI cycle is ended by the CPU with a retry.

3) This time, an emulation cycle in which the subcontroller 300 is the master and the SIC 310 is the target is started (see F1). With the first cycle, it is clear from command information in the data C07F03FDh (see C1) latched in the first code latch 372 that this is a read cycle (bit 31 Of FIG. 65B is 1), the next emulation cycle (bit 30 is 1), and the emulation address is 03FDh (bits 15 to 0). This 03FDh is the I/O address for the AT machine that corresponds to 0032h with the 98 machine, as shown in FIG. 66. The emulation data is generated by the read-out bit data information 7Fh for the first cycle (see C1) or the read-out bit definition information 07312605h for the second cycle (see E1), together with the emulation read data 61h that has been read by the read operation on 3FDh (see G1). In other words, bit data information and bit definition information are input from the first and second code latches 372 and 374 to the read data generation portion 382, and emulation read data is input from the input buffer 390. The read data generation portion 382 generates the emulation data from this information. This generation method is shown in FIG. 68. Since bit 7 indicates that the bit data information and the bit definition information is 0, 0 is allocated, from the table of FIG. 65F. Since bits 6 to 0 indicate that the bit data information is 1 and the bit definition information is 7, 3, 1, 2, 6, 0, and 5, bits 7, 3, 1, 2, 6, 0, and 5 of emulation read data 61h are allocated, from the table of FIG. 65E. This means that the generated emulation data is 07h. This value of 07h is held in the read data generation portion 382 for the next emulation data generation.

4) At the same time as the operation of the above procedure 3, the microcode memory read cycle for the next emulation cycle is activated. The memory address 81FDh (see H1) this time is generated from the emulation address 03FDh (see I1). In this case, the upper 8 bits of the memory address of this embodiment are encoded as 4 bits (bits EA3 to EA0 in FIG. 65A), in order to reduce the volume of microcode memory used. Thus the upper byte 03h of the emulation address is encoded as 1h, so that, as a result, the memory address becomes 81FDh. The data 808003FEh is stored at this address (see J1). Since the command information is 80h and hence all of bits 24, 25, 27, and 28 are 0, emulation data generation is necessary and a second cycle is activated. This time, the memory address is C1FDh (see K1). This address contains the data 52222222h (see L1).

5) The subcontroller 300 then activates the second emulation cycle. It is clear from the command information 80h of 808003FEh (see J1) that this cycle is the final emulation cycle (bit 30=0), and it is a read cycle (bit 31=1) with respect to I/O address 03FEh (bits 15 to 0). The emulation data is generated from the bit data information 80h (see J1), the bit definition information 52222222h (see L1), the emulation read data 20h from I/O address 03FEh (see M1), and the previously generated emulation data 07h. This generation method is shown in FIG. 68. Since bit 7 indicates the bit data information is 1 and the bit definition information is 5 (0101), bit 5 of the emulation read data 20h is allocated to bit 7, from the table of FIG. 65E. Since bits 6 to 0 indicate that the bit data information is 0 and the bit definition information is 2 (0010), bits 6 to 0 of the previously generated emulation data 07h are allocated, from the table of FIG. 65F. This 07h is held in the read data generation portion 382. This generates the emulation data 87h.

6) When the second emulation cycle of the above procedure 5 ends, the subcontroller 300 deasserts the REQ signal and transfers the bus access right to the CPU. This causes the CPU to retry the read instruction of 0032h (see N1). The subcontroller 300 outputs the emulation data 87h (see O1) obtained by the above procedure 5, for the read instruction. The above processing enables the CPU to read emulated data.

EXAMPLE 2

Two 8259A chips are used as interrupt controllers in the 98 machine, with the master interrupt controller having I/O addresses 0000h and 0002h. Similarly, two 8259A chips are used in the AT, but with the master I/O addresses being 0020h and 0021h. The allocation of interrupt events with respect to interrupt lines (interrupt vectors) also differs between the 98 and the AT, as shown in FIG. 69A. Interrupt controllers 305 and 307 are incorporated into the SIO 310 with the AT machine. Therefore, as described above with reference to the fifth embodiment, the allocation of interrupt events with respect to interrupt lines can not be changed by hardware means. In this case, emulation processing is necessary to swap IRQ2 and IRQ7 (swap the location of the slave).

As shown in FIG. 69B, access to registers in the 8259A differs according to the state at that time, even with the same I/O address. For example, the state at that point determines whether access is to the IRR or the ISR, even when the read is performed for the same I/O address 0000h (98 machine). An initialization sequence is necessary immediately after a reset, and four initialization command words ICW1 to ICW4 are set in sequence therefor. The IRR and ISR are registers which notify the current interrupt state in order to notify the interrupt mask register (IMR) is used to set an interrupt mask. Three operation command words OCW1 to OCW3 are commands that can be sent to the 8259A after the initialization sequence. Swap processing for IRQ2 and IRQ7 is necessary with ICW3, OCW1, OCW2, IRR, ISR, and IMR because the allocation of interrupt events with respect to interrupt lines differs between the 98 and AT machines. The sequence in such a case will now be described with reference to FIGS. 70 and 71.

1) After a reset, the 8259A is in a state in which it can receive ICW1, and thus the application program (or OS) first writes 0000h to ICW1. The write data from the CPU at this point is 11h which is the same in both the 98 and AT machines. The memory address for the first cycle in this case is 0000h, and the data 00FF0020h (see P1 of FIG. 70) is stored at this address. Since the command information is 00h, a second cycle is activated, with the memory address of the second cycle being 4000h. This memory address contains the data 76543210h (see Q1 of FIG. 70). The emulation data is generated at this point by the write data generation portion 378 from the bit data information FFh from the first code latch 372, the bit definition information 76543210h from the second code latch 374, and the CPU write data 11h from the data latch 358. In this case, all the bits of the bit data information are 1, so the bit definition information is 7, 6, 5, 4, 3, 2, 1, and 0, as shown in FIG. 71. This figure also shows that the emulation data is therefore exactly the same as the CPU write data. This means that, only the address is changed to 0020h. The emulation data 11h which is equivalent to the CPU write data is written (see R1 of FIG. 70). In other words, since no swap processing for IRQ2 and IRQ7 is necessary with ICW1, only the I/O address is translated.

2) When ICW1 is set, the application program then sets ICW2. The CPU write address is 0002h and the data is 08h. The memory address this time is 0002h and the obtained data is 02FF0021h. Since the command information 02h and the AD bit (bit 25 in FIG. 65B) is 1, only address translation is performed. Therefore, no second cycle is activated. This causes a write of the data 08h to I/O address 0021h in an emulation cycle (see S1 of FIG. 70). In this manner, this embodiment divides the reading of microcode memory into two cycles, and, since whether or not a second memory read cycle is to be activated is determined based on the command information (AD, immediate, through, and ignore bits) contained within the microcode information that is read out first, the activation of unnecessary memory read cycles is prevented. In other words, the above procedure 1 requires two memory read cycles in order to execute the processing translates only the address, but not the data. The use of the AD bit in procedure 2 reduces the processing to one memory read cycle.

Figure 72:
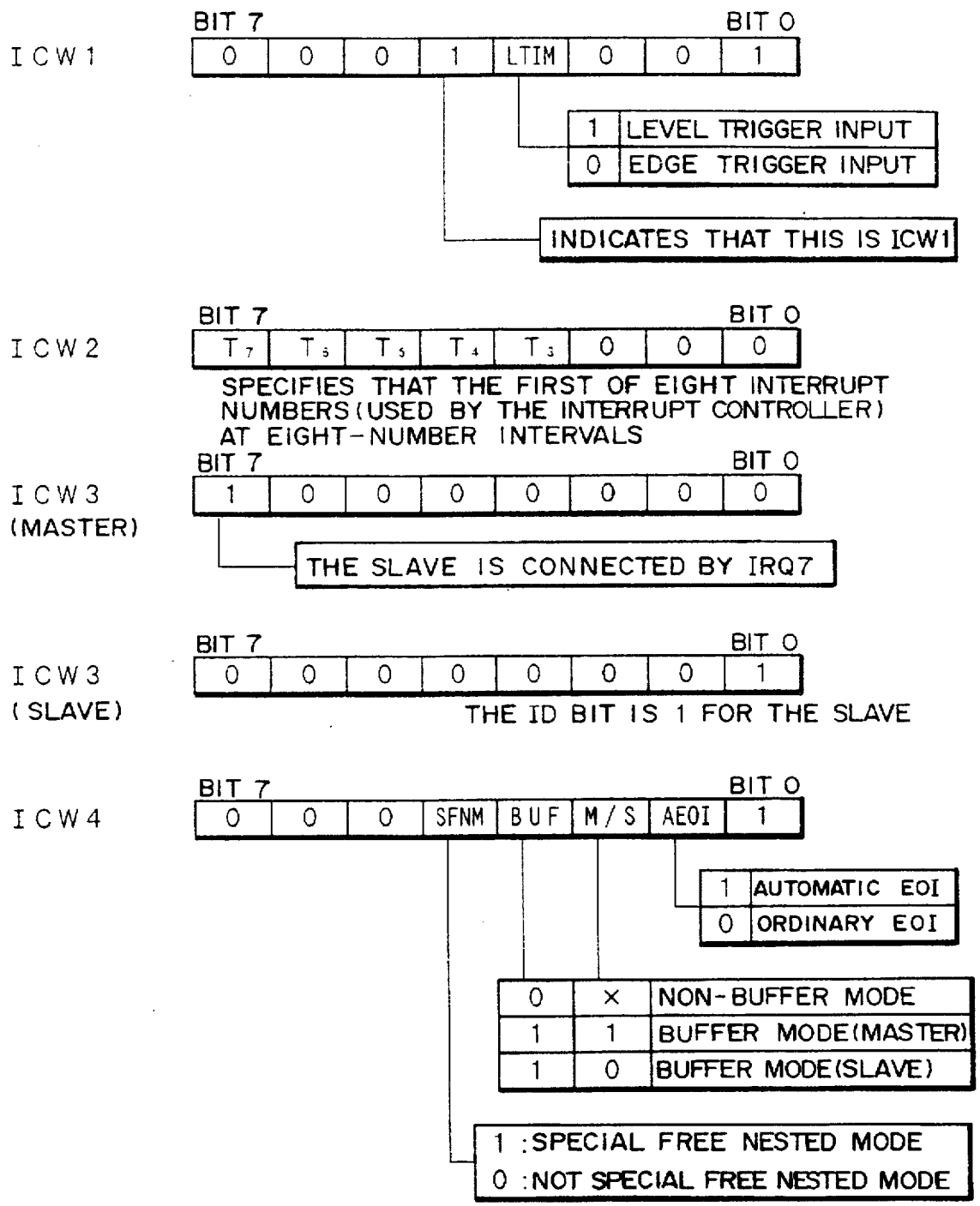
FIG. 72 is a figure illustrative of ICW1 to ICW4.

3) ICW3 is set next. ICW3 determines the slave location, therefore a 98-orientated application program writes 80h to 0002h. This is because the location of the slave can be set to IRQ7 by setting bit 7 of ICW3 to 1 (80h) as shown in FIG. 72. However, the slave location in an AT machine is at IRQ2 (see FIG. 69A), and this cannot be changed by hardware translation. Thus it is necessary to have emulation processing that writes 04h (bit 2 is 1) during the setting of ICW3. In this case, the memory address is 0002h. However, in the above procedure 2, the address is also 0002h for the setting of ICW2. Therefore, if the memory address is set to the same 0002h as in the above procedure 2, the same microcode information is read out, and thus the emulation processing can no longer distinguish between ICW2 and ICW3. That is why the option bits (bits 12 and 13 in FIG. 65A) are used in such a case. To be specific, 2002h is generated as the memory address when OP1 is 1, and the data 01040021h is stored at this memory address. Since the command information in this case is 01h with the immediate bit being 1, the data generation information D7 to D0 is used without modification as the emulation data. This means that bit data information 04h is written without modification to address 0021h (see T1 of FIG. 70). No second cycle is activated.

4) ICW4 is set at the end of the initialization sequence. The I/O address of ICW4 is 0002h. However, the write data is 1Dh with a 98 machine, but with an AT machine, bit 3 is 0 and bit 2 is 0 (because it is in non-buffer mode. It is also necessary in this case to distinguish between memory addresses used in the emulation of ICW2 and ICW3, and more particularly memory address 3002h is read with both OP1 and OP0 being 1. The data 02F30021h is stored at this memory address. In this case, the command information is 02h and the AD bit is 1, and also the bit data information D7 to D0 is F3h. Therefore, as shown in FIG. 71, bits 7 to 4 and bits 1 and 0 are the same as those of the CPU write data, and emulation data in which bits 3 and 2 are 0 is generated. This ensures that data 11h is written to I/O address 0021h in the emulation cycle (see U1 of FIG. 70).

5) The 8259A then enters ordinary operating mode. OCW1 is a command that releases the interrupt mask, and it is necessary to write 7Fh to address 0002h to enable slave interrupts. This time, OP0 is 1 and the memory address is 1002h. The data 00FF0021h is stored at this memory address. In this case, a second cycle is activated because the command information is 00h. The memory address of the second cycle is 5002h and the data it contains is 26543710h. Since the bit data information is FFh and the bit definition information is 26543710h, processing whereby bits 2 and 7 are swapped as shown in FIG. 71 is performed. This writes FBh to address 0021h (see V1 of FIG. 70). OCW1 shown in FIG. 73 enables the IRQ7 to interrupt if bit 7 is 0, or the IRQ2 to interrupt if bit 2 is 0. To enable slave interrupts, a 98-orientated application program assumes that the destination of the instruction is a 98 machine writes data 7Fh (IRQ7 is enabled by bit 7 being 0). The emulation system of this embodiment then translates this 7Fh into FBh (where IRQ2 is enabled by bit 2 being 0) and transfers it to the hardware of the AT machine. This enables a 98-orientated application program to operate on an AT machine, and thus enables compatibility.

6) OCW2 is a command used to issue an end of interrupt (EOI) during interrupt handling. When EOI is issued for a slave, the application program writes data 67h to I/O address 0000h. This becomes an instruction that causes the IRQ7 interrupt to end, but with an AT machine it should cause the IRQ2 interrupt to end. Therefore it is necessary to translate the data to 62h. The memory address of the first cycle is the same 0000h as that of the above procedure 1, and the data obtained thereby is 00FF0020h. On the other hand, OP0 is 1 and the memory address is 5000h in the second cycle, and the data obtained thereby is 76543A18h. Since the bit data information is FFh, the table of FIG. 65E is used. Thus the CPU write data is allocated without modification to bits 7 to 3 and bit 1 of the emulation data, as shown in FIG. 71. However, since the inversion bits for bits 2 and 0 are 1, bits 2 and 0 of the CPU write data are inverted. The above procedure writes 62h to I/O address 0020h (see W1 of FIG. 70).

7) IMR is a port for reading mask information written by OCW, and its I/O address is 0002h. Thus the memory address is 8002h and the data obtained thereby is 80FF0021h. The memory address for the second cycle is C002h and the data obtained thereby is 26543710h. Since the command information is 80h, this is a read cycle, and the data FBh (see X1 of FIG. 70) read out from I/O address 0021h is input to the read data generation portion 382. The emulation data is generated from this read data FBh, the bit data information FFh, and the bit definition information 26543710h. In this case, processing to swap bits 7 and 2 is performed as shown in FIG. 71, to obtain emulation data 7Fh. During a retry, the CPU reads this 7Fh (see Y1 of FIG. 70).

IRR and ISR are ports for reading request information and service information for interrupts, and the translation processing method used therefor is the same as that for IMR. In this manner, a 98-orientated application program can operate on an AT machine.

Seventh Embodiment

Extremely complicated processing is required for translating input data from a keyboard (hereinafter called "keyboard data") and input data from a mouse (hereinafter called "mouse data") from a format that conforms to a first architecture into a format that conforms to a second architecture. In such a case, emulation processing is performed by an SMI handler, without using microcode memory, as described above with reference to the fourth embodiment. This seventh embodiment performs this translation processing.

Figure 74A:
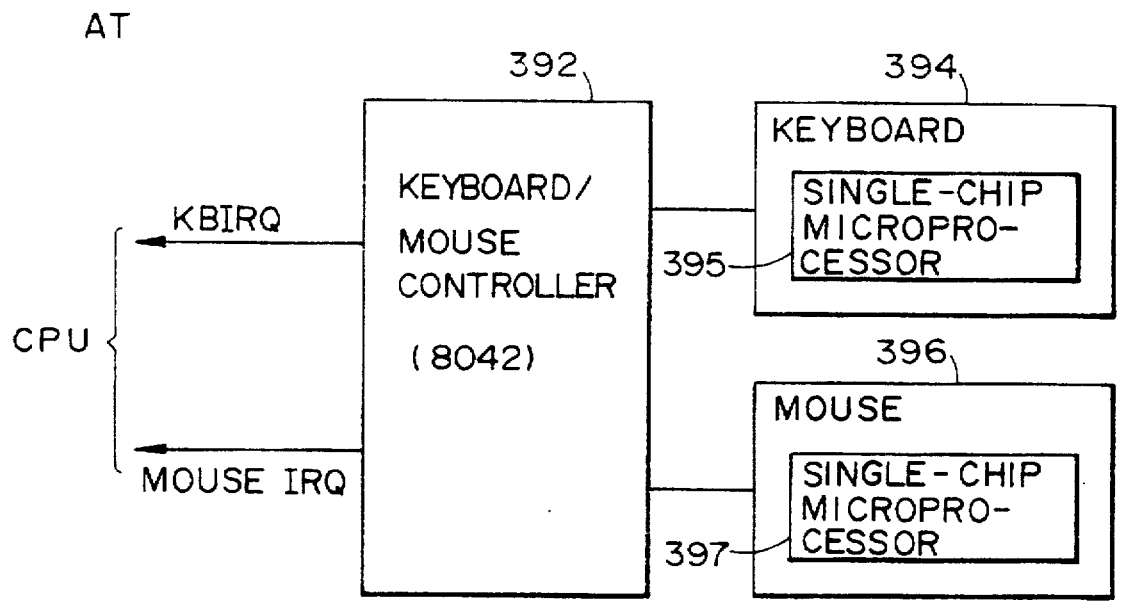
FIGS. 74A and 74B are figures illustrative of a keyboard controller and a mouse controller.
Figure 74B:
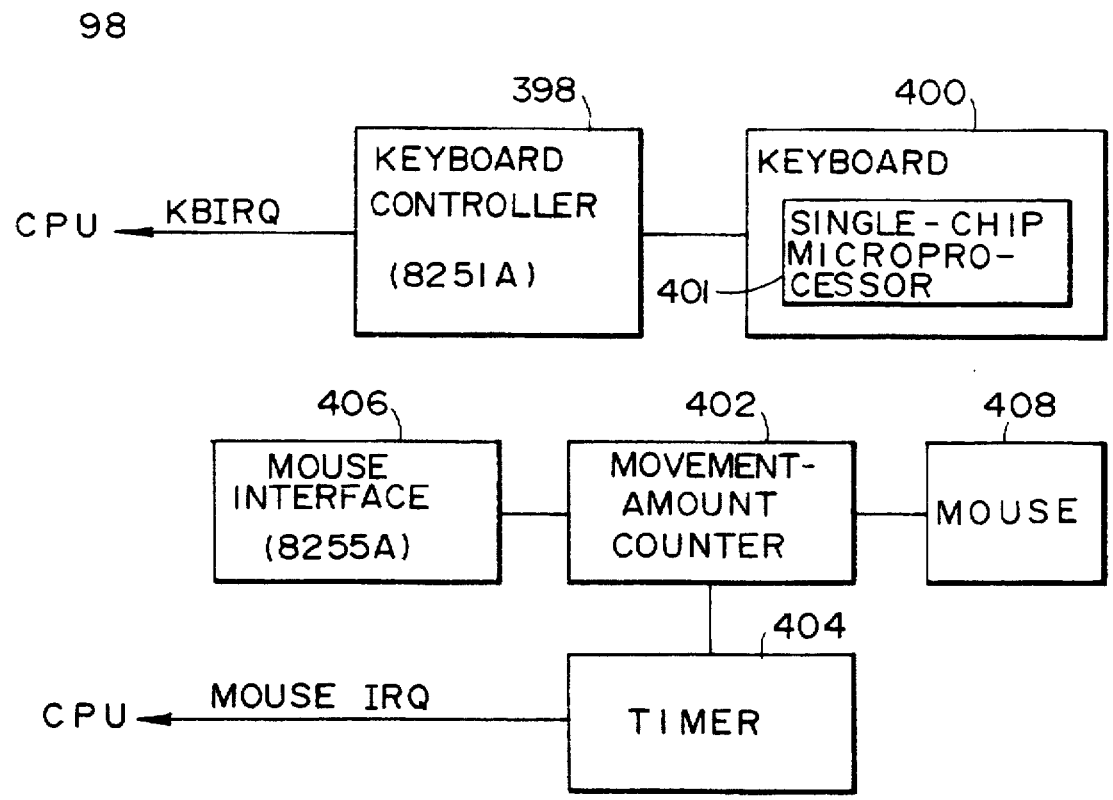

The description first deals with emulation processing for reading keyboard data. With an AT machine, a single-chip microprocessor (an 8042) is used as a keyboard/mouse controller 392 that provides serial communication between the CPU and a single-chip microprocessor 395 within a keyboard 394, as shown in FIG. 74A. Two ports are used for data communication between the CPU and the keyboard/mouse controller 392. The I/O addresses of these ports are 0060h and 0064h, with the port at 0060h being a data port and the port at 0064h being a command and status register port. With an 98 machine, a serial controller (an 8251A) is used as a keyboard controller 398 that provides serial communication between the CPU and a single-chip microprocessor 401 within a keyboard 400, as shown in FIG. 74B. In the same manner as the AT machine, two ports are used for data communication between the CPU and the keyboard controller 398, but the 8042 commands and the 8251A commands are completely different. In both the AT and the 98, an interrupt is generated when a key on the keyboard is pressed, and a read instruction issue request is posted to the CPU. The data is read by the CPU, and then the interrupt is cleared.

Figure 75:
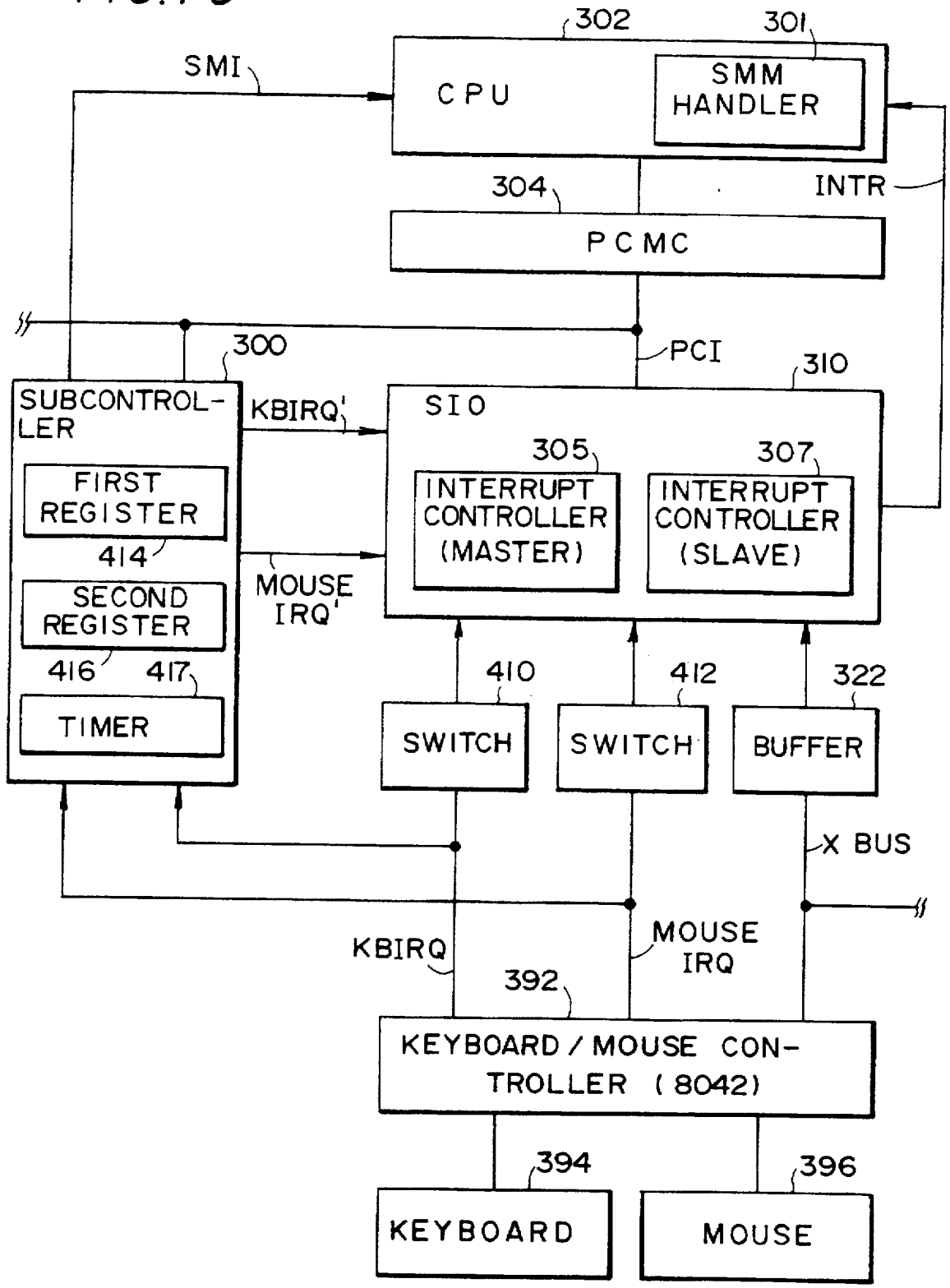
FIG. 75 shows the configuration of a seventh embodiment.

The configuration and operation of this seventh embodiment will now be described with reference to FIG. 75. When a switch means 410 turns on and a KBIRQ interrupt is generated thereby in AT mode, an INTR interrupt is generated for the CPU 302, under the control of interrupt controllers 305 and 307. On the other hand, when the switch means 410 turns off and a KBIRQ interrupt is generated in 98 mode, the subcontroller 300 accepts the interrupt and generates an SMI for the CPU 302. When an SMM handler (SMI BIOS) 301 activated by the SMI determines that the SMI event is from the keyboard, it reads keyboard data from the keyboard/mouse controller 392. This clears the KBIRQ interrupt from the keyboard/mouse controller 392. The formats of keyboard data (make data, break data, key code table, etc) are completely different in the AT and 98. This means that the SMM handler 301 uses a predetermined translation table to translate the data read from the keyboard/mouse controller 392. The SMM handler 301 then writes the translated data to a first register 414 in the subcontroller 300. When data is written to the first register 414, the subcontroller 300 generates a KBIRQ' interrupt for the SIO 310. This causes an interrupt controller within the SIO 310 to generate an INTR interrupt and posts a read instruction issue request to the CPU 302. At this point, the SMI handling ends. Since an INTR interrupt has been generated, the CPU 302 (98-orientated application program) goes on to read the data register of the keyboard/mouse controller 392. The I/O address of this data register is translated by the subcontroller 300 into the I/O address of the first register 414. This allows the CPU 302 to read keyboard data that has been translated for 98 use. When the first register 414 is read, the KBIRQ' interrupt is cleared.

As described above, keyboard data that has been translated into 98 format is read out from the keyboard/mouse controller 392 which is a device control means for an AT.

The description now turns to emulation processing relating to reading mouse data. With an AT, serial communication between the keyboard/mouse controller 392 and a single-chip microprocessor 397 in a mouse 396 is performed as shown in FIG. 74A. When the operator moves the mouse, a mouse IRQ interrupt is generated. With a 98, a mouse (bus mouse) 408 is connected to a movement-amount counter 402, the movement-amount counter 402 counts units of movement of the mouse, then this count is transferred to the CPU 302 through a mouse interface (8255A) 406. A timer 404 generates mouse IRQ interrupts at predetermined intervals (8 ms to 64 ms). Thus the CPU 302 reads out the count obtained by the movement-amount counter 402 within the above described predetermined interval, every time an interrupt is generated. This transfers the amount that the mouse has moved to the CPU 302.

Figure 76A:
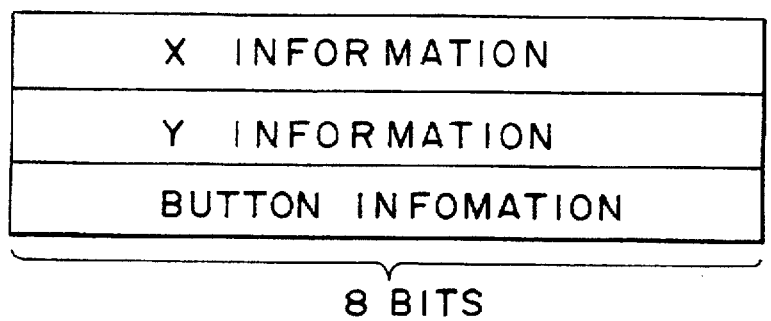
FIGS. 76A, and 76B show data formats for mouse data.
Figure 76B:
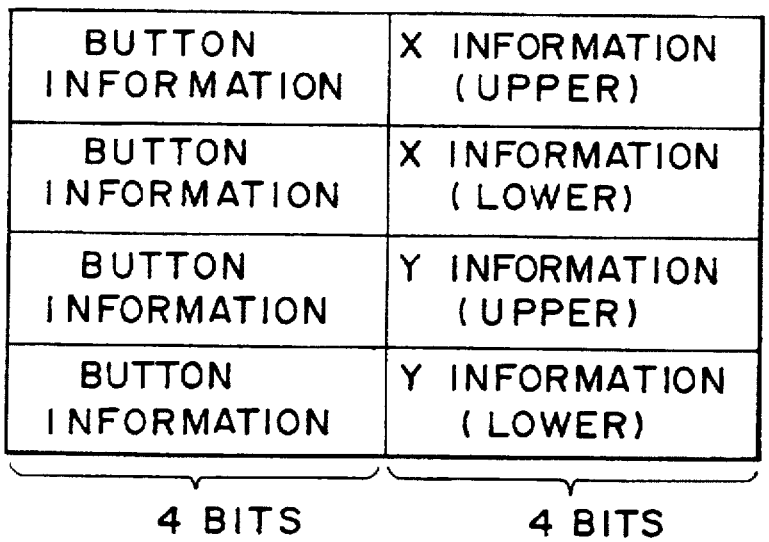

The operation of translating the mouse data in accordance with this embodiment will now be described. A switch means 412 turns on in AT mode but off in 98 mode. When the mouse 396 moves and a mouse IRQ interrupt is generated from the keyboard/mouse controller 392, the subcontroller 300 receives this interrupt and generates an SMI for the CPU 302. The SMM handler 301 activated by the SMI determines that this SMI event is a mouse event, and reads mouse data from the keyboard/mouse controller 392. This clears the mouse IRQ interrupt. The SMM handler 301 then translates the mouse data into 98 format. As shown in FIG. 76A, the mouse data in the AT is configured of 8 bits each of X information, Y information, and button information. In contrast, the data format for the 98 comprises groups of 4 bits, as shown in FIG. 76B. This requires processing that converts the data into a form that the 98-orientated application program can read. Translation processing relating to mouse sensitivity is also necessary.

The SMM handler 301 then writes the translated data to a second register 416 in the subcontroller 300. A timer 417 is incorporated in the subcontroller 300, and a mouse IRQ' interrupt is generated at predetermined intervals determined by this timer 417. Each of these interrupts cause the CPU 302 (98-orientated application program) to read in the amount of movement of the mouse, but since the I/O address has been changed, it is the data stored in the second register 416 that is read. This enables the mouse data translated for the 98 to be read by the CPU 302.

Eighth Embodiment

An eighth embodiment of the present invention relates to an emulation system that provides a subcontroller on the CPU bus. The reasons why such an emulation system is necessary are described below.

1) In order to increase the market value of this emulation system, it is preferable to have a system in which compatibility with a plurality of architectures can be implemented by simply installing an option board containing a subcontroller in the main unit. However, there are problems when it comes to implementing such an emulation system, as described below. In other words, as described above with respect to the sixth embodiment, an emulation system that provides a subcontroller 300 on the PCI bus must mask the FRAME signal in such a manner that an instruction from the CPU is not transferred to a device control means on an ISA or X bus. However, it is not possible to mask the FRAME signal with an emulation system that implements compatibility with a plurality of architectures by simply installing an option board into the main unit of the AT. In addition, an SMI signal is necessary for the emulation provided by SMI handling, but there is no terminal in a PCI expansion slot for extracting the SMI signal.

Figure 77A:
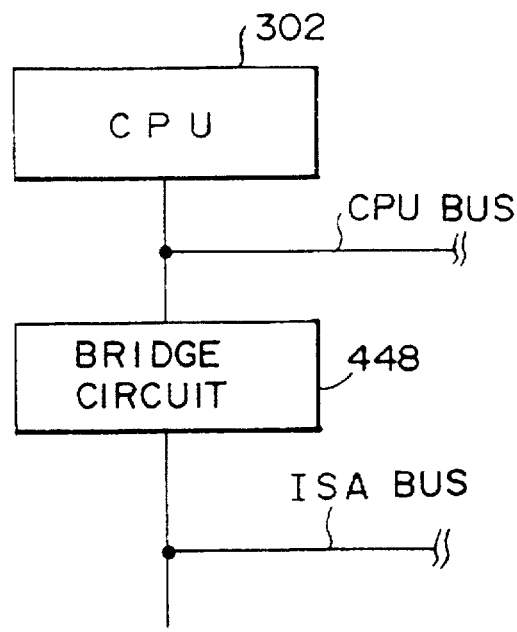
FIGS. 77A and 77B are figures illustrative of the relationships between a CPU, buses, and bridge circuits.
Figure 77B:
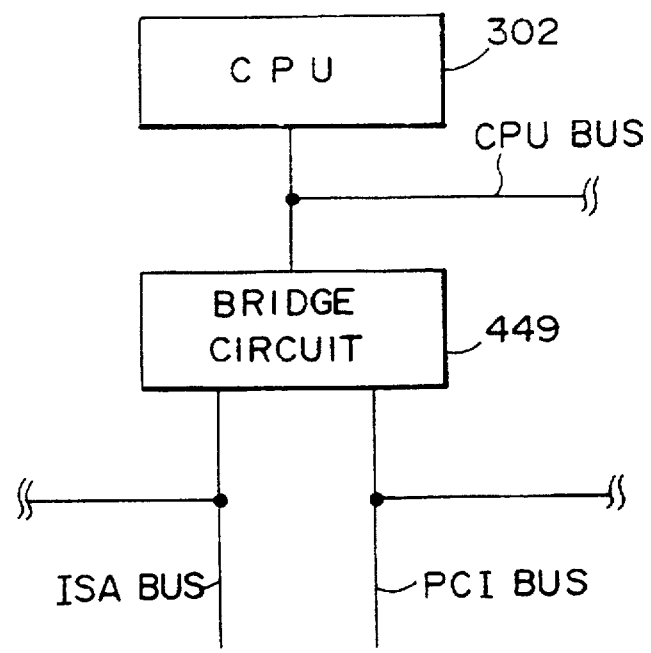

2) The 486 and Pentium chip sets have been developed for inexpensive applications and notebook PCs, so it is often the case that emulation on the PCI is not possible. A first example shown in FIG. 77A deals with a chip in which the PCI bus itself does not exist (such as the Intel ACC 2056). A second example shown in FIG. 77B has a PCI bus, but instructions from the CPU 302 do not always pass through the PCI bus. In other words, when an instruction from the CPU 302 is generated for a device control means on the ISA bus of the configuration shown in FIG. 77B, that instruction is transferred to a device control means on the ISA bus without passing through the PCI bus. Therefore, it is impossible in this case to not transfer an instruction from the CPU 302 to a device control means on the ISA bus by using a subcontroller on the PCI bus. In particular, it is possible that the trend toward reducing the costs of systems will make systems of the configurations shown in FIGS. 77A and 77B more common. This is another reason why a configuration that provides a subcontroller on the CPU bus is effective.

Figure 78A:
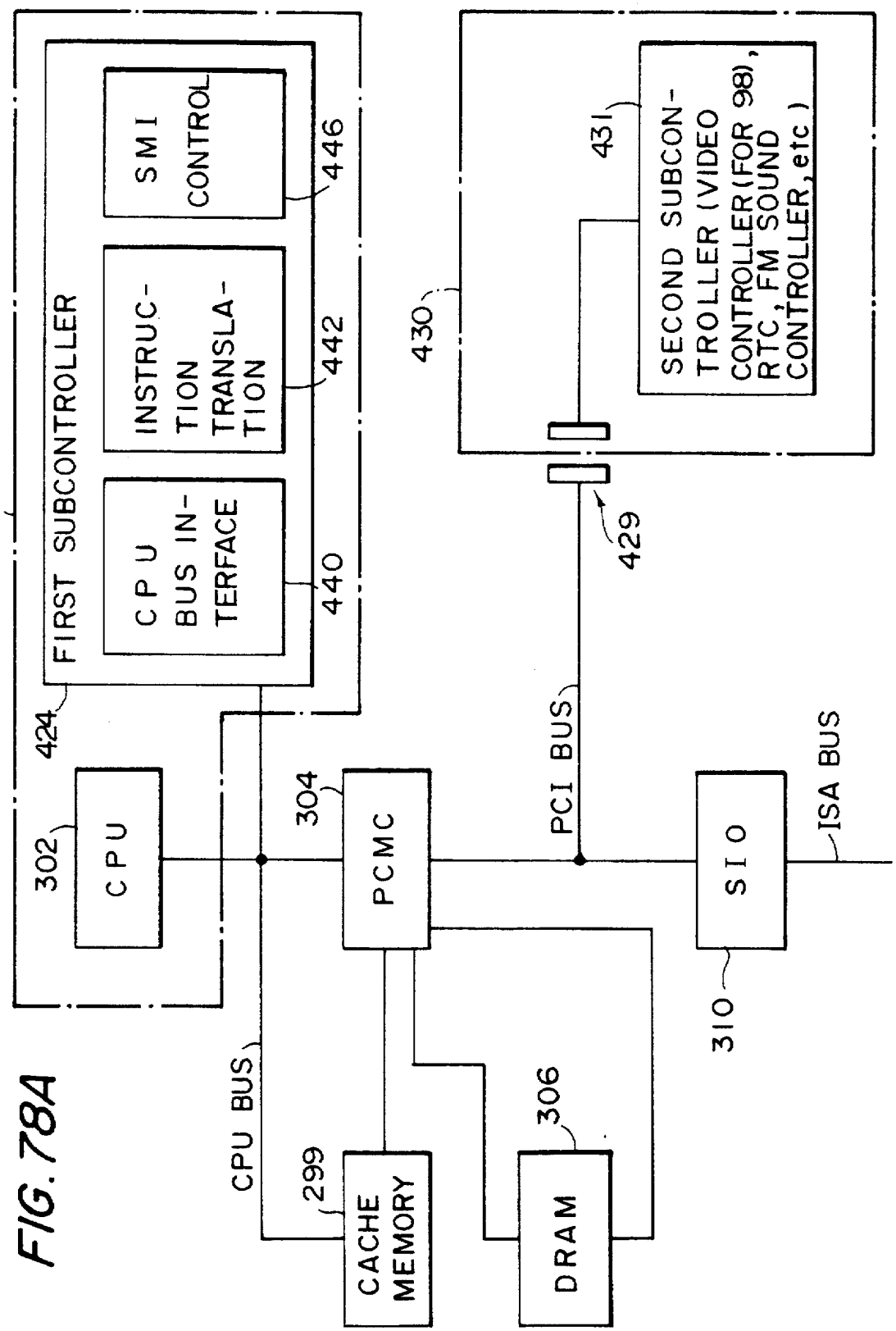
FIG. 78A shows the configuration when a subcontroller is provided on the CPU bus and FIG. 78B shows the configuration when a subcontroller is provided only on the PCI bus.
Figure 78B:
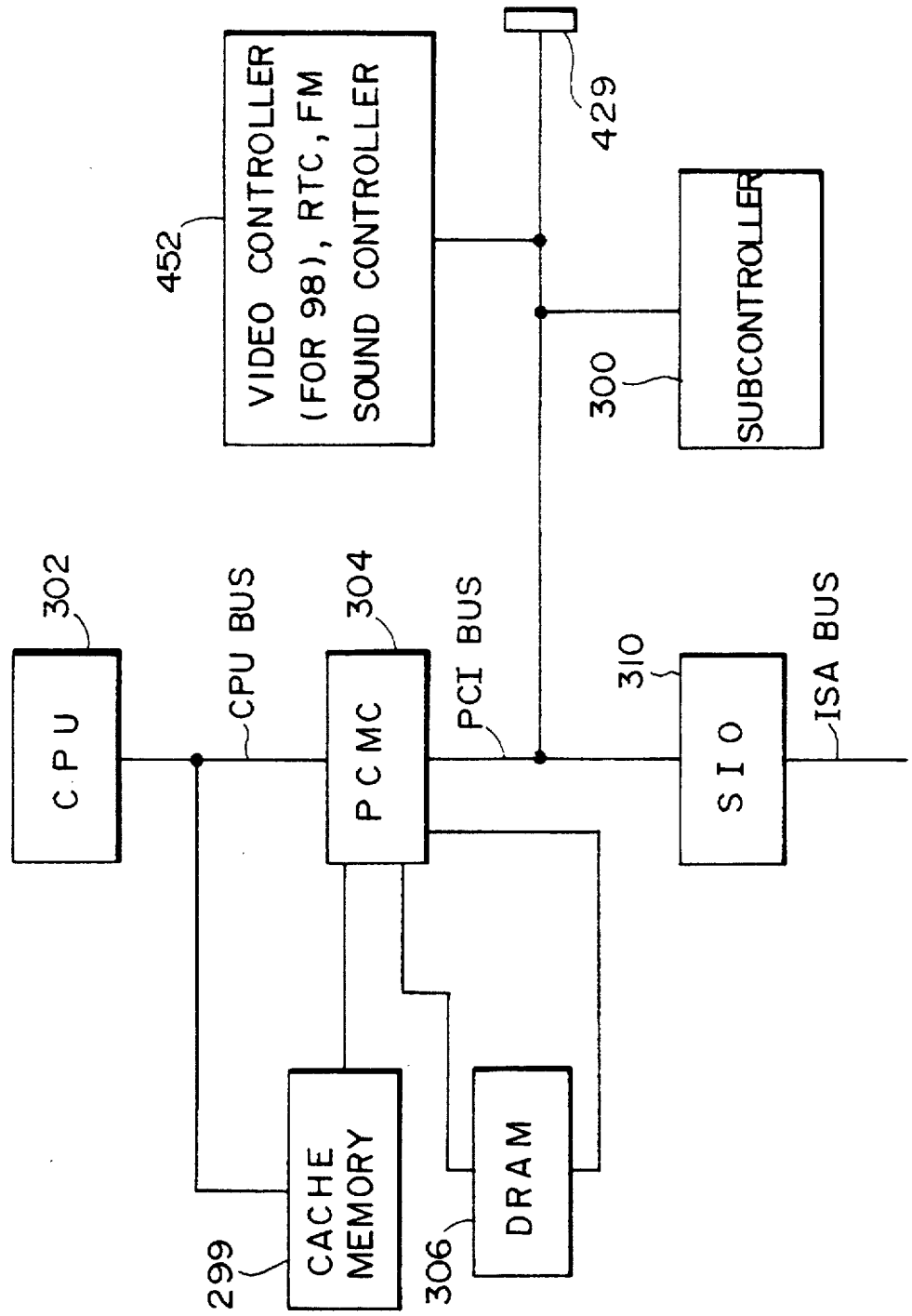

An emulation system that provides a subcontroller on the CPU bus can solve both of the problems described above. An example of the configuration of such an emulation system is shown in FIG. 78A. Note that a configuration of an emulation system in which the subcontroller 300 is provided only on the PCI bus is shown in FIG. 78B. In FIG. 78A, a first subcontroller 424 is provided on the CPU bus and a second subcontroller 431 that performs emulation processing together with the first subcontroller 424 is provided on the PCI bus. The first subcontroller 424 controls signals from the CPU 302 and the second subcontroller 431 comprises a 98-orientated video controller. If the first subcontroller 424 is located on a first option board 420 and the second subcontroller 431 is located on a second option board 430, compatibility with a plurality of architectures can be implemented by simply installing the option boards in the main unit.

Figure 79A:
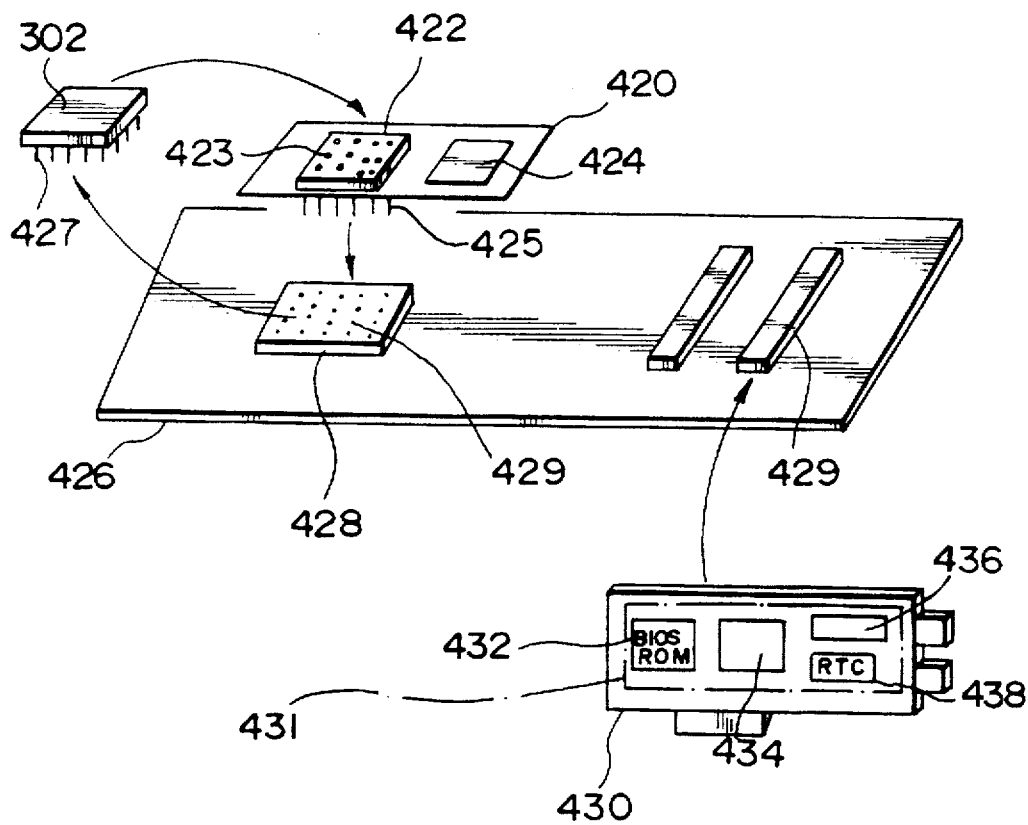
FIG. 79A shows a method of installing option boards.

An example of a method of installing these option boards is shown in FIG. 79A. First of all, a first socket (such as a PGA socket) 422 that is capable of accommodating the CPU 302 and the first option board 420 comprising the first subcontroller 424 are provided. The second option board 430 comprising the second subcontroller 431 is also provided. This second subcontroller 431 is configured of components such as a BIOS ROM 432, a 98-orientated video controller 434, an FM sound controller 436, and an RTC 438. These components are necessary for making a 98-orientated application program operate on an AT machine. The second option board 430 can be connected to a PCI expansion slot 429 provided on a main board 426. A second socket 428 that is capable of accommodating the CPU 302 is provided on the main board 426. The first option board 420 is installed as described below. First, the CPU 302 is removed from the second socket 428 on the main board 426. Next, a plurality of pins 425 that form an under portion of the first option board 420 are inserted into pin holes 429 of the second socket 428. A plurality of pins 427 that are the terminals of the CPU 302 are inserted into pin holes 423 of the first socket 422. The configuration is such that signals from the first group of pin holes that configures the pin holes 423 are transferred to a first group of pins that configure the pins 425. On the other hand, signals from the second group of pin holes that configures the pin holes 423 are transferred though the first subcontroller 424 to a second group of pins that configures the pins 425. This ensures that a first group of signals from the CPU 302 are transferred to the main board 426, whereas the transfer of a second group of signals (such as an ADS signal) from the CPU 302 to the main board 426 can be disabled by the control of the first subcontroller 424.

As described above, this emulation system can be implemented by installing the first option board 420, and then the second option board 430 in the PCI expansion slot 429.

Figure 79B:
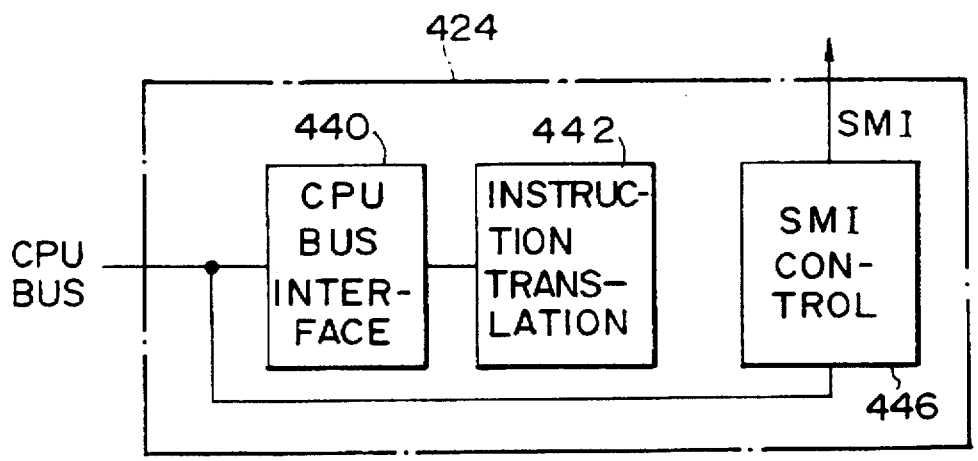
FIG. 79B shows an example of the configuration of the first subcontroller.

An example of the configuration of the first subcontroller 424 is shown in FIG. 79B. The first subcontroller 424 comprises a CPU bus interface means 440, an instruction translation means 442, and an SMI control means 446. The CPU interface means 440 controls the CPU bus, as will be described in more detail below. The instruction translation means 442 comprises hardware circuitry for translating instructions, such as a microcode memory. The SMI control means 446 is a circuit for executing SMI handling, which comprises an SMI generation means and an SMI status display means.

The operation of this eighth embodiment immediately after a reset (RS) (or immediately after power-on) will now be described with reference to FIGS. 80, and FIGS. 81A to 81C. As it is clear from the flowchart of FIG. 80, after RS, an 98-BIOS stored in the BIOS ROM 432 on the second option board 430 of this embodiment starts (steps V1 and V2). The AT-BIOS which is a BIOS for the AT machine, is on the X bus (or ISA bus). Therefore, if the second subcontroller 431 could assert the DEVSEL signal faster than the SIO 310, the 98-BIOS would have priority. However, if the ROMs containing the AT-BIOS and 98-BIOS are on the same bus, for example, if both are on the ISA bus or the CPU bus, the 98-BIOS cannot be given priority with the above described method. This means that the 98-BIOS should be given priority by the method described below. A flowchart used to illustrate the operation of this method is shown in FIG. 81A. First, after RS, the CPU accesses FFFFFFF0h (see A1 of FIG. 81B) (step W2). Next, the CPU interface means 440 masks the ADS signal, and the masked signal, LADS, is transferred to the device control means. As shown in FIG. 81C, this mask processing is based on a mask signal that is set when RS is low and reset when BRDY is low. Note that the ADS signal is a signal that indicates that the address and bus/cycle definition signals (M/IO, D/C, and W/R) are enabled, and also that the CPU has started a bus cycle. Therefore, if the ADS signal is masked, other components on the CPU bus will not respond to the first CPU instruction. Next, the first subcontroller 424 issues a JMP 1FFFF0h instruction (see B1 of FIG. 81C), and enables the BRDY (ready signal). When this happens, the flow jumps to 1FFFF0h as shown in FIG. 81B, and the 98-BIOS is executed. The AT-BIOS is disabled and the 98-BIOS is moved to addresses E8000h to FFFFFh. This ensures subsequent correct operation. The 98-BIOS that has been moved to E8000h to FFFFFh is then executed (step W5). This enables the 98-BIOS to take priority.

Figure 80:
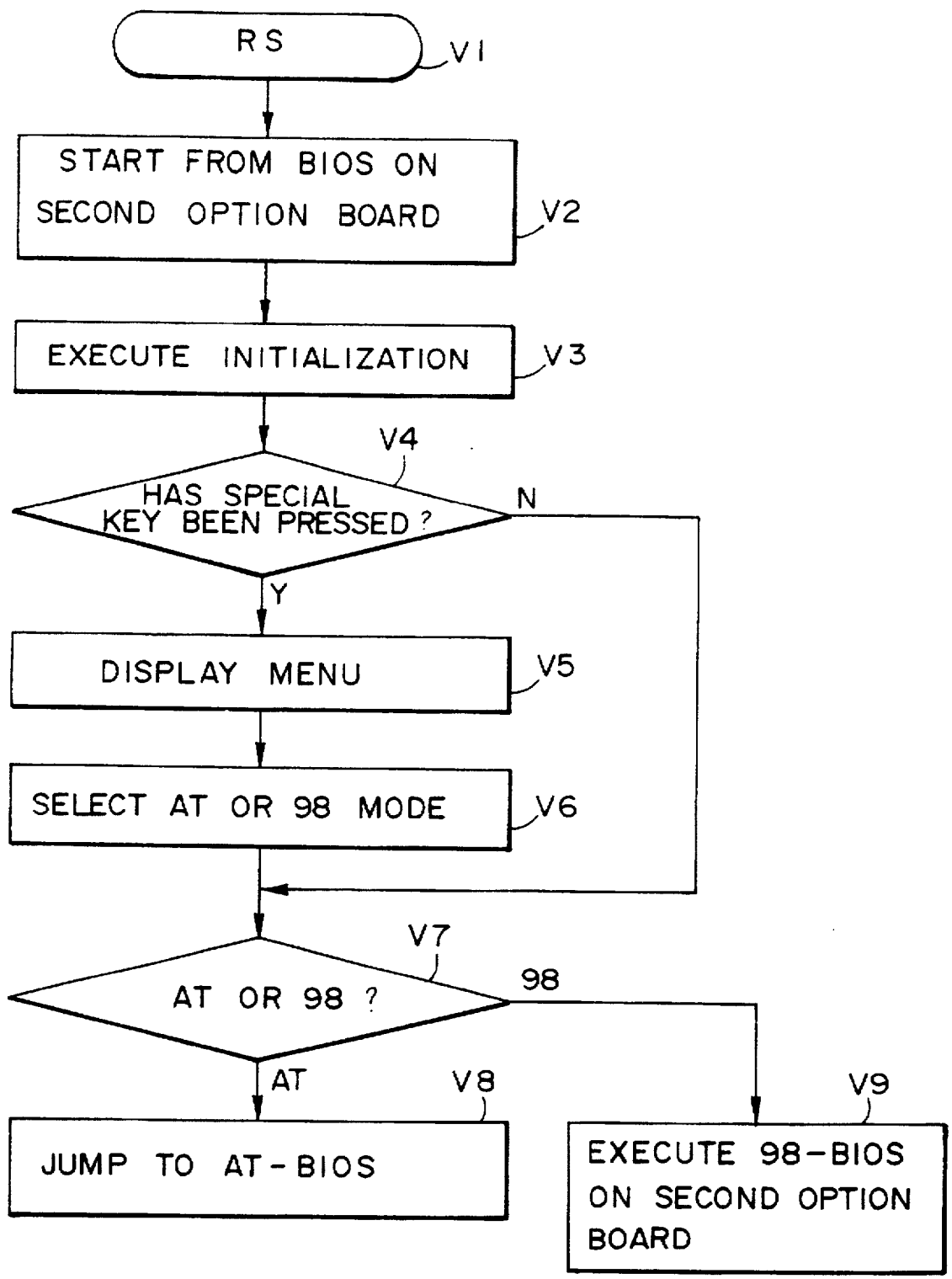
FIG. 80 is a flowchart of the operation of an eighth embodiment immediately after a reset.
Figure 81A:
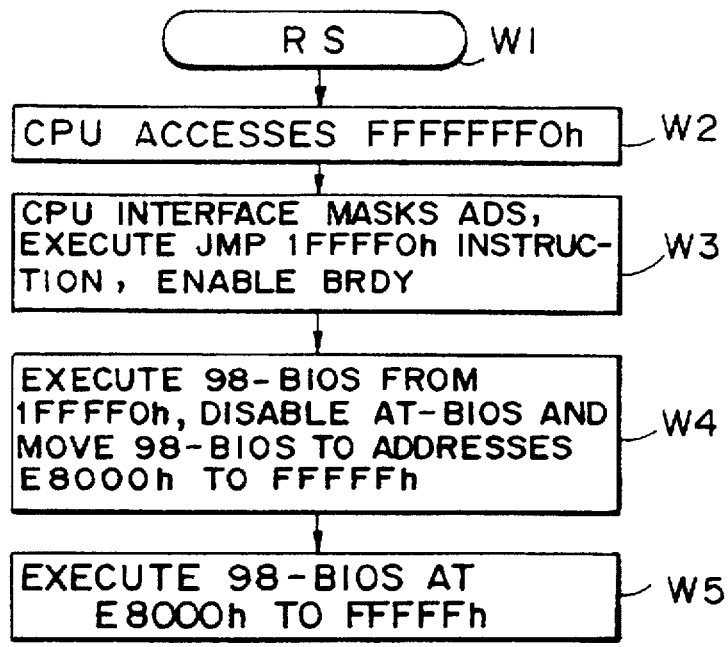
FIGS. 81A to 81C are a detailed flowchart, a memory map, and a signal waveform chart used to illustrate the operation of the eighth embodiment immediately after a reset.
Figure 81B:
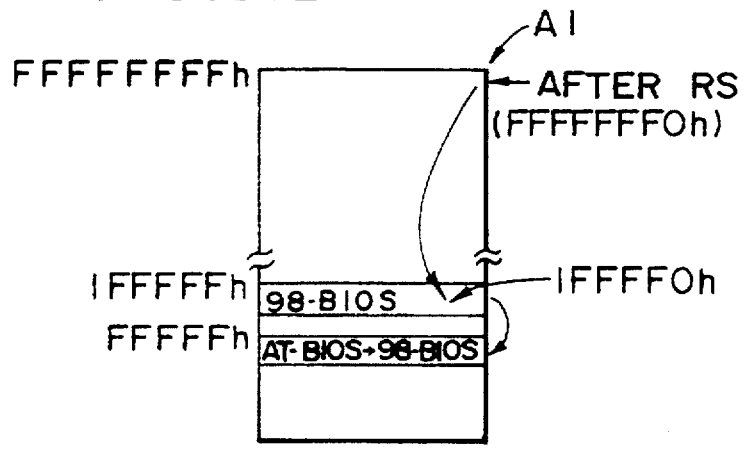
Figure 81C:
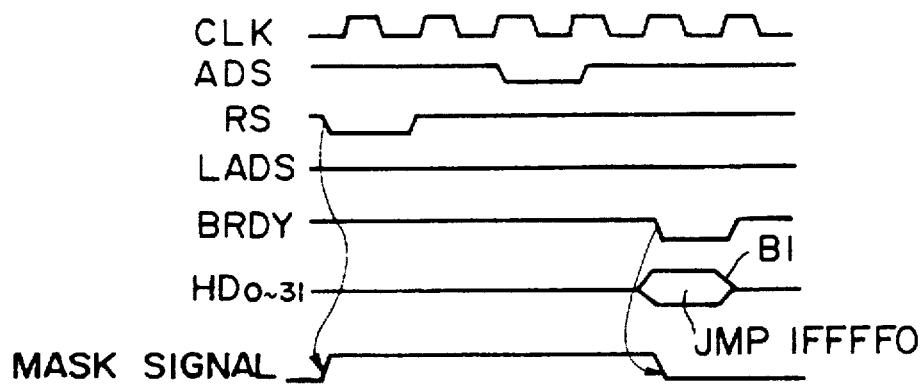

The description returns to FIG. 80. After the 98-BIOS has started, initialization processing is executed (step V3). Next it is determined whether or not a special key has been pressed (step V4), and, if it has, a menu screen is displayed (step V5). This menu screen enables the selection of either AT mode or 98 mode (step V6). Note that, whether or not a special key has been pressed may be determined by whether or not a predetermined key combination has been input. If the special key has not been pressed, the flow proceeds to a step V7 and the previous setting becomes valid. This reduces the complexity of mode selection by forcing the previously set operating mode after power is turned on or after a hard reset. If AT mode is selected, the flow jumps to the AT-BIOS (step V8); if 98 mode is selected, the 98-BIOS continues to operate (step V9).

When an emulation system is implemented by using AT hardware, it is preferable that the casing of an AT machine is used as the outer casing of this system. However, using the casing of an AT raises the problem that a mode selection switch cannot be provided in easy reach of the user. This problem is solved in this embodiment by enabling mode selection by a special key.

The description now turns to the processing required for a soft reset. Since an AT may not have a hard reset switch, it is necessary to perform a soft reset when a reset is required in this case. A key combination is provided to enable mode switching while the emulation BIOS is operating, and this enables the display of a mode-switching menu. However, only one key combination can be provided for a soft reset in the AT. This causes a problem in that it is impossible to switch to 98 mode while the AT-BIOS is executing. This embodiment solves this problem by including a routine that generates an SMI within a soft reset routine in the AT-BIOS. Since most BIOS ROMs are now flash memory, they are simple to overwrite. A menu is displayed so that the operator can select either a soft reset or a change to 98 mode in SMM activated by the SMI. Note that mode selection at hard reset or power-on may also be implemented by this SMI handling. An I/O port for issuing the SMI may be provided at an I/O address location that is accessible by DOS (the operating system) running on the AT. If this is implemented, this I/O port may be accessed and an SMI generated by inputting a DOS command such as CG98. This would enable a transition to 98 mode. In this case, a plurality of I/O ports for generating SMIs may be provided. This would enable the execution of different processes after the switch, not just mode switching. The handling after this switch may be processing that activates a specific program (such as a wordprocessor). If an AT is provided with a start command for a 98-orientated program and that start command is executed, the I/O port specified by the command is accessed and an SMI is generated. SMM then writes that program name into the 98-orientated autoexec file. This ensures that the desired program is activated immediately after a switch to 98 mode.

A hardware reset may be implemented by emulation caused by an SMI activated by a specific key combination being entered in 98 mode. This is effective for implementing an emulation system on an AT machine that does not have a hardware switch.

Figure 82:
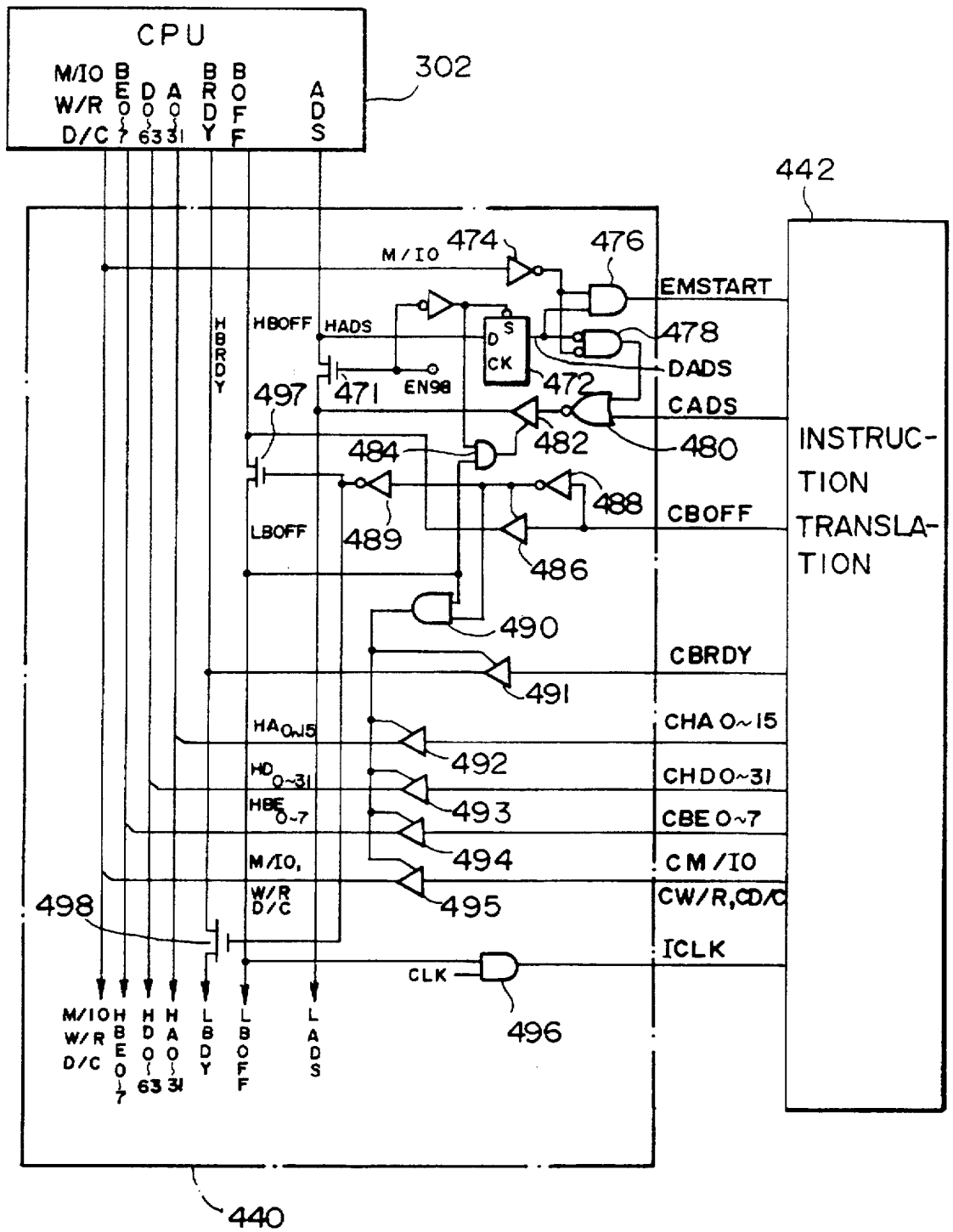
FIG. 82 shows an example of the circuit configuration of the CPU interface means.
Figure 83:
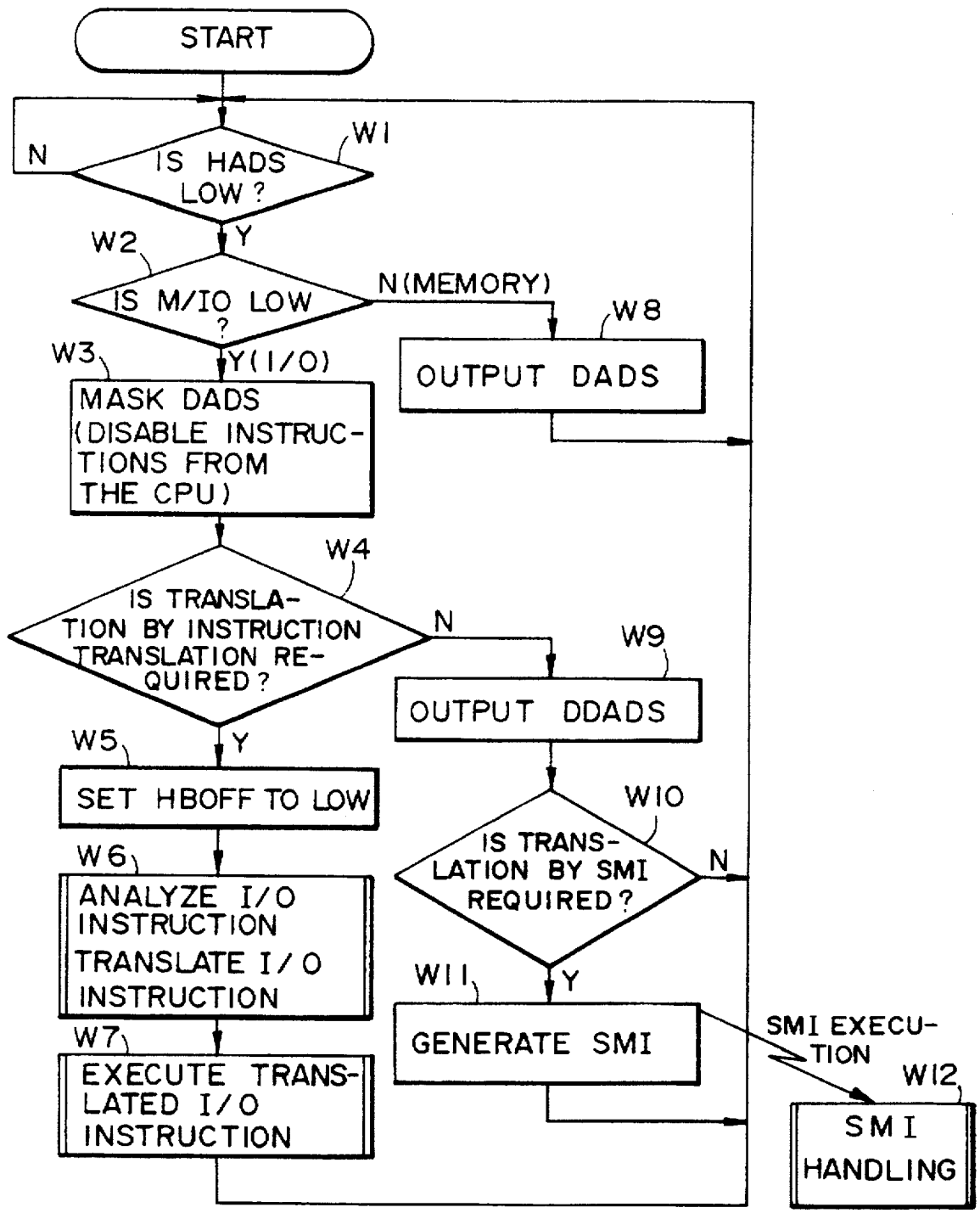
FIG. 83 is a flowchart of the operation of the eighth embodiment.
Figure 84:
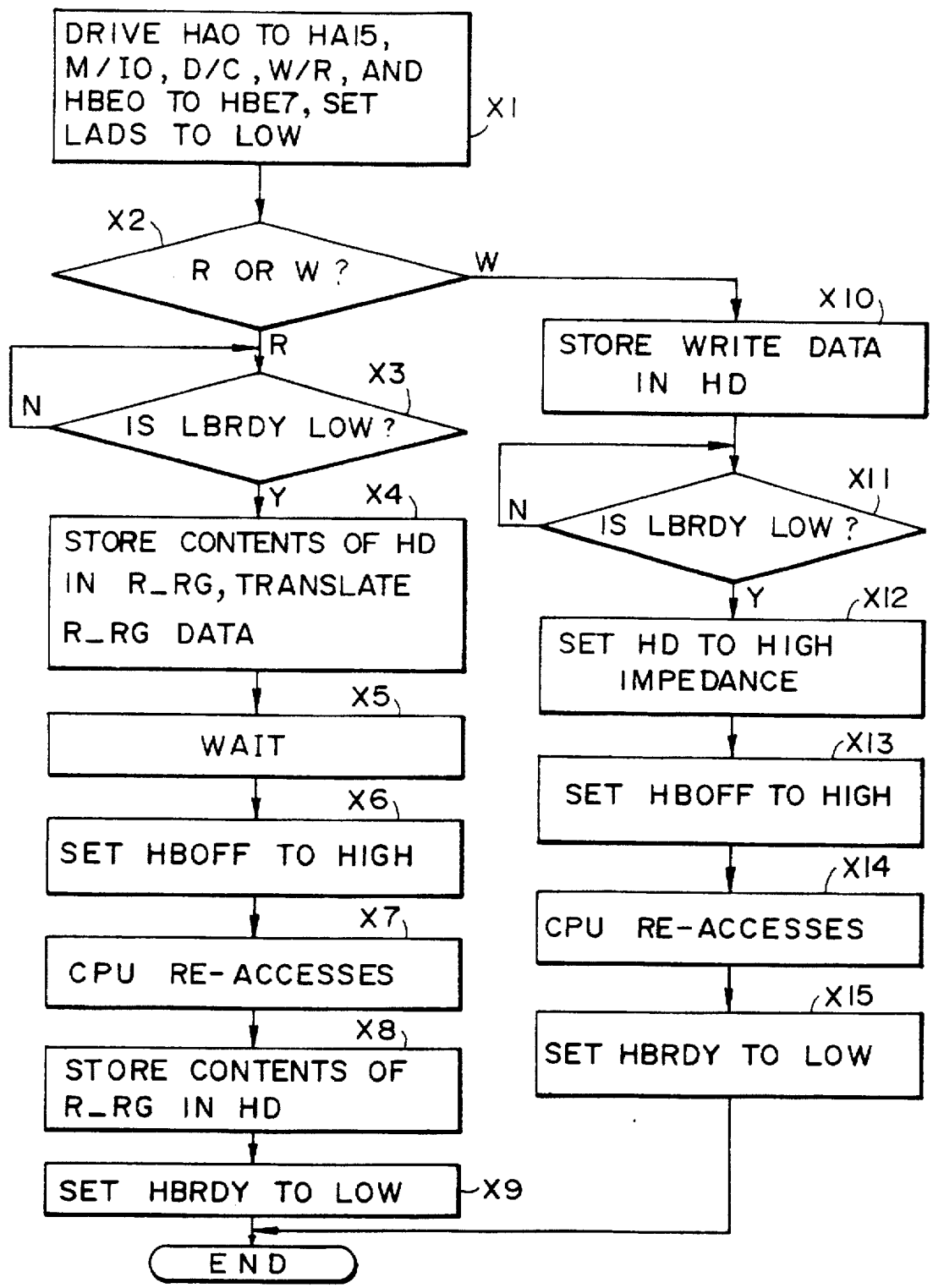
FIG. 84 is another flowchart of the operation of the eighth embodiment.
Figure 85:
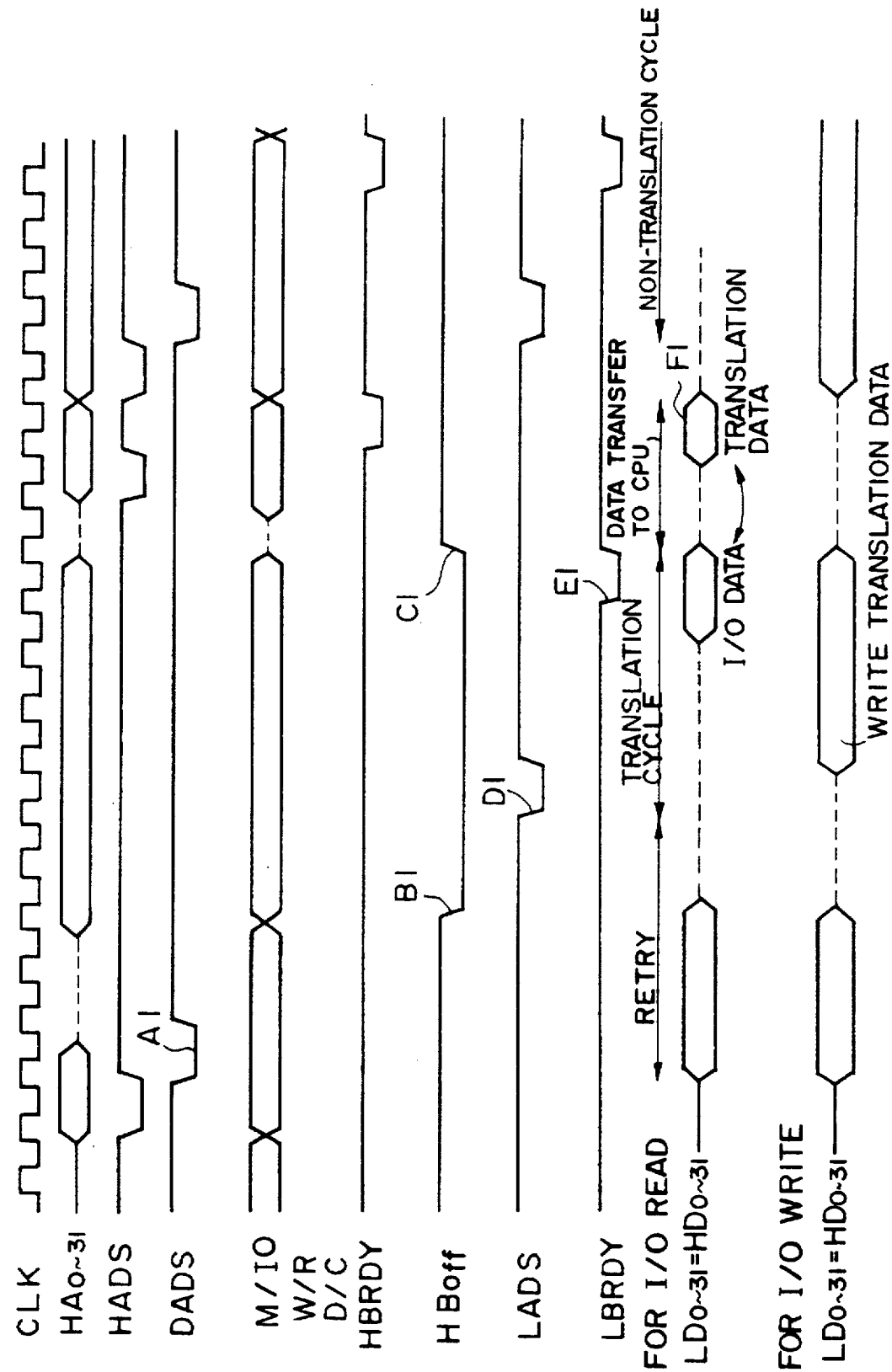
FIG. 85 is a signal waveform chart of the operation of the eighth embodiment.

An example of the circuit diagram of the CPU interface means 440 is shown in FIG. 82. A flowchart of the operation of this embodiment is shown in FIGS. 83 and 84, and a signal waveform chart thereof is shown in FIG. 85. A detailed description of the configuration and operation of this embodiment is given below, with reference to these figures.

In AT mode, an EN98 signal is set high and a high-speed switch 471 shown in FIG. 82 turns on. This transfers an ADS signal from the CPU 302 without modification to a device control means, so that the AT machine can operate at high speed. On the other hand, in 98 mode, EN98 is set low and the high-speed switch 471 turns off. Next it is determined whether or not HADS (the host ADS signal) is low (step W1 in FIG. 83). If HADS is low, it is then determined whether or not M/IO is low. If M/IO is high, (during memory access) a DADS signal, which is the ADS signal delayed by one clock pulse (see A1 of FIG. 85), is transferred as an LADS signal to the device control means that is the CPU instruction destination (step W8). This ensures that memory access is delayed by only one clock pulse, enabling the system to operate at high speed. However, if M/IO is low, in other words, if the CPU instruction is an I/O instruction, the DADS signal is masked. This disables the transfer of the instruction from the CPU to the device control means, by preventing the transfer of the DADS (LADS) signal to the device control means. Other methods of disabling such an instruction may be one which transfers the DADS signal without modification and masking and which translates the CPU bus control signals (M/IO, D/C, and W/R). For example, if a bus cycle in which all of M/IO, D/C, and W/R are high is set as a special cycle and BE7 to BE0 is (11111011), the device control means ends access from the CPU, without any excess operation that may lead to operating errors, as if the CPU has issued a HALT instruction. This makes it possible to disable CPU instructions. Note, however, that the objective of preventing the device control means from responding to a CPU instruction can be achieved by simply setting the bus cycle to a special cycle, even if BE7 to BE0 do not have the above described values.

Next, it is determined in a step W4 whether or not translation processing by the instruction translation means 442 is necessary. If it is determined that translation processing is not necessary, a DDADS signal that is DADS signal delayed by another clock pulse is transferred to the device control means (step W9). This further delay by one clock pulse provides sufficient time for determining whether or not translation is necessary. Therefore, under certain circumstances, a delay of two or more clock pulses may be inserted. It is then determined whether or not translation with SMI is necessary, and if it is necessary, an SMI is generated and SMI handling is executed (steps W10 to W12). All this processing is executed by the SMI control means 446. The SMI handler performs instruction translation processing by software means. On the other hand, if translation processing by the instruction translation means 442 is necessary, HBOFF (the backoff signal) is set low (B1 of FIG. 85). This makes the CPU release bus control. The CPU remains in a bus hold state until HBOFF is set high. The I/O instruction is analyzed and I/O instruction translation processing is performed, then the translated I/O instruction is executed (steps W6 and W7 of FIG. 83).

The above operation will now be described with reference to the circuit diagram of FIG. 82. When EN98 is low, the set terminal of a DFF 472 becomes high. This means that the HADS (ADS) signal is sampled by the DFF 472, and the DADS signal that is HADS delayed by one clock pulse is output from the DFF 472. When M/IO is high (during memory access), emulation does not start because one input of a logic circuit 476 is low and thus EMSTART becomes low. The DADS signal is transferred through logic circuits 478, 480, and 482; as a result, the DADS signal that is HADS delayed by one clock pulse is transferred to the device control means. This enables rapid memory access. On the other hand, when M/IO is low (during an I/O instruction), the DADS signal is transferred as the EMSTART signal to the instruction translation means 442 through the logic circuit 476. This causes the instruction translation processing to start. Since an output of the logic circuit 478 is fixed low, DADS is not transferred to the device control means. When the instruction translation processing is started, the instruction translation means 442 first sets CBOFF low. This turns high-speed switches 497 and 498 off so that signal input to the CPU 302 is out. The CBOFF signal is transferred to the CPU 302 through a tristate buffer 486, thus activating backoff operation of the CPU 302 and halting bus access. This time, the instruction translation means 442 provides bus access. The I/O instruction is analyzed and, if necessary, the address and data within the I/O instruction are translated. The instruction translation means 442 operates as the CPU bus master instead of the CPU 302, and signals HA0 to HA15 and HBE0 to HBE7 are driven via buffers 492 to 495. HD0 to HD31 are also driven if this is a write cycle. In this manner, the instruction translation means 442 executes the translated I/O instruction.

A detailed flowchart of the operation during instruction analysis/translation and instruction execution (steps W6 and W7 in FIG. 83) is shown in FIG. 84. First of all, in a step X1, the instruction translation means 442 drives signals such as HA0 to HA15 and sets LADS to low (D1 in FIG. 85). For an I/O read, it monitors whether LBRDY is set low (step X3) and, if LBRDY is low (E1 of FIG. 85), it stores the data output from HD (host data bus or CPU bus) in R-RG (stack register within the instruction translation means) and executes data translation processing (step X4). The device control means that is the instruction destination then waits for the bus to be released, and sets HBOFF to high (steps X5 and X6, and C1 in FIG. 85). This re-executes the bus cycle disabled by the CPU. This operation is the same as the retry of the PCI bus. When the CPU has re-accessed, the data in R-Re is output to the HD (steps X7 and X8, and F1 in FIG. 85). HBRDY is then set low (step X9). For an I/O write, the data is transferred to the device control means by outputting the translated data to the HD, and the HD is set to high impedance at the stage at which LBRDY is set to low (steps X10 to X12). HBOFF is then set to high, so that the CPU is re-accessed (steps X13 and X14). With this embodiment as described above, the CPU HBOFF (backoff) signal is asserted. This is necessary when there is a number of I/O ports, for halting the CPU at least until LBRDY becomes low. However, note that other methods of halting the CPU until LBRDY goes low such as a method using a HOLD signal may be considered. However, methods that use the HOLD signal require differing signal control for read and write, so the circuitry is complicated and enlarged. In this embodiment, the CPU is halted by using the HBOFF signal. The current cycle is ended by setting HBRDY to low when the CPU re-accesses. In this manner, the CPU operation can be halted without using the HOLD signal.

Note that PCI retry is used only for a read cycle in the above described sixth embodiment, but retry may be used in a similar manner in a write cycle. In this case too, the device control means to which the translation data is transferred halts the CPU at least until TRDY is set low. The CPU bus cycle may be terminated by setting TRDY to low during CPU re-access.

The HBOFF signal is often used by device control means other than the first subcontroller 424. This means that some action is necessary if the HBOFF signal is asserted simultaneously by the first subcontroller 424 and another device control means. That is why this embodiment is configured in such a manner that outputs of tristate buffers 482 and 491 to 495 (shown in FIG. 82) are put in a high impedance state when LBOFF has gone low. The ICLK signal is fixed low by a logic circuit 496. This provides the same operation as if the first subcontroller 424 is integrated with the CPU 302 and the CPU 302 is in a backoff state, thus maintaining compatibility.

Ninth Embodiment

Figure 86:
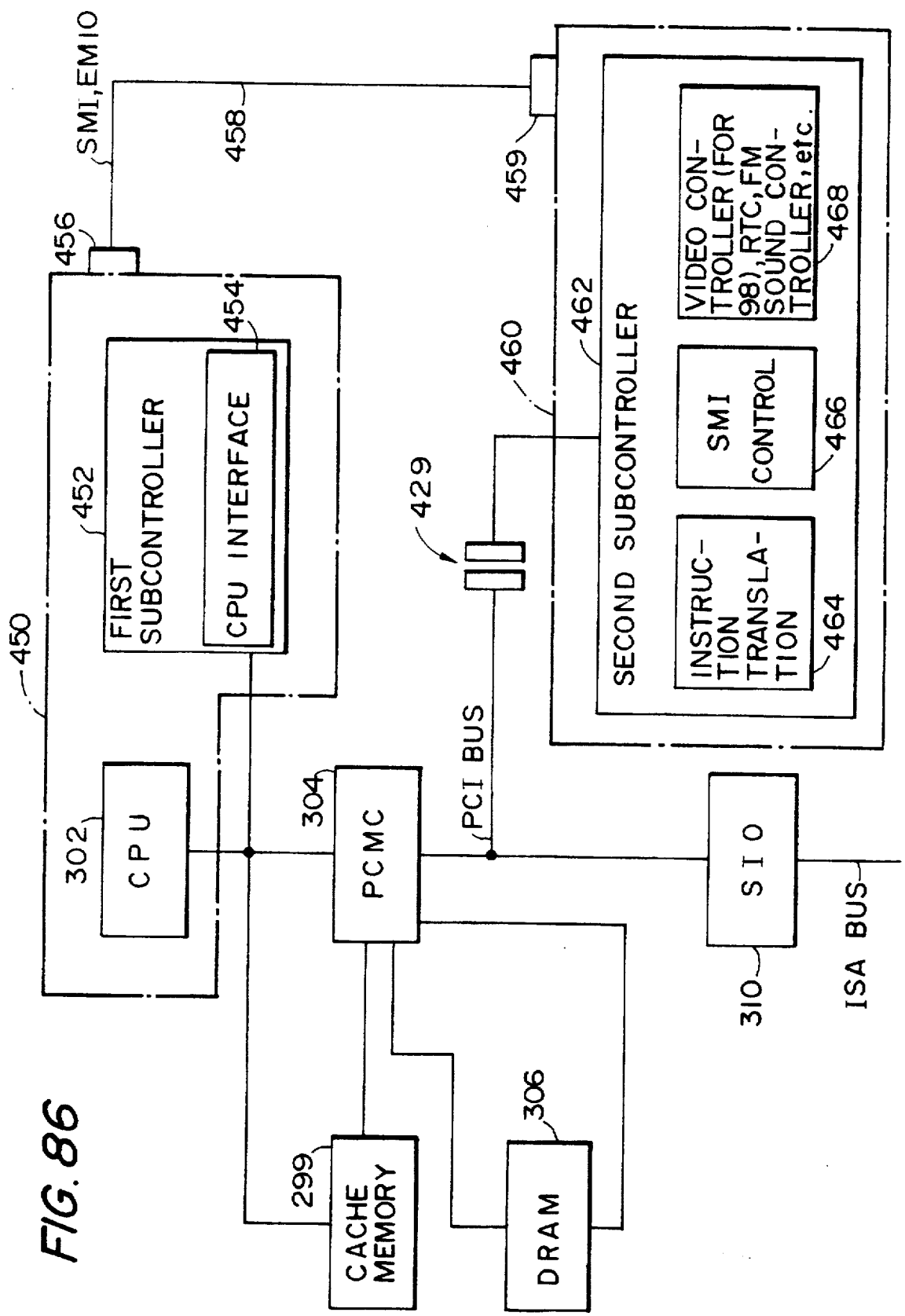
FIG. 86 shows an example of the configuration of a ninth embodiment of this invention.
Figure 87:
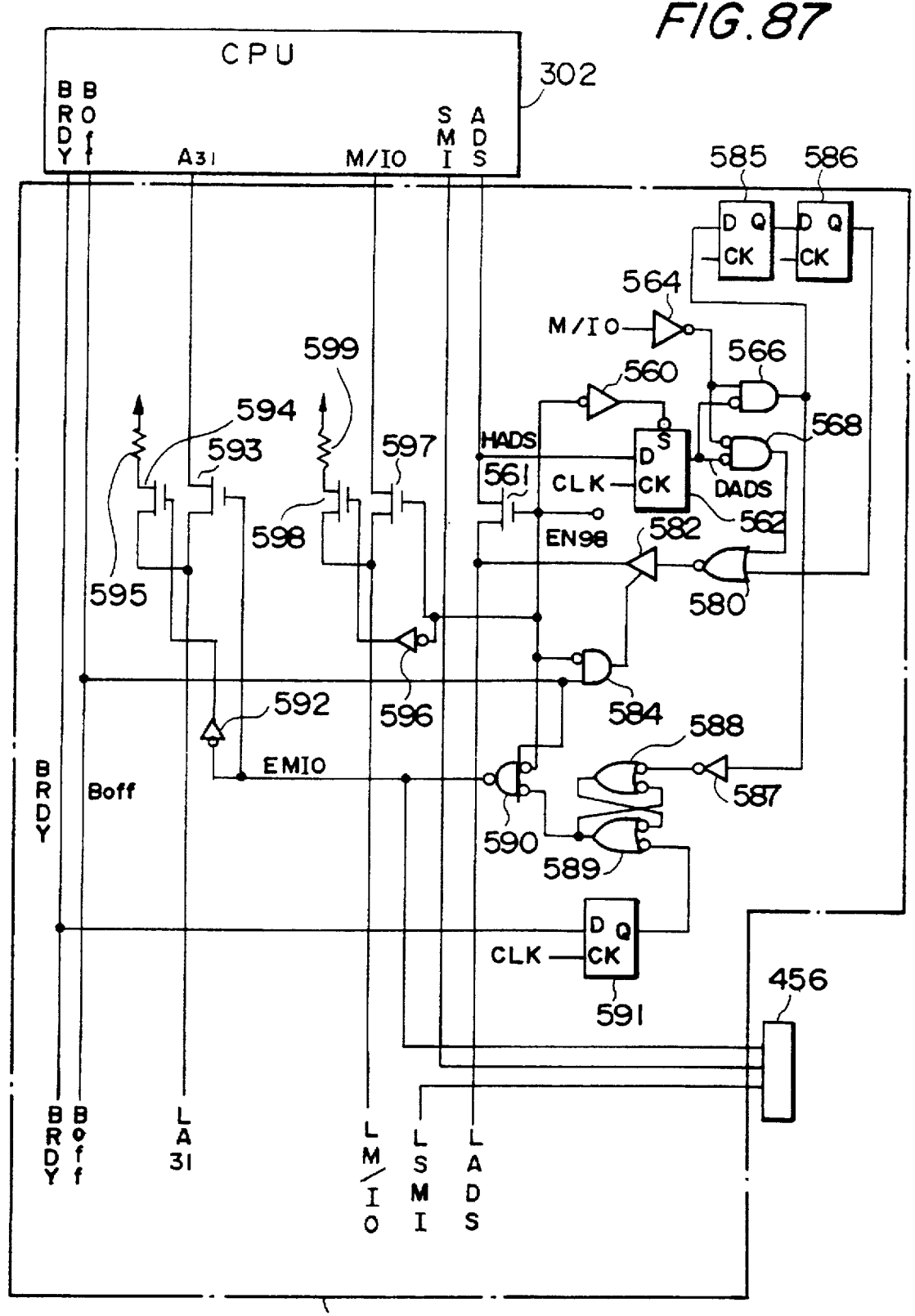
FIG. 87 shows an example of the configuration of the CPU interface means.

An example of the configuration of a ninth embodiment of this invention is shown in FIG. 86. This embodiment differs from the eighth embodiment in that the first subcontroller 452 does not comprise an instruction translation means and SMI control means; these are incorporated in the second subcontroller 462. First and second option boards 450 and 460 are provided with connectors 456 and 459, respectively, and an SMI signal and an EMIO signal are transferred therebetween through a cable 458. The circuit configuration of a CPU interface means 454 differs from that of the instruction translation means of the eighth embodiment, as shown in FIG. 87.

If an instruction from the CPU is an I/O instruction, the CPU interface means 454 within a first subcontroller 452 translates the instruction so that it cannot be received by other device control means, in other words into an instruction with an address that cannot normally be accessed. To be specific, it sets M/IO and A31 to high. An instruction translation means 464 within the second subcontroller 462 determines whether or not this I/O instruction requires emulation processing, from factors such as the A31 signal and the EMIO signal transferred through the cable. Note, however, that this determination may be based on A31 alone (in which case, the EMIO signal would not be necessary) or from the A30 signal. If it is determined that this is an I/O instruction that requires emulation processing, this emulation processing is executed by components such as the instruction translation means 464 and an SMI control means 466. Note that this configuration, in which the SMI control means 466 is provided within the option board 460, makes it necessary to provide means for transferring the SMI signal, such as the cable 458.

One advantage of the ninth embodiment over the eighth embodiment is that the circuitry provided on the first option board 450 is more compact. For example, if the circuitry is of the scale shown in FIG. 87, the first subcontroller 452 may be configured of a single-chip programmable logic array (PAL). This size reduction of the circuitry makes it possible to miniaturize the first option board 450, which is advantageous when the space around the first option board 450 is limited. Unlike the sixth embodiment in which the subcontroller 300 is provided on the PCI bus, the configuration of this ninth embodiment allows the subcontroller 300 and a second subcontroller 448 to use common circuitry. This enables a reduction in development time.

Figure 88:
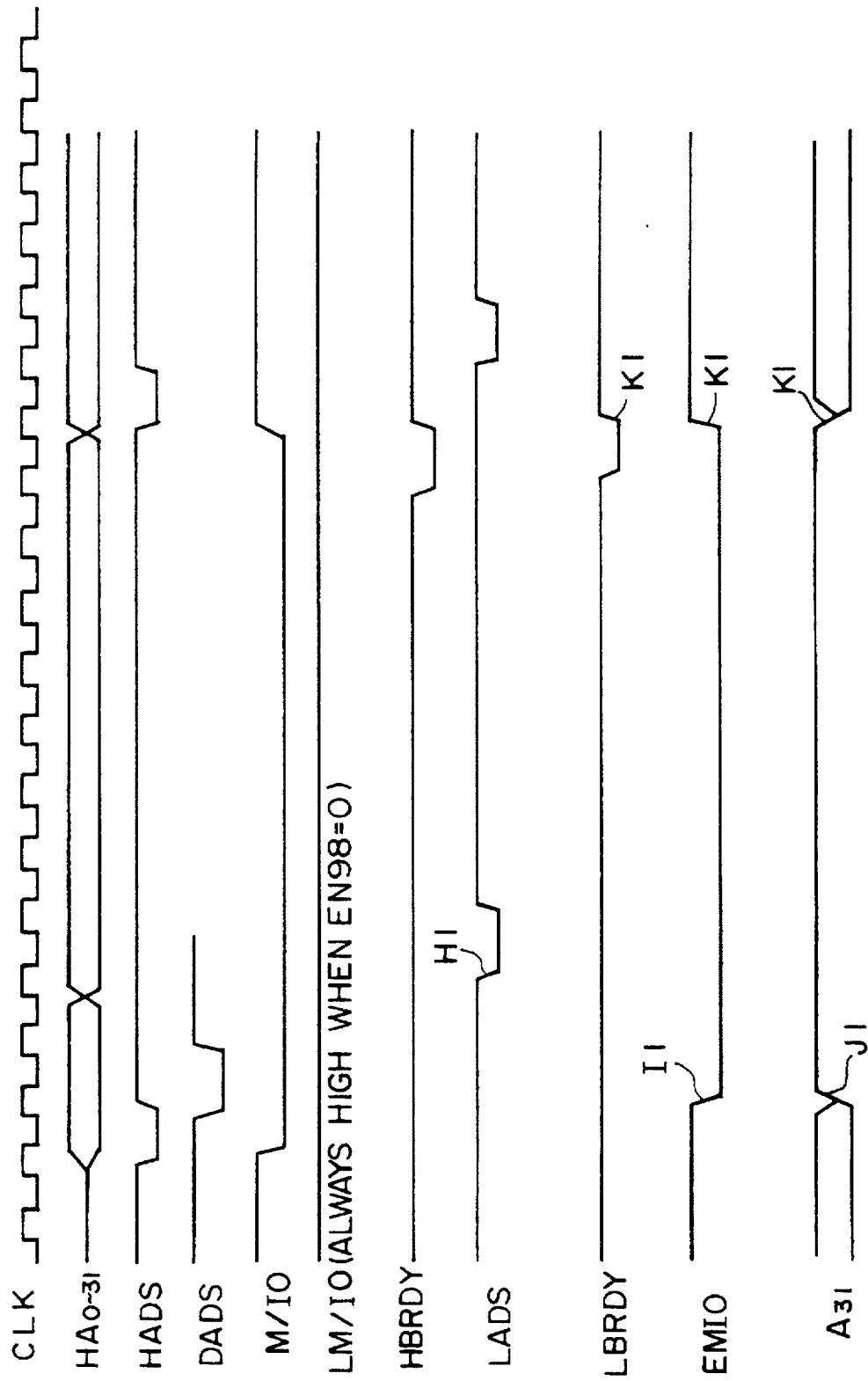
FIG. 88 is a signal waveform chart of the operation of the ninth embodiment.

A detailed description of the configuration and operation of the CPU interface means 454 will now be given with reference to FIGS. 87 and 88. First, when EN98 is set high, the operation is virtually the same as that of an ordinary AT machine, as in the eighth embodiment. However, when EN98 is set low, the DADS signal that is HADS delayed by one clock pulse is output from a DFF 562. When M/IO is high (during memory access), an output of a logic circuit 566 is fixed low. The DADS signal is transferred to the device control means through logic circuits 568, 580 and 582, to maintain high-speed memory access. On the other hand, when M/IO is low (during I/O access), a signal that is HADS delayed by three clock pulses is transferred to the device control means through the logic circuit 566, DFFs 585 and 586, and the logic circuit 580 and 582 (H1 in FIG. 88). When EN98 is low, a high-speed switch 597 is off and another high-speed switch 598 is on. This means that an LM/IO signal is always at a high level. When DADS is set low, EMIO becomes low by logic circuits 587 to 590 (I1 in FIG. 88), a high-speed switch 593 turns off, and another high-speed switch 594 turns on. Therefore, A31 is high (J1 in FIG. 88). When LBRDY is low, EMIO is becomes high by components such as a DFF 591, and A31 is not fixed at high (see K1 of FIG. 88). Thus, this embodiment enables the implementation of emulation processing using a compact CPU interface means.

Note that, this invention is not limited to the above described embodiments; it can be modified in various ways within the scope of the claims set out herein.

For example, the above described embodiments considered cases involving a first computer architecture whereby hardware and software occupy an extremely large market share worldwide, and a second computer architecture with a comparatively modest market share and whose software resources are to be utilized. However, the present invention is not limited to such first and second computer architectures; it is equally well applicable to a case in which the above described architectures have the opposite relationship. In such a case, the emulation processing for the serial interface may be executed so as to enable a predetermined application on an 8251A, for example. Similarly, the keyboard emulation processing may be such as to enable a predetermined application on the 8251A. It should be obvious to those skilled in the art that the emulation processing in such cases may be performed by the same methods as those described with reference to the above embodiments.

The second computer architecture of this invention actually means one or a plurality of computer architectures that differ from the first computer architecture. Similarly, the first computer architecture actually means one or a plurality of computer architectures that differ from the second computer architecture.

Thus the principle of the present invention may be applied to a case in which a program written for the Macintosh computer is to be run on an AT machine or 98 machine, for example, or, conversely, an AT-orientated or 98-orientated program is to be run on a Macintosh. This principle of the present invention can also be applied to a case in which a computer of one architecture, such as an AT, is to run programs of several different architectures, such as AT, 98, and Macintosh programs.

The methods of analyzing instructions and setting event data of this invention are not limited to those described above with reference to the embodiments; all possible methods may be considered therefor.

In the above described embodiments, the bus arbiter is incorporated in the subcontroller, but it should be noted that the present invention is not limited thereto. The bus arbiter may be located outside the subcontroller.

With a configuration in which components such as the subcontroller are located on an option board, programs such as the SMM handler may be stored in an external storage device such as a floppy disk or CD-ROM. This software may be loaded into RAM of a personal computer system to enable the SMM handler to execute the given processing. The RAM of a personal computer system of the first architecture may be converted to act as SMRAM, or an independent storage device may be provided on a board to use as SMRAM.

In the above described embodiments, a Pentium with its pipelining function is used as the CPU, but it should be obvious to those skilled in the art that another CPU (such as Intel's SL Enhanced 486 or the PowerPC being developed by Motorola, Apple, and IBM) may be used instead. The pipelining function of this Pentium processor enables the CPU's processing to proceed to the next instruction while an SMI is generated. In such as case, the CPU may retry and the SMI may be issued after the desired instruction.

Assuming that the control device of the first architecture, such as the memory controller 11, sets addresses for an externally connected device such as a RAM in such a manner that they are incompatible with addresses used under the second architecture, sufficient equivalent can be obtained by inserting a suitable decoder circuit.

With this invention, the processing in accordance with a selected architecture may be difficult, because it requires extremely complicated and fast emulation processing. In such a case, a plurality of assemblies of the minimum necessary hardware may be provided within the information processing device. For example, video controllers and FDD controllers of a plurality of architectures may be incorporated within the information processing device.

The interrupt means cited in the above described embodiments is an SMI, but any interrupt means that may be developed in the future may be used instead, provided that it has similar characteristics to the previously described SMI.

The configuration of this invention using microcodes can be applied to various different emulation systems without having to provide compatibility with a plurality of architectures.

Similarly, the configuration in which the subcontroller is provided on the CPU bus is not limited to those shown in FIGS. 78A and 86. For example, the configuration may be such that all of the components within the second subcontroller 431 of FIG. 78A may be incorporated in the first subcontroller 424 and the second subcontroller 431 is omitted. Alternatively, some of these components, such as the RTC, may be incorporated in the first subcontroller 424.

Figure 89A:
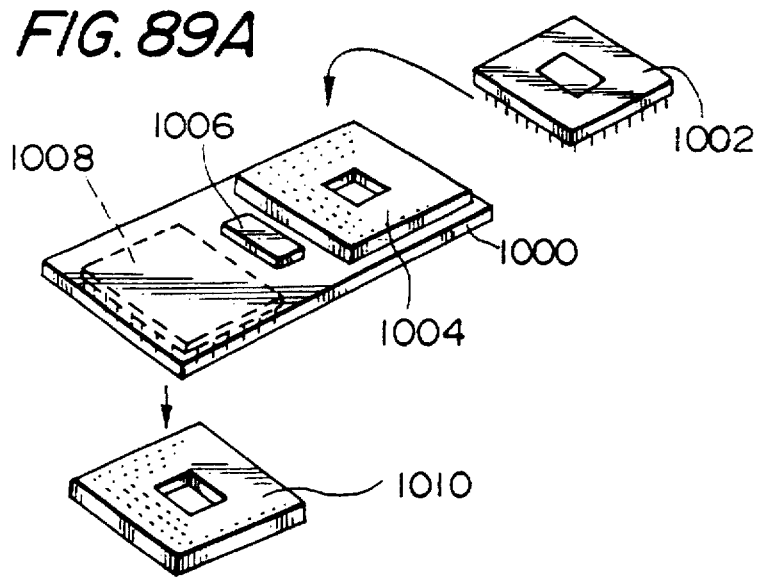
FIGS. 89A to 89E show various configurations of the option boards.
Figure 89B:
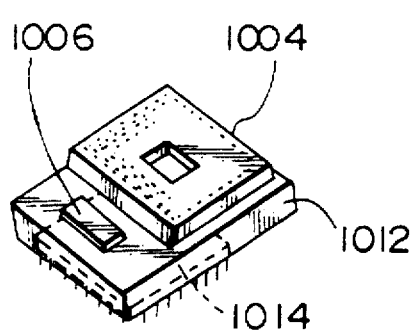
Figure 89C:
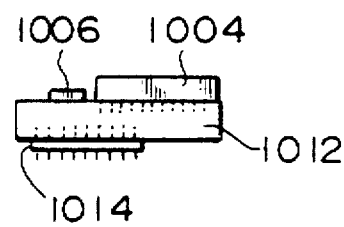

The configuration of the first board is similarly not limited to that shown in FIG. 79A, provided that it has means of connecting the CPU terminals to the terminals of the second socket on the main board and means for connecting the CPU terminals to the terminals of the second socket via the first subcontroller. For example, a first subcontroller 1006 and a first socket 1004 capable of accommodating a CPU 1002 may be provided on a first option board 1000, as shown in FIG. 89A. A connector 1008 is provided on the rear surface of the first option board 1000, and this connector 1008 is inserted into a second socket 1010 on the main board. The first socket 1004, first subcontroller 1006, and connector 1008 are connected together by predetermined wiring. In a further variation, a first option board 1012 shown in FIG. 89B has a multi-layer circuit board structure with a first socket 1004 and a first subcontroller 1006 provided thereon, and a connector 1014 is provided on a rear surface of the first option board 1012. A cross-sectional view of this configuration is shown in FIG. 89C. This configuration enables a reduction in size of the option board.

Figure 89D:
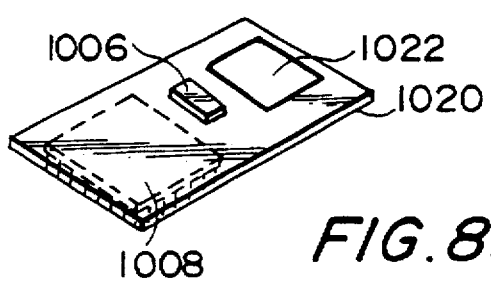
Figure 89E:
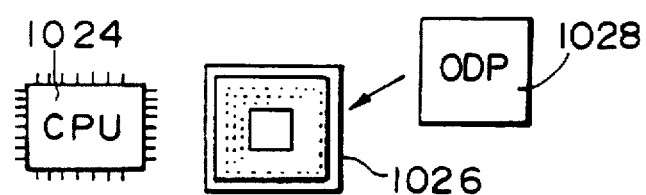

As shown in FIG. 89D, a CPU 1022 may be mounted on a first option board 1020 as a tape carrier package (TCP). Since the CPU 1022 is permanently installed on the first option board 1020 with this configuration, the manufacturer has to supply the CPU 1022. However, this configuration enables a reduction in mounting area.

In a further variation, an over-drive processor (ODP) socket 1026 in which an ODP 1028 is mounted acts as a second socket. In this case, the ODP 1028 can be removed from the ODP socket 1026 and a first option board of this invention can be installed in the ODP socket 1026. The removed ODP 1028 is then installed on the first option board. The ODP 1028 in this case corresponds to the central control means of this invention. Note that the ODP 1028 may be installed by TCP, as shown in FIG. 89D.

Furthermore, it is not necessary that the first and second boards of this invention are option boards. The third board is not limited to being the main board; it may equally well be a CPU board.

What is claimed is:

1. An emulation system, comprising:
   first device control means for controlling a first device, said first device control means being controlled by instructions of a first instruction set, said first instruction set conforming to a first computer architecture;
   second device control means for controlling a second device, said second device control means being controlled by instructions of a second instruction set, said second instruction set conforming to a second computer architecture differing from said first computer architecture;
   central control means coupled to the first and the second device control means for issuing an instruction which is a second instruction of said second instruction set;
   transferring means coupled to said second device control means for transferring said second instruction received from the central control means to one of said second device control means and said second device;

accepting means coupled to said transferring means for accepting and analyzing said second instruction when emulating one of said second device control means and said second device;

setting means coupled to said accepting means for setting first event data that indicates an instruction type when the accepting means accepts said second instruction; and interrupt means coupled to said central control means and said setting means for generating a first interrupt in said central control means based on said first event data when the accepting means accepts said second instruction, said first interrupt activating said central control means to execute a first given processing corresponding to said first event data with respect to one of at least said first device control means and said first device.

2. An emulation system as defined in claim 1, wherein a first control mode of said central control means is changed to a second control mode managed by a given system based on said first interrupt, data necessary for said first given processing being stored in a memory region dedicated to said second control mode.

3. An emulation system as defined in claim 2, wherein an address location in said memory region of said data necessary for said first given processing can be changed only in said second control mode.

4. An emulation system as defined in claim 1, wherein a first control mode of said central control means is changed to a second control mode managed by a given system based on said first interrupt, contents of internal registers of said central control means being stored in a memory region dedicated to said second control mode and, when said second control mode ends, the stored internal register contents being returned to said central control means.

5. An emulation system as defined in claim 4, wherein an address location in said memory region of said contents of said internal registers can be changed only when said central control means is in said second control mode.

6. An emulation system as defined in claim 1, wherein a first control mode of said central control means is changed to a second control mode managed by a given system based on said first interrupt, said first given processing being executed in accordance with an instruction set independent of said first control mode in which the central control means was operating before the first interrupt is generated.

7. An emulation system as defined in claim 1, wherein said first interrupt is a system management interrupt that changes a control mode of said central control means to a system management mode.

8. An emulation system as defined in claim 1, further comprising:
a plurality of first event storage means for storing said first event data; and
second event storage means for storing detailed event data relating to said first event data stored in each of said plurality of first event storage means, said detailed event data being stored in the second event storage means having a lower hierarchical level.

9. An emulation system as defined in claim 1, further comprising:
means coupled to said central control means for detecting and analyzing a change event in a system operating environment, for setting said first event data that indicate a type of said change event in the system operating environment, and for generating said first interrupt in said central control means to execute said first given processing corresponding to said first event data.

10. An emulation system as defined in claim 9, wherein said change event in said system operating environment comprises at least one of a power failure and a reset, said change event having a higher priority than any event based on an instruction issued by said central control means.

11. An emulation system as defined in claim 9, wherein said change event comprises at least one of a power failure and a reset, when the first given processing is executed based on said change event the first given processing storing data in memory means controlled by one of said first and said second device control means.

12. An emulation system as defined in claim 1, wherein said first event data correspond to an external input from external means that is unsupported by at least said first device control means, when said external input is detected, said first given processing of said central control means directing said first device control means to execute a processing that corresponds to said external input.

13. An emulation system as defined in claim 1, further comprising:
mask means coupled to said interrupt means for masking said first interrupt generated based on said first event data.

14. An emulation system as defined in claim 13, wherein said first interrupt is masked by said mask means after one of a power-on and a reset until said first given processing of said central control means can be executed normally.

15. An emulation system as defined in claim 14, wherein a dummy interrupt that is unmasked by said mask means is generated after one of said power-on and said reset to ensure a normal execution of said first given processing.

16. An emulation system as defined in claim 1, further comprising:
means for changing a system operating environment to a given state while said central control means is executing said first given processing.

17. An emulation system as defined in claim 16, wherein a change in said system operating environment is a change in a processing speed of said central control means to a higher speed setting.

18. An emulation system as defined in claim 1, further comprising:
bus arbiter means coupled to said transferring means that arbitrates a bus access, when said first interrupt is generated, said bus arbiter means arbitrating said bus access such that said central control means has a highest priority.

19. An emulation system as defined in claim 1, further comprising:
means for controlling a memory device acting as said first device control means, and means for translating a memory map of said memory device into a memory map conforming to said second computer architecture.

20. An emulation system, comprising:
central control means;
receiving means coupled to said central control means for receiving and analyzing an instruction when said central control means issues said instruction which is a second instruction from a second instruction set that conforms to a second computer architecture and differs from a first computer architecture;
setting means coupled to said receiving means for setting event data that indicates an instruction type when the receiving means receives said second instruction;

interrupt means coupled to said setting means for generating an interrupt in said central control means based on said event data when the receiving means receives said second instruction, said interrupt means activating said central control means to execute a given processing corresponding to said event data with respect to one of at least first device control means controlled by a first instruction set conforming to said first computer architecture and an object being controlled thereby, wherein during said given processing, said central control means operates at a higher speed.

21. An emulation system, comprising:

central control means;

transfer means coupled to said central control means for transferring an instruction when said central control means issues said instruction which is a first instruction of a first instruction set conforming to a first computer architecture to one of first device control means controlled by the first instruction set and an object being controlled by said first device control means;

receiving means coupled to said transfer means for receiving and analyzing said instruction when said central control means issues said instruction which is a second instruction of a second instruction set conforming to a second computer architecture that differs from said first computer architecture;

setting means coupled to said receiving means for setting event data that indicates an instruction type when said receiving means receives said second instruction; and interrupt means coupled to said central control means and said setting means for generating an interrupt in said central control means, said interrupt activating said central control means to execute a given processing corresponding to said event data with respect to one of at least said first device control means and said object being controlled thereby when the receiving means receives said second instruction, wherein a first control mode of said central control means is changed by said interrupt to a second control mode managed by a given system, and data necessary for said given processing is stored in a memory region dedicated to said second control mode.

22. An emulation system as defined in claim 21, wherein an address location in said memory region at which said data necessary for said given processing is stored can be changed only in said second control mode.

23. An emulation system as defined in claim 21, further comprising:

means for controlling a memory device acting as said first device control means, and means for translating a memory map of said memory device into a memory map conforming to said second computer architecture.

24. An emulation system, comprising:

central control means;

transfer means coupled to said central control means for transferring an instruction when said central control means issues said instruction which is a first instruction of a first instruction set conforming to a first computer architecture to one of first device control means controlled by said first instruction set and an object being controlled by said first device control means;

receiving means coupled to said transfer means for receiving and analyzing said instruction when said central control means issues said instruction which is a second instruction of a second instruction set conforming to a second computer architecture that differs from said first computer architecture;

setting means coupled to said receiving means for setting event data that indicates an instruction type when said receiving means receives said second instruction; and interrupt means coupled to said setting means for generating an interrupt in said central control means, said interrupt activating said central control means to execute a given processing corresponding to said event data with respect to one of at least said first device control means and said object being controlled thereby when said receiving means receives said second instruction, wherein a first control mode of said central control means is changed by said interrupt to a second control mode managed by a given system, contents of internal registers of said central control means being stored in a memory region dedicated to said second control mode and when said second control mode ends, the contents stored in said internal registers are returned to said central control means.

25. An emulation system as defined in claim 24, wherein an address location in said memory region at which the contents of said internal registers are stored can be changed only in said second control mode.

26. An emulation system as defined in claim 24, further comprising:

means for controlling a memory device acting as said first device control means, and means for translating a memory map of said memory device into a memory map conforming to said second computer architecture.

27. An emulation system, comprising:

central control means;

transfer means coupled to said central control means for transferring an instruction when said central control means issues said instruction which is a first instruction of a first instruction set conforming to a first computer architecture to one of first device control means controlled by said first instruction set and an object being controlled by said first device control means;

receiving means coupled to said transfer means for receiving and analyzing said instruction when said central control means issues said instruction which is a second instruction of a second instruction set conforming to a second computer architecture that differs from said first computer architecture;

setting means coupled to said receiving means for setting event data that indicates an instruction type when said receiving means receives said second instruction; and interrupt means coupled to said setting means for generating an interrupt in said central control means, said interrupt activating said central control means to execute a given processing corresponding to said event data with respect to one of at least said first device control means and said object being controlled by said first device control means when the receiving means receives said second instruction, wherein a first control mode of said central control means is changed by said interrupt to a second control mode managed by a given system, and said given processing is executed in accordance with an instruction set independent of the first control mode in which the central control means was operating before the interrupt is generated.

28. An emulation system, comprising:

central control means;

transfer means coupled to said central control means for transferring an instruction when said central control means issues said instruction which is a first instruction of a first instruction set conforming to a first computer architecture to one of first device control means controlled by said first instruction set and an object being controlled by said first device control means;

receiving means coupled to said transfer means for receiving and analyzing said instruction when said central control means issues said instruction which is a second instruction of a second instruction set conforming to a second computer architecture that differs from said first computer architecture;

setting means coupled to said receiving means for setting event data that indicates an instruction type when said receiving means receives said second instruction; and interrupt means coupled to said setting means for generating an interrupt in said central control means, said interrupt activating said central control means to execute a given processing corresponding to said event data with respect to one of at least said first device control means and said object being controlled by said first device control means when the receiving means receives said second instruction, wherein said interrupt is a system management interrupt for changing said central control means to a system management mode.

29. An emulation system, comprising:

central control means;

transfer means coupled to said central control means for transferring an instruction when said central control mean issues said instruction which is a first instruction of a first instruction set conforming to a first computer architecture to one of first device control means controlled by said first instruction set and an object being controlled by said first device control means;

receiving means coupled to said receiving means for receiving and analyzing said instruction when said central control means issues said instruction which is a second instruction of a second instruction set conforming to a second computer architecture differing from said first computer architecture;

setting means coupled to said receiving means for setting event data that indicates an instruction type when said receiving means receives said second instruction;

interrupt means coupled to said setting means for generating an interrupt in said central control means when said instruction is analyzed to be of a first instruction type, said interrupt activating said central control means to execute a given processing corresponding to said event data with respect to one of at least said first device control means and said object controlled by said first device control means; and translation means coupled to said central control means for translating said instruction into a translated first instruction conforming to said first computer architecture when said instruction is analyzed to be a second instruction type, said translation means further comprising:

means for disabling a bus access by said central control means; and means for issuing to the first device control means the translated first instruction instead of said instruction issued by said central control means.

30. An emulation system as defined in claim 29, further comprising:

means for halting a current processing of said central control means and disabling said bus access by said central control means;

means for issuing the translated first instruction instead of said instruction from said central control means when said instruction is a read instruction of a second instruction type, said first device control means receiving said translated first instruction and executing said translated first instruction to obtain read-data; and data transfer means for transferring the read-data to said central control means, the data transfer means transferring the read-data to said central control means by a re-execute processing of said central control means.

31. An emulation system as defined in claim 29, further comprising:

modifying means for modifying internal register contents of said central control means that are stored in a given memory region when said central control means issues a read instruction of said first instruction type, said modifying means modifying the given memory region by storing read-data obtained by said given processing in said given memory region; and returning means for returning the modified given memory region as the internal register contents to said central control means at an end of a control mode activated in said central control means by said interrupt.

32. An emulation system as defined in claim 29, wherein said first device control means is an interface for data transfer, said instruction issued by said central control means is one of a data transfer instruction and a status read instruction, said instruction being analyzed by said receiving means to be said second instruction type.

33. An emulation system as defined in claim 29, wherein said first device control means is an interface for data transfer, when said instruction issued by said central control means is a command write instruction, said instruction being analyzed by said receiving means to be said first instruction type, and is translated by said given processing of said central control means.

34. An emulation system as defined in claim 29, wherein said first device control means is an interface for data transfer, when said instruction issued by said central control means sets a baud rate for a data transfer, said instruction being analyzed by said receiving means to be said first instruction type, said baud rate being calculated by said given processing of said central control means.

35. An emulation system as defined in claim 29, wherein said first device control means is data input means, when said instruction issued by said central control means is one of a command transmission instruction, a command write instruction, and a data reception instruction, said instruction being analyzed by said receiving means to be of said first instruction type, said instruction being translated by said given processing of said central control means.

36. An emulation system as defined in claim 29, wherein said first device control means is data input means, when said instruction issued by said central control means is a status read instruction, said instruction being analyzed by said receiving means to be said second instruction type.

37. An emulation system as defined in claim 29, wherein said first device control means controls interrupts, said emulation system, further comprising:

vector translation means coupled to said first device control means for translating an interrupt vector issued with respect to said central control means.

38. An emulation system as defined in claim 29, wherein said first device control means controls interrupts, said emulation system, further comprising:

means coupled to said first device control means for halting a processing of said central control means and disabling said bus access from said central control means;

means coupled to said central control means for generating a new interrupt acknowledge cycle when an interrupt acknowledge instruction is issued by said central control means; and means coupled to said central control means for transferring a translated interrupt vector to said central control means by a re-execute processing of said central control means.

39. An emulation system, comprising:

central control means;

a bridge circuit that connects a first bus to a second bus; and a subcontroller connected to said first bus, said subcontroller comprising:

translating means for translating an instruction conforming to a second computer architecture issued from said central control means, said translating means translating said instruction into a first instruction conforming to a first computer architectures and disabling means for disabling a transfer of said instruction to one of first device control means connected to said second bus and an object being controlled by said first device control means when said instruction is issued, said disabling means disabling said transfer by controlling a first bus control signal that is input to said bridge circuit.

40. An emulation system, comprising:

central control means;

second device control means for controlling an object, said second device control means being connected to a first bus and controlled by a second instruction set conforming to a second computer architecture; and a subcontroller connected to said first bus, said subcontroller comprising:

translating means for translating an instruction conforming to said second computer architecture issued from said central control means, said translating means translating said instruction into a first instruction conforming to a first computer architecture, disabling and transferring means for disabling a transfer of said instruction to one of said second device control means and said object being controlled by said second device control means when said instruction conforming to said first computer architecture is issued, and for transferring said instruction to one of said second device control means and said object being controlled by said second device control means when said instruction conforming to said second computer architecture is issued, said disabling and transferring means performing disabling and transferring by controlling a first bus control signal that is input to said second device control means.

41. An emulation system comprising:

central control means;

a subcontroller connected to a first bus, said subcontroller comprising first means for translating an instruction when issued by said central control means that conforms to a second computer architecture, said first means translating said instruction to conform to a first computer architecture;

a first expansion slot which is connectable to said first bus;

a board which is insertable into said first expansion slot and comprising second means for translating a first bus signal into a second bus signal for a second bus that is controlled by said instruction when said instruction conforms to said second computer architecture; and an expansion slot box connected to said board by a cable and comprising at least one second expansion slot connectable to said second bus.

42. An emulation system for translating second instructions of a second instruction set conforming to a second computer architecture into first instructions of a first instruction set conforming to a first computer architecture when central control means issues said second instructions, said emulation system comprising:

a microcode memory for storing microcode information comprising at least command information and emulation address information at an input memory address location; and selector means coupled to said microcode memory for selecting one of address information included within said second instructions issued by said central control means and emulation address information contained within said microcode memory, and for generating said input memory address location based on said second instructions and said emulation address information, wherein said selector means selects said emulation address information and generates said input memory address location based on said emulation address information when emulation continuation information contained within said command information indicates that emulation is to continue.

43. An emulation system as defined in claim 42, further comprising:

data generation means coupled to said central control means for executing emulation data generation processing based on said microcode information from said microcode memory, wherein said data generation means executes said emulation data generation processing for an (n+1)th emulation, based on one of write data from the central control means and emulation data generated by an nth emulation where n is a positive integer when said emulation continuation information specifies that said emulation is to continue.

44. An emulation system as defined in claim 42, further comprising:

address decoding means for obtaining said input memory address location by decoding address information included within said second instructions issued by said central control means, wherein said address decoding means comprises means for obtaining different input memory address locations from identical address information, when said address information included within second instructions issued by said central control means are identical.

45. An emulation system for translating second instructions of a second instruction set conforming to a second computer architecture into first instructions of a first instruction set conforming to a first computer architecture when central control means issues said second instructions, said emulation system comprising:

a microcode memory for storing microcode information for an instruction translation at a given memory address location;

reading means coupled to said microcode memory for reading said microcode information from said microcode memory; and data generation means coupled to said central control means for generating emulation data based on said microcode information read from said microcode memory, wherein said microcode information includes first microcode information and second microcode information, said first microcode information comprising at least command information and emulation address information stored at a first memory address location said second microcode information comprising a part of data generation information stored at a second memory address location, said second memory address location being obtained by translating said first memory address location, said reading means reading said command information during a first memory read cycle, then when said emulation system determines that data generation processing by said data generation means is necessary based on said command information, said reading means activating a second memory read cycle and reads said data generation information stored at said second memory address location, said data generation means executing said data generation processing based on said first microcode information read out in said first memory read cycle and said second microcode information read out in said second memory read cycle.

46. An emulation system as defined in claim 45, wherein said data generation information comprises bit definition information, said data generation means defining a value of each bit of said emulation data based on said bit definition information and executing said data generation processing.

47. An emulation system as defined in claim 45, wherein said first microcode information comprises a predetermined number of bits of data and said command information comprises information specifying that said predetermined number of bits of data is to be output as said emulation data.

48. An emulation system as defined in claim 45, wherein said command information comprises information specifying that only address translation is to be executed and data translation is not to be executed.

49. An emulation system as defined in claim 45, further comprising:
  address decoding means for obtaining said first and second memory addresses by decoding address information included within said second instructions issued by said central control means, wherein said address decoding means comprises means for obtaining different memory addresses from identical address information when said address information included within second instructions issued by said central control means are identical.

50. An emulation system for translating a second instruction of a second instruction set conforming to a second computer architecture into a first instruction of a first instruction set conforming to a first computer architecture when central control means issues said second instruction, and for transferring said first instruction to one of first device control means controlled by said first instruction set and an object being controlled by said first device control means, said emulation system comprising:
  means coupled to said central control means for accepting a first interrupt from said first device control means and setting event data indicating an instruction type when said first interrupt is generated;
  means for generating a second interrupt for said central control means;
  execution means activated by said second interrupt for executing a given processing corresponding to said event data, and setting a state in which said second instruction can be issued to one of said first device control means and an object being controlled by said first device control means; and
  means for generating a third interrupt which is equivalent to said first interrupt and posting an instruction issue request in said central control means.

51. An emulation system as defined in claim 50, further comprising:
  a keyboard controller acting as said first device control means, wherein said given processing provided by said execution means uses a data translation table to translate input data from a keyboard and stores the translated input data in storage means which can be read by said central control means.

52. An emulation system as defined in claim 50, further comprising:
  a mouse controller acting as said first device control means, wherein said given processing provided by said execution means converts input data from a mouse into data that can be read by an instruction conforming to said second computer architecture and stores the converted input data in storage means which can be read by said central control means.

53. An emulation system, comprising:
  central control means;
  a first subcontroller connected to a first bus that is directly connected to said central control means, wherein said first subcontroller comprises:
    means for disabling the transfer of an instruction issued by said central control means to one of first device control means controlled in accordance with a first instruction set conforming to a first computer architecture and an object being controlled by said first device control means, said instruction being of an instruction set conforming to a second computer architecture;
    translating means coupled to said central control means for translating said instruction issued from said central control means into a first instruction of a first instruction set conforming to said first computer architecture; and
    transferring means coupled to said translating means for transferring said translated first instruction to one of said first device control means and said object being controlled by said first device control means.

54. An emulation system as defined in claim 53, wherein said transferring means for transferring said translated first instruction comprises means for halting and re-executing a processing of said central control means by controlling an input signal of said central control means, and for transferring one of data obtained from said translated first instruction and a control signal from said first device control means when re-executing said processing.

55. An emulation system as defined in claim 53, further comprising:
  a second subcontroller connected to a second bus differing from said first bus, wherein said second subcontroller comprises second device control means controlled by said instruction set conforming to said second computer architecture.

56. An emulation system as defined in claim 53, wherein said first subcontroller further comprises:
  means for transferring said instruction issued from said central control means to one of said first device control means and said object being controlled by said first device control means when said instruction issued from said central control means conforms to said first computer architecture.

57. An emulation system as defined in claim 53, wherein said first subcontroller further comprises:

means for delaying a control start signal generated by said central control means for said first bus to determine whether said instruction issued from said central control means is issued with respect to one of a memory device control means and an object being controlled by said memory device control means.

58. An emulation system as defined in claim 53, further comprising:

activating means coupled to said central control means for activating a second BIOS conforming to said second computer architecture in preference to a first BIOS conforming to said first computer architecture after one of a reset and power is turned on; and mode selection switching means for one of transferring said instruction issued by said central control means without translation and transferring said instruction issued by said central control means after translating said instruction into said translated first instruction based on a command from data input means.

59. An emulation system, comprising:

central control means;

a first subcontroller connected to a first bus that is directly connected to said central control means; and a second subcontroller connected to a second bus differing from said first bus, wherein said first subcontroller comprises first means for translating an instruction issued by said central control means into an unacceptable instruction that is unacceptable to one of first device control means controlled by a first instruction set conforming to a first computer architecture and an object being controlled by said first device control means, and said second subcontroller comprises second means for translating said instruction issued from said central control means into a translated first instruction conforming to said first computer architecture and for transferring said translated first instruction to one of said first device control means and said object being controlled by said first device control means.

60. An emulation system as defined in claim 59, wherein said first means translates said instruction into said unacceptable instruction by translating address information included within said instruction into an address that is not used by one of said first device control means and said object being controlled by said first device control means.

61. An emulation system as defined in claim 59, wherein said second means for translating and for transferring said translated first instruction further comprises:

means for halting and re-executing a processing of said central control means by controlling a second bus signal; and means for transferring data obtained from one of said translated first instruction and a control signal from said first device control means during re-execution of said processing.

62. An emulation system as defined in claim 59, wherein said second subcontroller comprises second device control means controlled by an instruction set conforming to said second computer architecture.

63. An emulation system as defined in claim 59, further comprising:

means for transferring an interrupt signal from said second subcontroller to said central control means.

64. An emulation system as defined in claim 59, wherein said first subcontroller further comprises:

means for transferring said instruction issued from said central control means to one of said first device control means and said object being controlled by said first device control means when said instruction issued from said central control means conforms to said first computer architecture.

65. An emulation system as defined in claim 59, wherein said first subcontroller further comprises:

means for delaying a control start signal generated by said central control means for said first bus to determine whether said instruction issued from said central control means is issued with respect to one of a memory device control means and an object being controlled by said memory device control means.

66. An emulation system as defined in claim 59, further comprising:

activating means coupled to said central control means for activating a second BIOS conforming to said second computer architecture in preference to a first BIOS conforming to said first computer architecture after one of a reset and power is turned on; and mode selection switching means for one of transferring said instruction issued by said central control means without translation and transferring said instruction issued by said central control means after translating said instruction into said translated first instruction based on a command from data input means.

67. An emulation system comprising:

central control means;

a first board coupled to said central control means having at least a first subcontroller for enabling emulation processing of an instruction issued by said central control means, wherein said first board comprises:

first connection means for connecting a first group of terminals corresponding to a group of terminals of said central control means to a first group of terminals of a second socket of a third board, said second socket being accommodable to said group of terminals of said central control means; and second connection means for connecting a second group of terminals of said central control means to a second group of terminals of said second socket, via said first subcontroller.

68. An emulation system as defined in claim 67, wherein said first board further comprises:

a first socket that accommodates said group of terminals of said central control means;

a connector having a plurality of pins insertable into a plurality of pin holes provided in said second socket; and wiring means for connecting terminals of said first socket, terminals of said first subcontroller, and terminals of said connector.

69. An emulation system as defined in claim 67, wherein said first board further comprises:

said central control means;

a connector having a plurality of pins insertable into a plurality of pin holes provided in said second socket; and wiring means for connecting terminals of said central control means, terminals of said first subcontroller, and terminals of said connector.

70. An emulation system as defined in claim 67, further comprising:

a second board having at least a second subcontroller for executing said emulation processing together with said first subcontroller, said second board being insertable into an expansion slot that is capable of transferring signals to and from terminals of said second socket on said third board.

71. An emulation system as defined in claim 70, further comprising:
a signal line for transferring signals between said first and second boards, wherein said signals comprise an interrupt signal generated from said second subcontroller on said second board with respect to said central control means on said first board.

72. An emulation method using an information processing device which combines first device control means controlled by a first instruction set conforming to a first computer architecture and second device control means controlled by a second instruction set conforming to a second computer architecture differing from said first computer architecture, comprising the steps of:
A: issuing a second instruction of said second instruction set from central control means;
B: transferring said second instruction to one of said second device control means, an object being controlled by said second device control means and means for accepting and analyzing said second instruction; then
C: indicating an instruction type by setting event data of an event using setting means and generating an interrupt using interrupt means with respect to said central control means; and
D: executing a given processing activated by said interrupt of said step C, said given processing corresponding to said event with respect to at least one of said first device control means and an object being controlled by said first device control means.

73. An emulation method as defined in claim 72, further comprising:
detecting and analyzing a change in a system operating environment during said steps B and C;
setting said event data that indicates a type of said change in the system operating environment; and
generating an interrupt with respect to said central control means.

74. An emulation method as defined in claim 73, wherein said change is a high priority change when said event data is set based on said change in said system operating environment that corresponds to at least a first event caused by one of a power-failure and a reset, and said first event is set to have a priority higher than a second event based on an instruction issued by said central control means.

75. An emulation method as defined in claim 72, wherein said event comprises an event relating to an input from external means that is unsupported by at least said first device control means, and when said external input is detected, said given processing of said step D is executed so that said first device control means executes processing corresponding to said external input.

76. An emulation method as defined in claim 72, wherein said interrupt generated in said step C is masked by mask means.

77. An emulation method comprising the steps of:
A: receiving and analyzing an instruction using receiving means when central control means issues a second instruction of a second instruction set conforming to a second computer architecture differing from a first computer architecture;
B: setting event data using setting means that indicates an instruction type and generating an interrupt with respect to said central control means using interrupt means;

C: executing a given processing activated by said interrupt, said given processing corresponding to said event data with respect to at least one of first device control means controlled by a first instruction set conforming to said first computer architecture and an object being controlled by said first device control means; and
D: setting a processing speed of said central control means to a higher speed while executing said given processing of step C.

78. An emulation method, comprising the steps of:
A: transferring an instruction to one of first device control means controlled by a first instruction set conforming to a first computer architecture and an object being controlled by said first device control means when central control means issues said instruction from said first instruction set;
B: receiving and analyzing said instruction using receiving means when said central control means issues said instruction from a second instruction set conforming to a second computer architecture differing from said first computer architecture;
C: setting event data using setting means that indicates an instruction type and generating an interrupt using interrupt means with respect to said central control means; and
D: executing a given processing activated by said interrupt, said given processing corresponding to said event data with respect to at least one of said first device control means and said object being controlled by said first device control means, wherein a first control mode of said central control means is changed by said interrupt to a second control mode managed by a given system, and data necessary for said given processing is stored in a memory region dedicated to said second control mode.

79. An emulation method, comprising the steps of:
A: transferring an instruction to one of first device control means controlled by a first instruction set conforming to a first computer architecture and an object being controlled by said first device control means when central control means issues said instruction from said first instruction set;
B: receiving and analyzing said instruction using receiving means when said central control means issues said instruction from a second instruction set conforming to a second computer architecture differing from said first computer architecture;
C: setting event data using setting means that indicates an instruction type and generating an interrupt using interrupt means with respect to said central control means; and
D: executing a given processing activated by said interrupt, said given processing corresponding to said event data with respect to at least one of said first device control means and said object being controlled by said first device control means, wherein a first control mode of said central control means is changed by said interrupt to a second control mode managed by a given system, contents of internal registers of said central control means are stored in a memory region dedicated to said second control mode, and when said second control mode ends, the stored internal register contents are returned to said central control means.

80. An emulation method, comprising the steps of:
A: transferring an instruction to one of first device control means controlled by a first instruction set conforming to a first computer architecture and an object being controlled by said first device control means when central control means issues an instruction from said first instruction set;

B: receiving and analyzing a second instruction using receiving means when said central control means issues said instruction from a second instruction set conforming to a second computer architecture differing from said first computer architecture;

C: setting event data using setting means that indicates an instruction type and generating an interrupt using interrupt means with respect to said central control means when said instruction has been analyzed to be of a first instruction type;

D: executing a given processing activated by said interrupt, said given processing corresponding to said event data with respect to at least one of said first device control means and said object being controlled by said first device control means;

E: translating said instruction into a translated first instruction of said first instruction set conforming to said first computer architecture when said instruction is analyzed to be of a second instruction type; and F: disabling a bus access by said central control means and issuing the translated first instruction instead of said central control means.

81. An emulation method for translating an instruction into a translated first instruction of a first instruction set conforming to a first computer architecture when central control means issues said instruction from a second instruction set conforming to a second computer architecture, the method comprising the steps of:

A: reading microcode information stored in a microcode memory, said microcode information comprising at least command information and emulation address information at an input memory address location; and B: selecting one of address information included within said instruction issued by said central control means and emulation address information read out from said microcode memory; and C: generating a memory address based on said instruction and said emulation address information, wherein said emulation address information is selected and said memory address is generated based on said emulation address information when emulation continuation information comprised within said command information indicates that emulation is to continue.

82. An emulation method for translating an instruction into a translated first instruction of a first instruction set conforming to a first computer architecture when central control means issues said instruction from a second instruction set conforming to a second computer architecture, the method comprising the steps of:

A: reading first microcode information by activating a first memory read cycle, said first microcode information comprising at least command information and emulation address information that is stored at a first memory address location of a microcode memory;

B: reading second microcode information comprising a part of data generation information that is stored at a second memory address location obtained by translating said first memory address when it is determined that emulation data generation processing is necessary based on said command information; and C: executing an emulation data generation processing based on said first microcode information read out in said first memory read cycle and said second microcode information read out in a second memory read cycle.

83. An emulation method for translating an instruction into a translated first instruction of a first instruction set conforming to a first computer architecture when central control means issues said instruction from a second instruction set conforming to a second computer architecture, and for transferring said translated first instruction to one of first device control means controlled by said first instruction set and an object being controlled by said first device control means, the method comprising the steps of:

A: accepting a first interrupt from said first device control means and setting event data indicating an instruction type when said first interrupt is generated;

B: generating a second interrupt for said central control means;

C: executing a given processing activated by said second interrupt and corresponding to said event data;

D: setting a state in which an instruction conforming to said second computer architecture can be issued to one of said first device control means and an object being controlled by said first device control means; and E: generating a third interrupt which is equivalent to said first interrupt and posting an instruction issue request with respect to said central control means.

84. An emulation method using an information processing device comprising a first subcontroller connected to a first bus that is directly connected to central control means, the method comprising the steps of:

A: disabling the transfer of an instruction to one of first device control means controlled by a first instruction set conforming to a first computer architecture and an object being controlled by said first device control means when said central control means issues said instruction from a second instruction set conforming to a second computer architecture; and B: translating said instruction issued from said central control means into a translated first instruction of a first instruction set conforming to said first computer architecture; and C: transferring said translated first instruction to one of said first device control means and said object being controlled by said first device control means.

85. An emulation method using an information processing device comprising a first subcontroller connected to a first bus that is directly connected to central control means, and a second controller connected to a second bus differing from said first bus, the method comprising the steps of:

A: translating an instruction issued by said central control means into an unacceptable instruction that is unacceptable to one of first device control means controlled in accordance with a first instruction set conforming to a first computer architecture and an object being controlled by said first device control means; and B: translating said instruction issued from said central control means into a translated first instruction of said first instruction set and transferring said translated first instruction to one of said first device control means and said object being controlled by said first device control means.

* * * * *